US012585326B2

(12) United States Patent　　(10) Patent No.:　US 12,585,326 B2
Stavru et al.　　　　　　　　　(45) Date of Patent:　Mar. 24, 2026

(54) METHODS AND APPARATUS TO PRESENT CONSENT-BASED, CONSENSUS-BASED AND CONSENT-CONSENSUS-BASED CONVERSATIONAL WORKSHOPS IN COMPUTING ENVIRONMENTS

(71) Applicant: AhaPlay Limited, Sofia (BG)

(72) Inventors: Stavros Andreu Stavru, Sofia (BG);
Stefan Todorov Grigorov, Sofia (BG);
Ivan Plamenov Mitov, Sofia (BG)

(73) Assignee: AhaPlay Bulgaria VCC, Sofia (BG)

( * ) Notice: Subject to any disclaimer, the term of this patent is extended or adjusted under 35 U.S.C. 154(b) by 0 days.

(21) Appl. No.: 18/890,677

(22) Filed: Sep. 19, 2024

(65) Prior Publication Data

US 2025/0093943 A1　　Mar. 20, 2025

Related U.S. Application Data

(60) Provisional application No. 63/583,844, filed on Sep. 19, 2023.

(51) Int. Cl.
*G06F 3/01*　　　　(2006.01)
*G06F 11/34*　　　(2006.01)
(52) U.S. Cl.
CPC .......... *G06F 3/011* (2013.01); *G06F 11/3438* (2013.01); *G06F 2203/011* (2013.01)
(58) Field of Classification Search
None
See application file for complete search history.

(56) References Cited

U.S. PATENT DOCUMENTS 7,007,235 B1　　2/2006　Hussein et al.
11,812,194 B1 *　11/2023　Vandyke ................. G06F 3/167
2014/0137003 A1　5/2014　Peters et al.
2015/0100503 A1　4/2015　Lobo et al.

OTHER PUBLICATIONS

International Searching Authority, "Search Report," issued in connection with PCT Application No. PCT/EP2024/076221, dated Nov. 27, 2024, 5 pages.
International Searching Authority, "Written Opinion," issued in connection with PCT Application No. PCT/EP2024/076221, dated Nov. 27, 2024, 11 pages.
Sonya T., "7 Tips for Running Effective Whiteboard Sessions," Collaboration, GlobalMeet, Jun. 10, 2020, 2 pages.

* cited by examiner

*Primary Examiner* — Aneeta Yodichkas
(74) *Attorney, Agent, or Firm* — Hanley, Flight & Zimmerman, LLC

(57)　　　　ABSTRACT

An example apparatus includes interface circuitry, machine-readable instructions, and at least one processor circuit to be programmed by the machine-readable instructions to present a graphical user interface associated with a conversational workshop, a type of the graphical user interface presented based on a status of a user account, identify a conversation flow to present on the graphical user interface, the conversation flow based on a type of activity, receive user input associated with the type of activity, the user input including input from a plurality of users, identify at least one of a consent or a consensus from the user input, and output, based on the at least one of the consent or the consensus, a progress of the conversational workshop.

20 Claims, 121 Drawing Sheets

100 ─

300

1200

1300

1400

1500

1600

1700

1800

1900

2000

2100

2200

2300

2400

2500

2600

2700

2800

2900

3000

3100

3200

3300

3400

3500

3600

3700

3800

3900

4000

4100

4200

4300

4400

4500

4600

4700

4800

4900

5200

5300

5400

5500

5600

5700

5800

5900

6000

6100

6200

6300

6400

6500

6600

6700

6800

6900

7000

7100

7200

7300

7400

7500

7600

7700

8200

8300

8400

8500

8600

8700

8800

8900

9200

9300

9400

9500

9800

9900

10000

10100

10200

10300

10400

10500

10600

10700

10800

10900

11000

11100

11200

11300

11400

11500

11600

11700

12000

12100

12200

12300

12600

12700

13000

13100

13200

13300

13800

13900

14000

14100

14200

14300

14400

14500

14600

14700

14800

14900

15000

15100

15200

15300

15400

15500

15600

15700

15800

15900

16000

16100

16200

16300

16400

16500

16600

16700

16800

16900

17000

17100

17200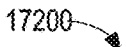
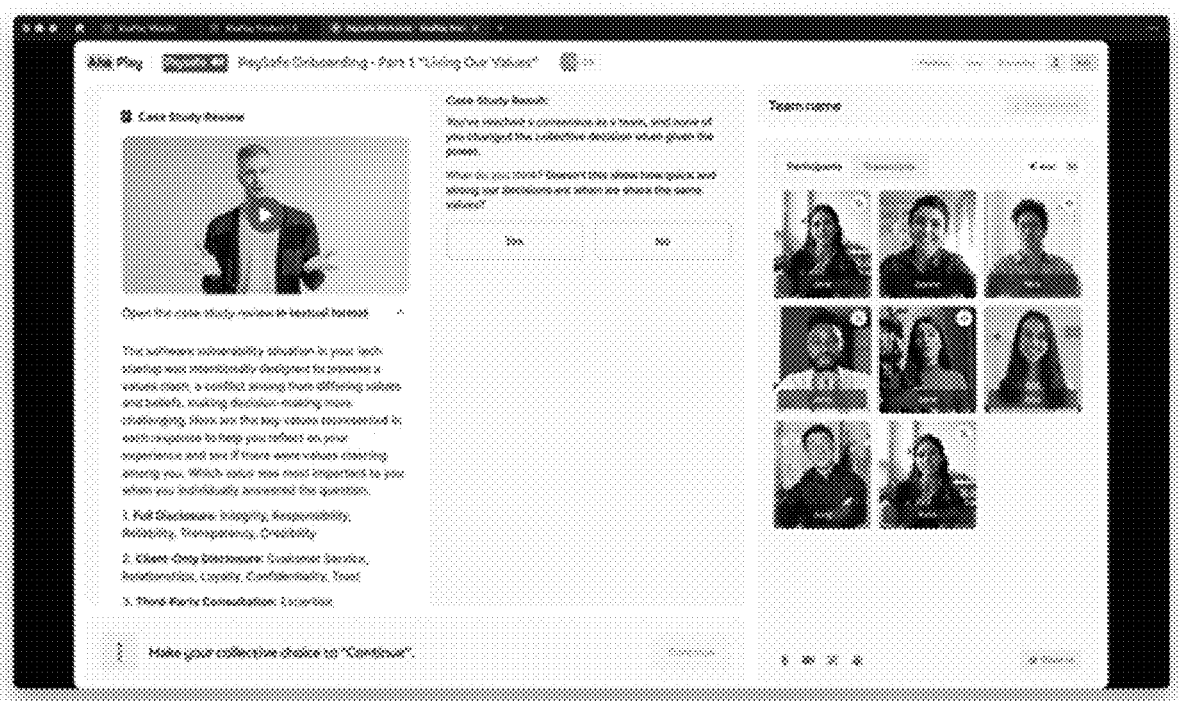
FIG. 172
17300
FIG. 173

17400

17500

17600

17700

17800

17900

18000

18100

18200

18300

18400

18500

18600

18700

18800

18900

19000

19100

19200

19300

19400

19500

19600

19700

19800

19900

20000

20100

20200

20300

20400

20500

20600

20700

20800

20900

21000

21100

21200

21300

21400

21500

21600

21700

21800

21900

METHODS AND APPARATUS TO PRESENT CONSENT-BASED, CONSENSUS-BASED AND CONSENT-CONSENSUS-BASED CONVERSATIONAL WORKSHOPS IN COMPUTING ENVIRONMENTS

BACKGROUND

Virtual meetings allow for collaborative activities among individuals using video, audio and/or text to share information in real-time. For example, virtual meetings can include one-on-one meetings and/or team-based discussions. In some examples, virtual meetings can be joined using videoconferencing software, online communication platforms, and/or phone-based conferencing systems. In some examples, virtual meeting software is executed using mobile applications, desktop applications, and/or Internet browsers.

BRIEF DESCRIPTION OF THE DRAWINGS

FIG. 120 illustrates an example fourth user interface associated with exiting a conversation.

FIG. 121 illustrates an example fifth user interface associated with exiting a conversation.

FIG. 122 illustrates an example first user interface associated with changing roles during the execution of the conversation flow.

FIG. 123 illustrates an example second user interface associated with changing roles during the execution of the conversation flow.

FIG. 124 illustrates an example first user interface associated with identifying an outcome of the conversation.

FIG. 125 illustrates an example second user interface associated with identifying an outcome of the conversation.

FIG. 126 illustrates an example third user interface associated with identifying an outcome of the conversation.

FIG. 127 illustrates an example first user interface associated with a conversation flow.

FIG. 128 illustrates an example second user interface associated with a conversation flow, where the user is notified to select "Continue" to submit their response.

FIG. 129 illustrates an example third user interface associated with a conversation flow, where the user is notified to select "Continue" after finalizing their definition.

FIG. 130 illustrates an example fourth user interface associated with a conversation flow, where the user is notified that all players are ready.

FIG. 131 illustrates an alternative first user interface associated with a conversation flow, where the user can provide their individual definition.

Figure 132:
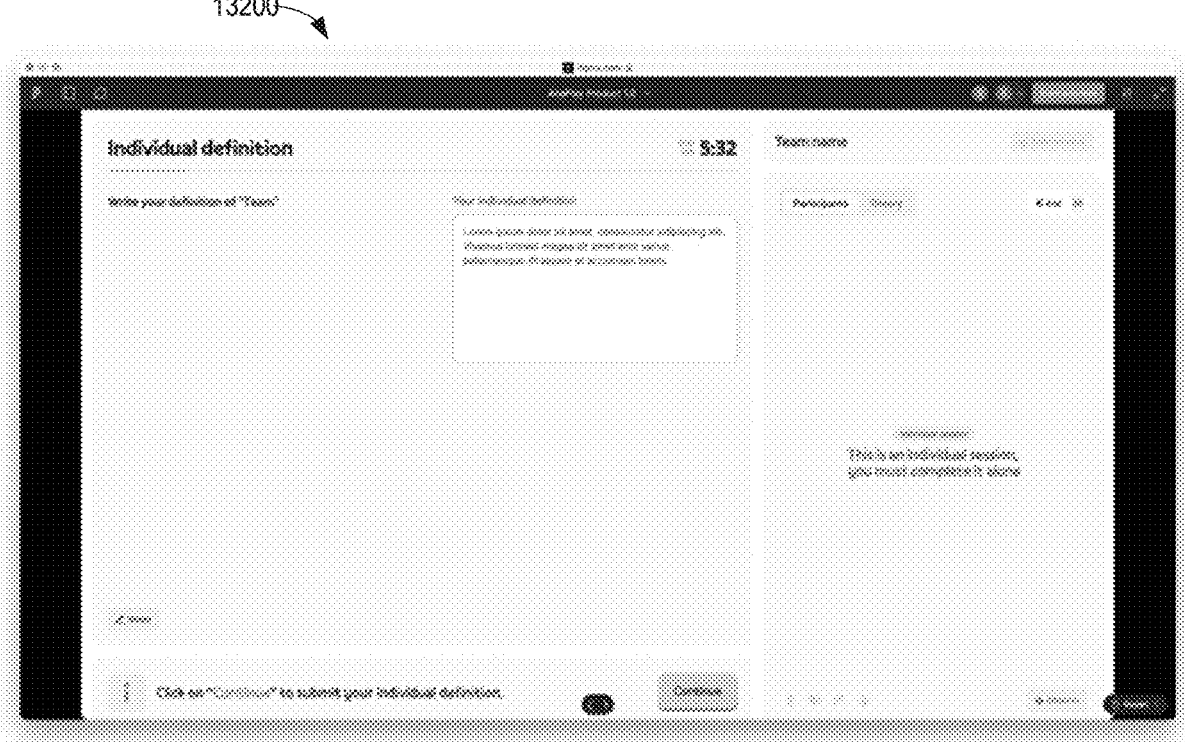

FIG. 132 illustrates an alternative second user interface associated with a conversation flow, where the user is notified to submit their individual definition.

Figure 133:
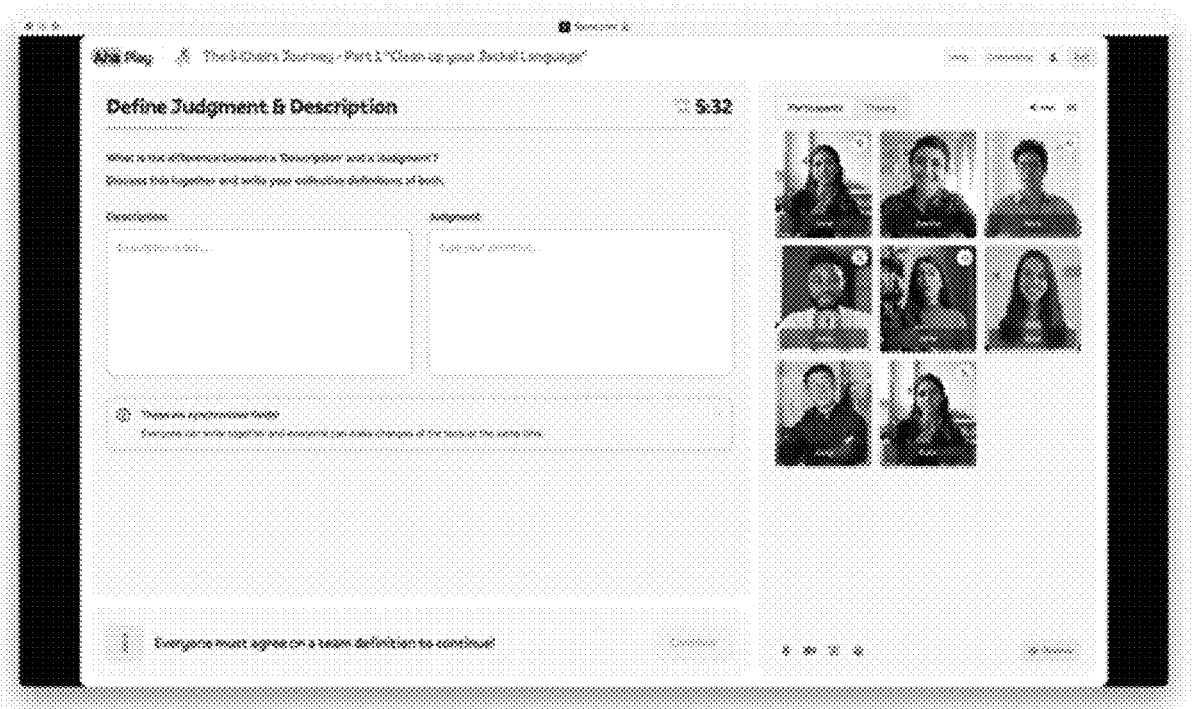

FIG. 133 illustrates an alternative third user interface associated with a conversation flow, where the user is notified that everyone agrees on a team definition to continue.

Figures 134, 135:

FIG. 134 illustrates an example first user interface associated with a definition entry, where the user's definition entry is displayed, and the user is prompted to enter a team definition.

FIG. 135 illustrates an example second user interface associated with a definition entry, where the team definition is displayed separately from the user's own definition.

Figures 136, 137:

FIG. 136 illustrates example third user interface associated with a definition entry, where the team definition is displayed separately from the user's own definition and the user is notified that two players have agreed to the team definition.

FIG. 137 illustrates an example fourth user interface associated with a definition entry, where the team definition is displayed separately from the user's own definition and the user is notified that three more players need to approve the team definition.

Figure 138:
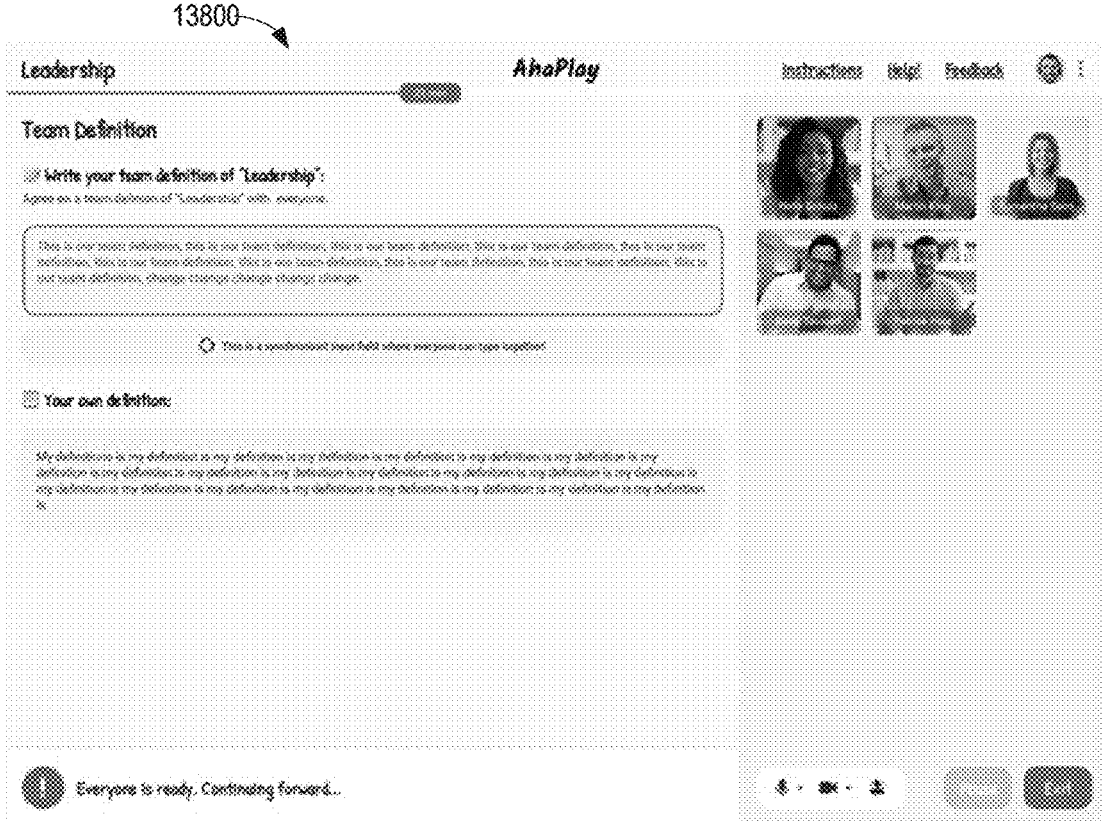

FIG. 138 illustrates an example fifth user interface associated with a definition entry, where the team definition is displayed separately from the user's own definition and the user is notified that all team players are ready to continue forward.

Figure 139:
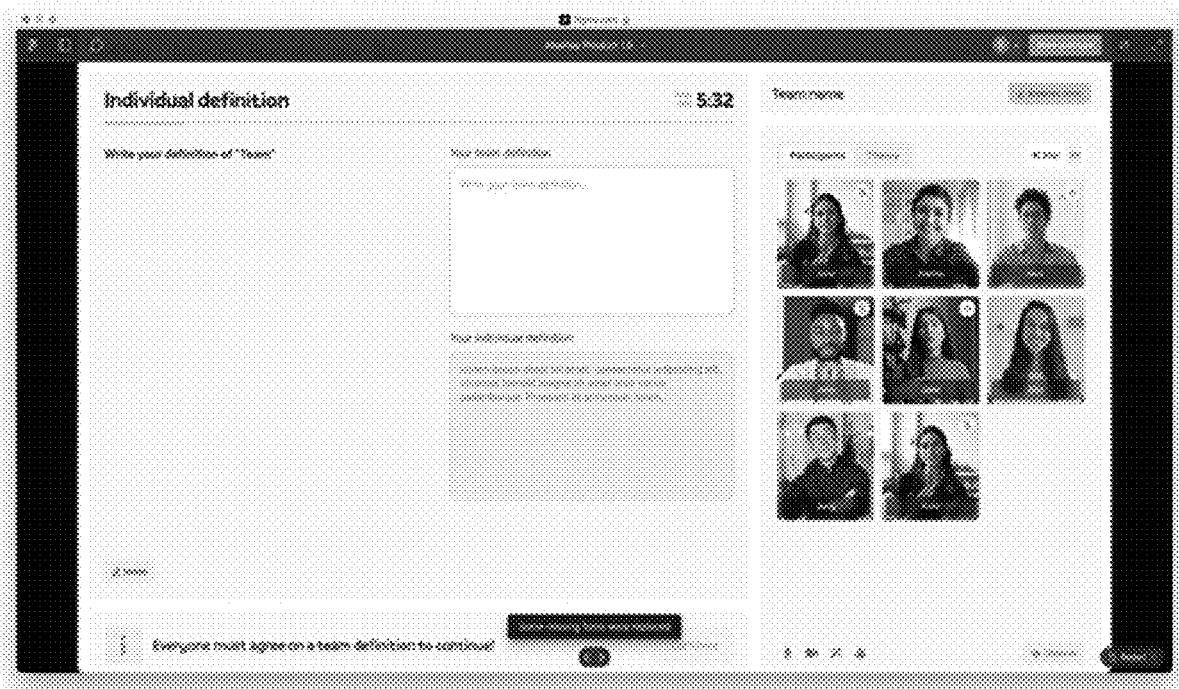

FIG. 139 illustrates an alternative first user interface associated with a definition entry, where the team definition is displayed separately from the user's own definition and the user is notified that all players agree on a team definition to continue.

Figures 140, 141:
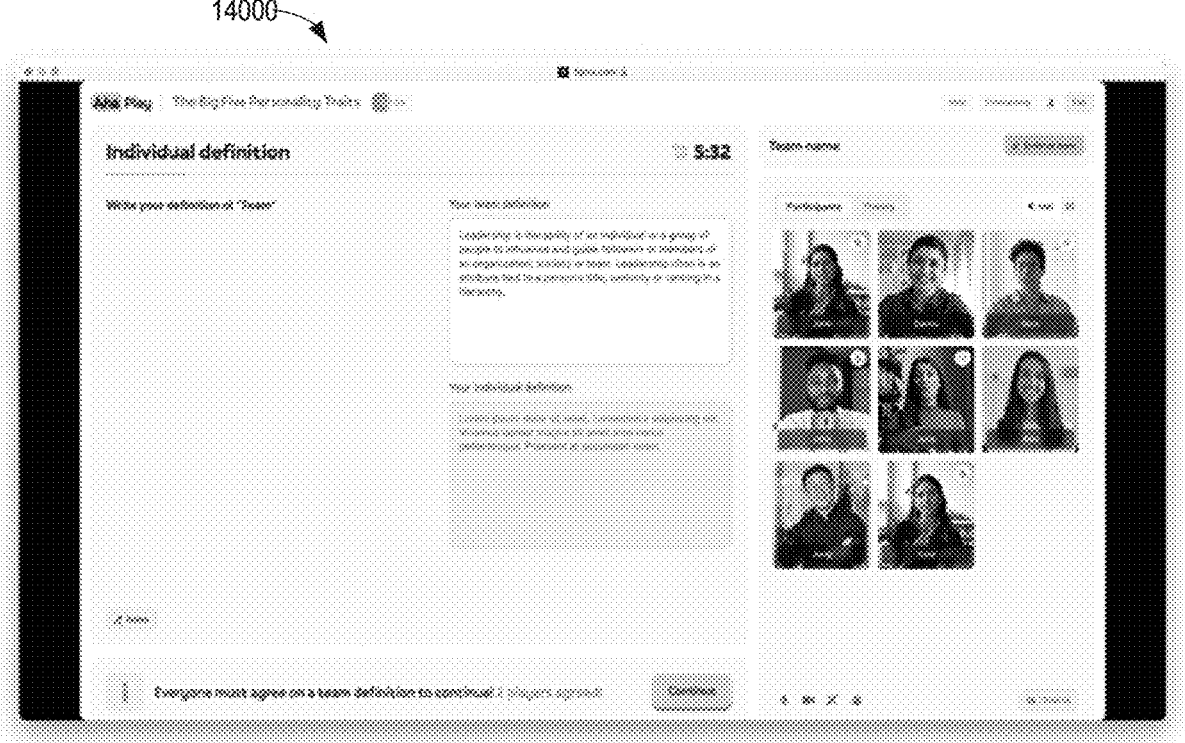

FIG. 140 illustrates an alternative second user interface associated with a definition entry, where the team definition is displayed separately from the user's own definition and the user is notified that two players have agreed on the team definition.

FIG. 141 illustrates an example first user interface associated with benchmarking individually, where the user selects an individual definition.

Figure 142:
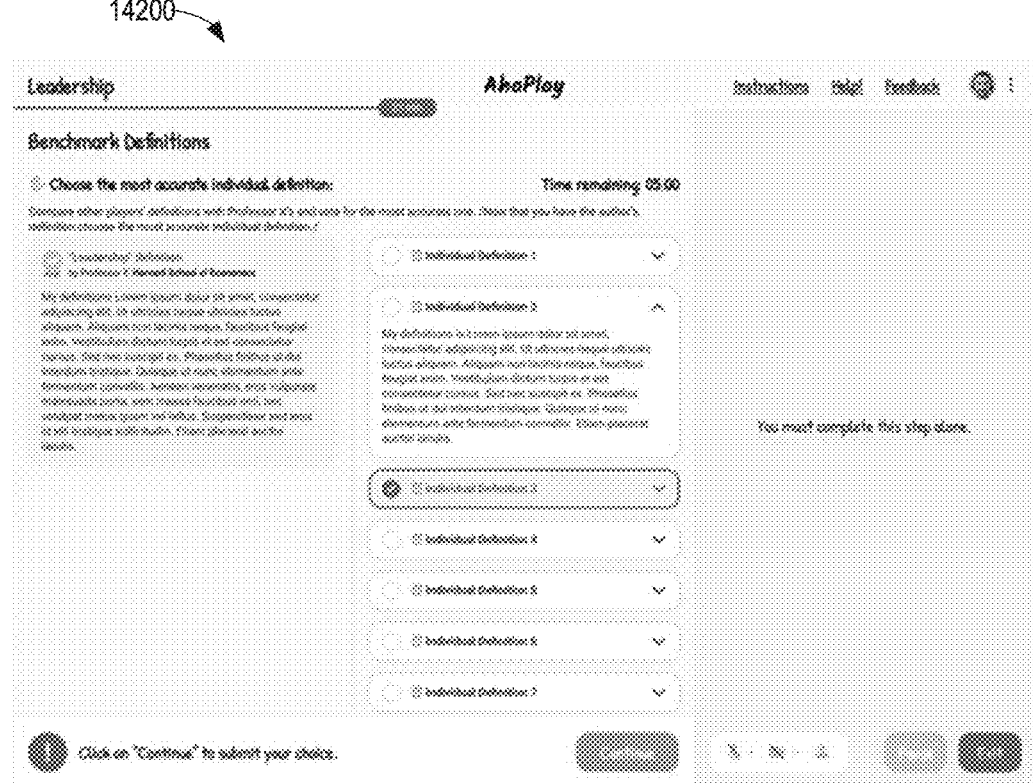

FIG. 142 illustrates an example second user interface associated with benchmarking individually, where the user selects an answer and proceeds to submit their choice.

Figure 143:
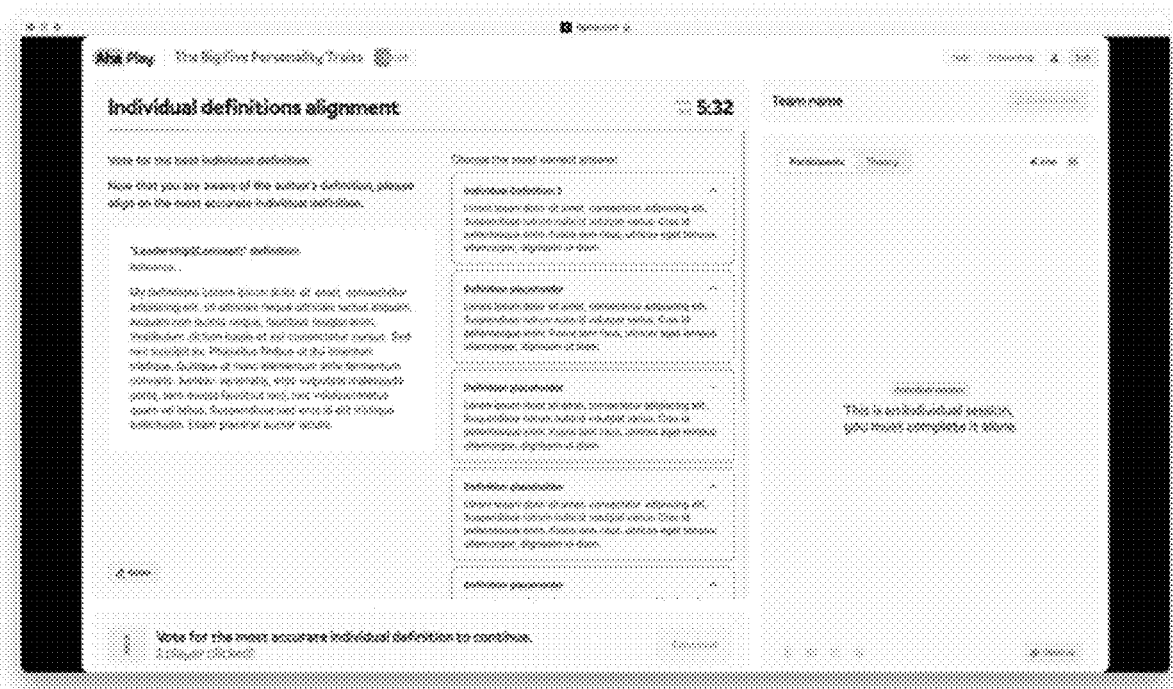

FIG. 143 illustrates an alternative first user interface associated with benchmarking individually, where the user votes for the most accurate individual definition.

Figure 144:
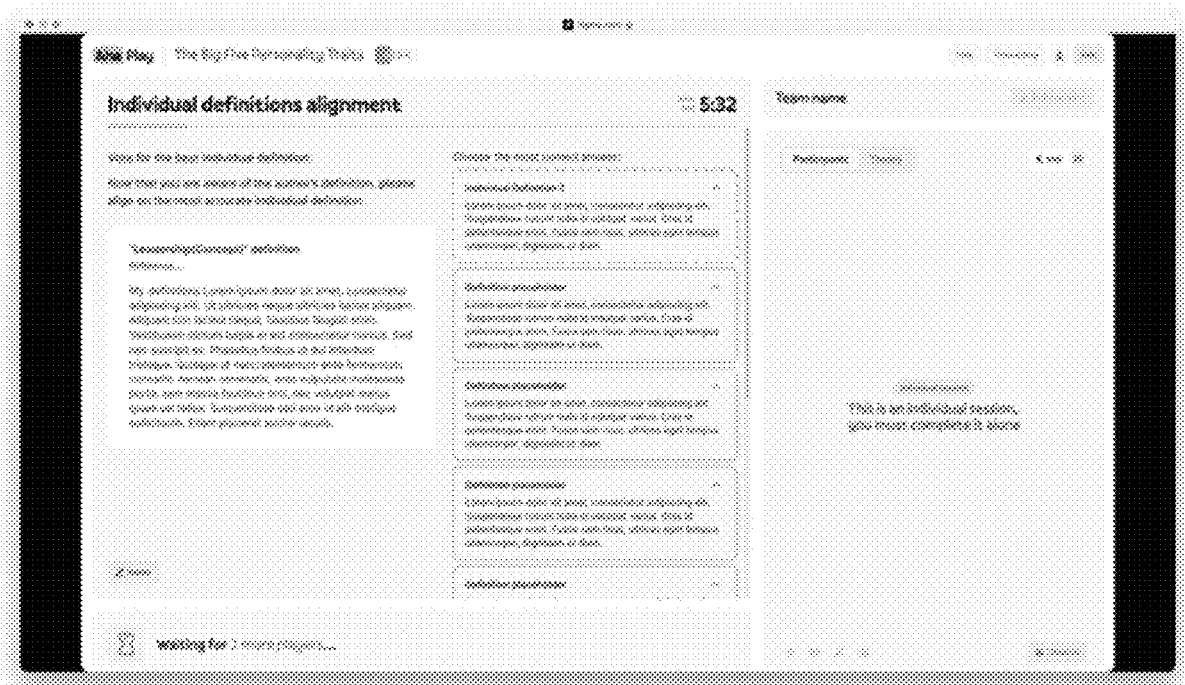

FIG. 144 illustrates an alternative second user interface associated with benchmarking individually, where the user is notified that two more players need to provide their input.

Figure 145:
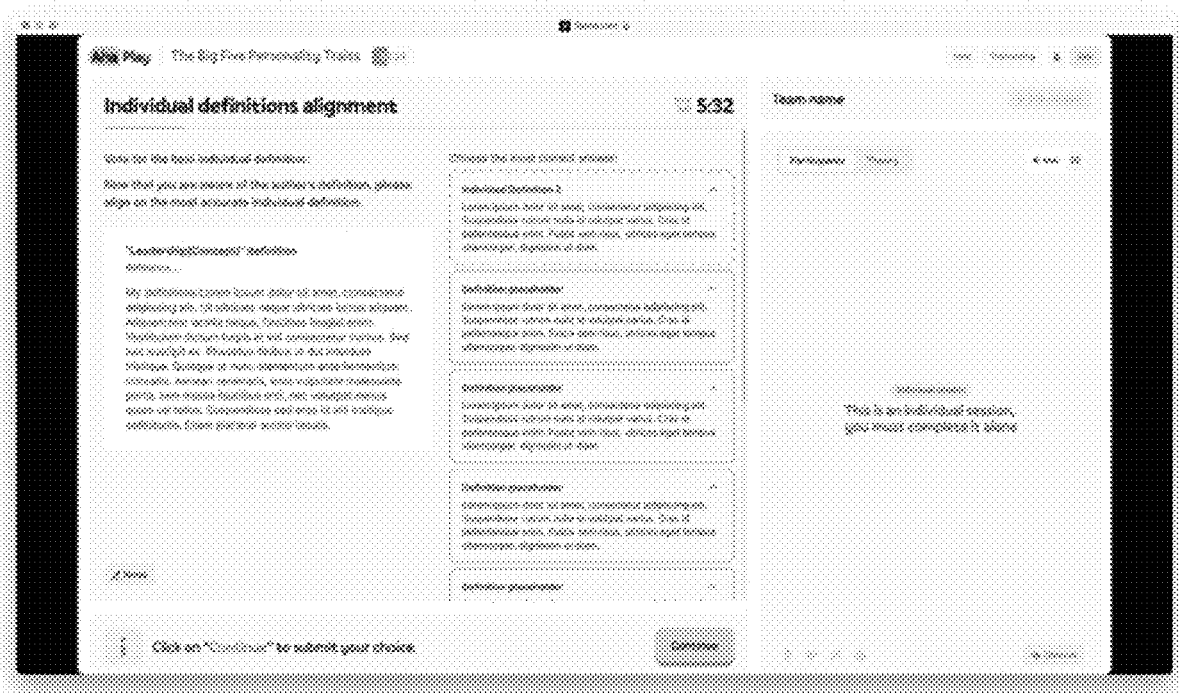

FIG. 145 illustrates an alternative third user interface associated with benchmarking individually, where the user is notified to proceed with the submission of their choice.

Figures 146, 147:
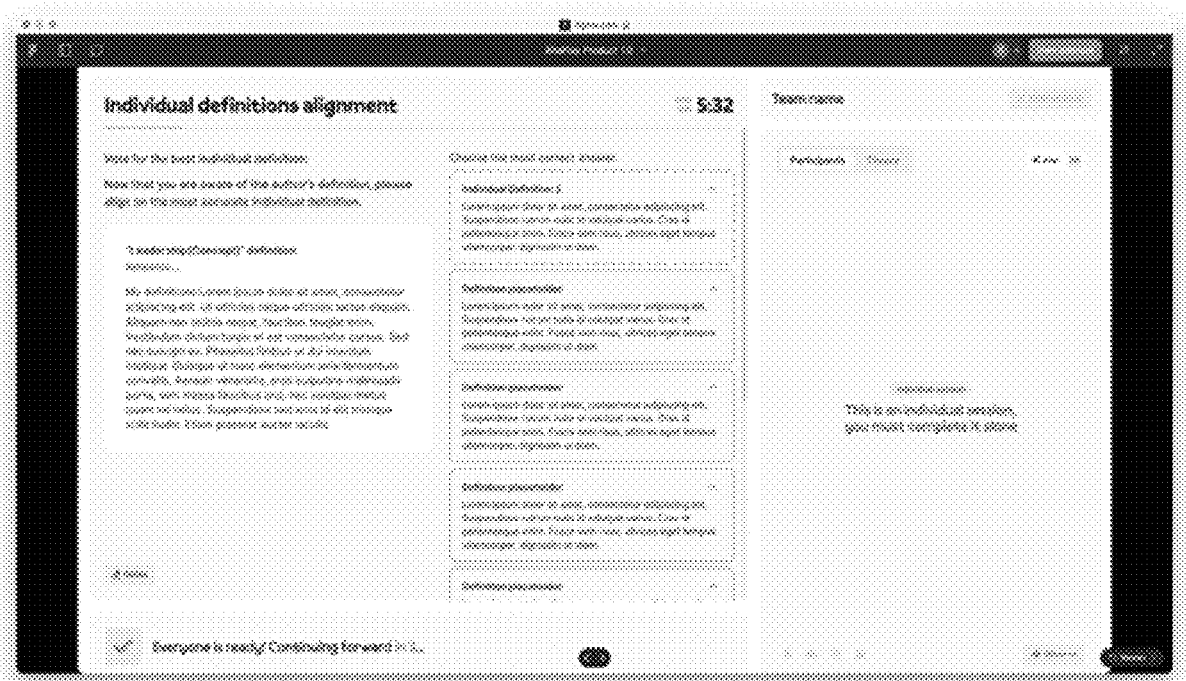

FIG. 146 illustrates an alternative fourth user interface associated with benchmarking individually, where the user is notified that all players are ready to proceed.

FIG. 147 illustrates an example first user interface associated with benchmarking as a group.

Figure 148:
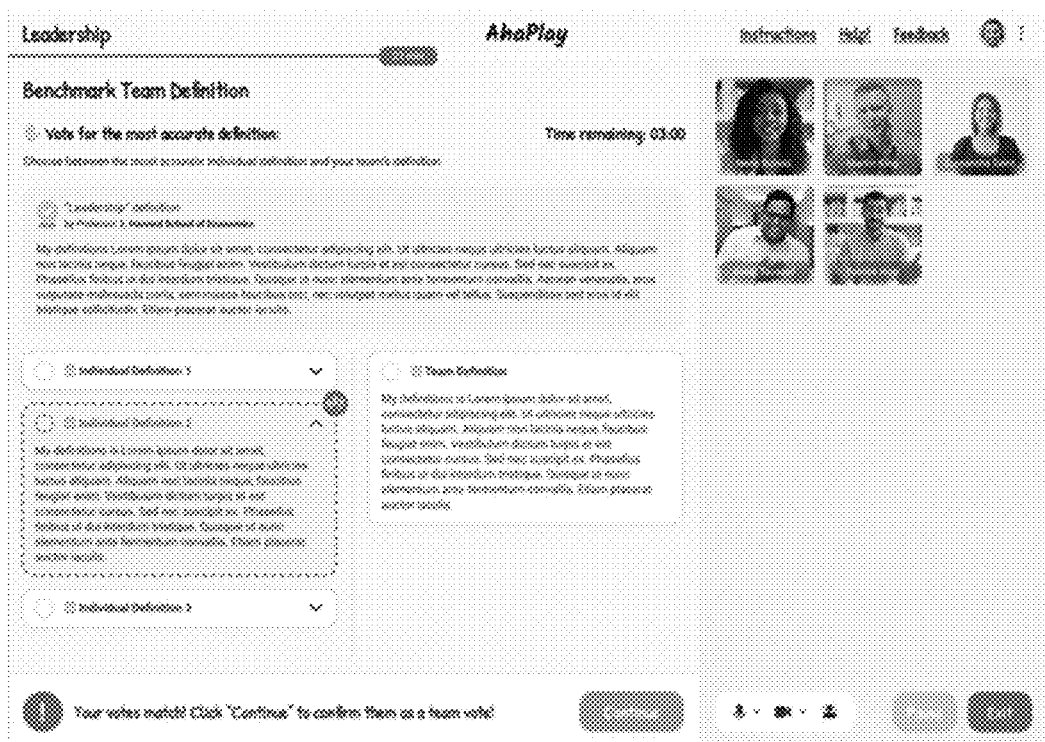

FIG. 148 illustrates an example second user interface associated with benchmarking as a group where the user is notified that all votes match.

Figure 149:
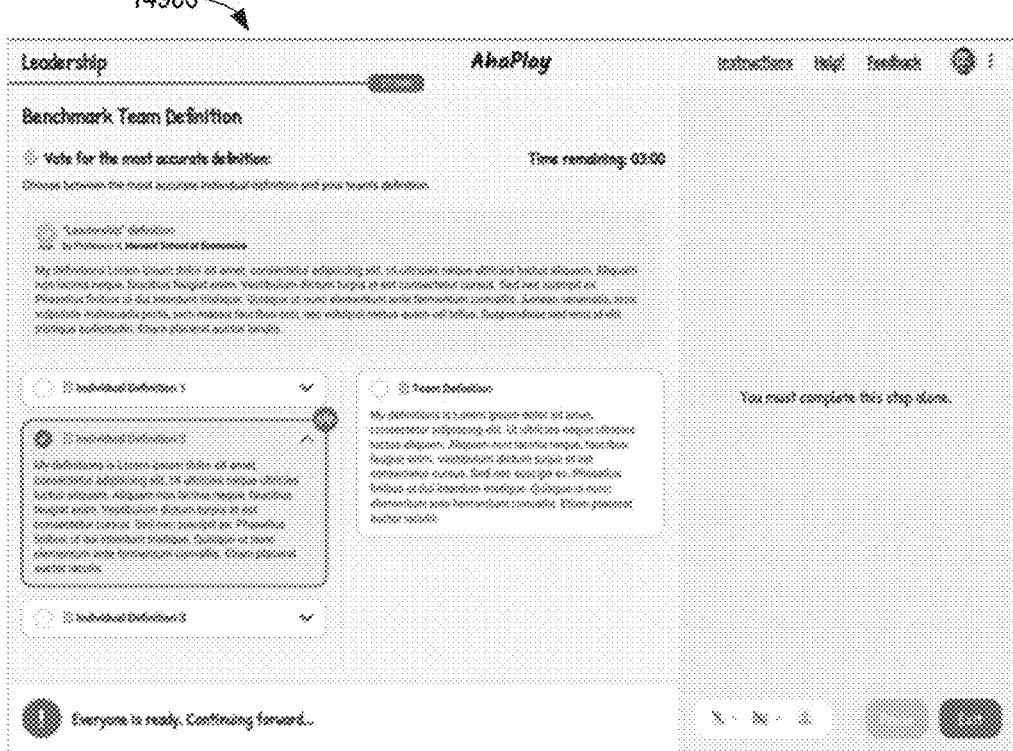

FIG. 149 illustrates an example third user interface associated with benchmarking as a group, where the user is notified that all participants are ready to continue.

Figure 150:
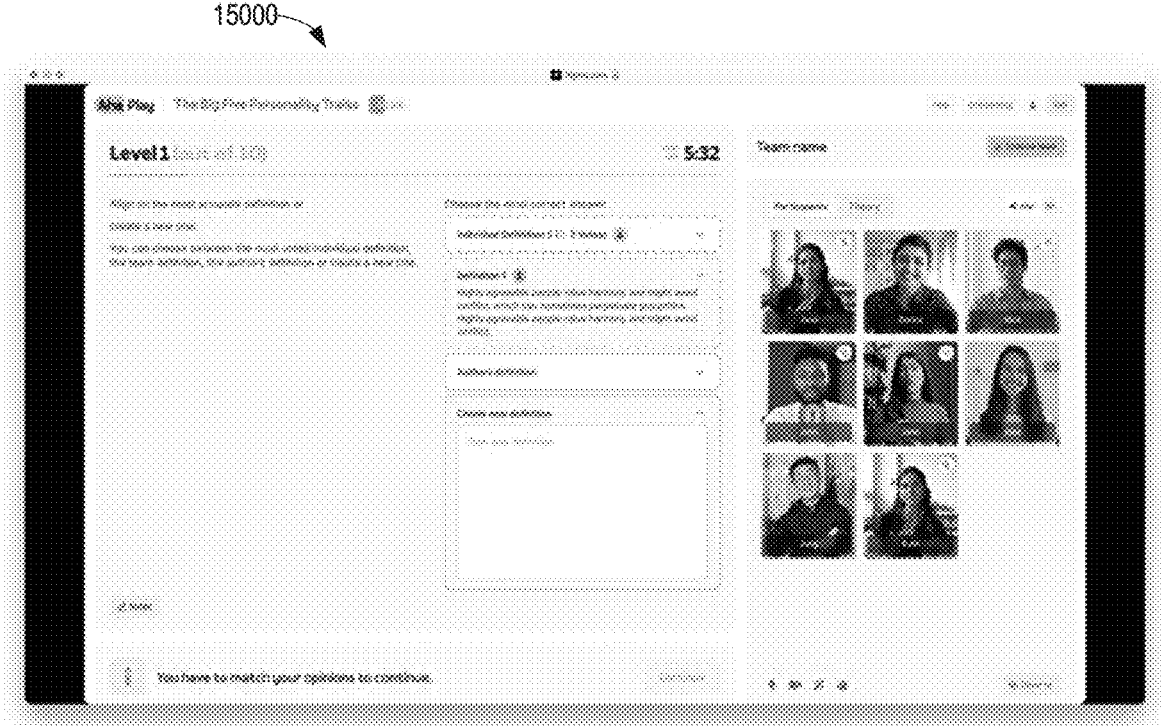

FIG. 150 illustrates an alternative first user interface associated with benchmarking as a group, where the user is notified that answers are to be matched to continue.

Figure 151:
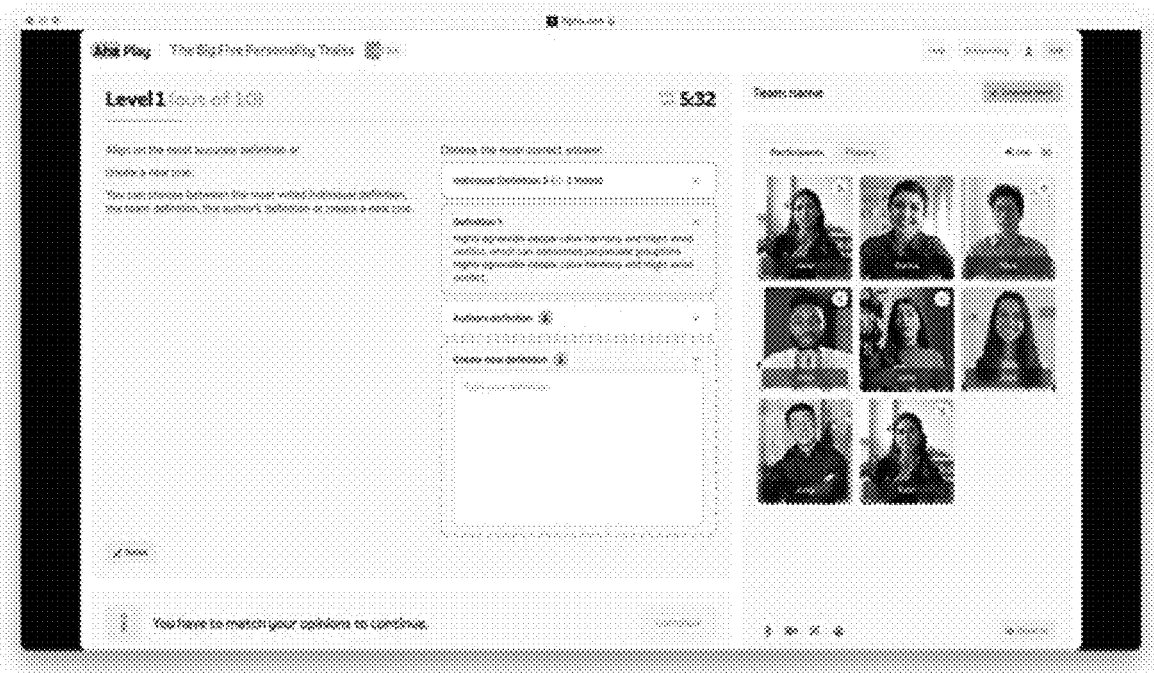

FIG. 151 illustrates an alternative second user interface associated with benchmarking as a group, where the user is provided with an area to create a new definition.

Figure 152:
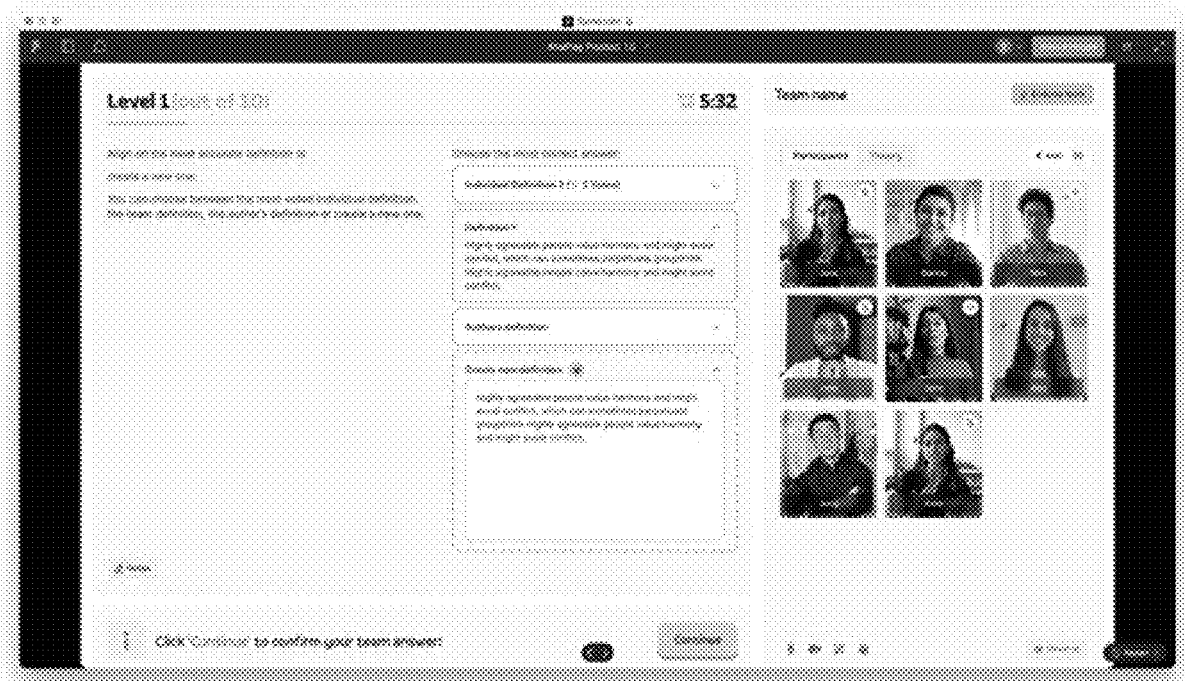

FIG. 152 illustrates an alternative third user interface associated with benchmarking as a group, where the user is notified to confirm their team answer.

Figure 153:
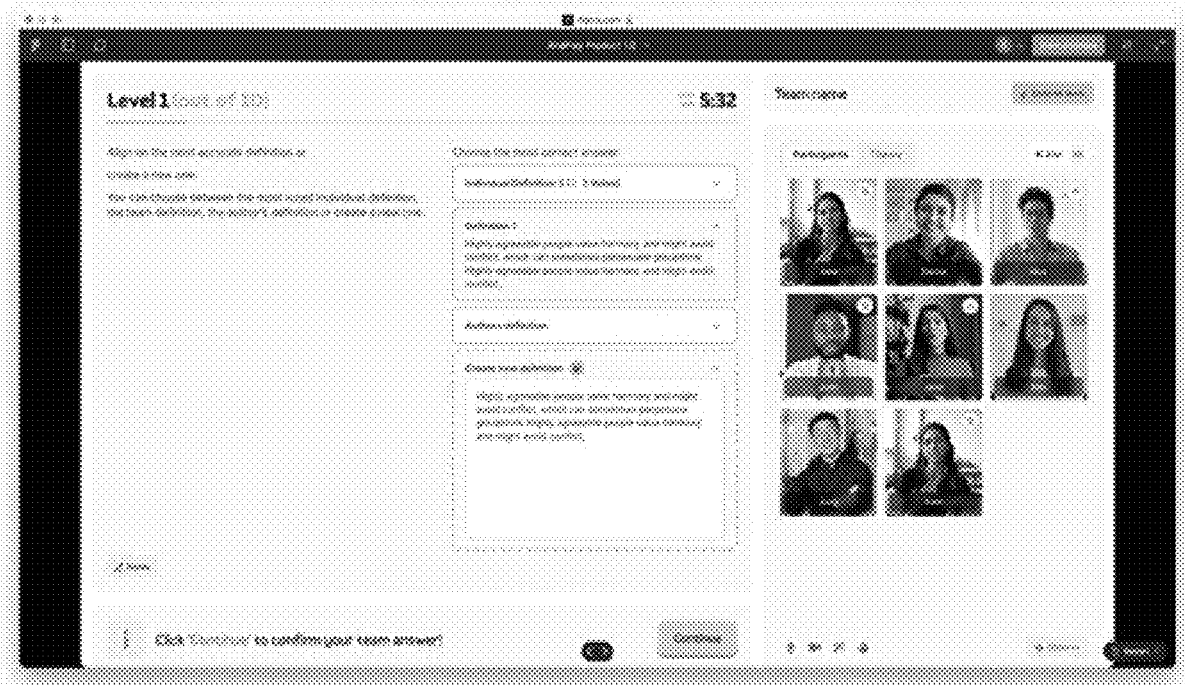

FIG. 153 illustrates an alternative fourth user interface associated with benchmarking as a group, where the user is notified that all players have agreed on the definition.

Figure 154:
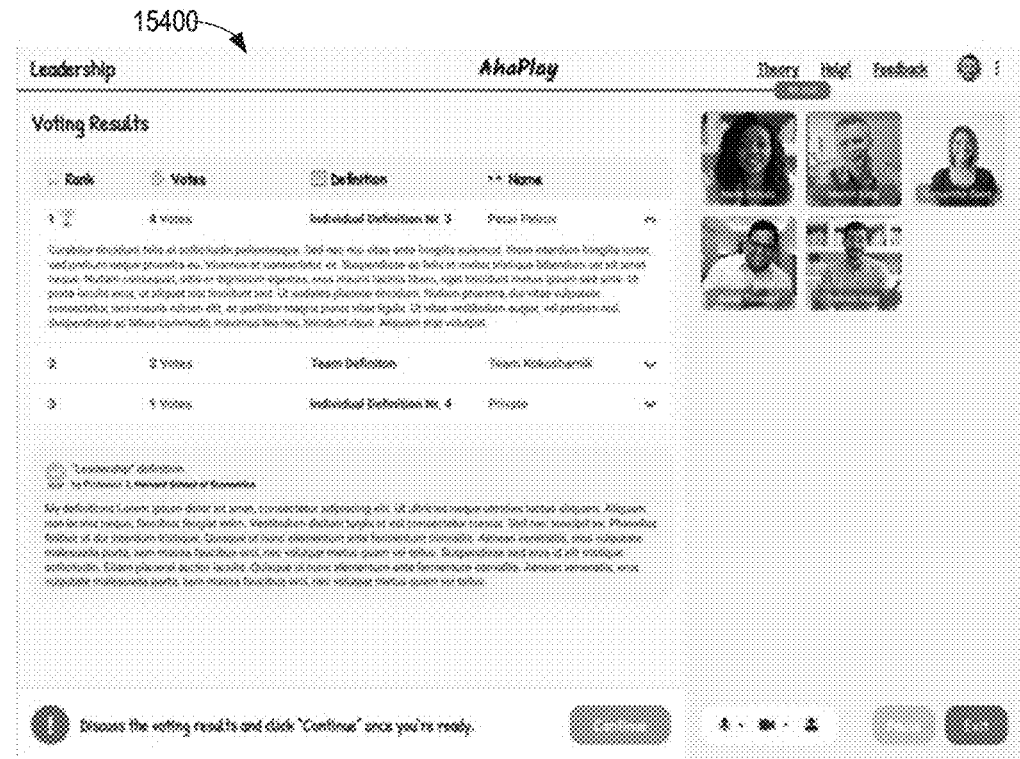

FIG. 154 illustrates an alternative fifth user interface associated with benchmarking as a group, where the user is provided with voting results.

Figure 155:
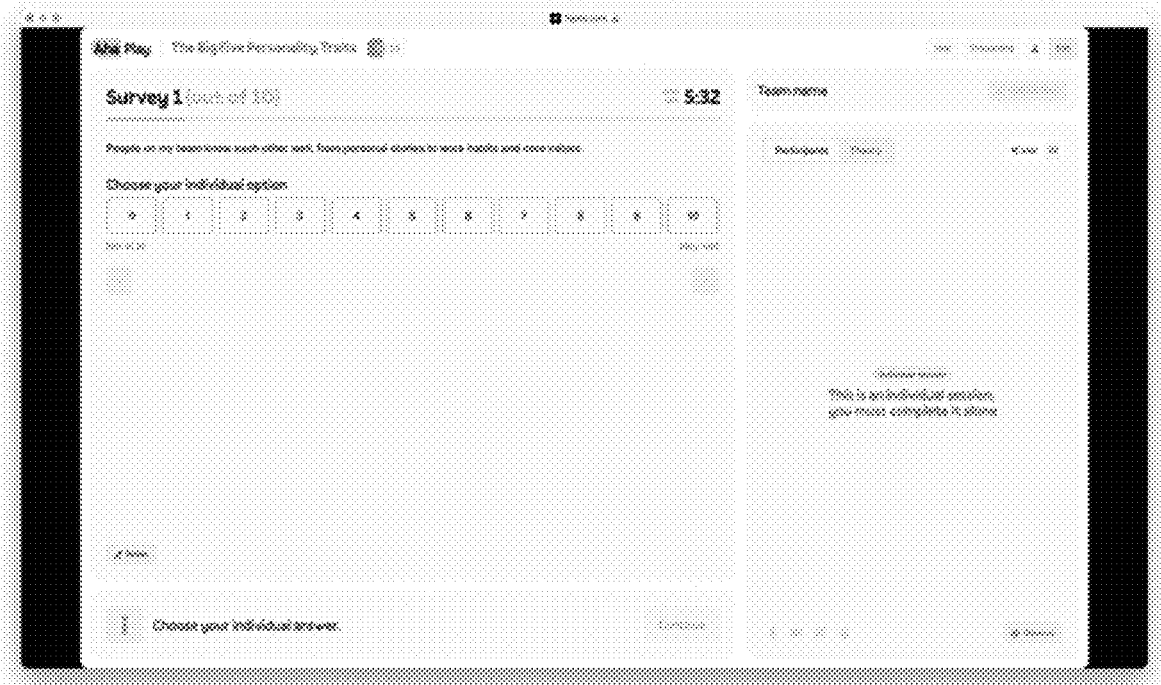

FIG. 155 illustrates an example first user interface associated with a survey prior to existing the conversation.

Figure 156:
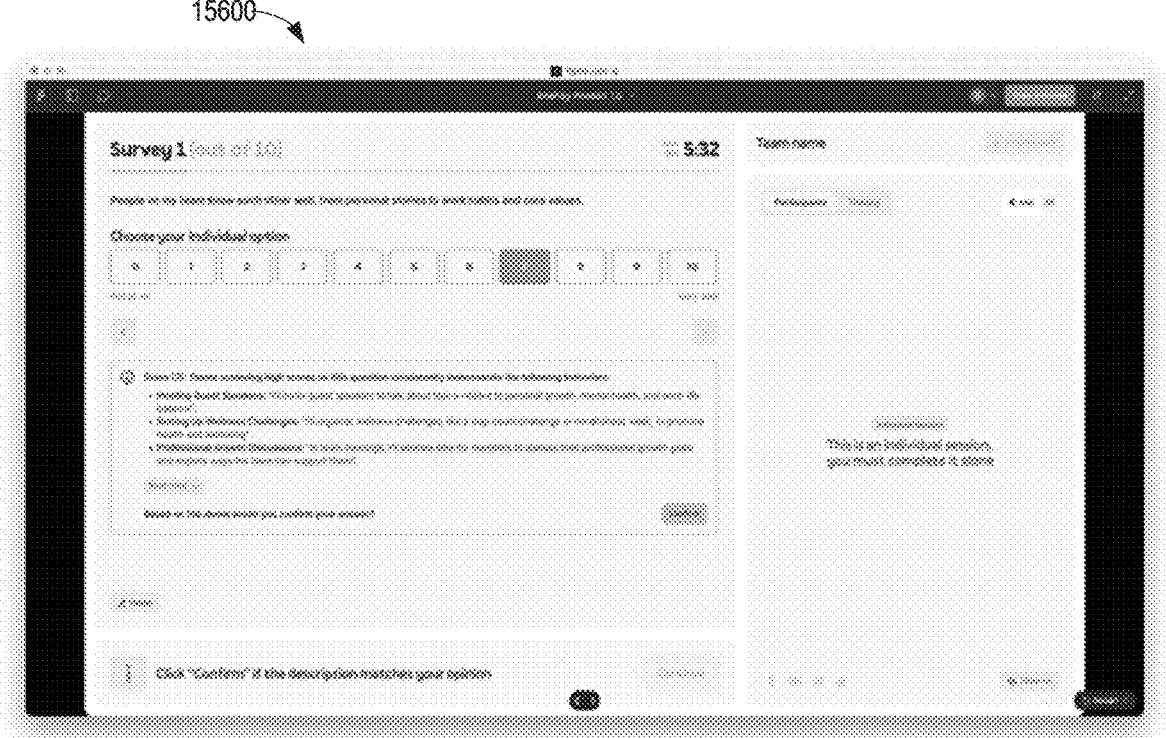

FIG. 156 illustrates an example second user interface associated with a survey prior to existing the conversation, where the user is asked to confirm whether a given description matches their opinion.

Figure 157:
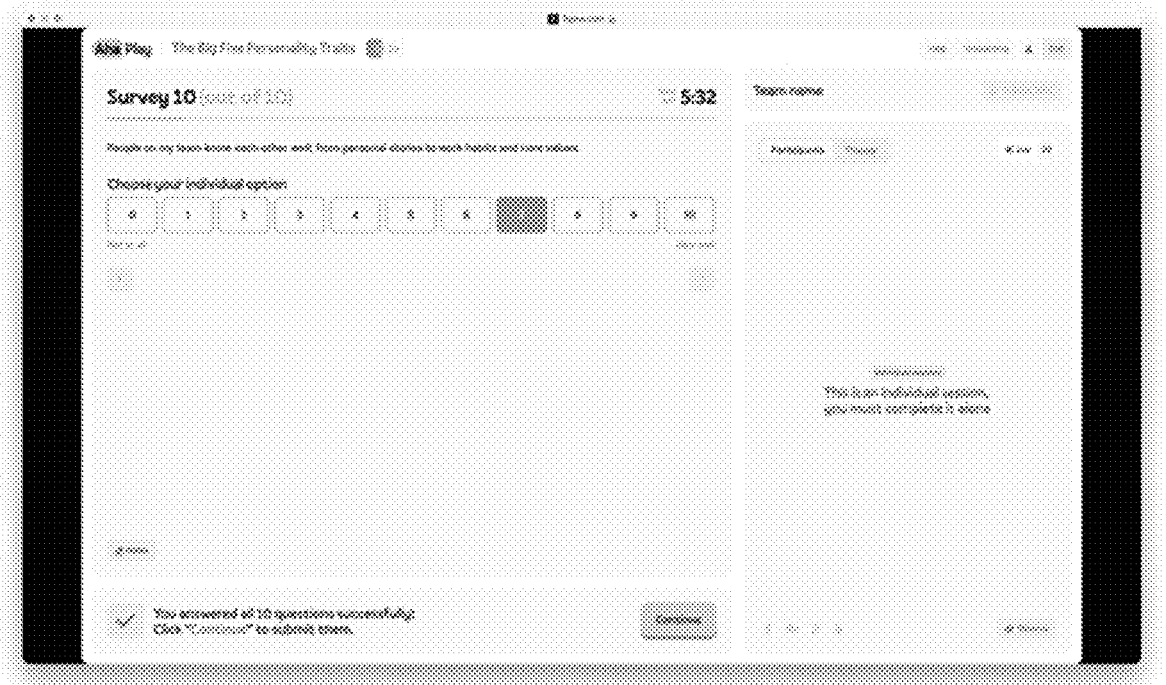

FIG. 157 illustrates an example third user interface associated with a survey prior to existing the conversation, where the user is notified that they have answered all questions successfully.

Figure 158:
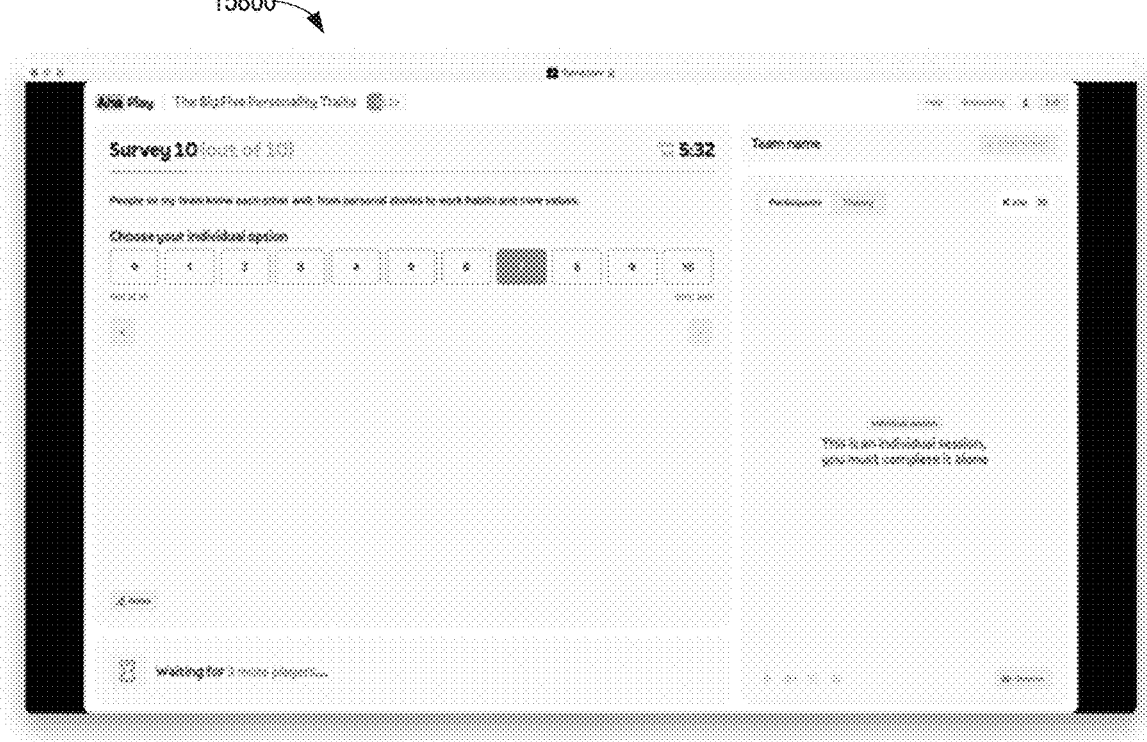

FIG. 158 illustrates an example fourth user interface associated with a survey prior to existing the conversation, where the user is notified that three more players need to provide their input.

Figure 159:
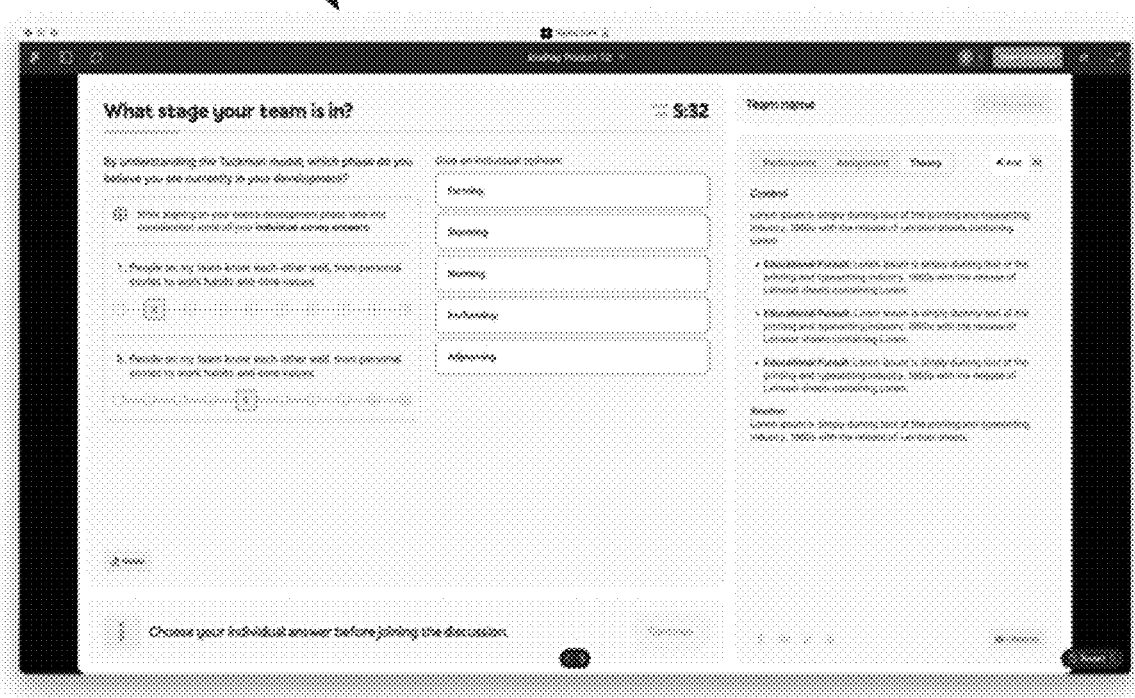

FIG. 159 illustrates an example first user interface associated with team alignment.

Figure 160:
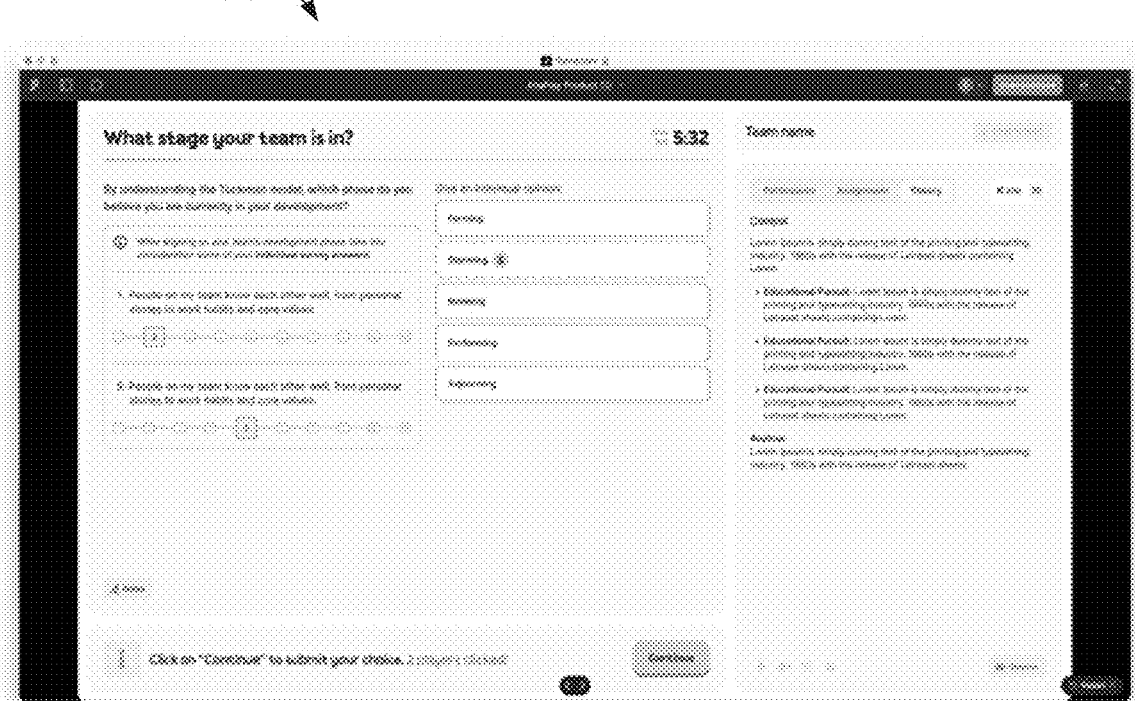

FIG. 160 illustrates an example second user interface associated with team alignment, where the user is notified that two players have already made a selection.

Figure 161:
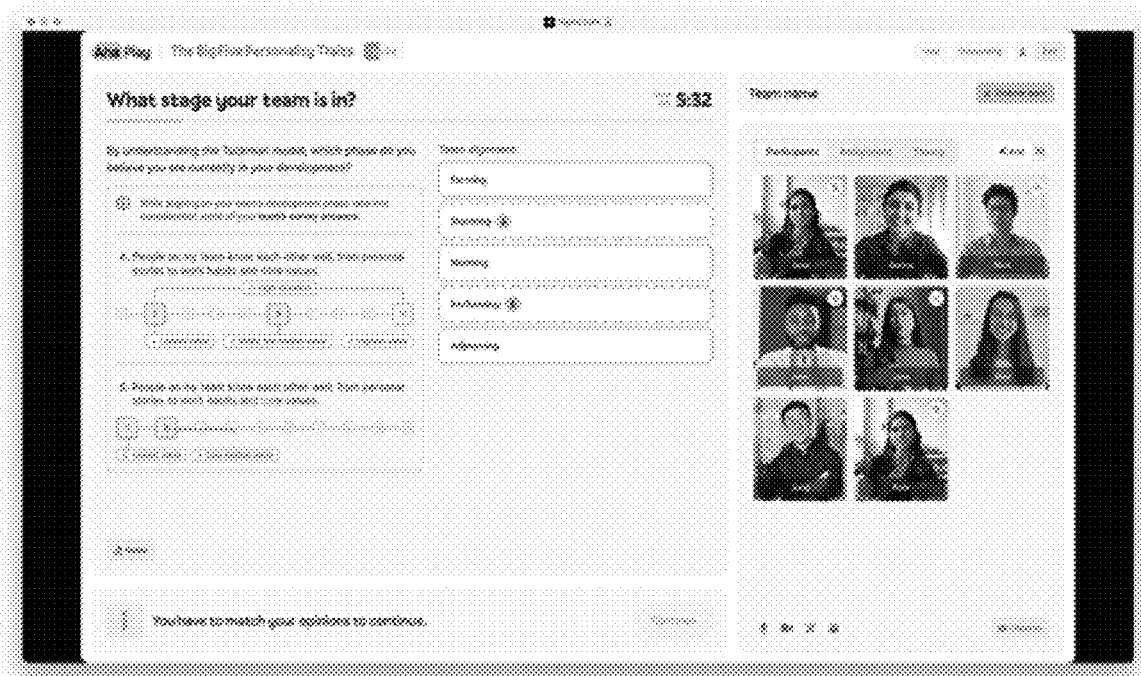

FIG. 161 illustrates an example third user interface associated with team alignment, where the user is notified that the player opinions need to be matched to continue.

Figures 162, 163:
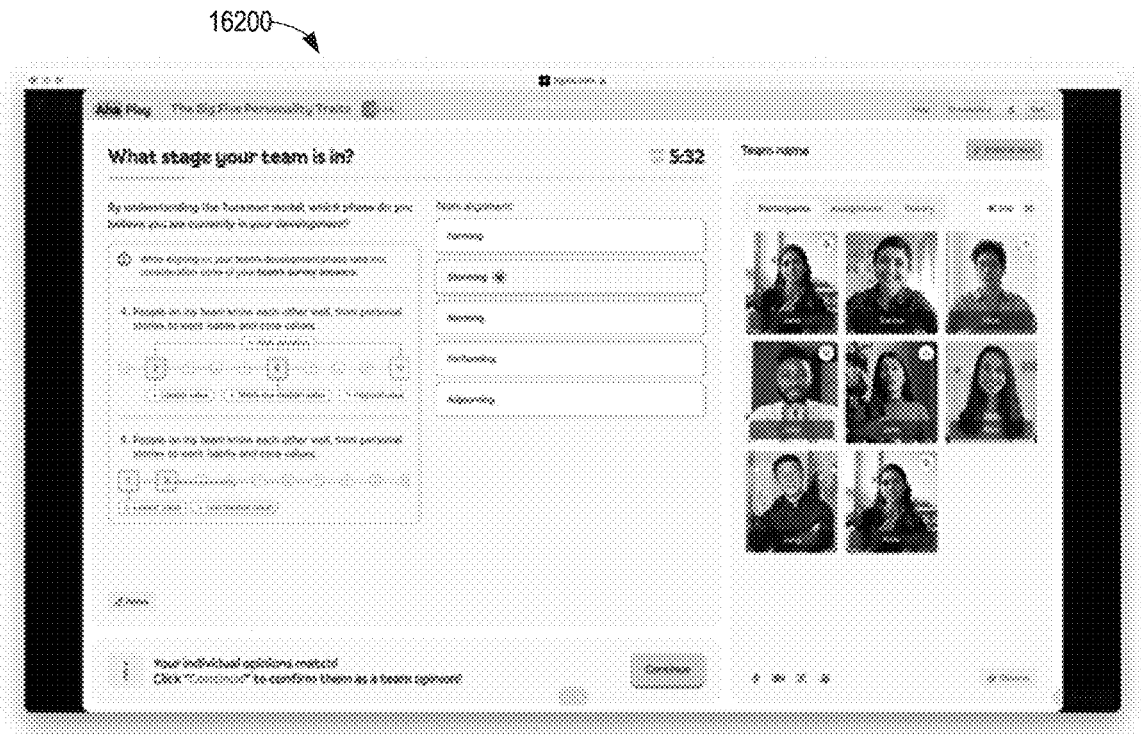

FIG. 162 illustrates an example fourth user interface associated with team alignment, where the user is notified that individual opinions match.

FIG. 163 illustrates an example fifth user interface associated with team alignment, where the user is reminded to continue when ready with the analysis.

Figure 164:
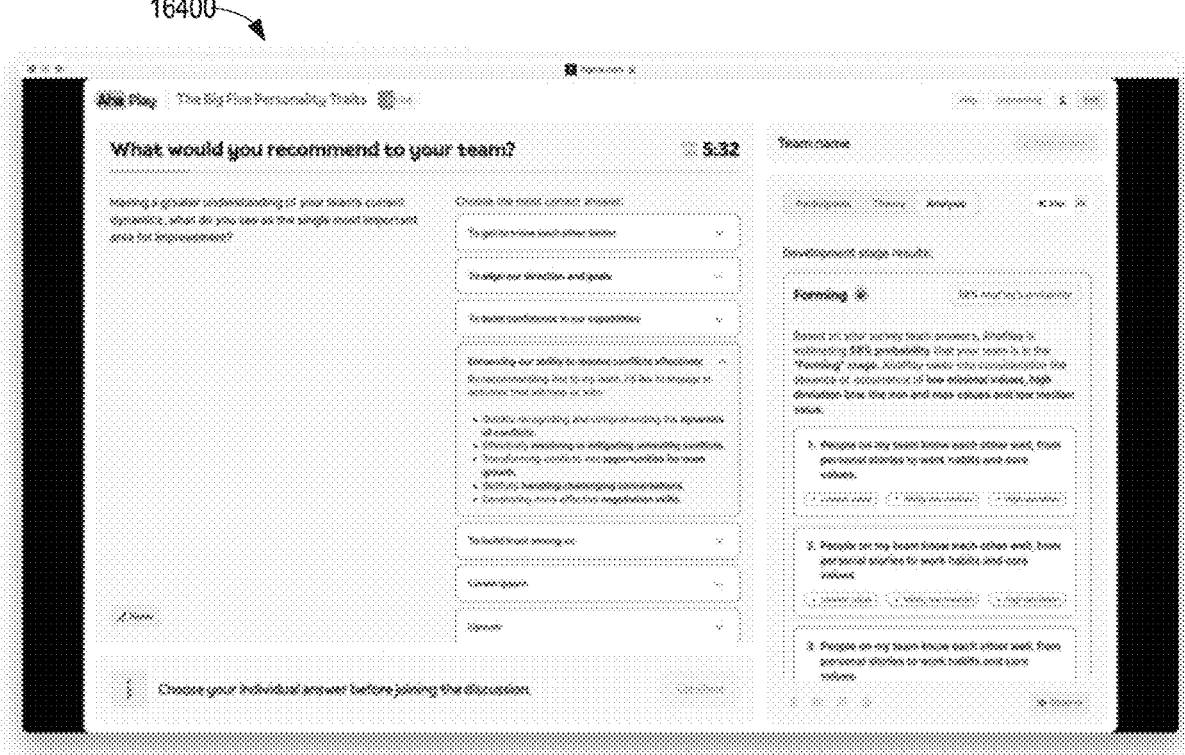

FIG. 164 illustrates an example first user interface associated with a team recommendation, where the user is reminded to select an individual answer before joining the discussion, with a separate area of the interface showing results associated with a developmental stage (e.g., as part of the analysis results).

Figure 165:
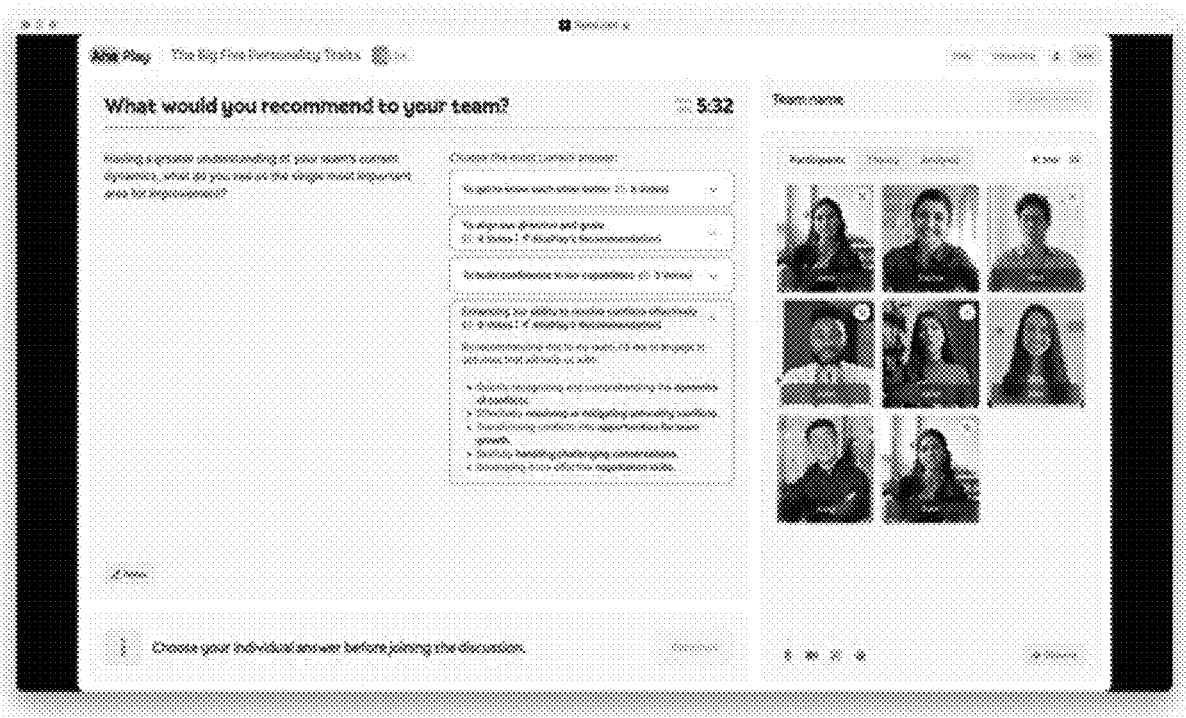

FIG. 165 illustrates an example second user interface associated with a team recommendation, where the user is reminded to select an individual answer before joining the discussion, with a separate area showing all the participants in place of the analysis results.

Figure 166:
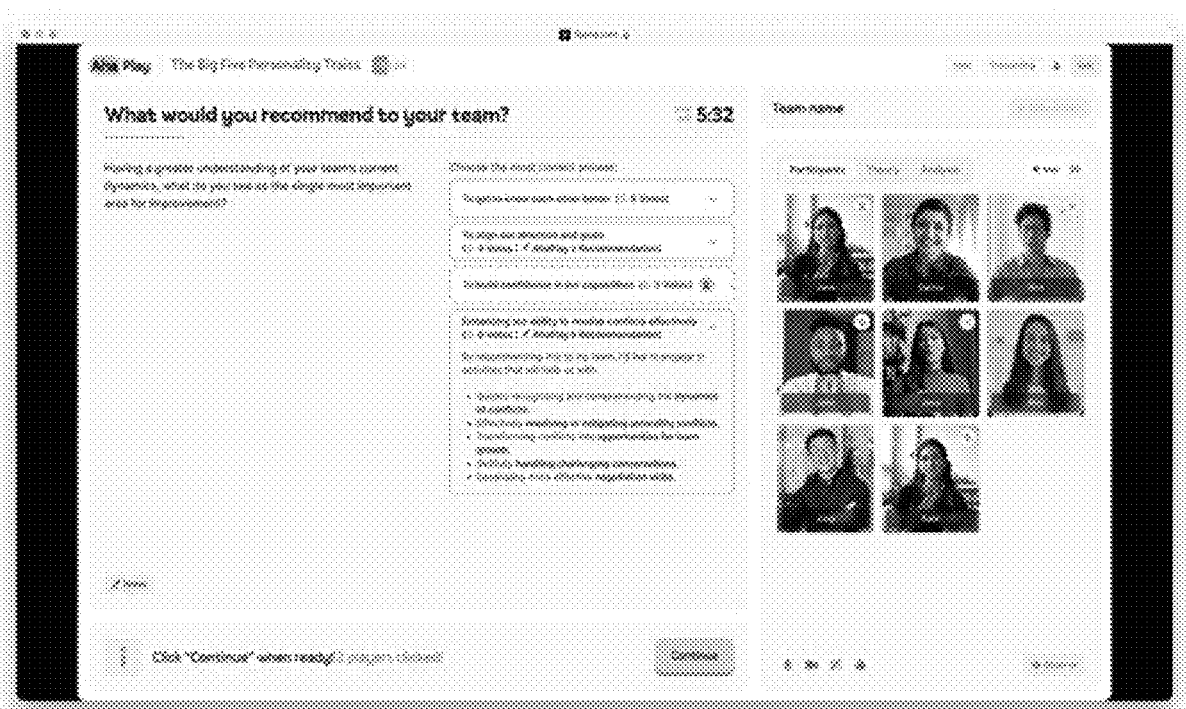

FIG. 166 illustrates an example third user interface associated with a team recommendation, where the user is notified that two players have made their selections.

Figure 167:
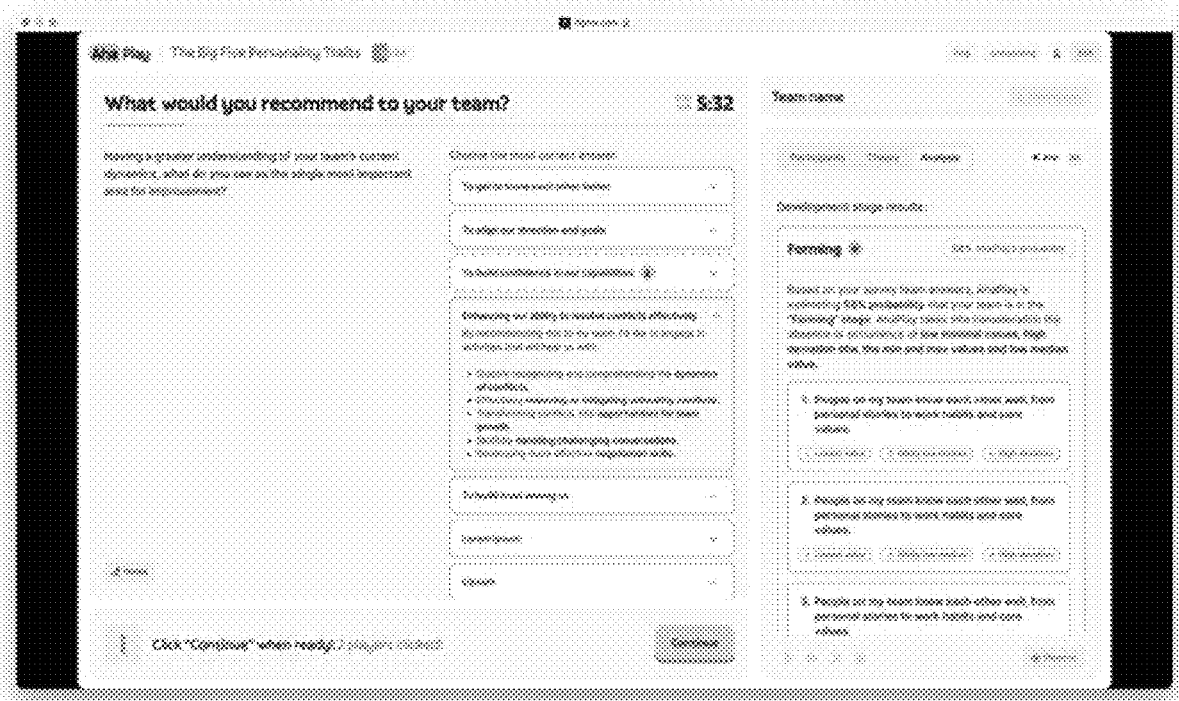

FIG. 167 illustrates an example fourth user interface associated with a team recommendation, where the user is notified that two players have made their selections and illustrates an example third user interface associated with a team recommendation, where the user is notified that two players have made their selections.

Figure 168:
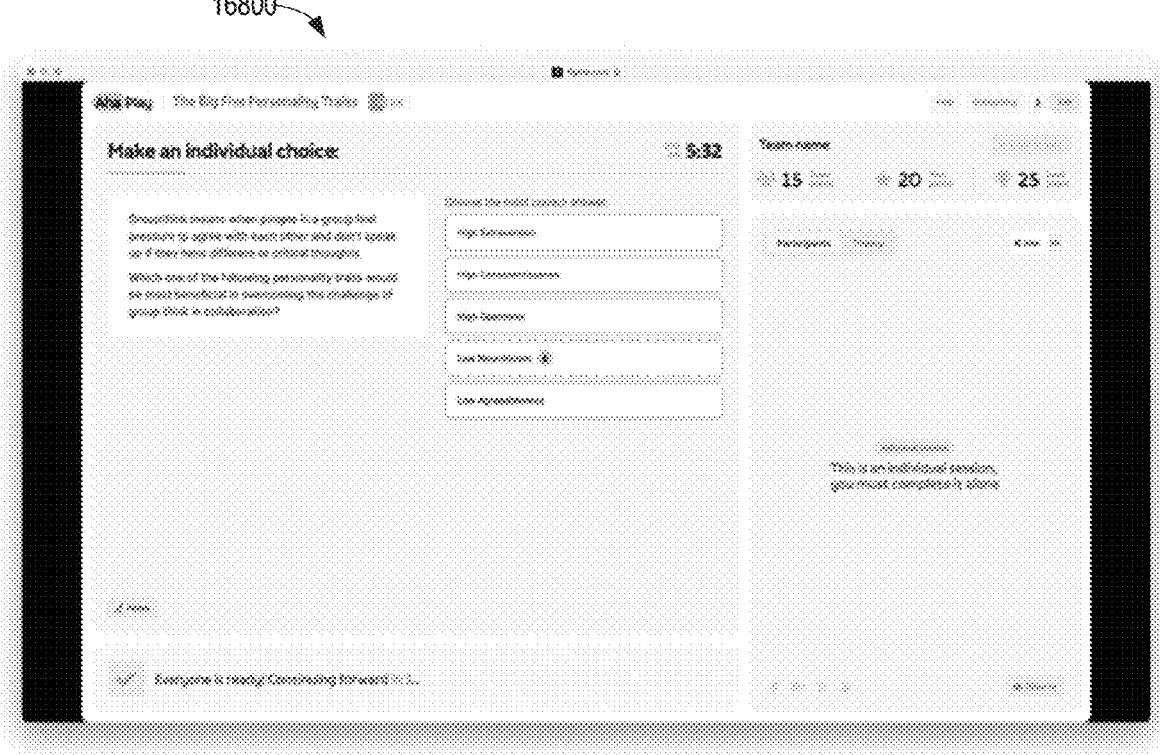

FIG. 168 illustrates an example user interface associated with making an individual choice.

Figure 169:
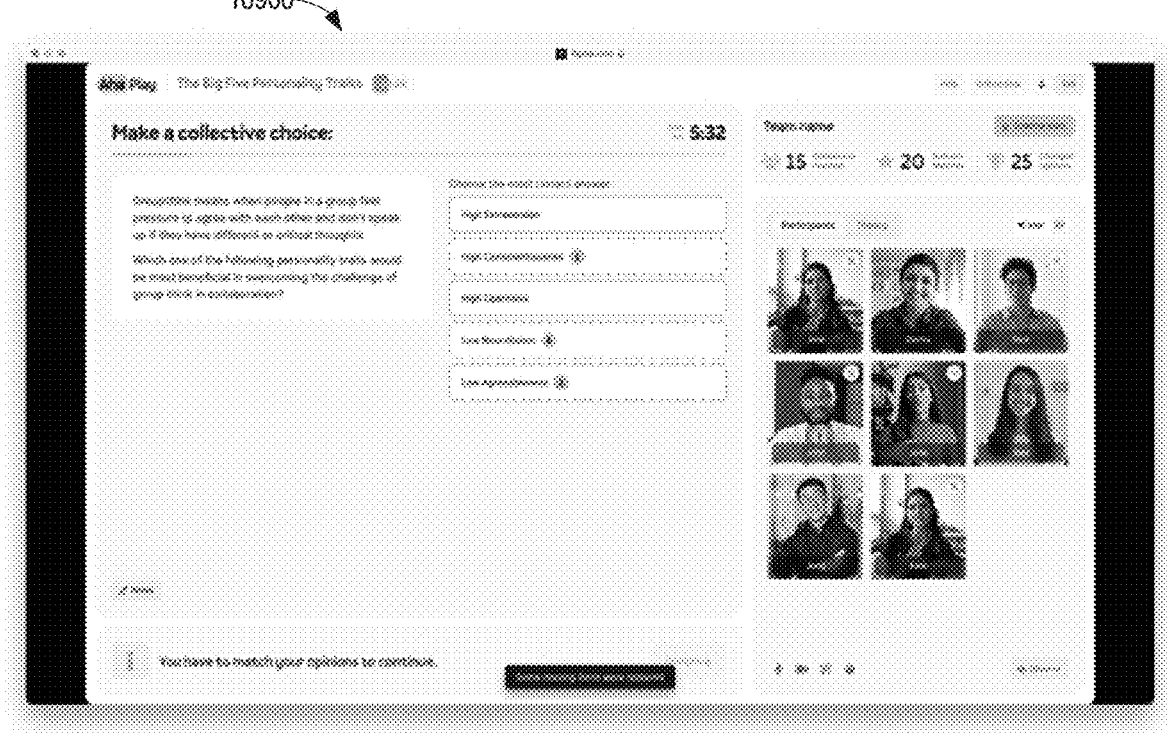

FIG. 169 illustrates an example user interface associated with making a collective choice.

Figure 170:
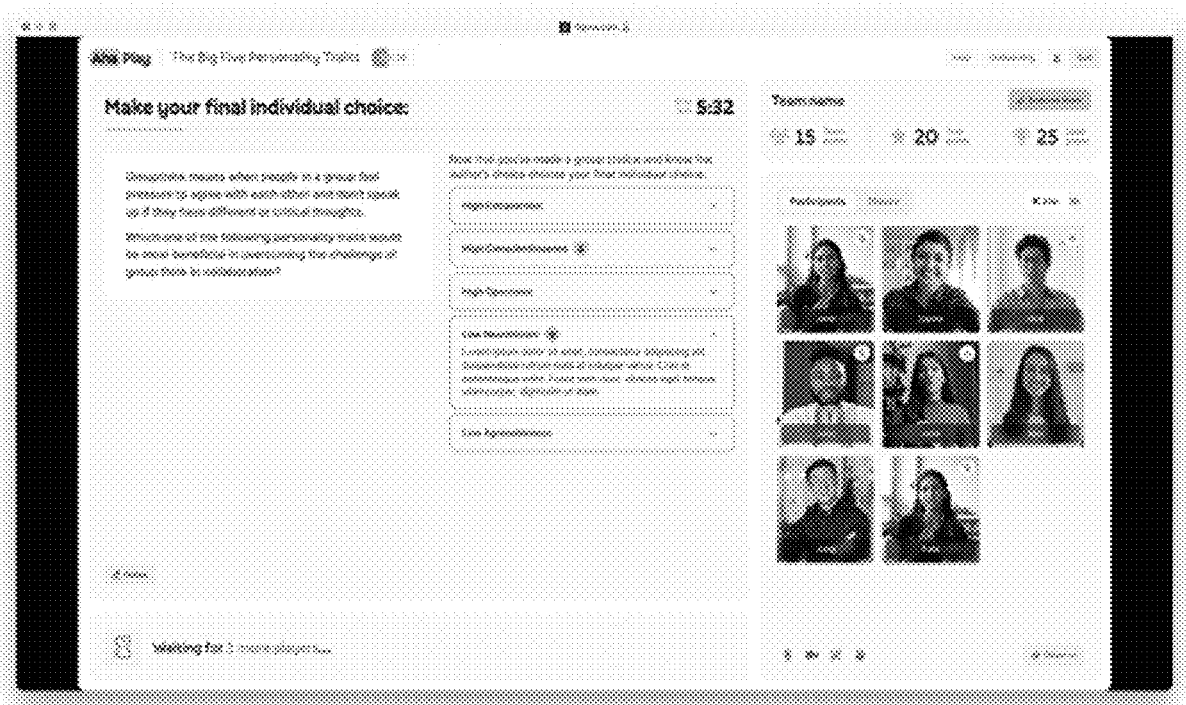

FIG. 170 illustrates an example first user interface associated with making a final individual choice.

Figure 171:
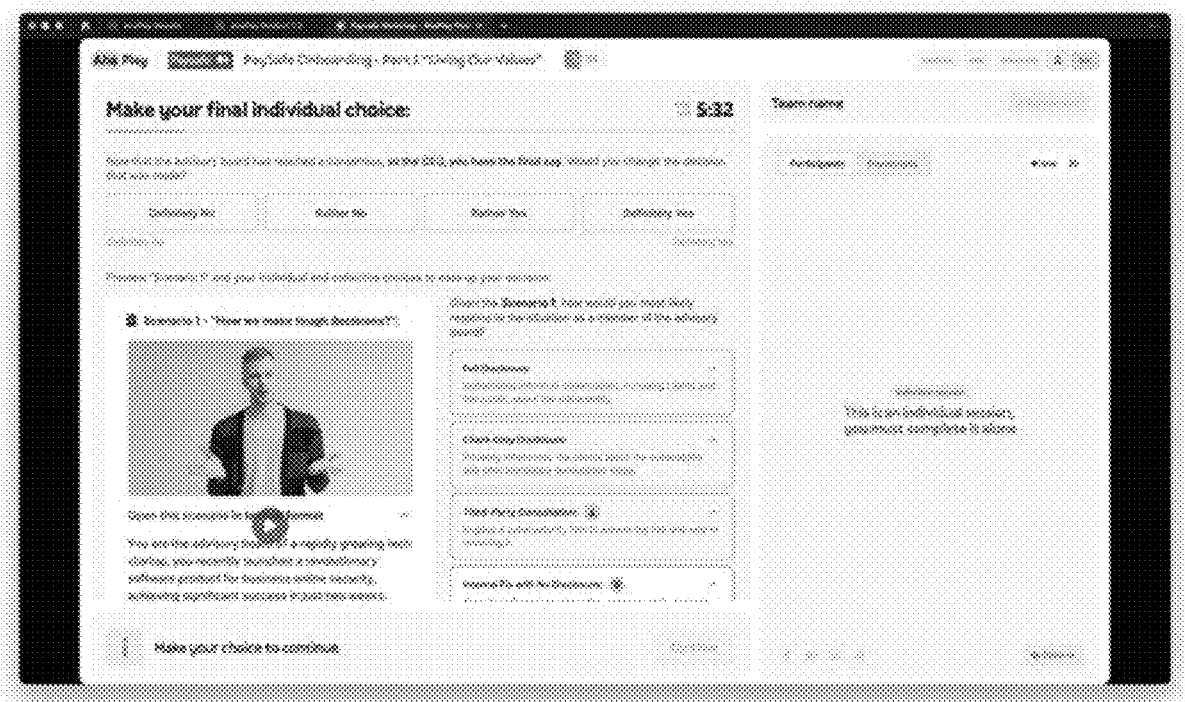

FIG. 171 illustrates an example second user interface associated with making a final individual choice.

FIG. 172 illustrates an example user interface associated with performing a case study review.

FIG. 173 illustrates an example first user interface associated with a brainstorming session.

Figure 174:
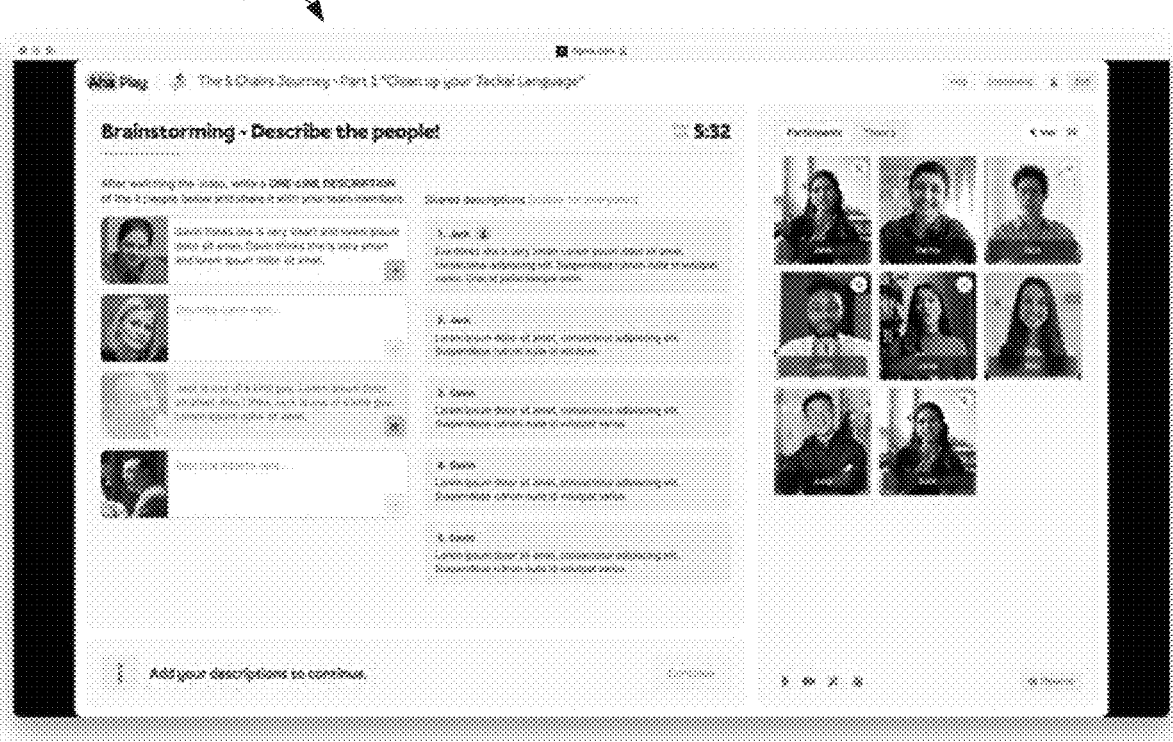

FIG. 174 illustrates an example second user interface associated with a brainstorming session.

Figure 175:
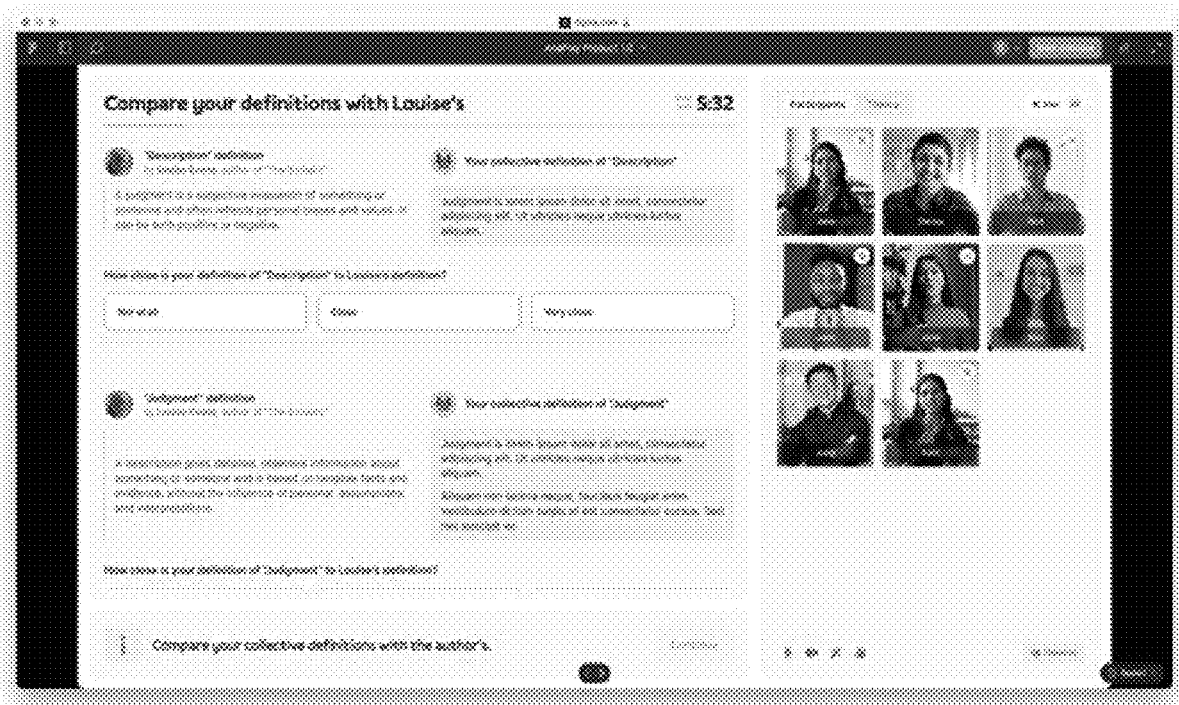

FIG. 175 illustrates an example first user interface associated with comparing collective definitions.

Figure 176:
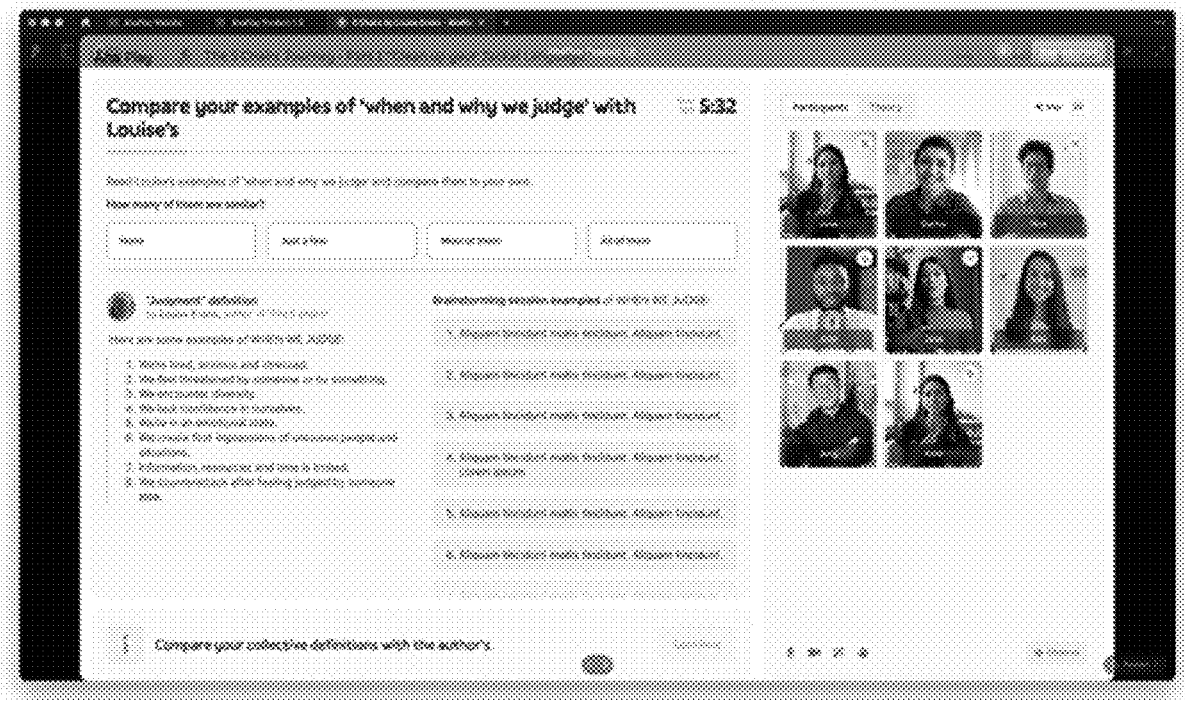

FIG. 176 illustrates an example second user interface associated with comparing collective definitions.

Figure 177:
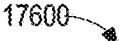

FIG. 177 illustrates an example third user interface associated with comparing collective definitions.

Figure 178:
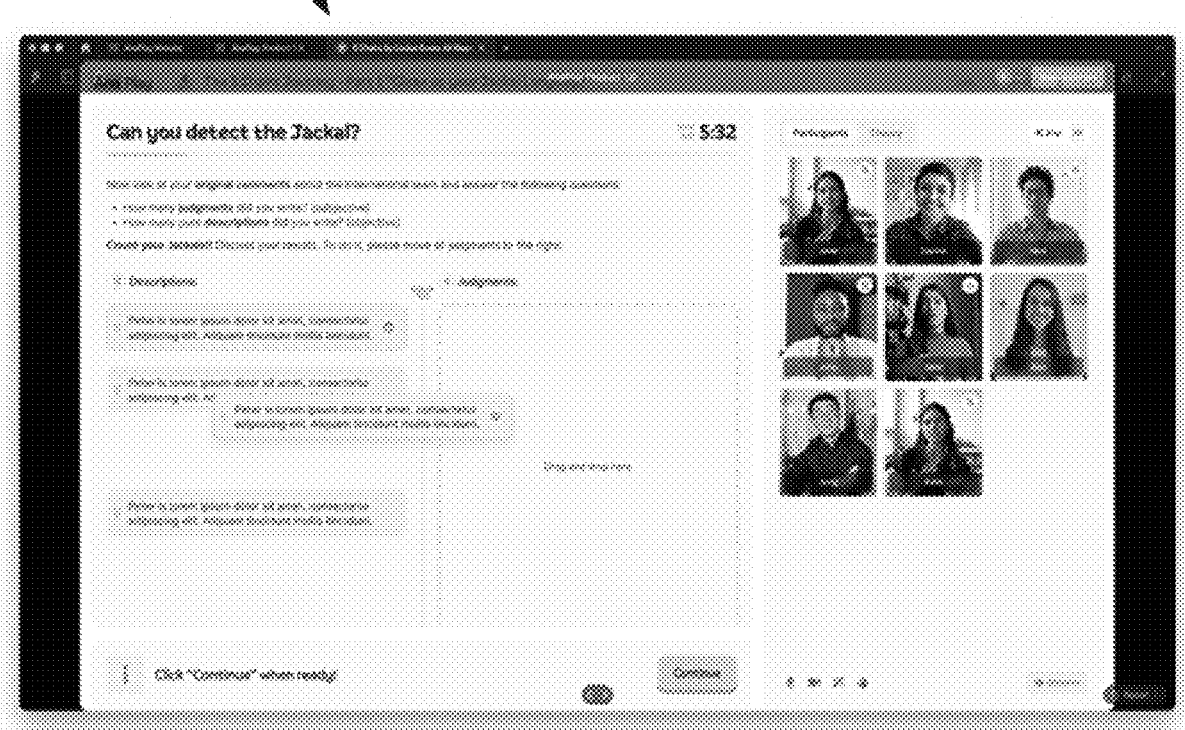

FIG. 178 illustrates an example fourth user interface associated with comparing collective definitions.

Figure 179:
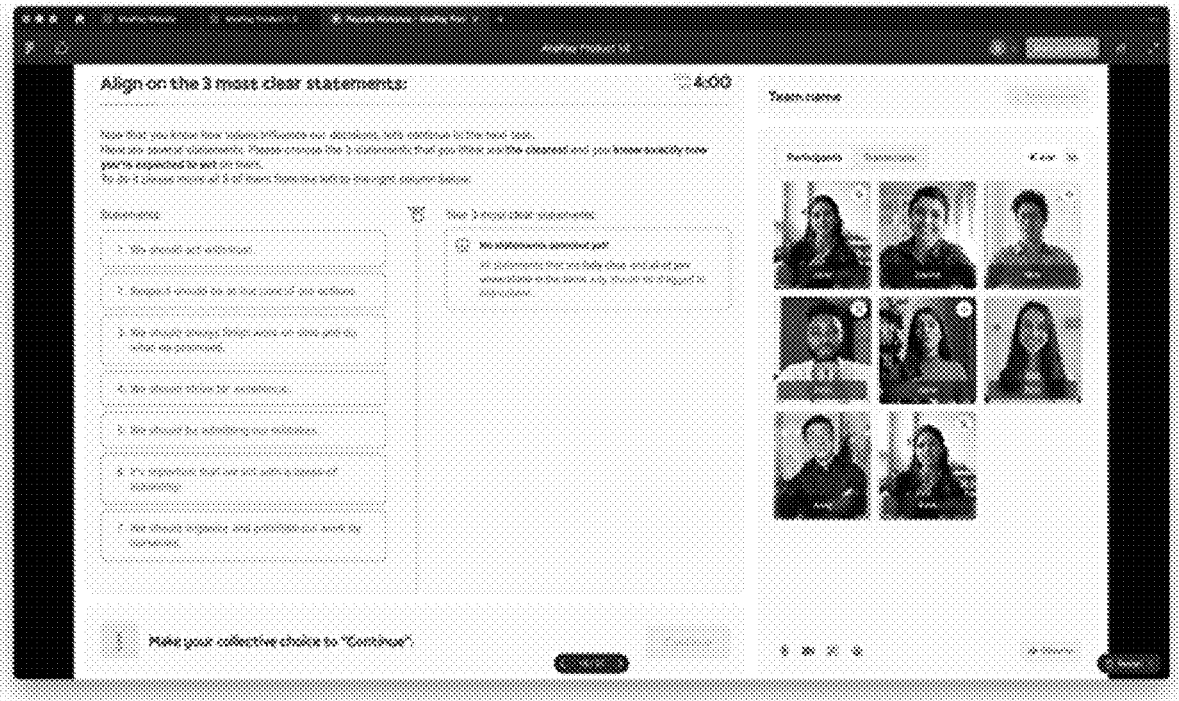

FIG. 179 illustrates an example fifth user interface associated with comparing collective definitions.

Figure 180:
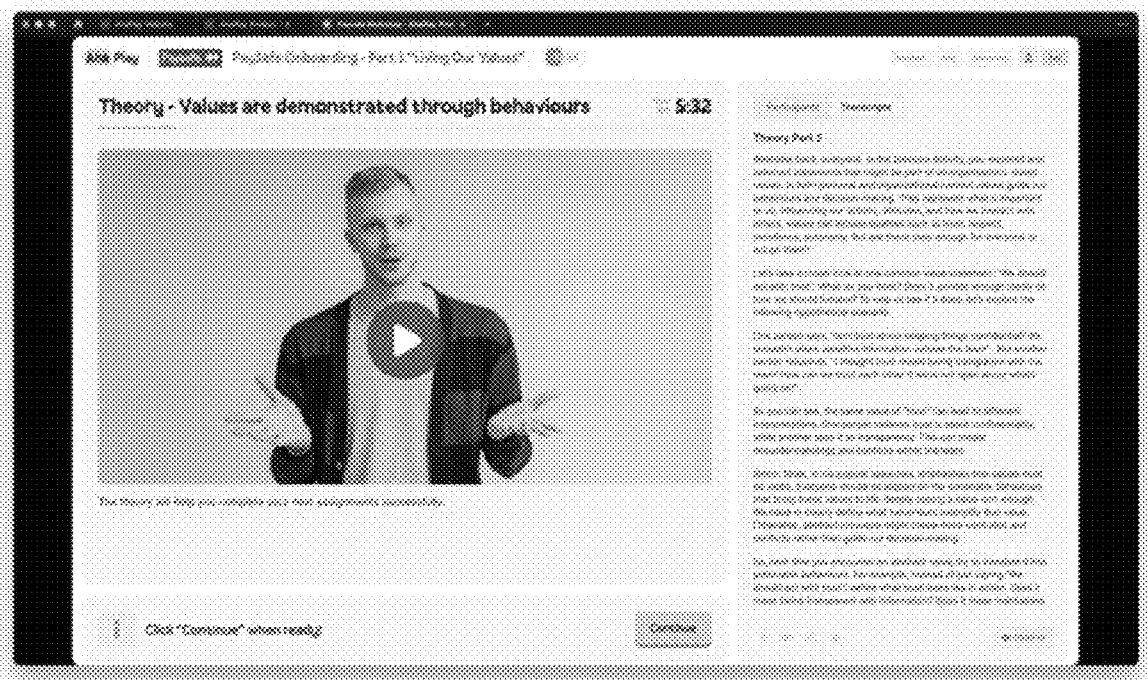

FIG. 180 illustrates an example user interface associated with information provided to the user (e.g., video and transcript) to assist with completing an assignment.

Figure 181:
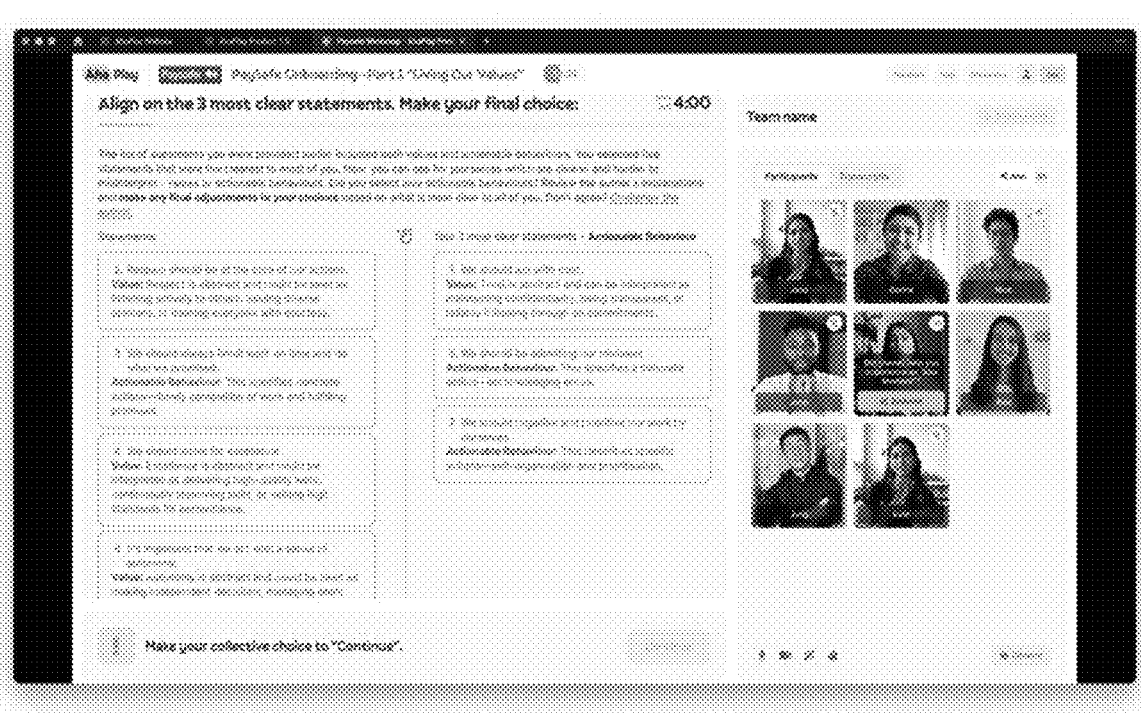

FIG. 181 illustrates an example user interface associated with making a collective choice.

Figures 182, 183:
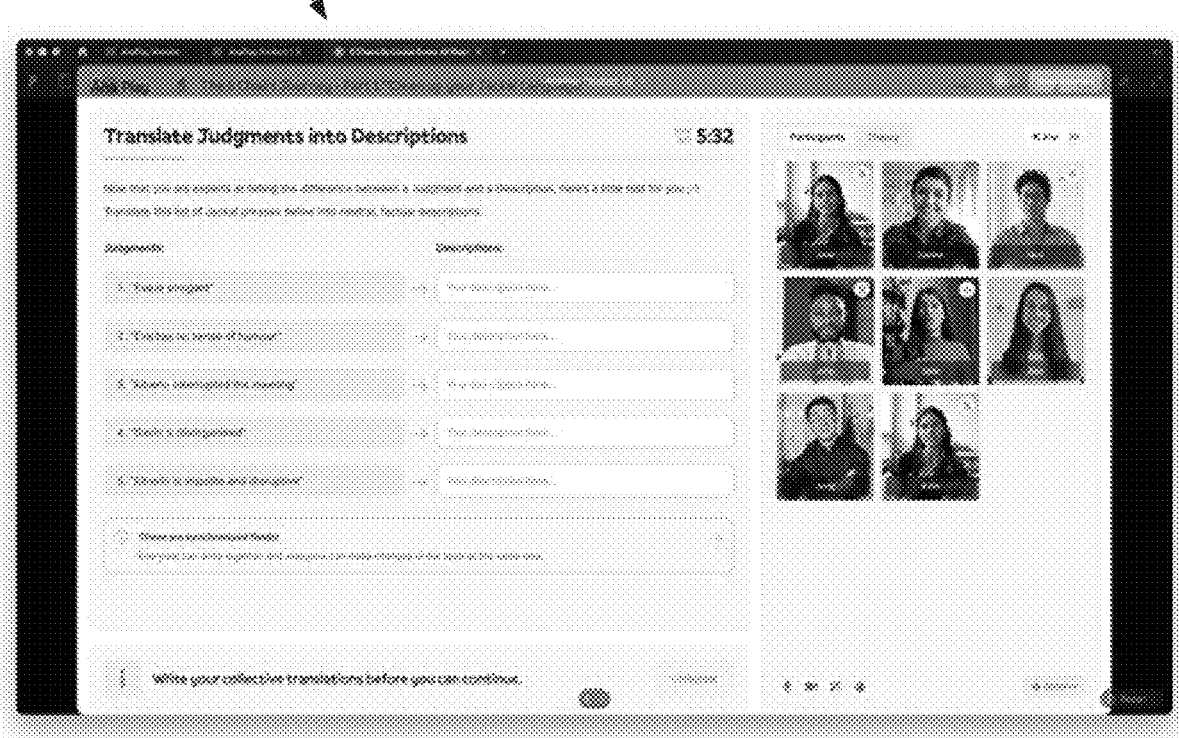

FIG. 182 illustrates an example first user interface associated with performing a collective translation.

FIG. 183 illustrates an example second user interface associated with performing a collective translation.

Figure 184:
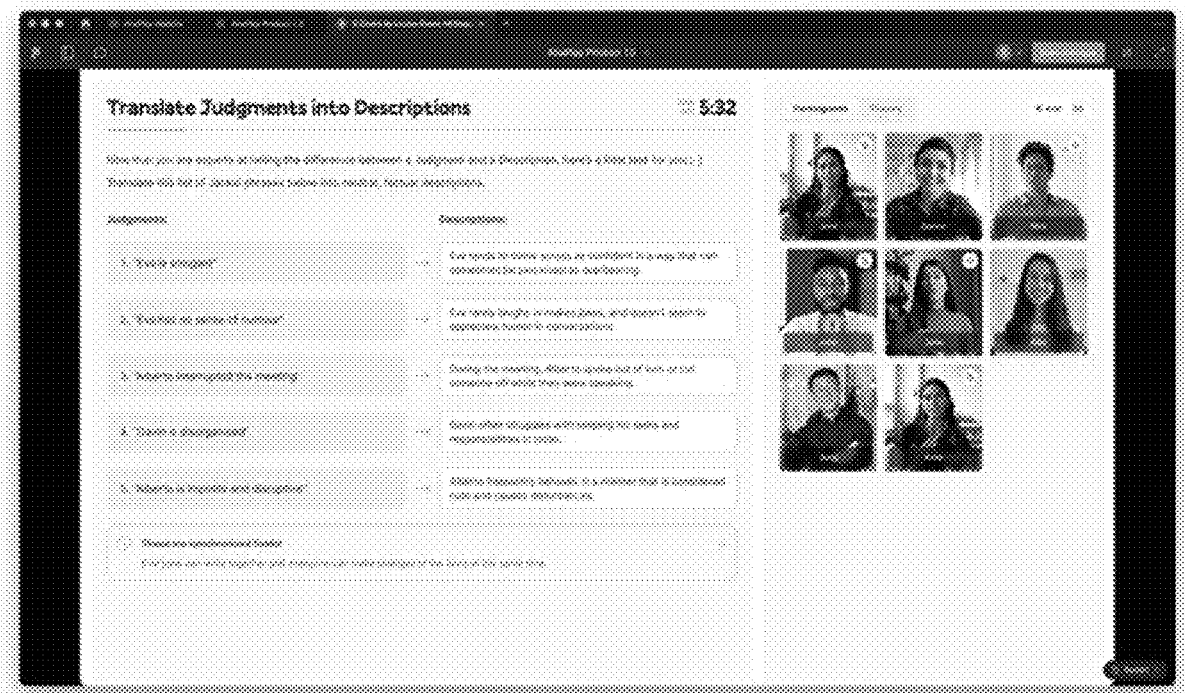

FIG. 184 illustrates an example third user interface associated with performing a collective translation.

Figure 185:
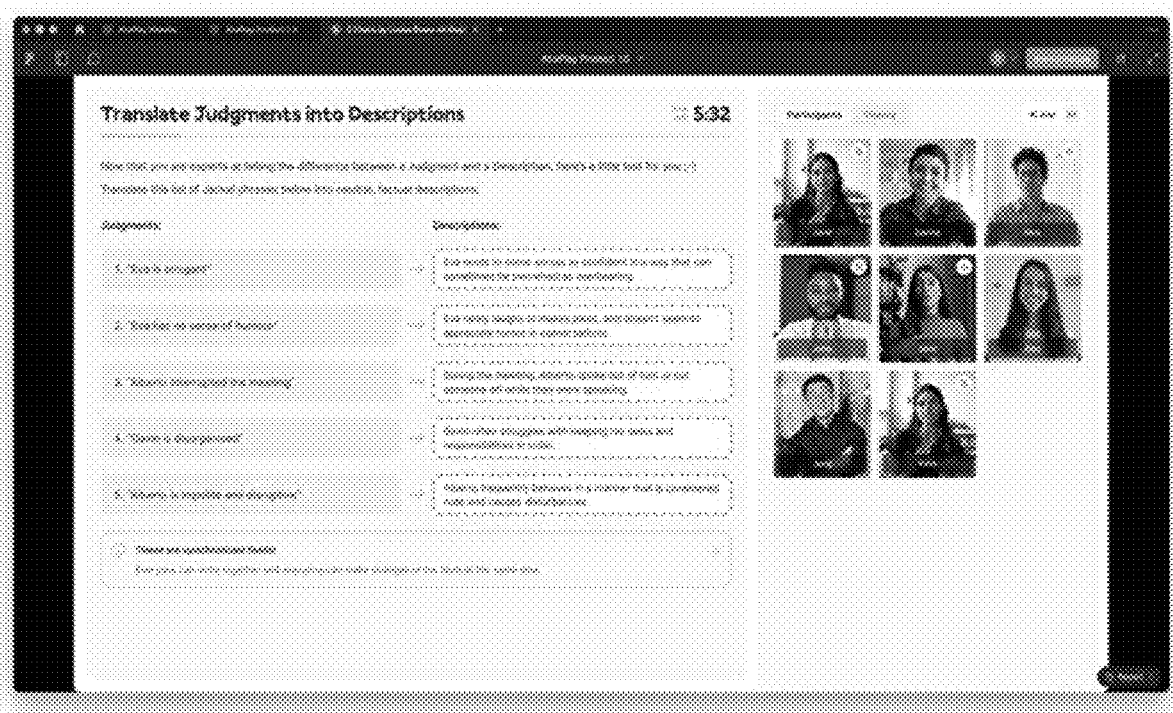

FIG. 185 illustrates an example fourth user interface associated with performing a collective translation.

Figure 186:
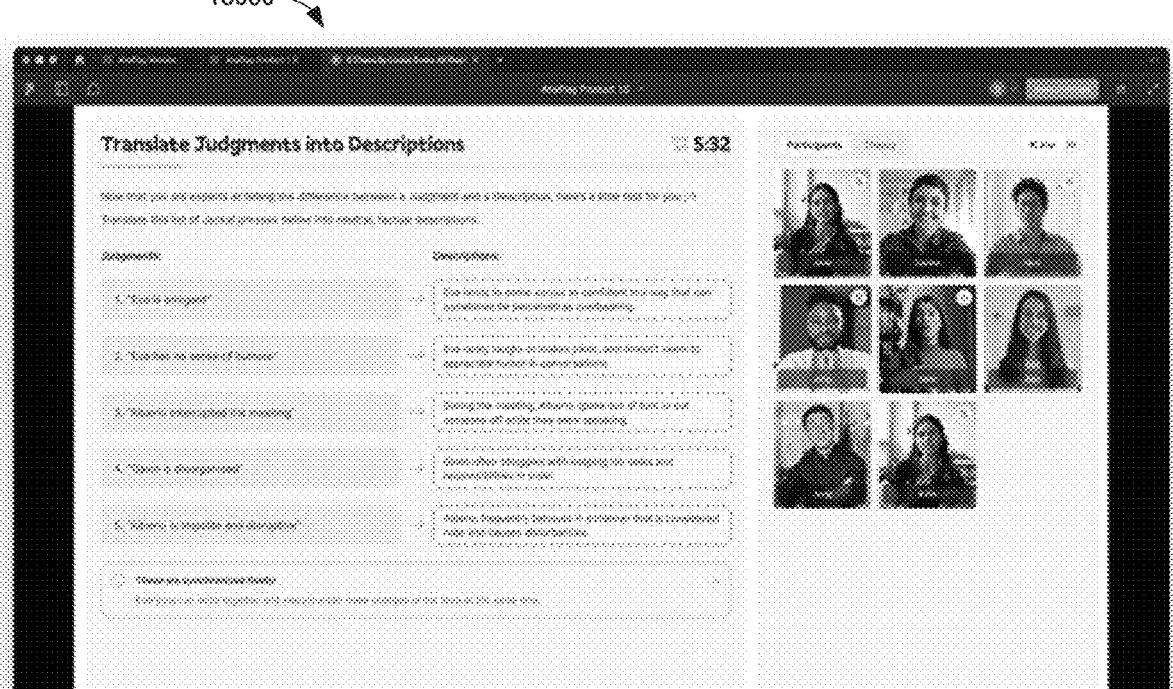

FIG. 186 illustrates an example fifth user interface associated with performing a collective translation.

Figure 187:
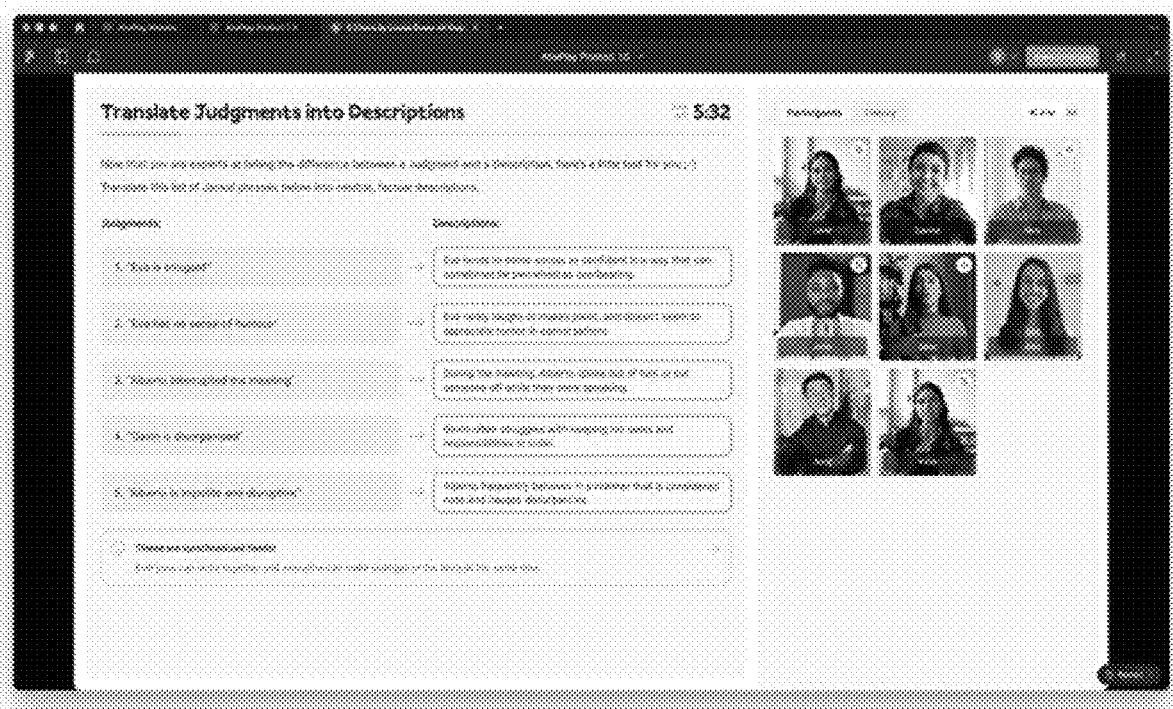

FIG. 187 illustrates an example sixth user interface associated with performing a collective translation.

Figure 188:
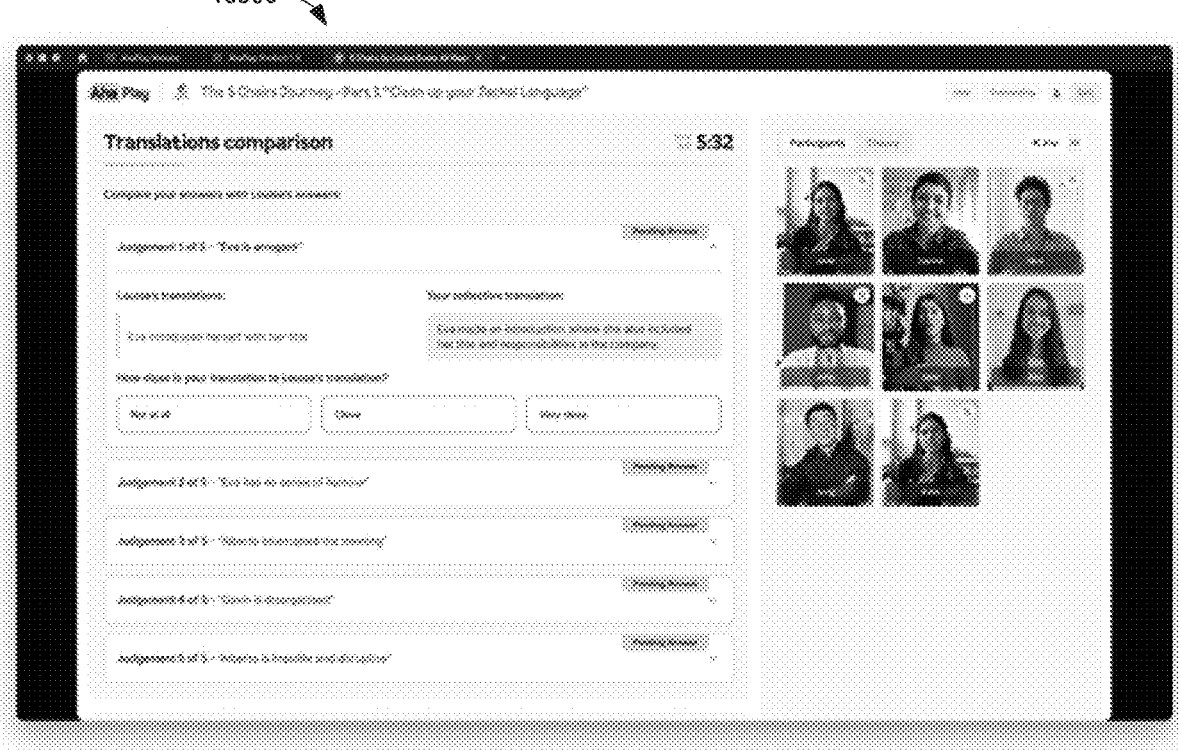

FIG. 188 illustrates an example seventh user interface associated with performing a collective translation.

Figure 189:
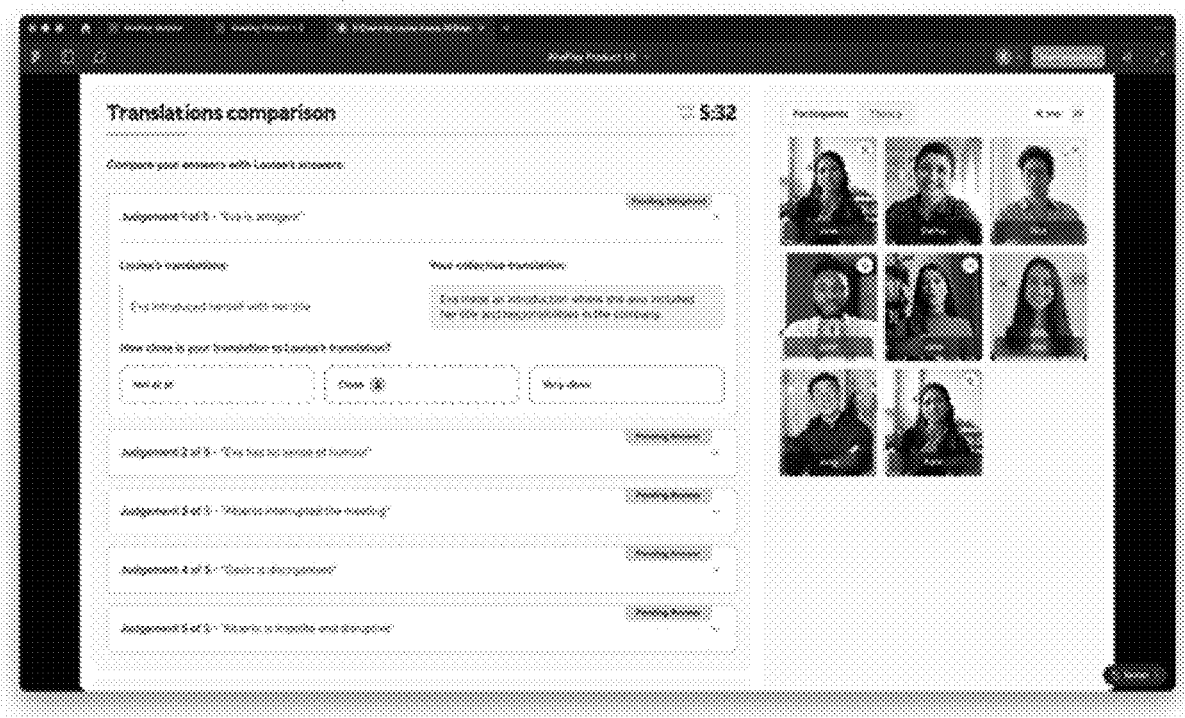

FIG. 189 illustrates an example eighth user interface associated with performing a collective translation.

Figures 190, 191:
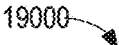

FIG. 190 illustrates an example ninth user interface associated with performing a collective translation.

FIG. 191 illustrates an example tenth user interface associated with performing a collective translation.

Figure 192:
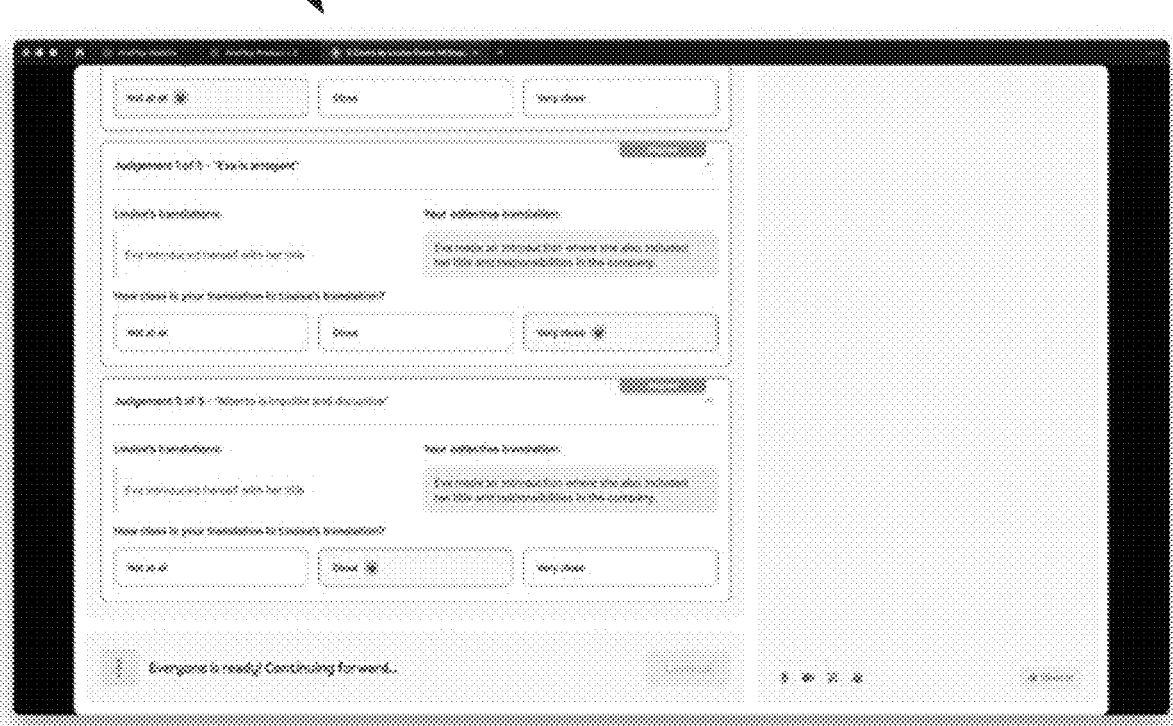

FIG. 192 illustrates an example eleventh user interface associated with performing a collective translation.

Figure 193:
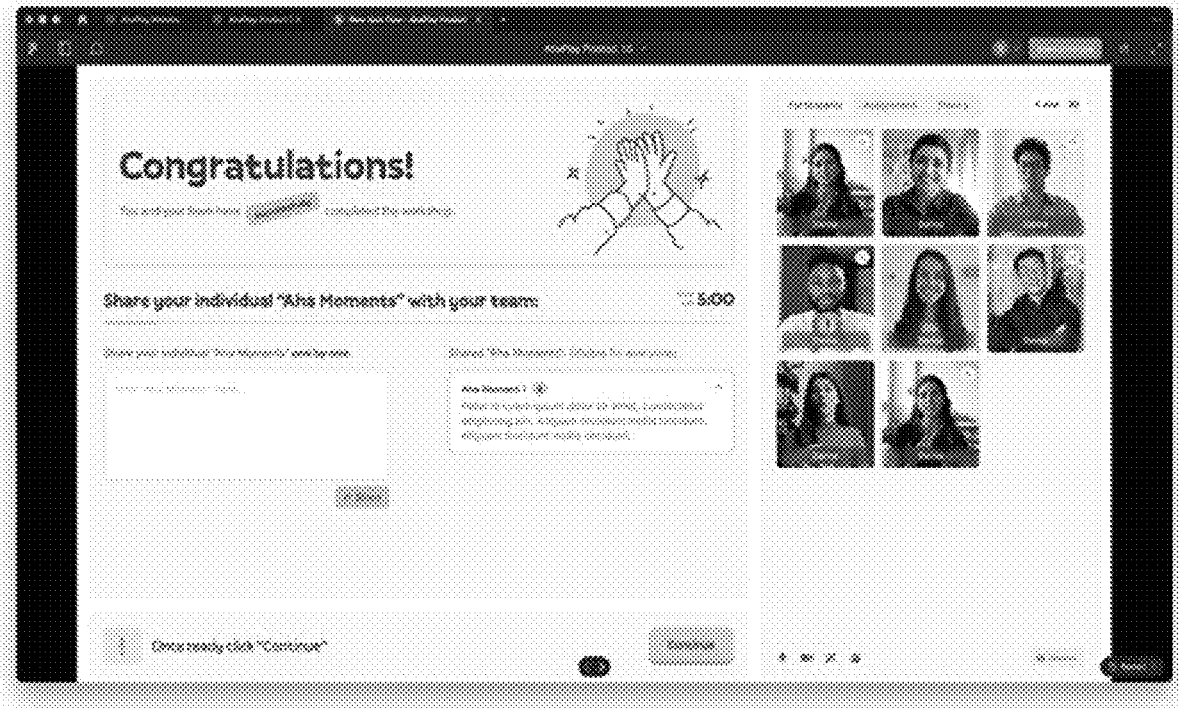

FIG. 193 illustrates an example first user interface associated with sharing of an aha moment.

Figure 194:
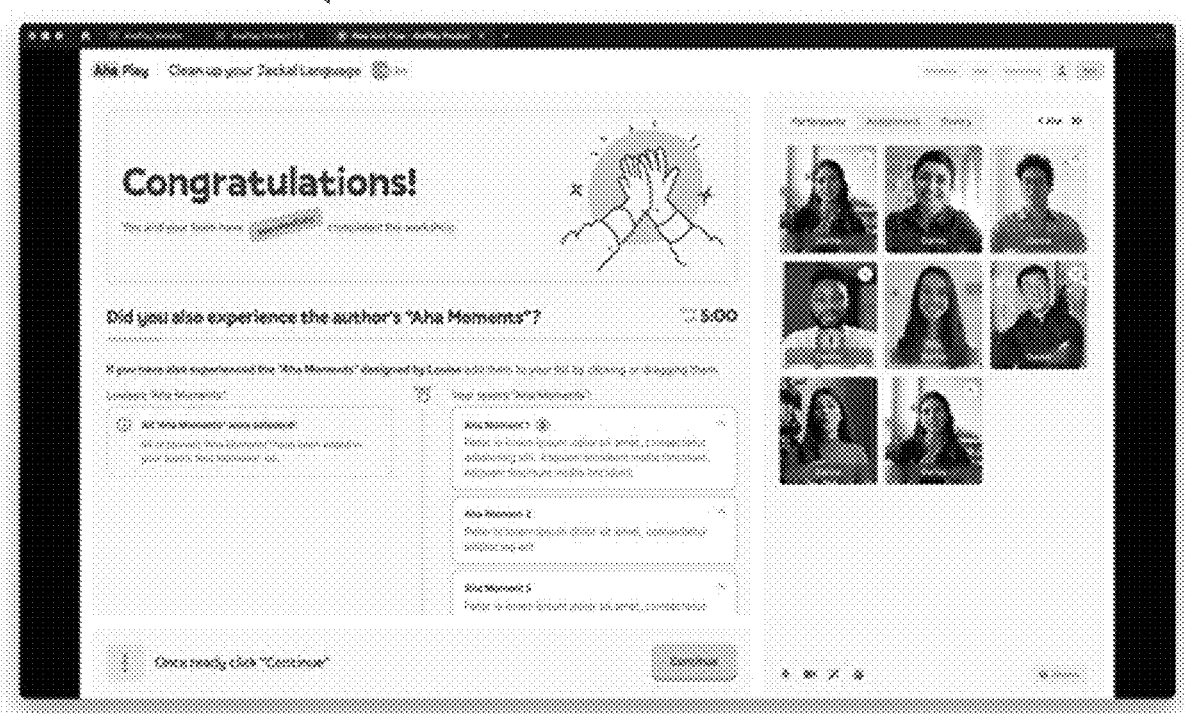

FIG. 194 illustrates an example second user interface associated with sharing of an aha moment.

Figure 195:
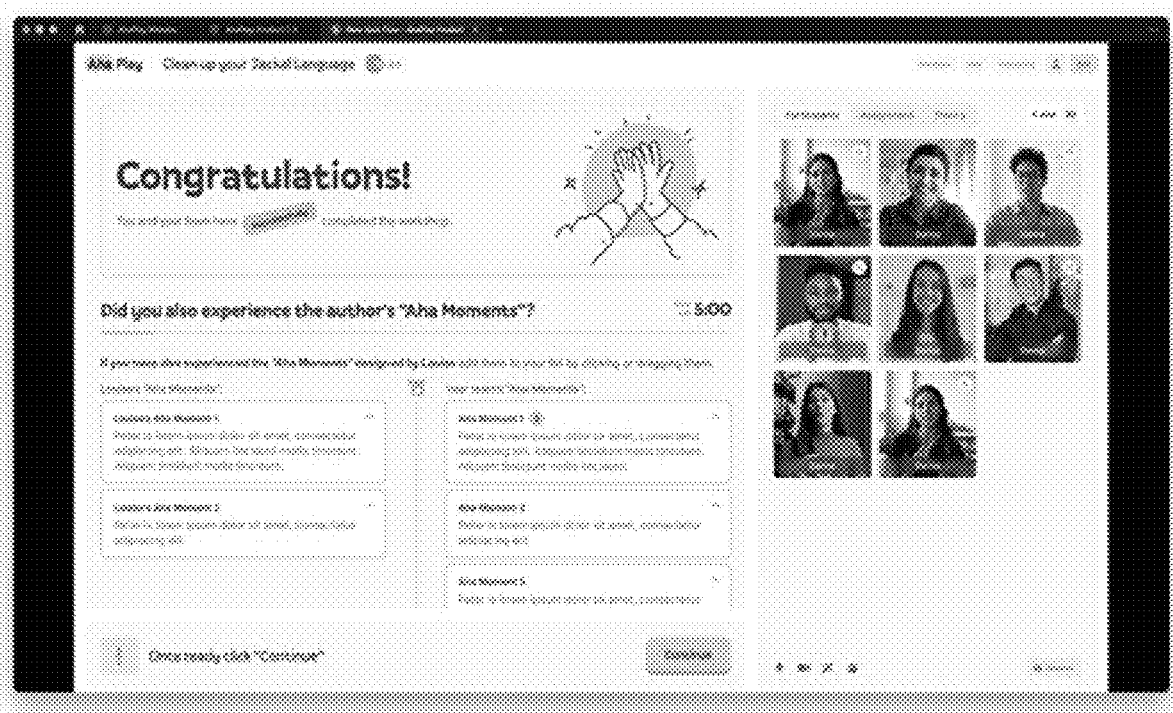

FIG. 195 illustrates an example third user interface associated with sharing of an aha moment.

Figures 196, 197:
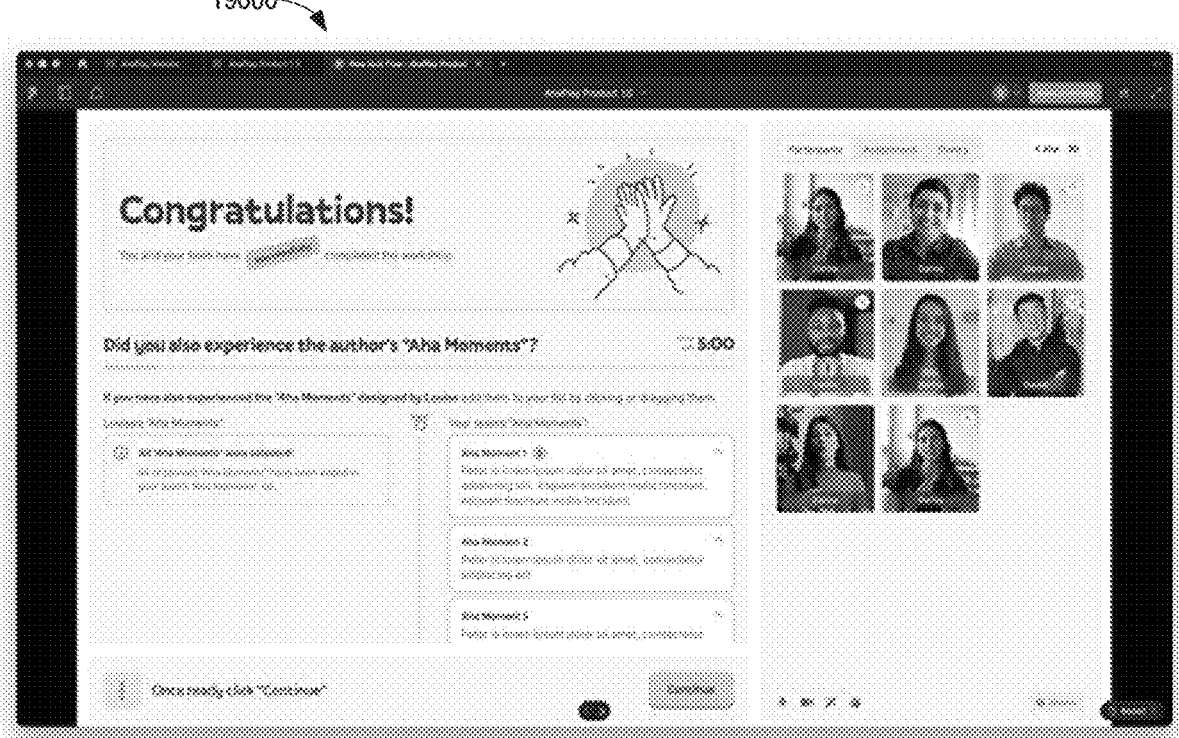

FIG. 196 illustrates an example fourth user interface associated with sharing of an aha moment.

FIG. 197 illustrates an example fifth user interface associated with sharing of an aha moment.

Figure 198:
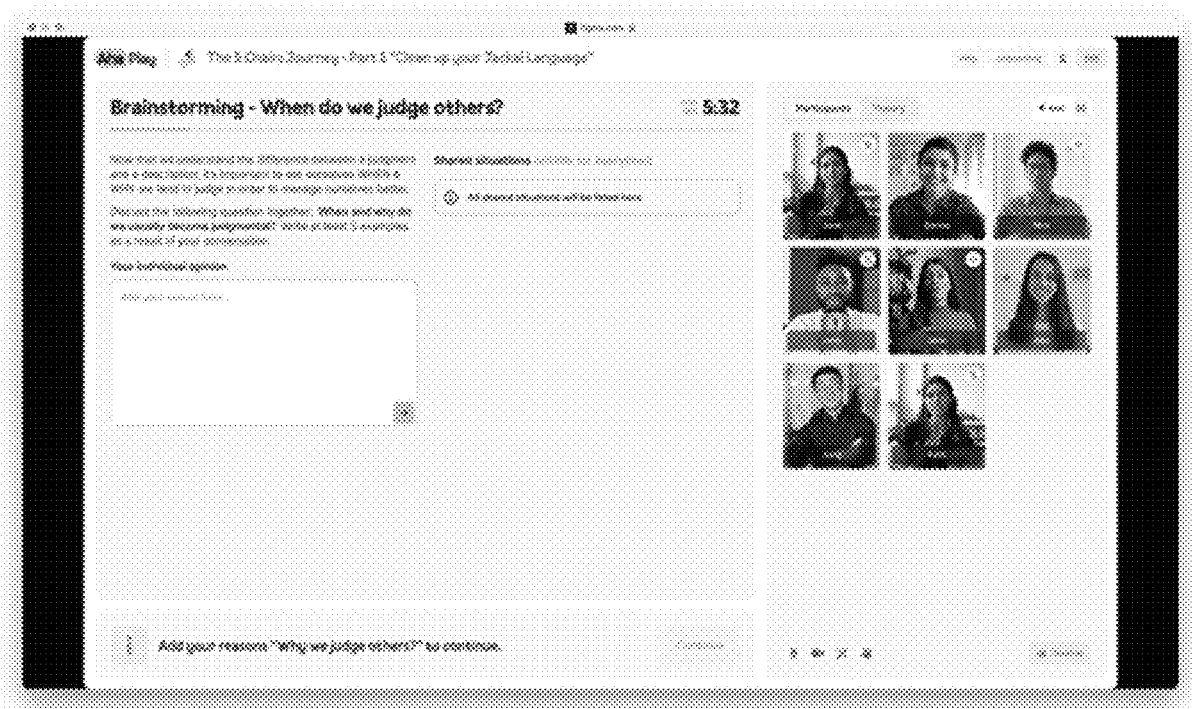

FIG. 198 illustrates an example user interface associated with a group brainstorming activity.

Figure 199:
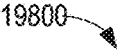

FIG. 199 illustrates an example first user interface associated with performing a categorization.

Figures 200, 201:
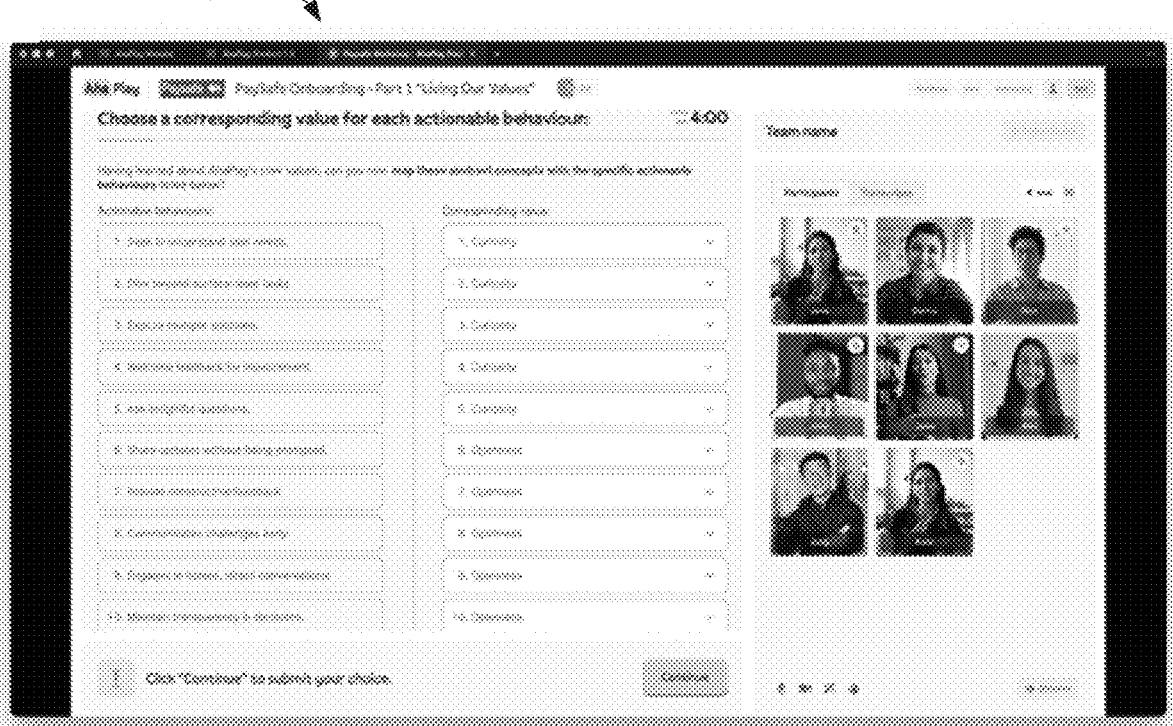

FIG. 200 illustrates an example second user interface associated with performing a categorization.

FIG. 201 illustrates an example third user interface associated with performing a categorization.

Figure 202:
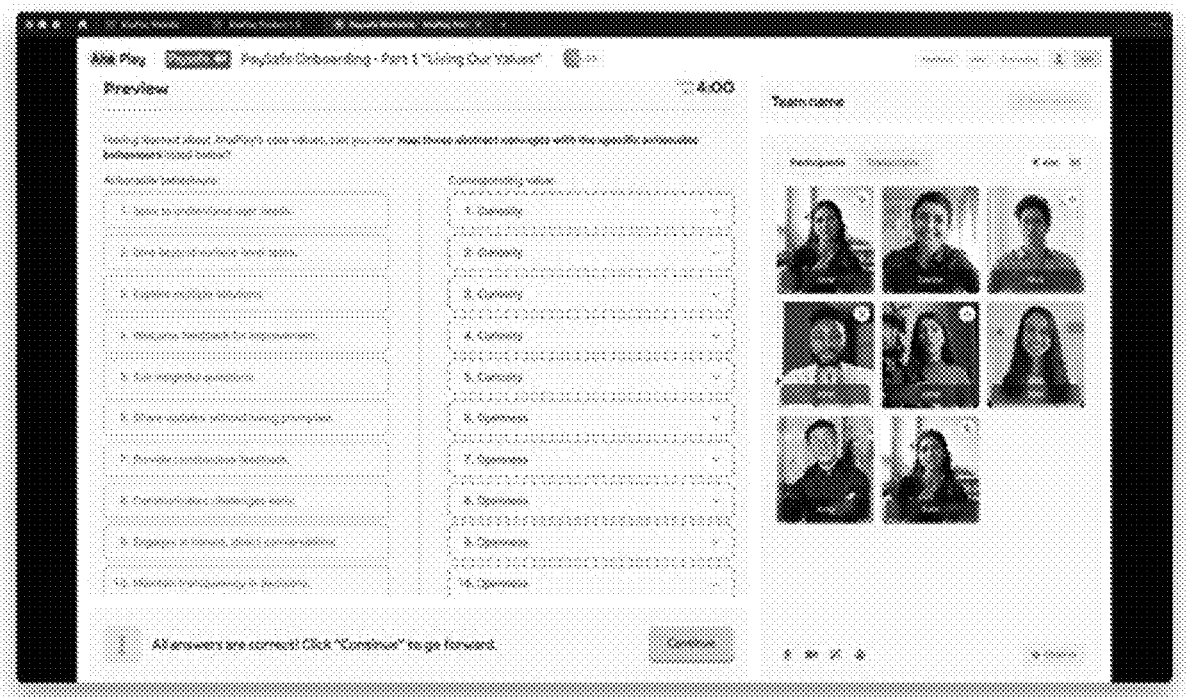

FIG. 202 illustrates an example fourth user interface associated with performing a categorization.

Figure 203:
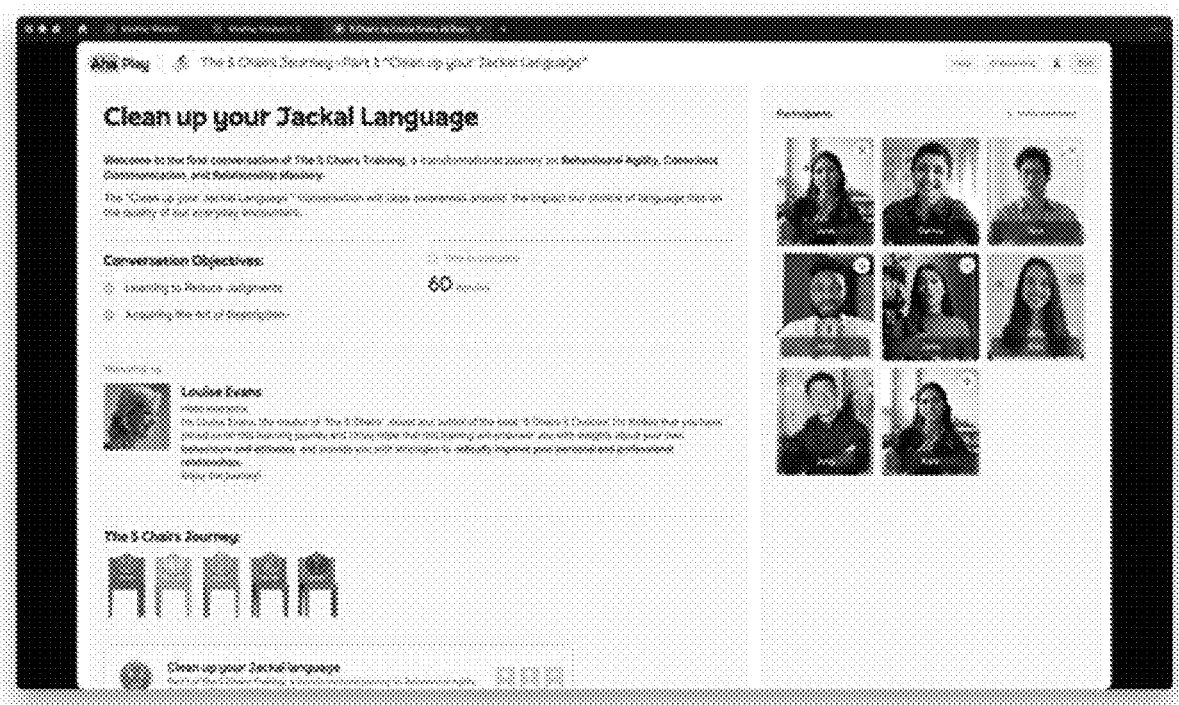

FIG. 203 illustrates an example first user interface associated with an end-to-end representation of the conversational workshop on a screen-by-screen basis, including an introduction to the conversation workshop.

Figure 204:
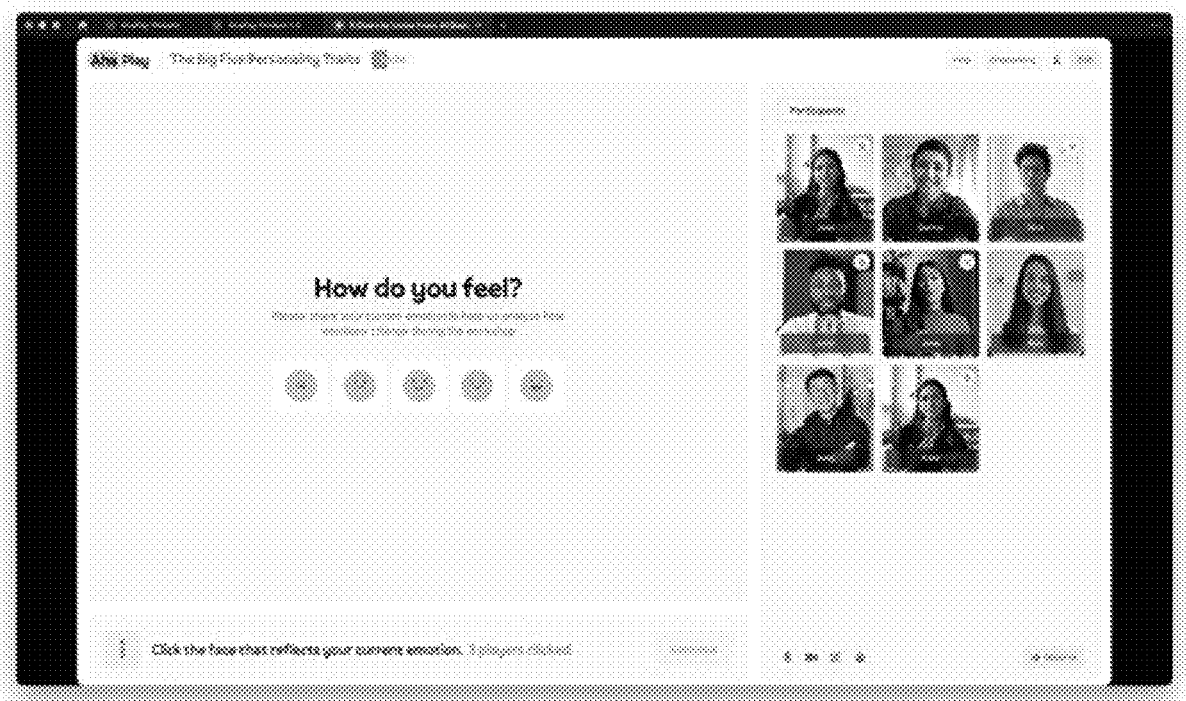

FIG. 204 illustrates an example second user interface associated with an end-to-end representation of the conversational workshop on a screen-by-screen basis, including a selection of an emotion by the participant.

Figure 205:
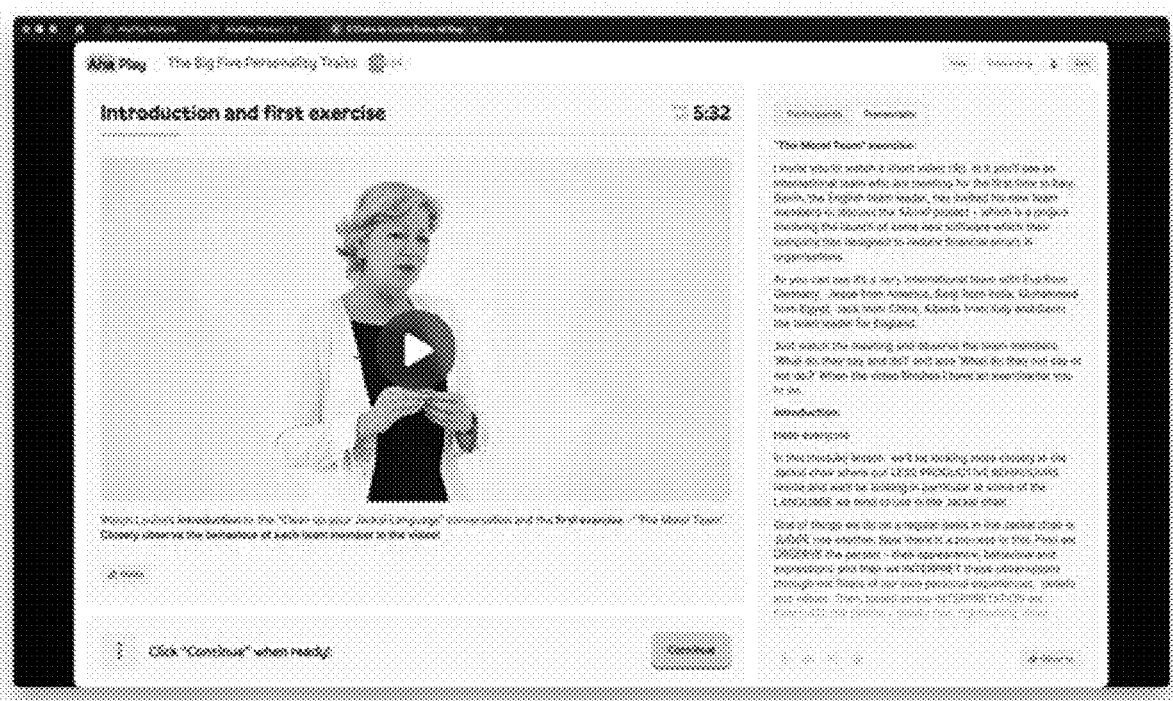

FIG. 205 illustrates an example third user interface associated with an end-to-end representation of the conversational workshop on a screen-by-screen basis, including a workshop introduction and first exercise.

Figure 206:
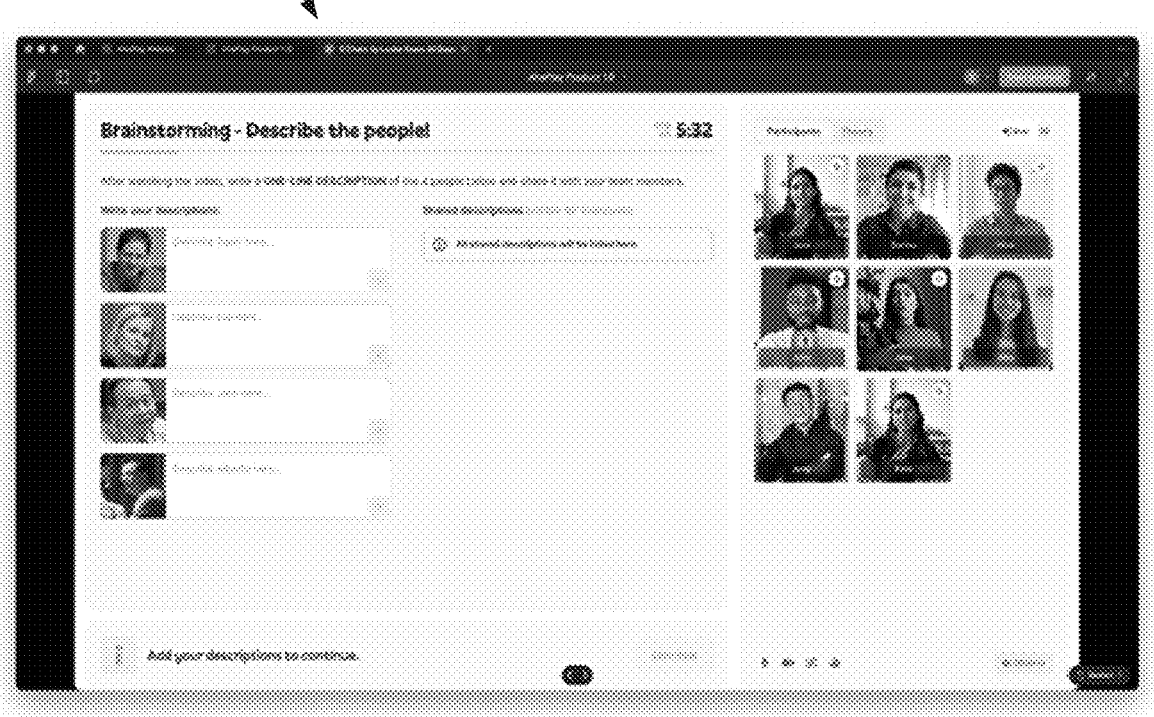

FIG. 206 illustrates an example fourth user interface associated with an end-to-end representation of the conversational workshop on a screen-by-screen basis, including a brainstorming activity.

Figure 207:
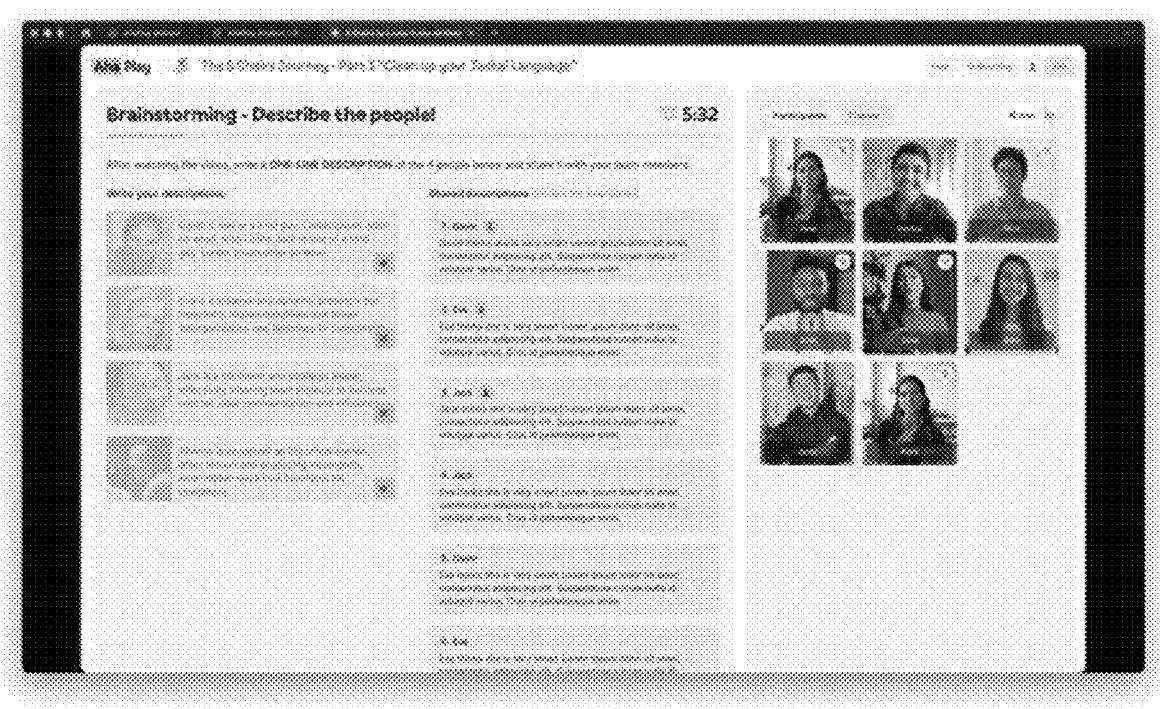

FIG. 207 illustrates an example fifth user interface associated with an end-to-end representation of the conversational workshop on a screen-by-screen basis, including the brainstorming activity.

Figure 208:
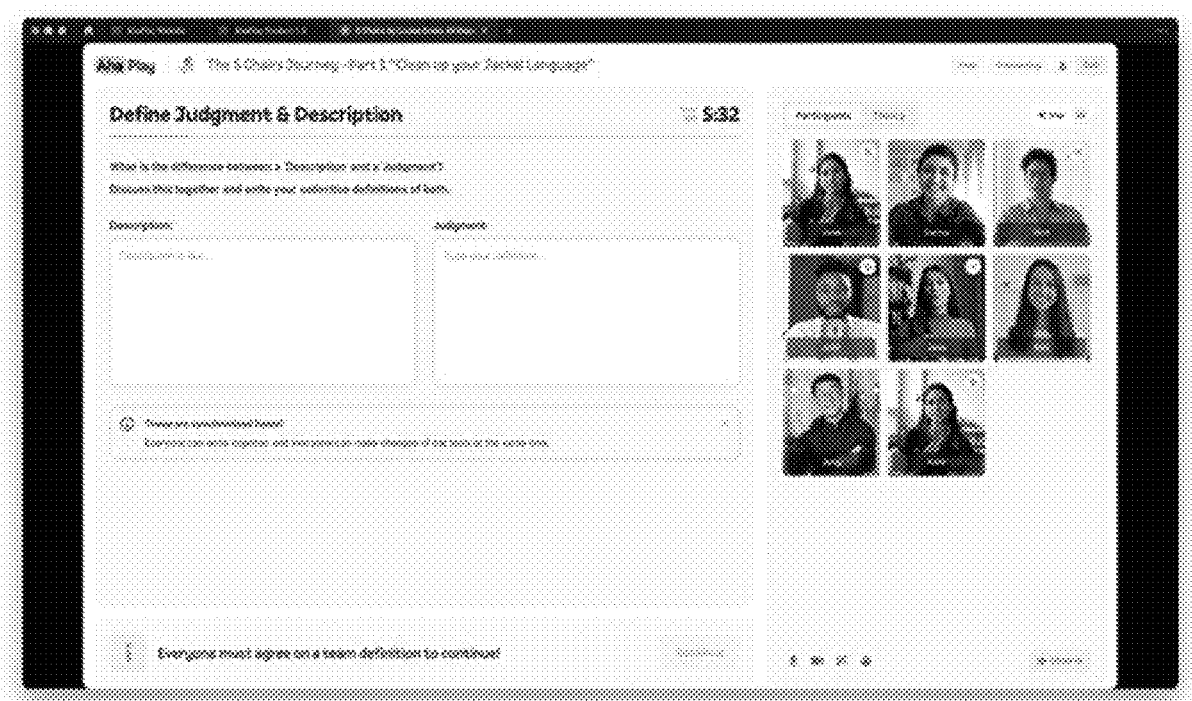

FIG. 208 illustrates an example sixth user interface associated with an end-to-end representation of the conversational workshop on a screen-by-screen basis, including an area for inputting a team definition.

Figure 209:
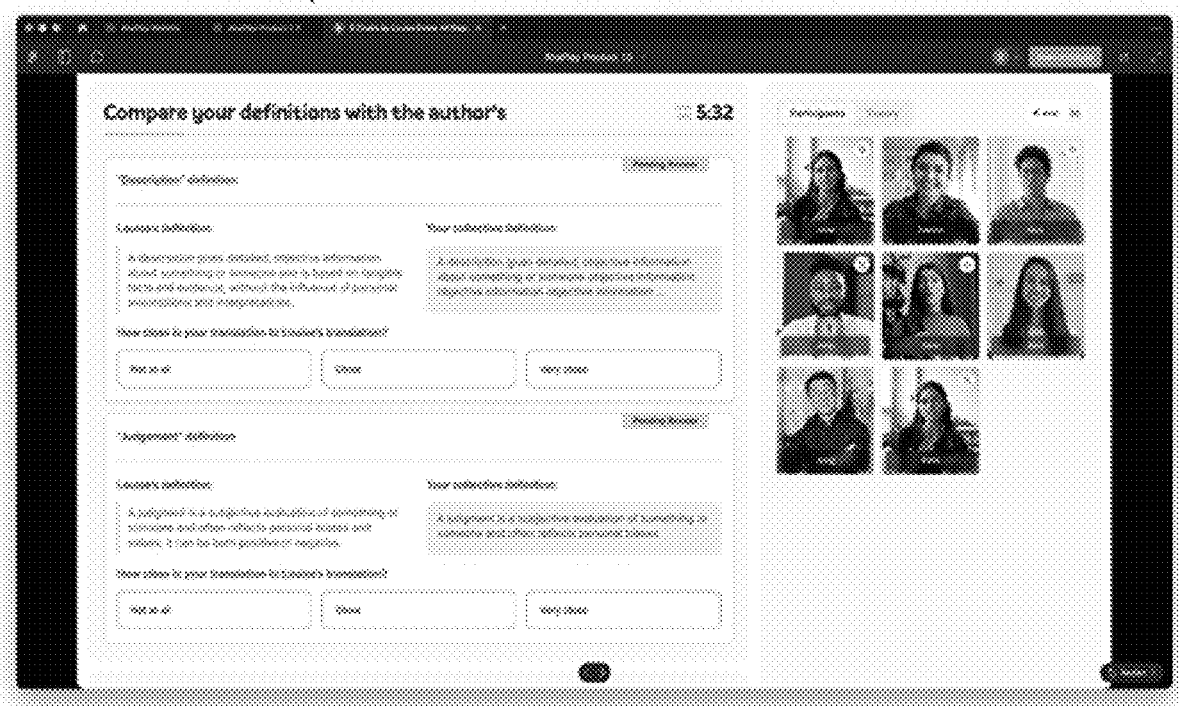

FIG. 209 illustrates an example seventh user interface associated with an end-to-end representation of the conversational workshop on a screen-by-screen basis, including a comparison of the team definitions.

Figure 210:
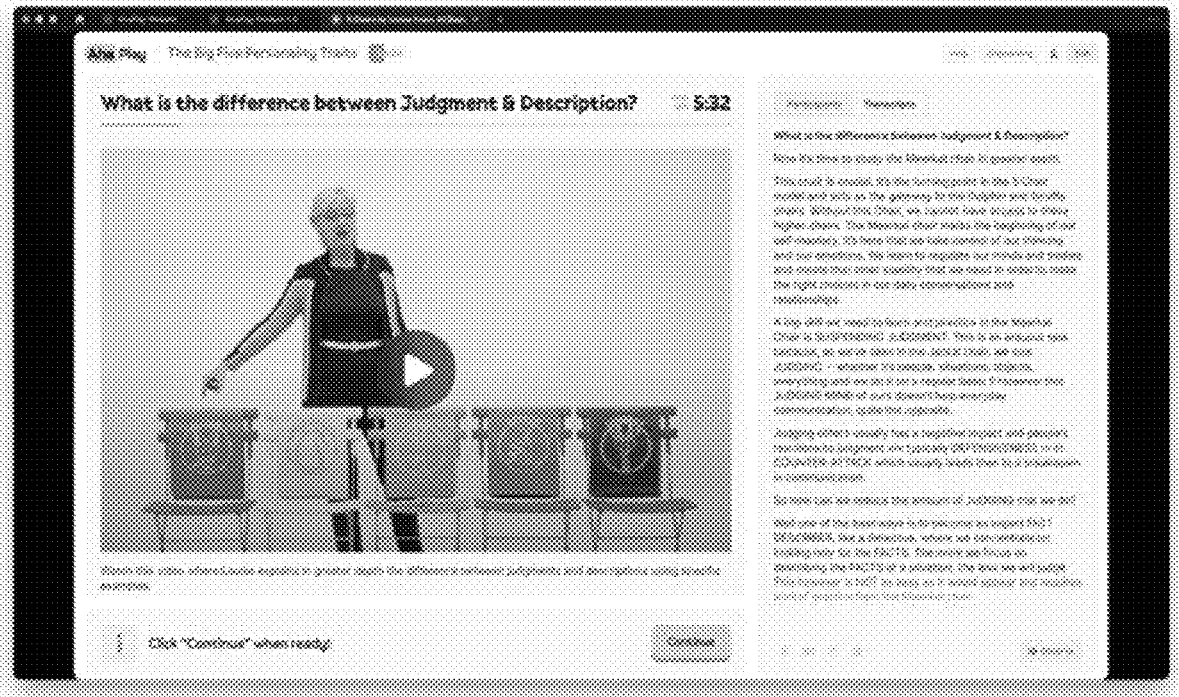

FIG. 210 illustrates an example eight user interface associated with an end-to-end representation of the conversational workshop on a screen-by-screen basis, including a continuation of the workshop presentation using a video and/or transcript.

Figure 211:
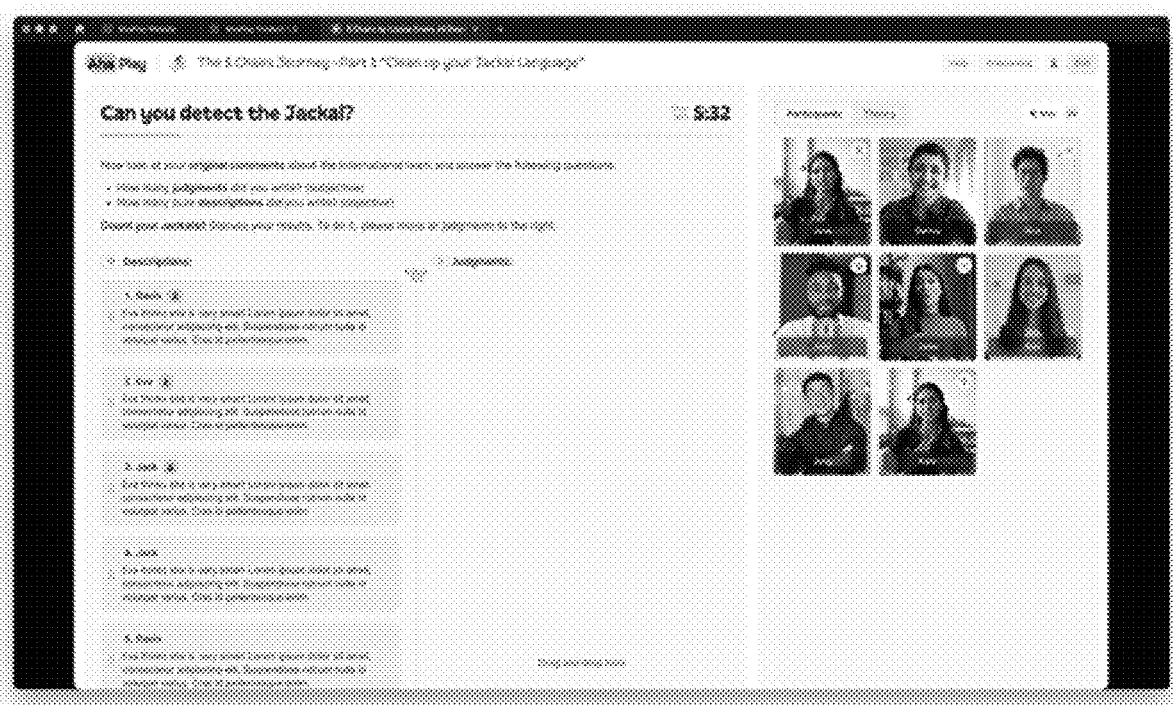

FIG. 211 illustrates an example ninth user interface associated with an end-to-end representation of the conversational workshop on a screen-by-screen basis, including an exercise associated with the conversation workshop.

Figure 212:
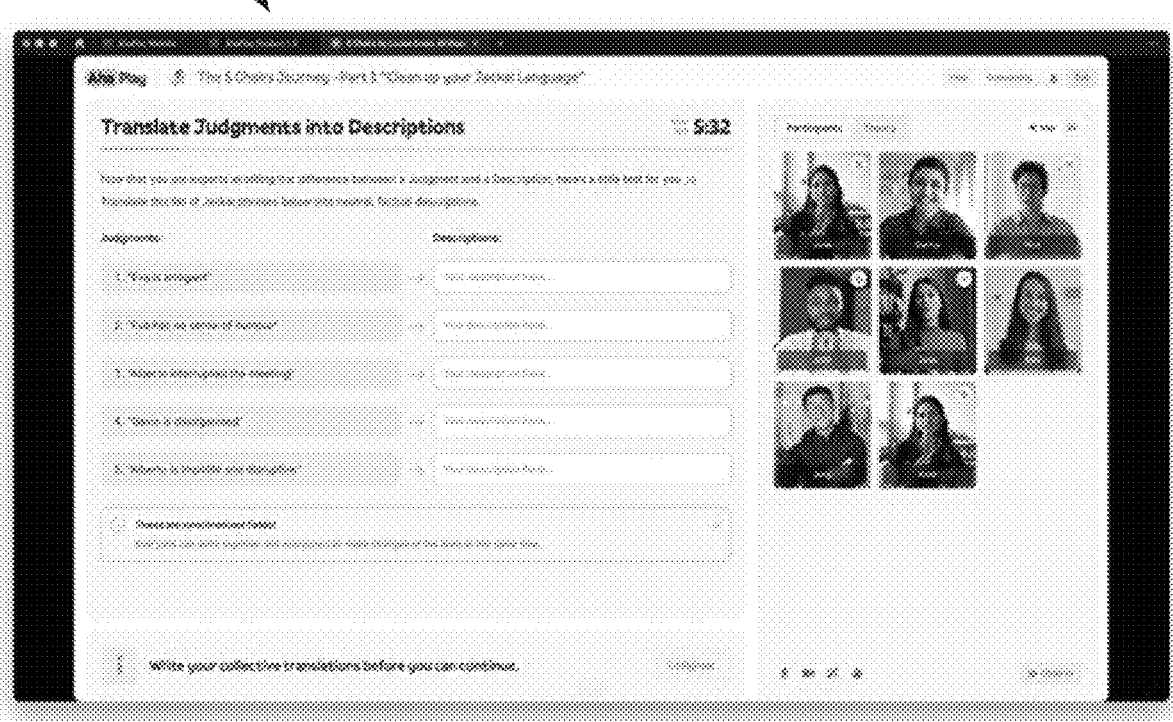

FIG. 212 illustrates an example tenth user interface associated with an end-to-end representation of the conversational workshop on a screen-by-screen basis, including the entry of collective translations.

Figure 213:
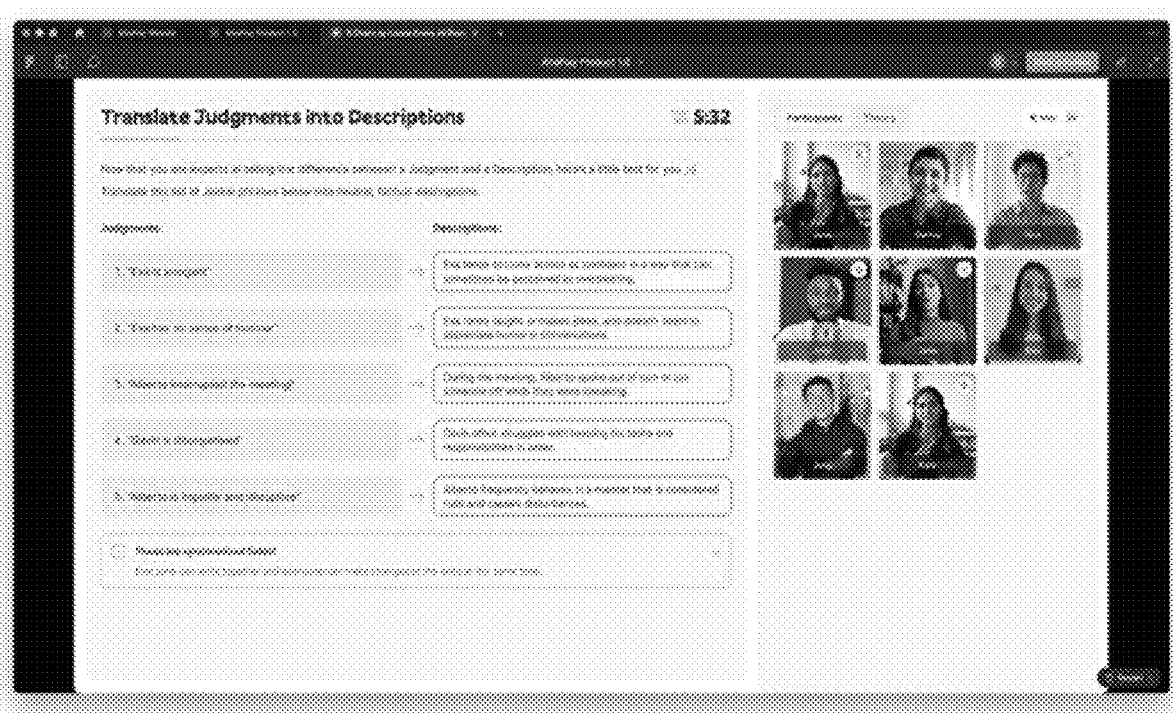

FIG. 213 illustrates an example eleventh user interface associated with an end-to-end representation of the conversational workshop on a screen-by-screen basis, including the entry of collective translations.

Figure 214:
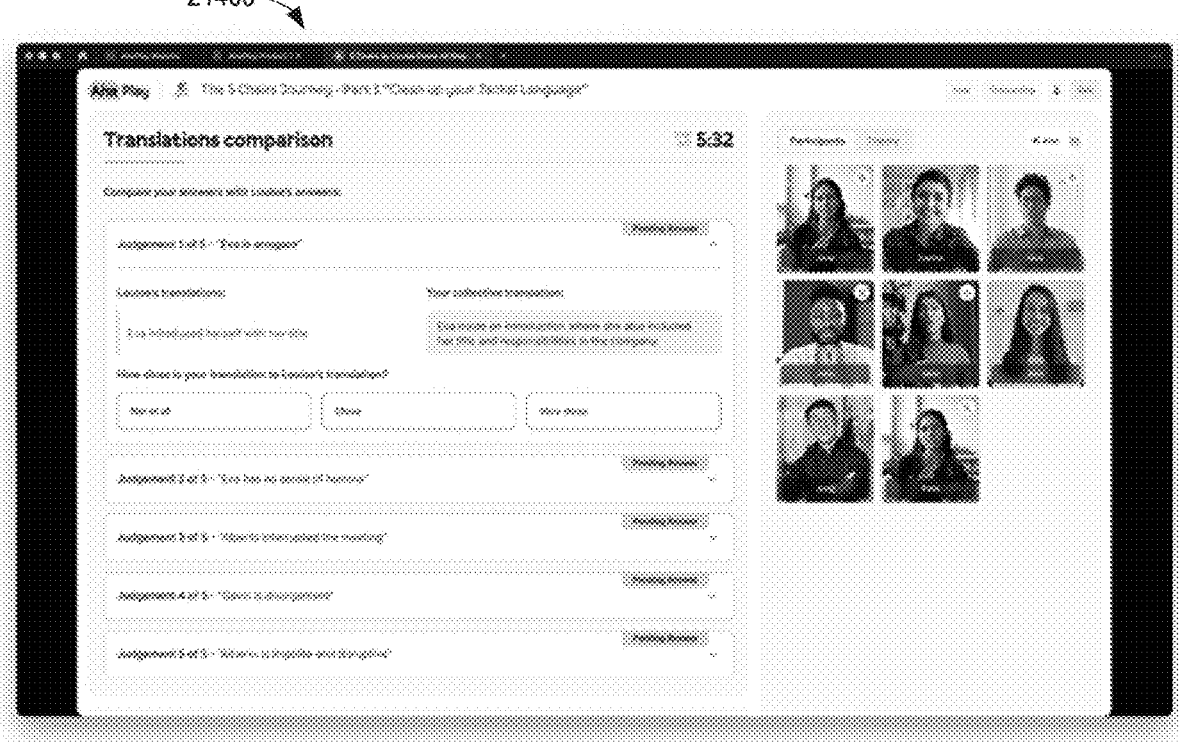

FIG. 214 illustrates an example twelfth user interface associated with an end-to-end representation of the conversational workshop on a screen-by-screen basis, including a comparison of translations.

Figure 215:
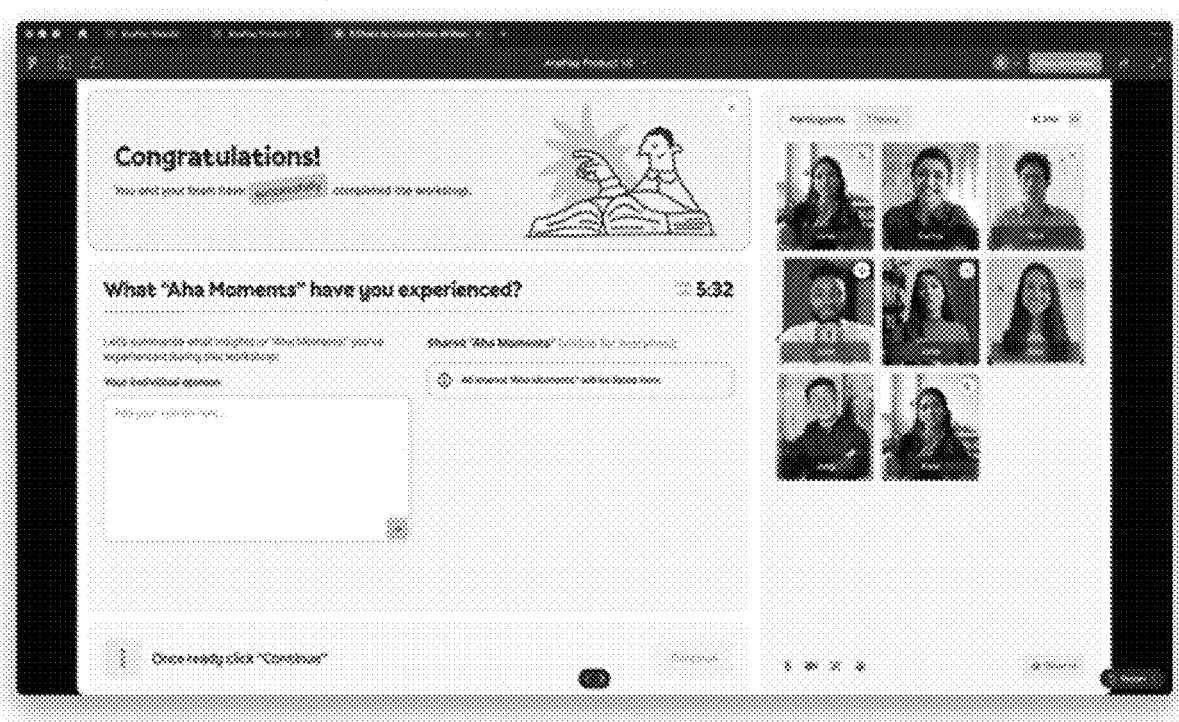

FIG. 215 illustrates an example thirteenth user interface associated with an end-to-end representation of the conversational workshop on a screen-by-screen basis, including an area for entering aha moments associated with the conversation workshop.

Figure 216:
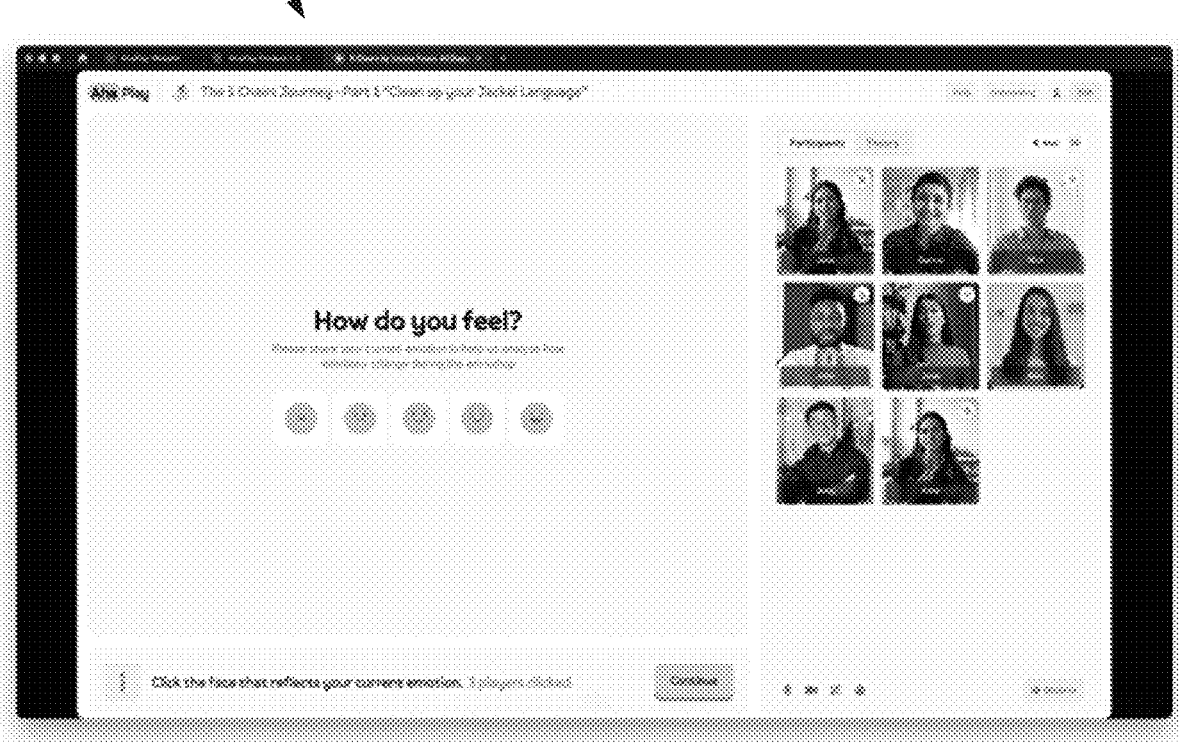

FIG. 216 illustrates an example fourteenth user interface associated with an end-to-end representation of the conversational workshop on a screen-by-screen basis, including entry of an emotion associated with the completion of the workshop.

Figure 217:
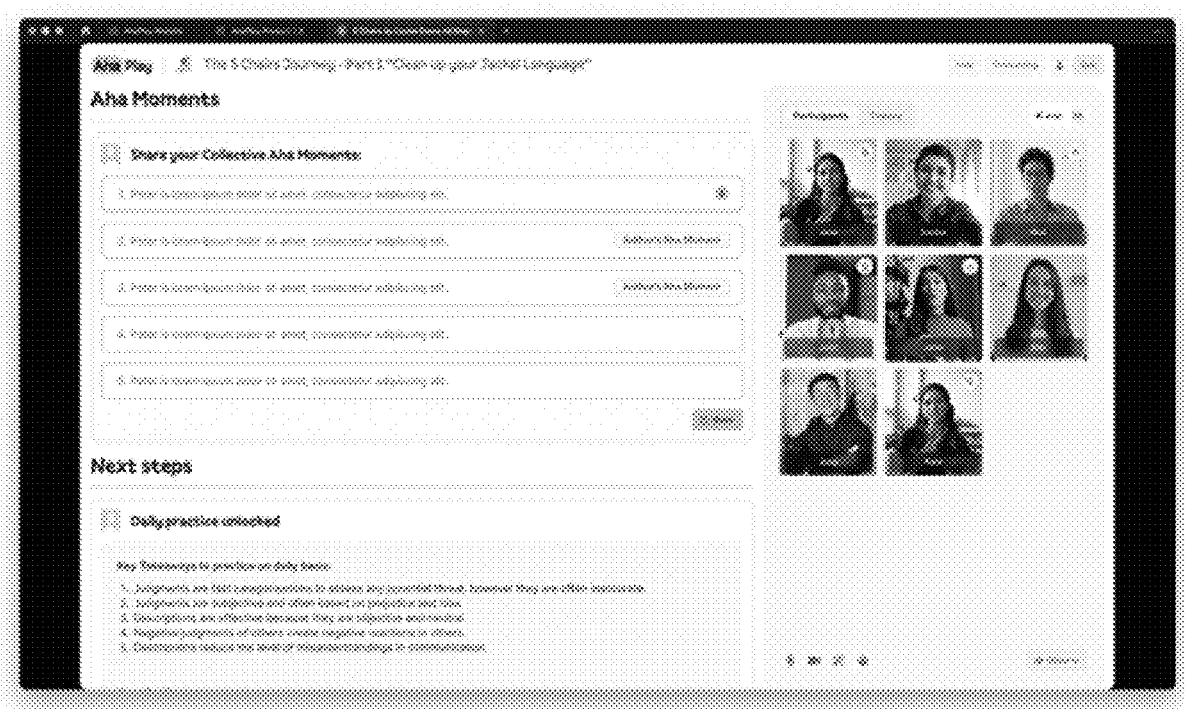

FIG. 217 illustrates an example fifteenth user interface associated with an end-to-end representation of the conversational workshop on a screen-by-screen basis, including the sharing of collective aha moments.

Figure 218:
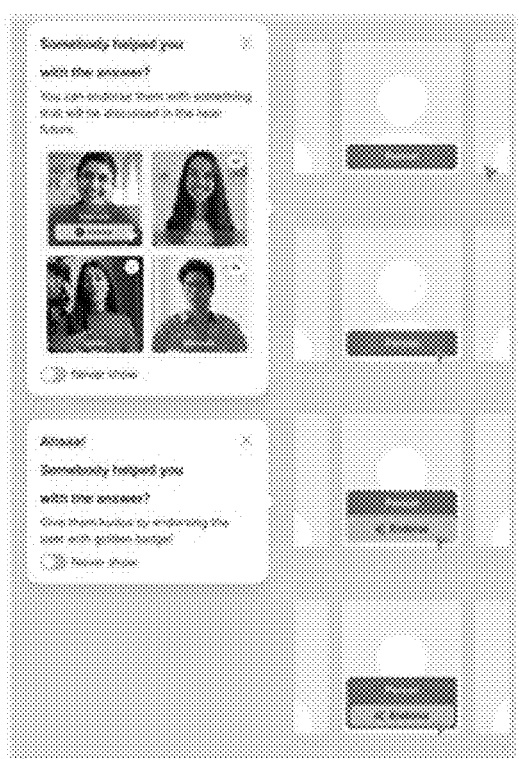

FIG. 218 illustrates an example first user interface associated with additional key features of the conversation platform, such as endorsements.

Figure 219:
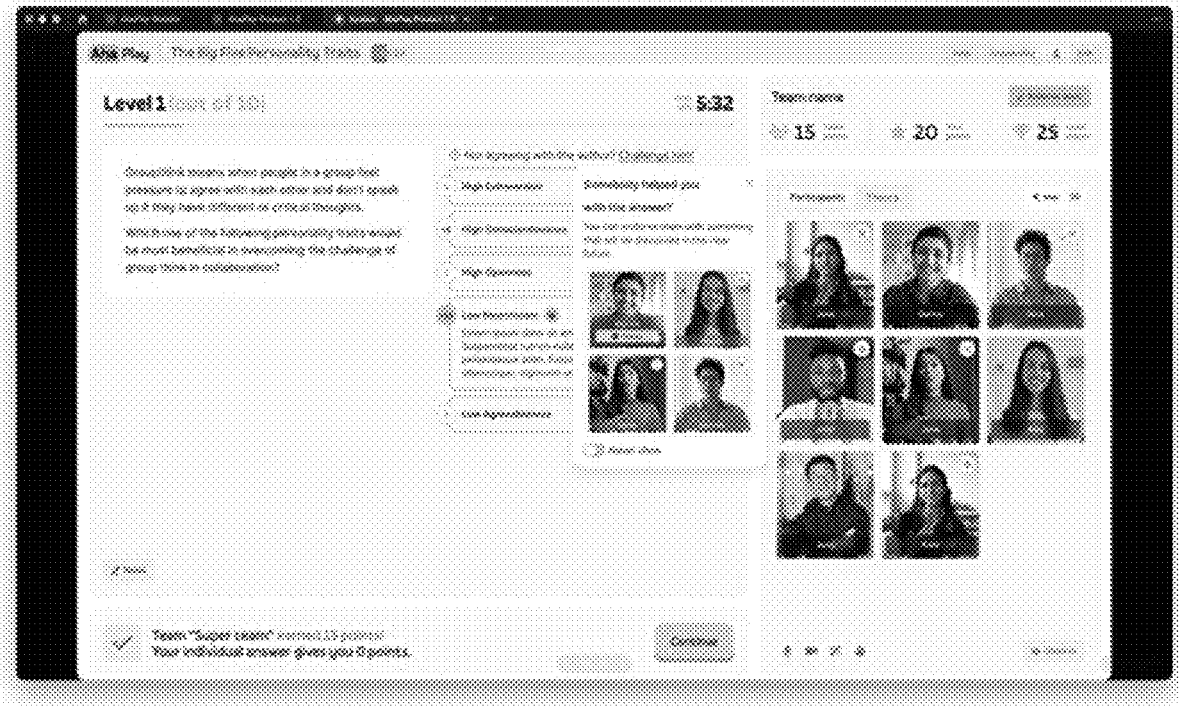

FIG. 219 illustrates an example second user interface associated with additional key features of the conversation platform, such as endorsements.

Figure 220:
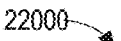
Figure 220:
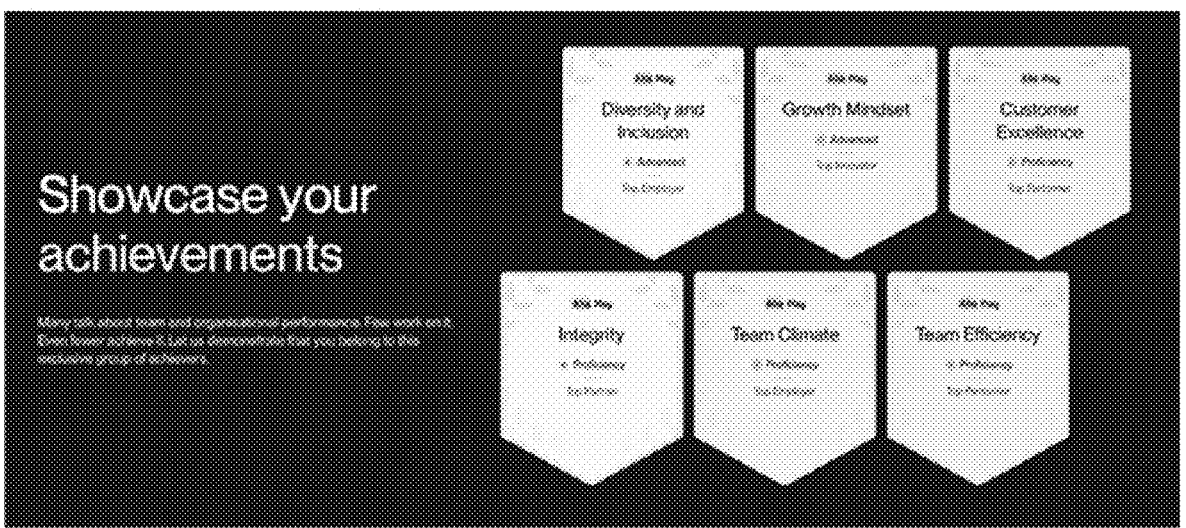

FIG. 220 illustrates an example user interface associated with additional key features of the conversation platform, such as personal achievements.

Figure 1:
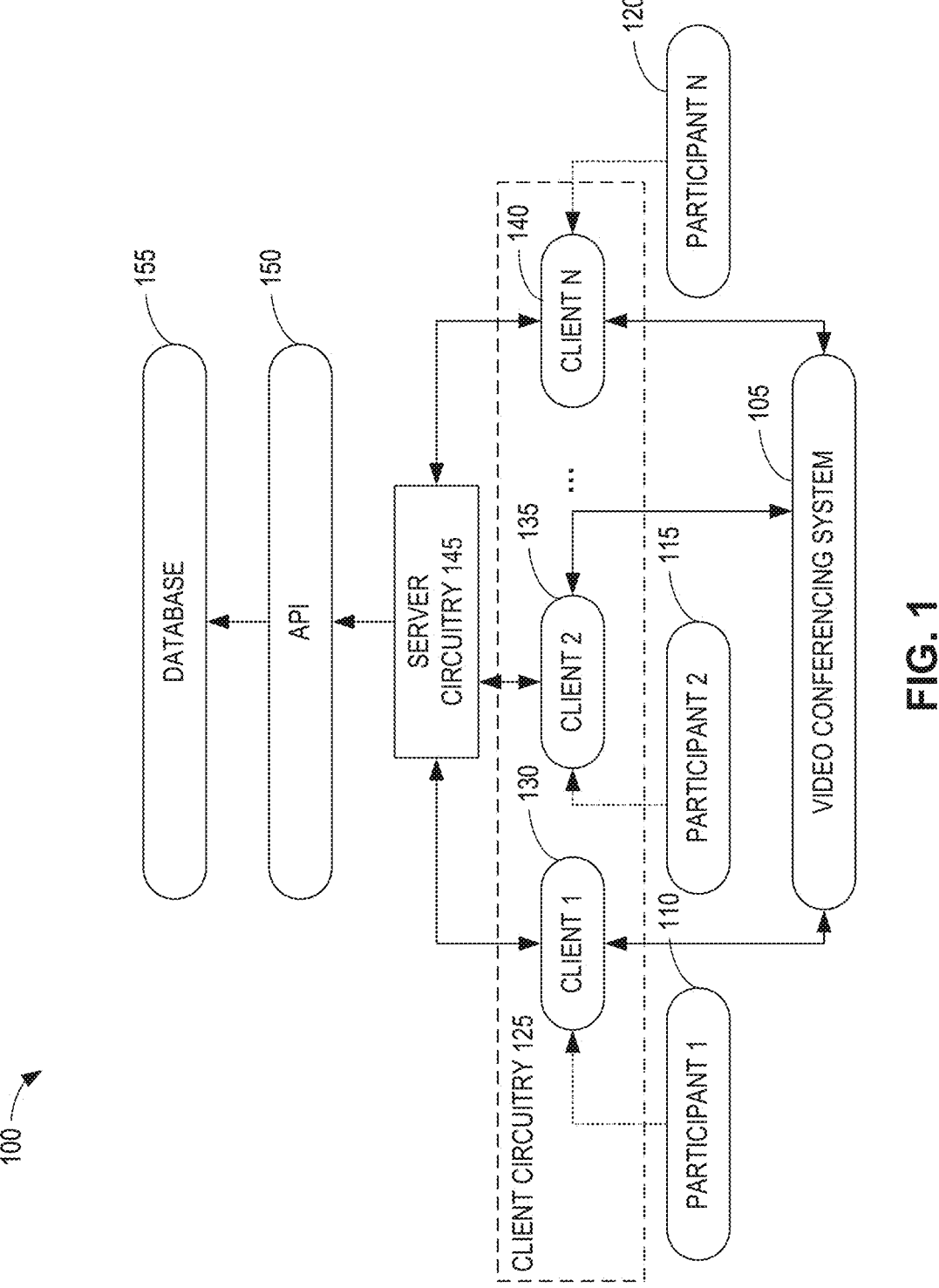
FIG. 1 is a block diagram of an example first implementation of client circuitry and server circuitry constructed in accordance with teachings of this disclosure to present consent-based, consensus-based and consent-consensus-based conversational workshops.
Figure 2:
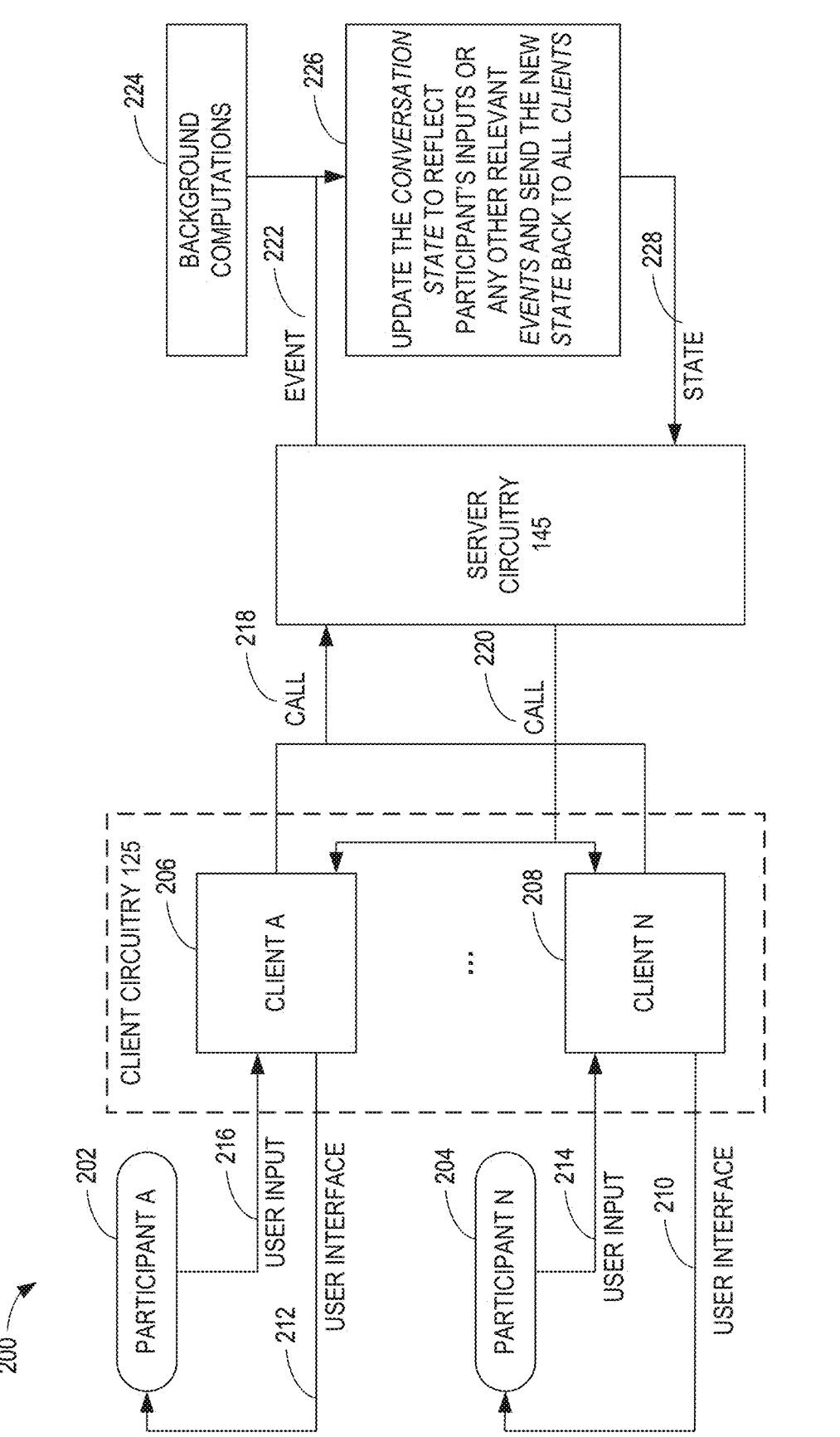
FIG. 2 is a block diagram of an example second implementation of client circuitry and server circuitry of FIG. 1 constructed in accordance with teachings of this disclosure to present conversational workshops.
Figure 221:
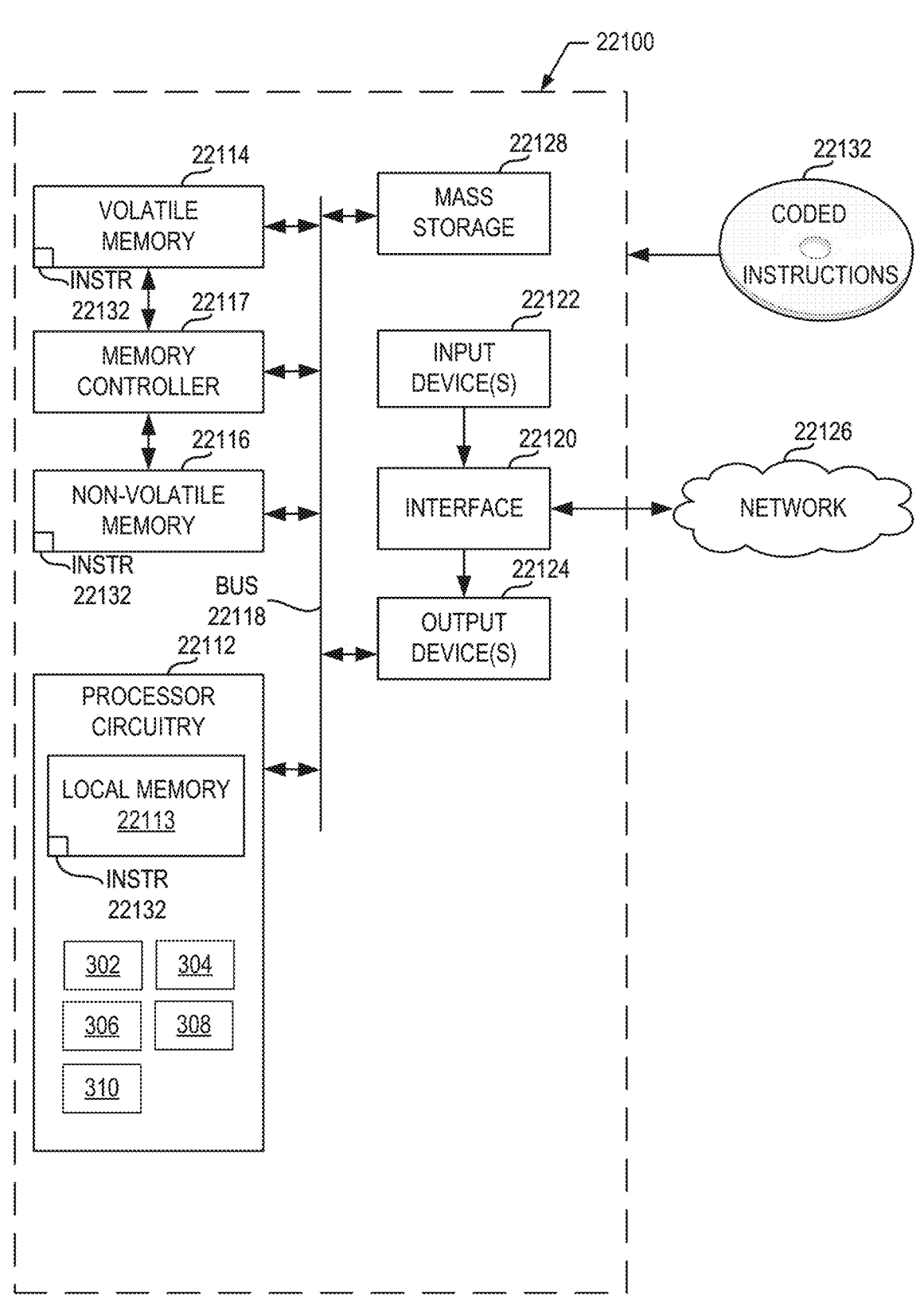

FIG. 221 is a block diagram of an example processing platform including programmable circuitry structured to execute, instantiate, and/or perform the example machine readable instructions and/or perform the example operations of FIGS. 5, 7, 8, 9 and/or 11 to implement the client circuitry 125 of FIGS. 1-2.

Figure 222:
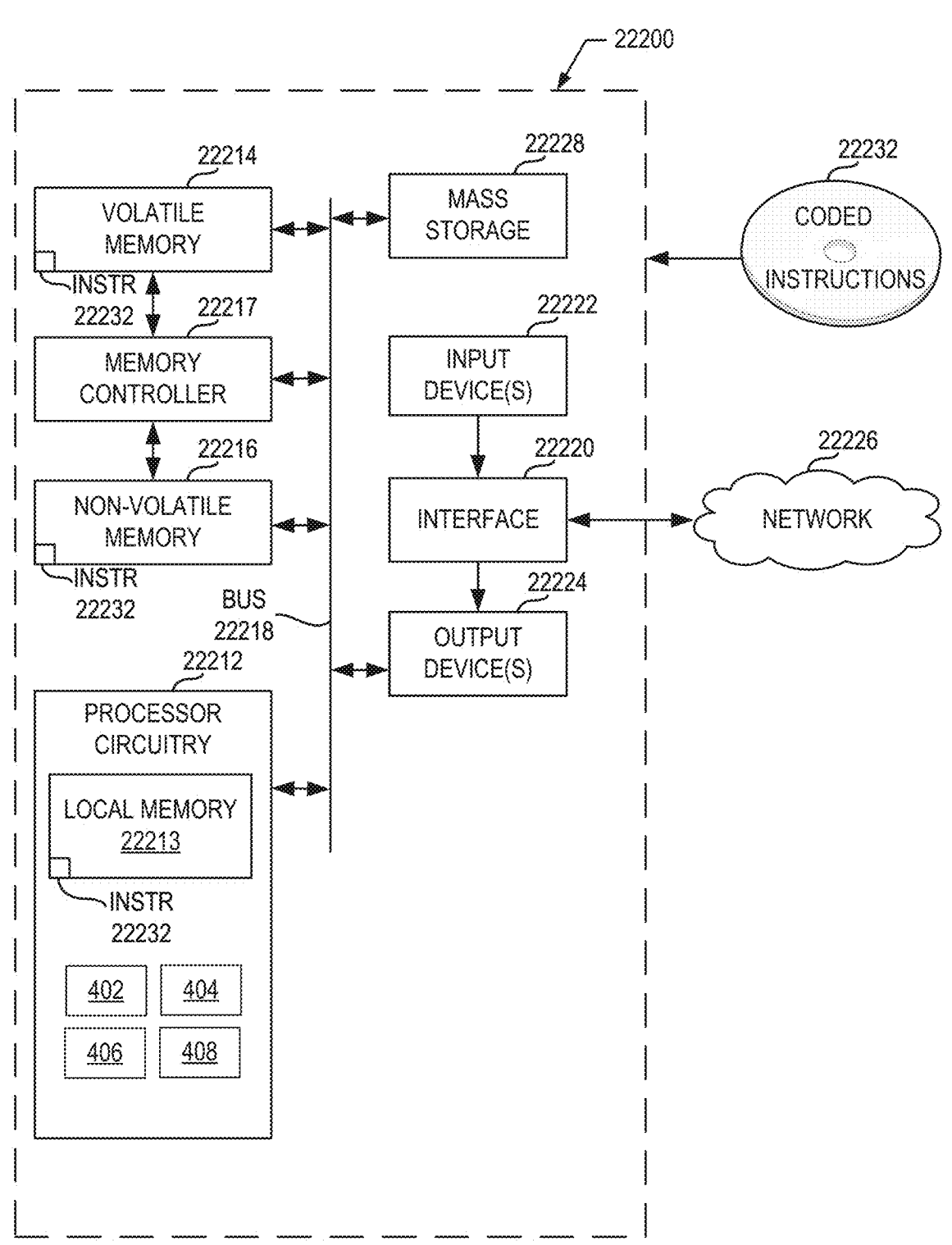

FIG. 222 is a block diagram of an example processing platform including programmable circuitry structured to execute, instantiate, and/or perform the example machine readable instructions and/or perform the example operations of FIGS. 5, 7, 8, 9 and/or 11 to implement the server circuitry 145 of FIGS. 1-2.

Figure 223:
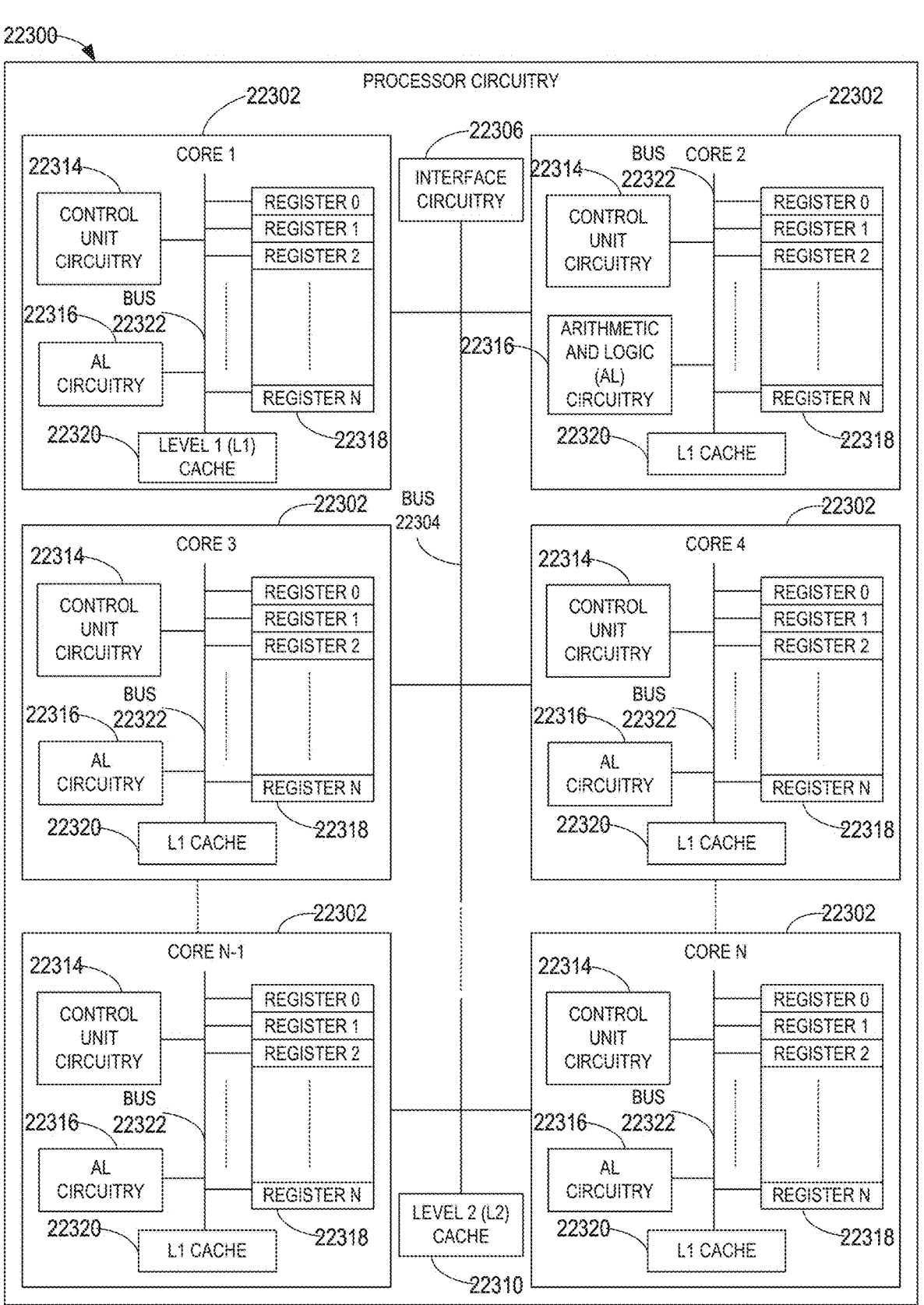

FIG. 223 is a block diagram of an example implementation of the processor circuitry of FIGS. 221 and/or 222.

Figure 224:
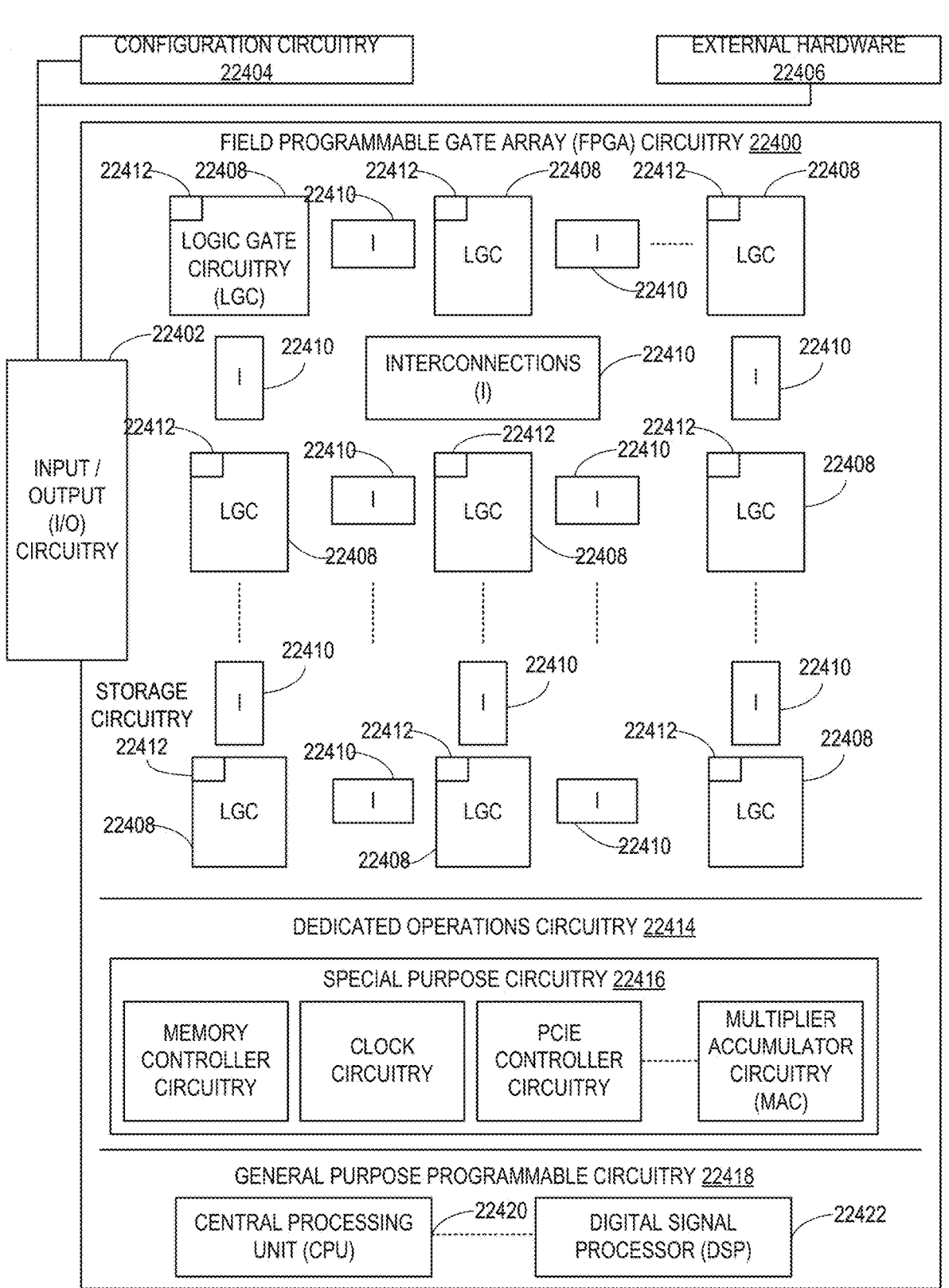

FIG. 224 is a block diagram of another example implementation of the programmable circuitry of FIGS. 221 and/or 222.

Figure 225:
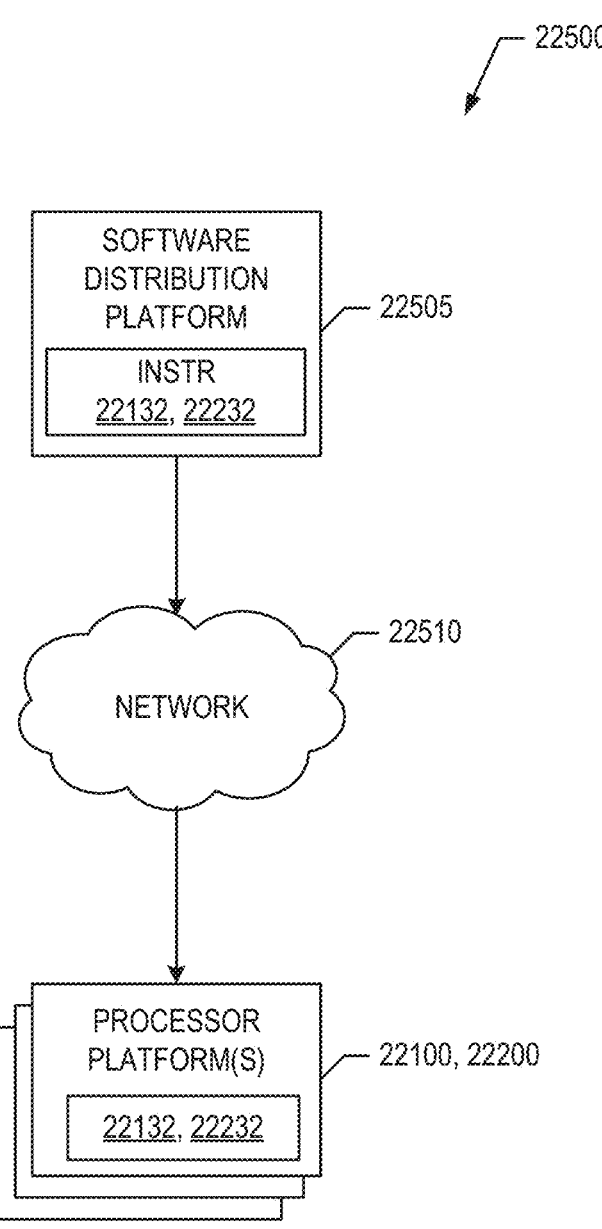

FIG. 225 is a block diagram of an example software/firmware/instructions distribution platform (e.g., one or more servers) to distribute software, instructions, and/or firmware (e.g., corresponding to the example machine readable instructions of FIGS. 5, 7, 8, 9 and/or 11) to client devices associated with end users and/or consumers (e.g., for license, sale, and/or use), retailers (e.g., for sale, re-sale, license, and/or sub-license), and/or original equipment manufacturers (OEMs) (e.g., for inclusion in products to be distributed to, for example, retailers and/or to other end users such as direct buy customers).

In general, the same reference numbers will be used throughout the drawing(s) and accompanying written description to refer to the same or like parts. The figures are not necessarily to scale.

DETAILED DESCRIPTION

Virtual meetings allow for collaborative activities among individuals using video, audio and/or text to share information in real-time. For example, virtual meetings can include one-on-one meetings and/or team-based discussions. In some examples, virtual meetings can be joined using videoconferencing software, online communication platforms, and/or phone-based conferencing systems. In some examples, virtual meeting software is executed using mobile applications, desktop applications, and/or Internet browsers.

Methods and apparatus disclosed herein introduce a conversational workshop as part of a virtual meeting platform. In examples disclosed herein, participants can select among consent-based, consensus-based, and consent-consensus-based conversational workshops. In examples disclosed herein, a conversational workshop (e.g., conversation) refers to a dynamic group session where participants collaborate through hands-on activities (e.g., enabling them to share experiences, acquire knowledge, develop skills, make decisions, solve problems and/or build relationships). In examples disclosed herein, a conversational goal refers to a desired outcome of the conversation (e.g., which may include exploring or diving deeper into a given topic, reflecting on one's own experience, building skills or rethinking one's attitudes and/or beliefs, sharing knowledge with others and/or communicating important topics, aligning understanding, making a decision or solving a problem, fostering relationships among participants, getting an individual "aha" moment or a collective insight, etc.). In examples disclosed herein, a conversation flow includes a sequence of activities that participants follow to successfully achieve the conversation's intended goal. In some examples, the activities can be arranged in sequence, conditionally, recursively, and/or in any other combination.

In examples disclosed herein, the conversation activity includes a set of tasks that participants complete to progress through the conversation flow. In some examples, the conversation activity is a solo activity, a group activity, a team activity, or a composite activity. For example, a solo activity occurs when each participant works individually on a set of tasks, without any interaction or connection with the group. A group activity occurs when each participant engages in individual tasks while maintaining the opportunity to interact and connect with the group. A team activity occurs when participants collaborate and work together to complete the assigned activity, which consists of a set of tasks. A composite activity occurs when a conversation activity consists of one or more solo, group or team activities.

In examples disclosed herein, an activity task includes various possible actions (e.g., clicking on a button, sharing information with other participants, entering text into an input field, making a selection, sorting a list, among any other types of interactive tasks and/or user inputs). In examples disclosed herein, a task outcome is a result of an activity. For example, results of an activity can include a variety of actions, such as the presence of a clicked button, a sorted list, and/or a filled input field, among others. In examples disclosed herein, a confirmation refers to a participant giving their formal confirmation with the outcome of a task (e.g., selecting "Continue" or selecting "I am ready"). In examples disclosed herein, consent refers to a result achieved when each participant has given their confirmation with their activity's tasks outcome, but these outcomes are not necessarily identical (e.g., such that participants may select different buttons, obtain a different selection from a set of radio buttons, order in different ways a list of items, etc.). In examples disclosed herein, consensus can be achieved when each participant has given their confirmation with their activity's task outcomes and these outcomes are identical (e.g., such as all participants have selected "Continue", or made the same selection from a set of radio buttons, ordered in the same way a list of items, etc.).

In examples disclosed herein, conversation progress refers to moving from one activity of the activity flow to another activity. In examples disclosed herein, a consent-based conversation refers to a conversation where progress is made through reaching consents. In examples disclosed herein, a consensus-based conversation refers to a conversation where progress is made through reaching consensuses. In examples disclosed herein, a consent-consensus-based conversation refers to a conversation where progress is made by reaching consents or consensuses. In examples disclosed herein, a conversation outcome refers to a quantitative measure of the success of a conversation. In examples disclosed herein, a timeout refers to the potential of every activity to be subject to a time limit. For example, if an activity concludes without achieving confirmation and/or consensus within the allocated time, the conversation will progress, but the outcome of the conversation might be negatively affected.

In examples disclosed herein, an event refers to anything that could trigger a conversation progress (e.g., such as confirmation, consent, consensus, timeout, participants joining and/or leaving the conversation, etc.). In examples disclosed herein, a conversational journey refers to a set of conversational workshops. In examples disclosed herein, a conversation platform refers to a digital platform including software and/or hardware for conversation flow execution and the management of conversational journeys and/or conversational workshops. For example, a journey is a dedicated space within the conversation platform for specific sets of conversational workshops. Members can start or join a journey, follow their progress, access historical data, and/or retrieve badges and certificates for completed journeys. As described herein, conversations within a journey can be arranged in any order (e.g., sequentially, conditionally, recursively, etc.). In examples disclosed herein, the dedicated spaces available for users can include any type of space that is common for Software as a Service (SaaS) platforms (e.g., specific to billing, invoices, security and privacy settings, preferences, etc.).

FIG. 1 is a block diagram 100 of an example first implementation of client circuitry 125 and server circuitry 145 constructed in accordance with teachings of this disclosure to present conversational workshops. In the example of FIG. 1, a video conferencing system 105 is in communication with client circuitry 125. For example, the video conferencing system 105 can be a computer program, computer hardware and/or any other type of device for audio and/or video streaming, allowing participants of a conversation (e.g., participant 110, participant 115, participant 120, etc.) to communicate with each other in real time. In some examples, the video conferencing system 105 can be integrated with the client circuitry 125 or used separately. In the example of FIG. 1, the client circuitry 125 includes client 130, client 135, and client 140. In examples disclosed herein, the client(s) 130, 135, and/or 140 can represent a user interface (e.g., any type of graphical user interface (GUI)-based application, etc.) that participants access to engage, interact, consume data and/or provide input for the conversation. For example, each conversation can include a mix of solo, group, team and/or composite activities, arranged in a conversation flow. In examples disclosed herein, a conversations platform executes this flow to enable participants to engage in learning, get-to-know and socializing, knowledge sharing, decision-making and problem-solving or any other type of group experiences (e.g., relevant to a conversation goal).

For example, FIG. 1 illustrates how the clients of the client circuitry 125 (e.g., client 130, client 135, client 140, etc.), server(s) (e.g., server circuitry 145), video conferencing system(s) (e.g., video conferencing system 105), API(s) (e.g., application programming interface (API) 150) and database(s) (e.g., database 155) communicate to execute a given conversation flow with a given number of participants (e.g., participant 110, participant 115, participant 120, etc.). In the example of FIG. 1, the client circuitry 125 is in communication with the server circuitry 145. In examples disclosed herein, the server circuitry 145 can be any of a computer program, computer hardware, and/or any other type of a device that manages (e.g., including in real time) the conversation state, progress and outcome and synchronizes any other data between all the clients (e.g., client 130, client 135, client 140, etc.) engaged in a conversation. In some examples, the server circuitry 145 is a web socket or any other type of network socket or communication technology. In examples disclosed herein, the video conferencing system 105 is a computer program, computer hardware and/or any other type of device for audio and video streaming, allowing a conversation's participants to communicate with each other in real time. In some examples, the video conferencing system 105 can be integrated into the client circuitry 125 or used separately. In examples disclosed herein, the API 150 is a collection of endpoints (e.g., accessible by the client circuitry 125 and/or the server circuitry 145), which provides various services such as computations or access to persistent (e.g., long-lasting) data, related to a conversation's participants, the conversation itself, or anything else relevant for the execution and management of the conversation. In examples disclosed herein, the database 155 is a collection of stored long-lasting data.

In the example of FIG. 1, the clients (e.g., client 130, client 135, client 140, etc.) communicate with (1) the server circuitry 145 (e.g., to update and obtain the conversation state) and (2) the video conferencing system 105 (e.g., to allow participants to communicate with one another in real time). In the example of FIG. 1, the server circuitry 145 uses the API 150 to read and update any relevant conversation data (e.g., the exact conversation flow, the conversation activities and their tasks, etc.) and any relevant participants' (e.g., participant 110, participant 115, participant 120, etc.) related data (e.g., whether a given participant is invited to the conversation or the participant has been involved in the conversation before, etc.). In some examples, the API 150 uses the database 155 to store generated data for future uses. FIG. 1 presents one possible configuration of an architecture shown in the block diagram 100 and does not include other components (e.g., load balancers, routers, content delivery networks (CDNs), authentication servers, session management servers, cache servers, web servers, application servers, firewalls, API gateways, monitoring and logging tools, backup and recovery systems, messaging queues, real-time data processing engines, analytics engines, notification services, identity management systems, microservices, search engines, data warehouses, storage systems, network switches, Domain Name System (DNS) servers, email servers, Short Message Service (SMS) gateways, Internet of Things (IoT) gateways, file servers, virtual private networks (VPNs), artificial intelligence/machine learning services, scheduler/task management systems, etc.). The client circuitry 125 and the server circuitry 145 are described in more detail in connection with FIGS. 3 and 4, respectively. In examples disclosed herein, the scheduler is a space in the conversations platform designed for both manual and automatic conversation scheduling.

FIG. 2 is a block diagram 200 of an example second implementation of the client circuitry 125 and the server circuitry 145 of FIG. 1 constructed in accordance with teachings of this disclosure to present conversational workshops. For example, FIG. 2 illustrates communication between the client circuitry 125 and the server circuitry 145. For example, FIG. 2 shows execution of a conversation flow in terms of communication between the client circuitry 125 and the server circuitry 145 (e.g., where all calculations for updating and managing the conversation state are performed using the server circuitry 145). In examples disclosed herein, the client circuitry 125 (e.g., client(s) 206, 208) presents the conversation state to the participant(s) (e.g., participant(s) 202, 204) in the form of a user interface (e.g., user interface(s) 210, 212). If the participant (e.g., participant(s) 202, 204) provides a user input (e.g., user input 214, 216), such as selecting an icon or writing in an input field, the client circuitry 125 sends a request to the server circuitry 145 (e.g., via a first call 218) triggering an event that results in an update to the conversation state (e.g., due to new user-based interaction).

The server circuitry 145 recalculates the conversation state and sends the result (e.g., via a second call 220) to the client circuitry 125 (e.g., client(s) 206, 208), including to the client that initially triggered the update. In some examples, there can be other events that trigger recalculation of the conversation state in addition to the user inputs (e.g., user input(s) 214, 216) received by the client(s) 206, 208. In some examples, other events that trigger changes in the conversation state include timeouts and transitions (e.g., which can be managed by the server circuitry 145 through various processes running in the background, or background computations 224). In examples disclosed herein, a transition is a concise representation, such as a short animation or another method, depicting the shift from one virtual room to another. This transition can require an action, triggered by a consensus input, a timeout which is over, or any other type of event, as described herein in connection with a conversation progress.

In the example of FIG. 2, the server circuitry 145 identifies an event 222 (e.g., timeout, transition, etc.) and, based on the background computations 224, the server circuitry 145 updates the conversation state to reflect participant inputs (e.g., user input(s) 214, 216) or any other relevant event(s) 222 and sends the updated state (e.g., state 228) back to all of the client(s) associated with the client circuitry 125. While FIG. 2 illustrates an example client-server communication, other implementations can be more complex and include additional components (e.g., including, but not limited to, authentication and authorization services, load balancers, databases, message queues, caching systems, analytics and monitoring tools, etc.).

Figure 3:
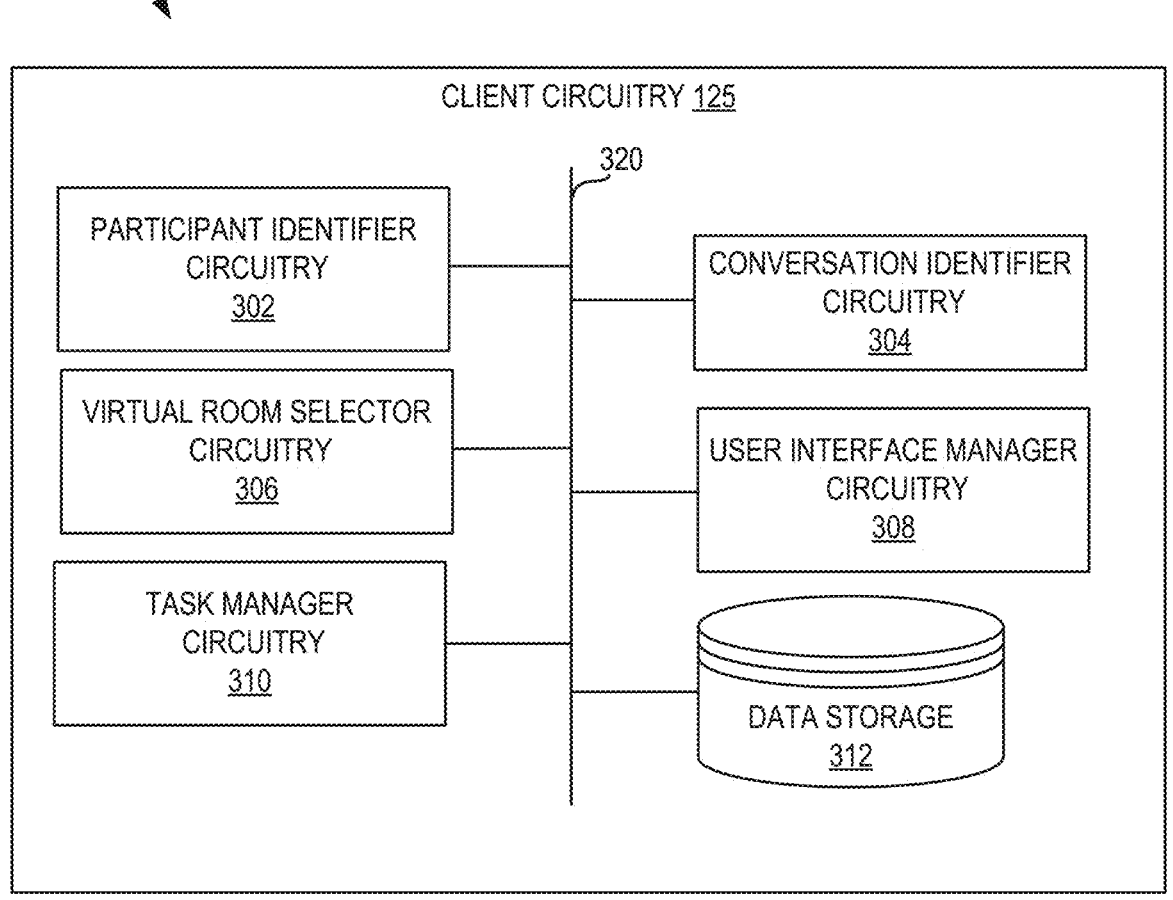
FIG. 3 is a block diagram of an example implementation of the client circuitry of FIG. 1 constructed in accordance with teachings of this disclosure to present conversational workshops.

FIG. 3 is a block diagram 300 of an example implementation of the client circuitry 125 of FIG. 1 constructed in accordance with teachings of this disclosure to present conversational workshops. The client circuitry 125 of FIG. 3 may be instantiated (e.g., creating an instance of, bring into being for any length of time, materialize, implement, etc.) by programmable circuitry such as a Central Processing Unit (CPU) executing first instructions. Additionally or alternatively, the client circuitry 125 of FIG. 3 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 3 may, thus, be instantiated at the same or different times. Some or all of the circuitry of FIG. 3 may be instantiated, for example, in one or more threads executing concurrently on hardware and/or in series on hardware. Moreover, in some examples, some or all of the circuitry of FIG. 3 may be implemented by microprocessor circuitry executing instructions and/or FPGA circuitry performing operations to implement one or more virtual machines and/or containers.

In the example of FIG. 3, the client circuitry 125 includes example participant identifier circuitry 302, example conversation identifier circuitry 304, example virtual room selector circuitry 306, example user interface manager circuitry 308, example task manager circuitry 310, and example data storage 312. The participant identifier circuitry 302, the conversation identifier circuitry 304, the virtual room selector circuitry 306, the user interface manager circuitry 308, the task manager circuitry 310, and the data storage 312 are in communication via an example bus 320.

The participant identifier circuitry 302 identifies the participant(s) engaged in the conversational workshop. For example, the participant identifier circuitry 302 identifies participant(s) 110, 115, 120 of FIG. 1 and/or participant(s) 202, 204 of FIG. 2. In some examples, the participant identifier circuitry 302 identifies the name(s) of the participant(s) based on their inputs via a user interface (e.g., user interface 210, 212). In some examples, the participant identifier circuitry 302 identifies participant(s) based on their input(s) (e.g., user inputs 214, 216).

The conversation identifier circuitry 304 identifies a conversation as a consensus-based conversation, a consent-based conversation, or a consensus-consent-based conversation. In examples disclosed herein, the conversation identifier circuitry 304 identifies consent based on when each participant gives their individual confirmation or approval, but these confirmations do not need to be identical. For example, participants can have different outcomes or selections, yet the activity progresses because each participant has confirmed their part. In examples disclosed herein, characteristics of a consensus-based conversation include individual approval as identified using the conversation identifier circuitry 304 (e.g., each participant confirms their own task outcome independently) with diverse outcomes (e.g., the outcomes do not need to match, such that participants can have different responses or actions). In examples disclosed herein, a consent-based conversation can include an activity where participants select a different emotion, but all participants need to select "Continue" to proceed.

In some examples, the conversation identifier circuitry 304 identifies a consensus-based conversation. For example, the conversation identifier circuitry 304 identifies a consensus as being reached when all participants have given their confirmation, and these confirmations are identical. For example, all participants agree on the same outcome or selection for the activity to progress. Characteristics of a consensus-based conversation include all participants confirming the same task outcome and the outcomes being identical for all participants. An example consensus-based conversation includes an activity where participants need to agree on a team name, such that all participants agree on the same name and confirm the name to proceed. As such, whereas the conversation identifier circuitry 304 identifies consent based on individual confirmations that can differ among participants, the conversation identifier circuitry 304 identifies consensus based on uniform confirmations, such that all participants are agreeing on the same outcome.

In examples disclosed herein, a consent-based activity involves each participant performing an action (e.g., selecting an emotion) and selecting "Continue". For example, even if participants select different emotions, when all participants select "Continue", the activity progresses. In examples disclosed herein, a consensus-based activity involves all participants agreeing on a common input (e.g., a team name) and confirming the input. The activity only progresses when all participants have given the same input and confirmed the input. As such, the conversation identifier circuitry 304 identifies consent-based conversations (e.g., where progress is made through individual confirmations, even if outcomes differ), consensus-based conversations (e.g., where progress is contingent on achieving uniform agreement among all participants), and consent-consensus-based conversations (e.g., where progress is made through either individual confirmations or uniform agreement, depending on the activity's requirements). In some examples, the server circuitry 145 identifies whether the participant has provided a consent or a consensus, and the conversation identifier circuitry 304 further classifies the conversation type.

The virtual room selector circuitry 306 identifies a virtual room for participant use based on a given task and/or activity. For example, as described in more detail in connection with FIGS. 7-8, the virtual room selector circuitry 306 identifies and/or determines whether to admit a participant to a technical setup room, a waiting room, an emotion room, a team name room, a personal information room, a group information room, a personal exercise room, and/or a group exercise room. For example, a technical setup room can be a personal room that represents a virtual room in which every participant performs setup and ensures that all the necessary software and hardware is ready and working for the conversation. A waiting room can be an interaction room where participants gather prior to the conversation beginning and get familiar with the conversation's author, goals, agenda and/or any other relevant information. An emotion room can be an interaction room where participants are asked to report their current personal emotional state. A team name room can be an interaction room where a single multi-type field is presented to all participants and each participant can type and edit the text in this field simultaneously to define the team name to use during the conversation.

In some examples, a personal information room can be a personal room in which every participant is presented with specific information (e.g., in the form of a video, text, etc.). Some examples of such a personal information room can be for providing theory, assignments, instructions, guidelines, videos, and/or stories. In some examples, the group information room can be an interaction room in which participants are presented with specific information (e.g., in the form of a video, text, etc.). Some examples of such a group information room can be for providing conversation-based statistics, results, and/or insights. In some examples, a personal exercise room can be a personal room in which every participant can engage in answering a question, ordering a list of items, sharing a thought or idea, engaging in idea creation or brainstorming, and/or selecting from a list of options or any other activity. In some examples, a group exercise room is an interaction room in which participants work together, starting from answering a simple question to solving complex problems that require simultaneous inputs and/or actions from all participants.

The user interface manager circuitry 308 identifies a user interface to display to one or more participants, as described in more detail in connection with FIG. 9. For example, the user interface manager circuitry 308 identifies whether to display a no user account interface (e.g., when there is no user account), a no access interface (e.g., when the user account does not have access to a given workspace), a workspace owner interface (e.g., when the user account is an owner of the workspace), or a workspace administrator interface (e.g., when the user account is an administrator of the workspace). However, the user interface manager circuitry 308 can display and/or generate any other type of user interface based on the conversational workshop and/or user-based actions. In examples disclosed herein, a workspace corresponds to a space within the conversation platform reserved for specific groups (e.g., organizations, departments, teams). Here, members can view their tailored list of conversations, schedules, history, analytics, and/or other relevant platform features. In examples disclosed herein, the history represents a space in the conversation platform designed for retrieving the list of completed conversations and conversational journeys.

The task manager circuitry 310 identifies a task to perform (e.g., based on a theory activity), as described in more detail in connection with FIGS. 10-11. For example, the task manager circuitry 310 initiates a given task based on whether the task is a video task (e.g., playing a video to the participants), a notify task (e.g., notifying participants that a text format of the video is available), a confirmation task (e.g., asking participants to confirm when they are ready), a time task (e.g., indicating to the participants that there is a time constraint to complete the activity), or an end task (e.g., initiating the completion of an activity). However, the task manager circuitry 310 can perform and/or identify any other type of task associated with the conversational workshop and/or user-based actions.

The data storage 312 can be used to store any information associated with the participant identifier circuitry 302, the conversation identifier circuitry 304, the virtual room selector circuitry 306, the user interface manager circuitry 308, and/or the task manager circuitry 310. The data storage 312 of the illustrated example of FIG. 3 can be implemented by any memory, storage device and/or storage disc for storing data such as flash memory, magnetic media, optical media, etc. Furthermore, the data stored in the data storage 312 can be in any data format such as binary data, comma delimited data, tab delimited data, structured query language (SQL) structures, image data, etc.

In some examples, the apparatus includes means for identifying a participant. For example, the means for identifying a participant may be implemented by participant identifier circuitry 302. In some examples, the participant identifier circuitry 302 may be instantiated by programmable circuitry such as the example programmable circuitry 22112 of FIG. 221. For instance, the participant identifier circuitry 302 may be instantiated by the example microprocessor 22300 of FIG. 223 executing machine executable instructions such as those implemented by at least block 810 of FIG. 8. In some examples, the participant identifier circuitry 302 may be instantiated by hardware logic circuitry, which may be implemented by an ASIC, XPU, or the FPGA circuitry 22400 of FIG. 224 structured to perform operations corresponding to the machine readable instructions. Additionally or alternatively, the participant identifier circuitry 302 may be instantiated by any other combination of hardware, software, and/or firmware. For example, the participant identifier circuitry 302 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a conversation. For example, the means for identifying a conversation may be implemented by conversation identifier circuitry 304. In some examples, the conversation identifier circuitry 304 may be instantiated by programmable circuitry such as the example programmable circuitry 22112 of FIG. 221. For instance, the conversation identifier circuitry 304 may be instantiated by the example microprocessor 22300 of FIG. 223 executing machine executable instructions such as those implemented by at least block 710 of FIG. 7. In some examples, the conversation identifier circuitry 304 may be instantiated by hardware logic circuitry, which may be implemented by an ASIC, XPU, or the FPGA circuitry 22400 of FIG. 224 structured to perform operations corresponding to the machine readable instructions. Additionally or alternatively, the conversation identifier circuitry 304 may be instantiated by any other combination of hardware, software, and/or firmware. For example, the conversation identifier circuitry 304 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for selecting a virtual room. For example, the means for selecting a virtual room may be implemented by virtual room selector circuitry 306. In some examples, the virtual room selector circuitry 306 may be instantiated by programmable circuitry such as the example programmable circuitry 22112 of FIG. 221. For instance, the virtual room selector circuitry 306 may be instantiated by the example microprocessor 22300 of FIG. 223 executing machine executable instructions such as those implemented by at least block(s) 705, 735, 745, 755, 770, 775, 790, 795 of FIG. 7. In some examples, the virtual room selector circuitry 306 may be instantiated by hardware logic circuitry, which may be implemented by an ASIC, XPU, or the FPGA circuitry 22400 of FIG. 224 structured to perform operations corresponding to the machine readable instructions. Additionally or alternatively, the virtual room selector circuitry 306 may be instantiated by any other combination of hardware, software, and/or firmware. For example, the virtual room selector circuitry 306 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for managing a user interface. For example, the means for managing a user interface may be implemented by user interface manager circuitry 308. In some examples, the user interface manager circuitry 308 may be instantiated by programmable circuitry such as the example programmable circuitry 22112 of FIG. 221. For instance, the user interface manager circuitry 308 may be instantiated by the example microprocessor 22300 of FIG. 223 executing machine executable instructions such as those implemented by at least block(s) 915, 925, 935, 945 of FIG. 9. In some examples, the user interface manager circuitry 308 may be instantiated by hardware logic circuitry, which may be implemented by an ASIC, XPU, or the FPGA circuitry 22400 of FIG. 224 structured to perform operations corresponding to the machine readable instructions. Additionally or alternatively, the user interface manager circuitry 308 may be instantiated by any other combination of hardware, software, and/or firmware. For example, the user interface manager circuitry 308 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for managing a task. For example, the means for managing a task may be implemented by task manager circuitry 310. In some examples, the task manager circuitry 310 may be instantiated by programmable circuitry such as the example programmable circuitry 22112 of FIG. 221. For instance, the task manager circuitry 310 may be instantiated by the example microprocessor 22300 of FIG. 223 executing machine executable instructions such as those implemented by at least block(s) 1110, 1115, 1125, 1135, 1160 of FIG. 11. In some examples, the task manager circuitry 310 may be instantiated by hardware logic circuitry, which may be implemented by an ASIC, XPU, or the FPGA circuitry 22400 of FIG. 224 structured to perform operations corresponding to the machine readable instructions. Additionally or alternatively, the task manager circuitry 310 may be instantiated by any other combination of hardware, software, and/or firmware. For example, the task manager circuitry 310 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

Figure 4:
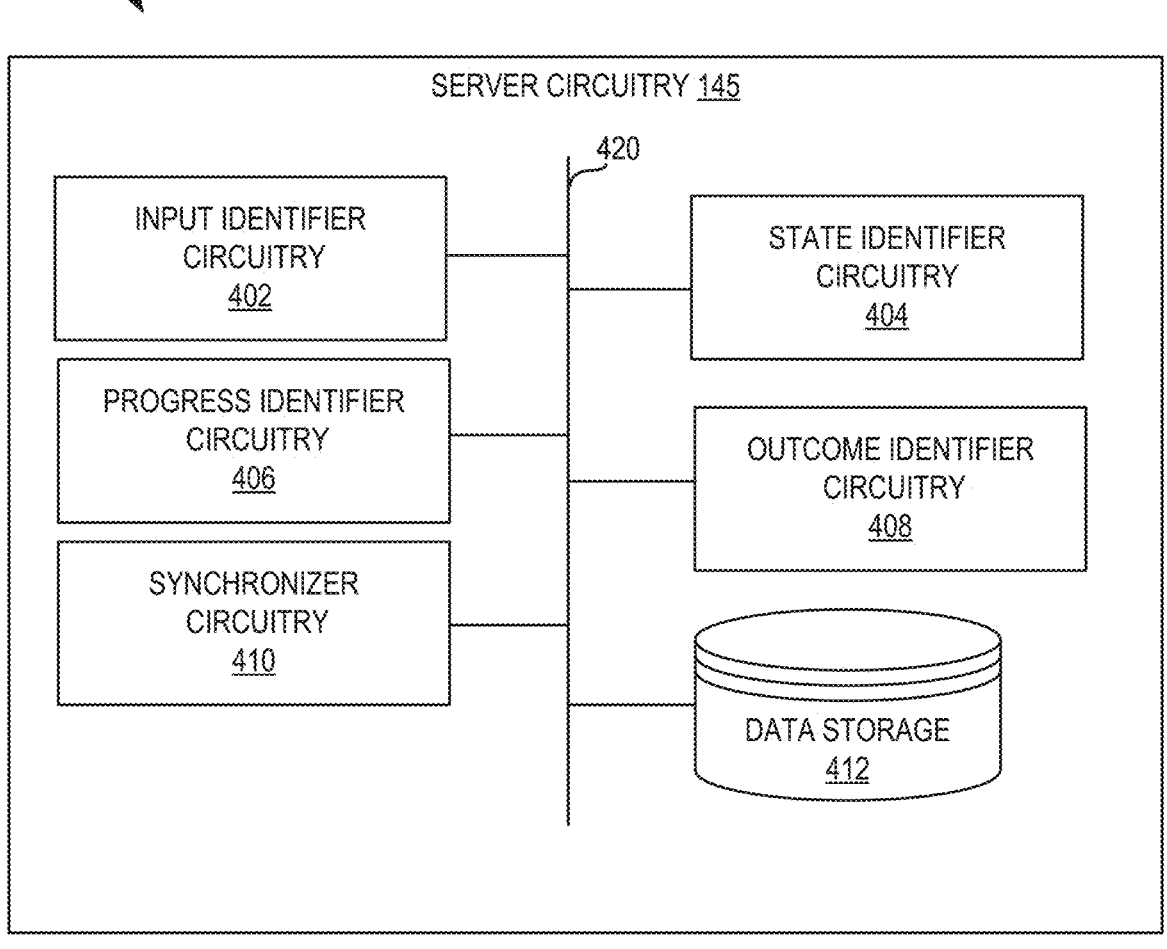
FIG. 4 is a block diagram of an example implementation of the server circuitry of FIG. 1 constructed in accordance with teachings of this disclosure to present conversational workshops.

FIG. 4 is a block diagram 400 of an example implementation of the server circuitry 145 of FIG. 1 constructed in accordance with teachings of this disclosure to present conversational workshops. The server circuitry 145 of FIG. 4 may be instantiated (e.g., creating an instance of, bring into being for any length of time, materialize, implement, etc.) by programmable circuitry such as a Central Processing Unit (CPU) executing first instructions. Additionally or alternatively, the server circuitry 145 of FIG. 4 may be instantiated (e.g., creating an instance of, bring into being for any length of time, materialize, implement, etc.) by (i) an Application Specific Integrated Circuit (ASIC) and/or (ii) a Field Programmable Gate Array (FPGA) structured and/or configured in response to execution of second instructions to perform operations corresponding to the first instructions. It should be understood that some or all of the circuitry of FIG. 4 may, thus, be instantiated at the same or different times. Some or all of the circuitry of FIG. 4 may be instantiated, for example, in one or more threads executing concurrently on hardware and/or in series on hardware. Moreover, in some examples, some or all of the circuitry of FIG. 4 may be implemented by microprocessor circuitry executing instructions and/or FPGA circuitry performing operations to implement one or more virtual machines and/or containers.

In the example of FIG. 4, the server circuitry 145 includes example input identifier circuitry 402, example state identifier circuitry 404, example progress identifier circuitry 406, example outcome identifier circuitry 408, example synchronizer circuitry 410, and example data storage 412. The input identifier circuitry 402, the state identifier circuitry 404, the progress identifier circuitry 406, the outcome identifier circuitry 408, the synchronizer circuitry 410, and the data storage 412 are in communication using an example bus 420.

The input identifier circuitry 402 identifies input(s) associated with the conversation platform and/or execution of the conversation flow. In some examples, the input identifier circuitry 402 identifies a synchronized input or a consensus input. For example, synchronized input corresponds to any kind of user input that could be changed simultaneously (e.g., or substantially simultaneously, such as within one second, at least partially overlapping, etc.) by the conversation's participants, where a given state is shared among the participants. In some examples, the synchronized input includes a text input or text area, a set of radio buttons or checkboxes, a dropdown and/or any other user interface that any participant can change by a user action, such that this action is reflected in the inputs of all other participants. In some examples, consensus input corresponds to the state of a particular user interface (e.g., representing one or more task outcomes) which should be the same for the conversation's participants to trigger an action. For example, consensus input can be identified when all participants have made the same selection or all participants have ordered in the same way a list of items in their individual user interface or graphical user interface (GUI). However, consensus input can also be any kind of graphical representation that represents the presence of the same user actions and/or states.

The state identifier circuitry 404 identifies a state associated with a conversation flow. In some examples, the state identifier circuitry 404 identifies a conversation state as a data representation of the conversation at a given point in time. For example, the conversation state can include the conversation flow, conversation activities, conversation tasks, conversation progress, participants' state, and/or a conversation outcome. In some examples, the state identifier circuitry 404 determines the current state of the conversation, the next state of the conversation, and/or what states the conversation has gone through at a particular point in the conversation flow. In some examples, the state identifier circuitry 404 identifies the participant state based on a data representation of a given conversation's participant at a given point in time. For example, the participant state can correspond to the activities the participant has gone through, the tasks that have been completed, the task outcomes that have been achieved, confirmations that have been given, and/or anything else related to a particular participant. As shown in connection with FIG. 5, the state identifier circuitry 404 performs conversation state management by recalculating the conversation state while executing the logic behind the consent-based, consensus-based and/or consent-consensus-based conversations. For example, all computations occur using the server circuitry 145, while the clients associated with the client circuitry 125 present the conversation state to the participants through a user interface. In some examples, the state identifier circuitry 404 manages the conversation state data structure, as described in connection with FIG. 6. For example, the state identifier circuitry 404 can manage execution of the conversation flow, as well as verify confirmations, consents and/or consensuses.

The progress identifier circuitry 406 determines the progress of a conversation flow. For example, the progress identifier circuitry 406 identifies progress made through reaching consents (e.g., in a consent-based conversation), progress made through reaching consensuses (e.g., consensus-based conversation), and/or progress made by reaching consents and consensuses (e.g., consent-consensus-based conversation). In examples disclosed herein, the progress identifier circuitry 406 can determine progress based on event(s) that trigger a conversation progress (e.g., such as confirmation, consent, consensus, timeout, participants joining and/or leaving the conversation, etc.). For example, as described on connection with FIG. 5, the progress identifier circuitry 406 can be used to recalculate a conversation progress based on identification of the presence of a consent or consensus.

The outcome identifier circuitry 408 determines the outcome of a conversation flow. For example, the outcome identifier circuitry 408 identifies the result of an activity (e.g., which can include a variety of actions, such as the selection of an icon, a sorted list, a filled input field, etc.). In some examples, the outcome identifier circuitry 408 determines a quantitative measure for the success of a given workshop. In some examples, the outcome identifier circuitry 408 recalculates the workshop outcome when consensus is reached, as shown in connection with FIG. 5. For example, the workshop outcome can be negatively affected if the participants do not reach a consensus. In some examples, the outcome identifier circuitry 408 outputs the outcome to the user interface, such that the participants can visualize the outcome of the workshop (e.g., related to how well the participants solved the case studies using the theory that was initially provided).

The synchronizer circuitry 410 synchronizes data between and/or among clients engaged in a conversation. For example, the synchronizer circuitry 410 generates and/or receives input from a text field that allows participants to provide synchronization input. In examples disclosed herein, the participants can create and agree on a common team name, using a synchronized input field. In some examples, a participant's input for a team name is simultaneously presented to all clients and all participants are invited to select "I agree" if they agree with the suggested team name.

The data storage 412 can be used to store any information associated with the input identifier circuitry 402, state identifier circuitry 404, progress identifier circuitry 406, outcome identifier circuitry 408, and/or synchronizer circuitry 410. The data storage 412 of the illustrated example of FIG. 4 can be implemented by any memory, storage device and/or storage disc for storing data such as flash memory, magnetic media, optical media, etc. Furthermore, the data stored in the data storage 412 can be in any data format such as binary data, comma delimited data, tab delimited data, structured query language (SQL) structures, image data, etc.

In some examples, the apparatus includes means for identifying an input. For example, the means for identifying an input may be implemented by input identifier circuitry 402. In some examples, the input identifier circuitry 402 may be instantiated by programmable circuitry such as the example programmable circuitry 22112 of FIG. 221. For instance, the input identifier circuitry 402 may be instantiated by the example microprocessor 22300 of FIG. 223 executing machine executable instructions such as those implemented by at least block 550 of FIG. 5. In some examples, input identifier circuitry 402 may be instantiated by hardware logic circuitry, which may be implemented by an ASIC, XPU, or the FPGA circuitry 22400 of FIG. 224 structured to perform operations corresponding to the machine readable instructions. Additionally or alternatively, the input identifier circuitry 402 may be instantiated by any other combination of hardware, software, and/or firmware. For example, the input identifier circuitry 402 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a state of a conversation. For example, the means for identifying a state of a conversation may be implemented by state identifier circuitry 404. In some examples, the state identifier circuitry 404 may be instantiated by programmable circuitry such as the example programmable circuitry 22112 of FIG. 221. For instance, the state identifier circuitry 404 may be instantiated by the example microprocessor 22300 of FIG. 223 executing machine executable instructions such as those implemented by at least block 570 of FIG. 5. In some examples, state identifier circuitry 404 may be instantiated by hardware logic circuitry, which may be implemented by an ASIC, XPU, or the FPGA circuitry 22400 of FIG. 224 structured to perform operations corresponding to the machine readable instructions. Additionally or alternatively, the state identifier circuitry 404 may be instantiated by any other combination of hardware, software, and/or firmware. For example, the state identifier circuitry 404 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying a conversation progress. For example, the means for identifying a conversation progress may be implemented by progress identifier circuitry 406. In some examples, the progress identifier circuitry 406 may be instantiated by programmable circuitry such as the example programmable circuitry 22112 of FIG. 221. For instance, the progress identifier circuitry 406 may be instantiated by the example microprocessor 22300 of FIG. 223 executing machine executable instructions such as those implemented by at least block 535 of FIG. 5. In some examples, progress identifier circuitry 406 may be instantiated by hardware logic circuitry, which may be implemented by an ASIC, XPU, or the FPGA circuitry 22400 of FIG. 224 structured to perform operations corresponding to the machine readable instructions. Additionally or alternatively, the progress identifier circuitry 406 may be instantiated by any other combination of hardware, software, and/or firmware. For example, the progress identifier circuitry 406 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for identifying an outcome of the conversation. For example, the means for identifying an outcome of the conversation may be implemented by outcome identifier circuitry 408. In some examples, the outcome identifier circuitry 408 may be instantiated by programmable circuitry such as the example programmable circuitry 22112 of FIG. 221. For instance, the outcome identifier circuitry 408 may be instantiated by the example microprocessor 22300 of FIG. 223 executing machine executable instructions such as those implemented by at least block 565 of FIG. 5. In some examples, outcome identifier circuitry 408 may be instantiated by hardware logic circuitry, which may be implemented by an ASIC, XPU, or the FPGA circuitry 22400 of FIG. 224 structured to perform operations corresponding to the machine readable instructions. Additionally or alternatively, the outcome identifier circuitry 408 may be instantiated by any other combination of hardware, software, and/or firmware. For example, the outcome identifier circuitry 408 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

In some examples, the apparatus includes means for synchronizing participant answers. For example, the means for synchronizing participant answers may be implemented by synchronizer circuitry 410. In some examples, the synchronizer circuitry 410 may be instantiated by programmable circuitry such as the example programmable circuitry 22112 of FIG. 221. For instance, the synchronizer circuitry 410 may be instantiated by the example microprocessor 22300 of FIG. 223 executing machine executable instructions such as those implemented by at least block 850 of FIG. 8. In some examples, synchronizer circuitry 410 may be instantiated by hardware logic circuitry, which may be implemented by an ASIC, XPU, or the FPGA circuitry 22400 of FIG. 224 structured to perform operations corresponding to the machine readable instructions. Additionally or alternatively, the synchronizer circuitry 410 may be instantiated by any other combination of hardware, software, and/or firmware. For example, the synchronizer circuitry 410 may be implemented by at least one or more hardware circuits (e.g., processor circuitry, discrete and/or integrated analog and/or digital circuitry, an FPGA, an ASIC, an XPU, a comparator, an operational-amplifier (op-amp), a logic circuit, etc.) structured to execute some or all of the machine readable instructions and/or to perform some or all of the operations corresponding to the machine readable instructions without executing software or firmware, but other structures are likewise appropriate.

While an example manner of implementing the client circuitry 125 is illustrated in FIG. 3, one or more of the elements, processes and/or devices illustrated in FIG. 3 may be combined, divided, re-arranged, omitted, eliminated and/or implemented in any other way. Further, the example participant identifier circuitry 302, the example conversation identifier circuitry 304, the example virtual room selector circuitry 306, the example user interface manager circuitry 308, the task manager circuitry 310, and/or, more generally, the example client circuitry 125 of FIG. 3 may be implemented by hardware, software, firmware and/or any combination of hardware, software and/or firmware. Thus, for example, any of the example participant identifier circuitry 302, the example conversation identifier circuitry 304, the example virtual room selector circuitry 306, the example user interface manager circuitry 308, the task manager circuitry 310, and/or, more generally, the example client circuitry 125 of FIG. 3 could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s), ASIC(s)), programmable logic device(s) (PLD(s)), and/or field programmable logic device(s) (FPLD(s)) such as FPGAs. Further still, the client circuitry 125 of FIG. 3 may include one or more elements, processes, and/or devices in addition to, or instead of, those illustrated in FIG. 3, and/or may include more than one of any or all of the illustrated elements, processes and devices.

Figure 7:
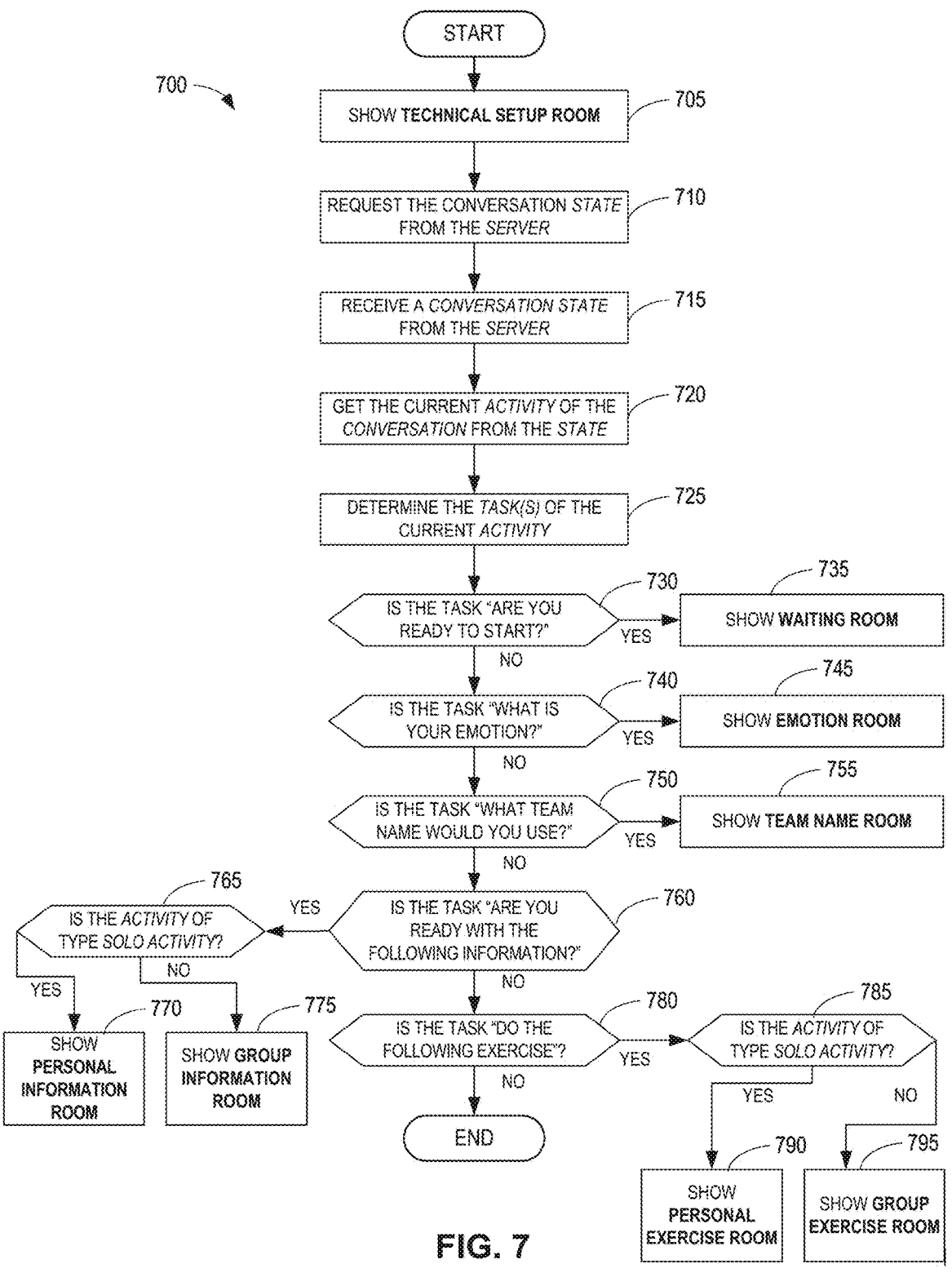
FIG. 7 is a flowchart representative of example machine-readable instructions and/or example operations that may be executed, instantiated, and/or performed by example programmable circuitry to implement the example client circuitry of FIG. 1 to present a state of a workshop to a participant.
Figure 8:
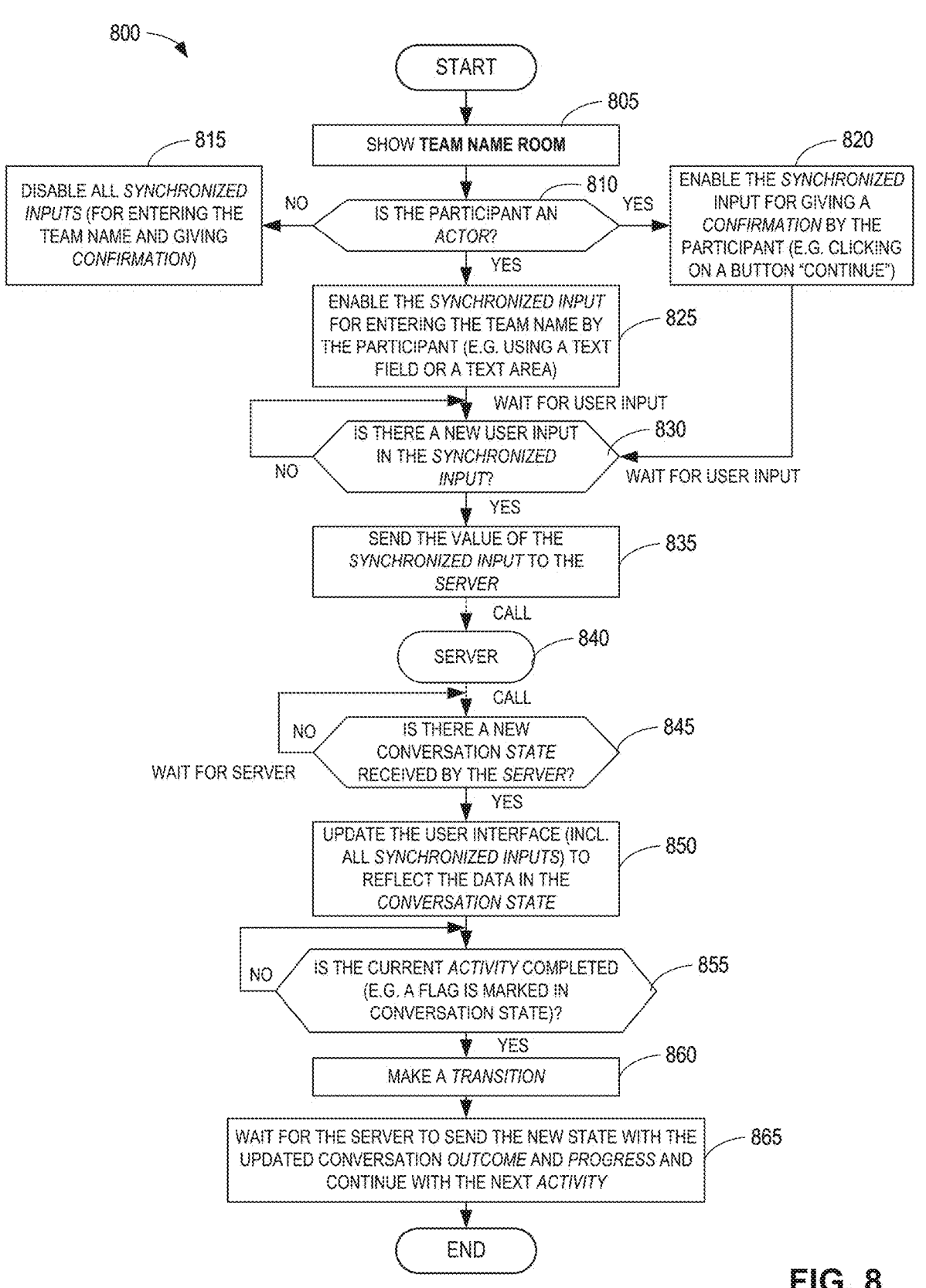
FIG. 8 is a flowchart representative of example machine-readable instructions and/or example operations that may be executed, instantiated, and/or performed by example programmable circuitry to implement the example client circuitry of FIG. 1 to manage a user interface depending on whether participants are actors or observers.
Figure 9:
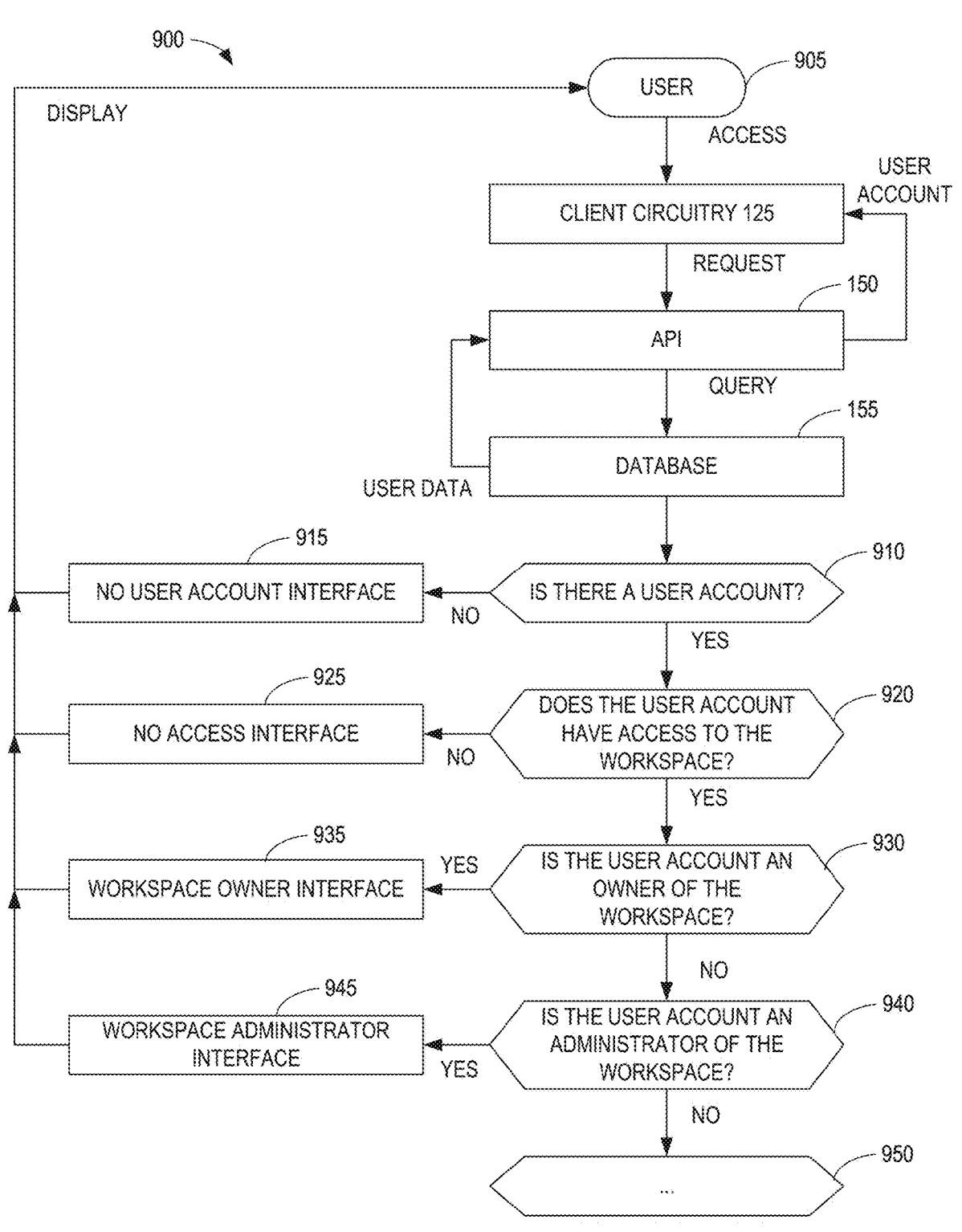
FIG. 9 is a flowchart representative of example machine-readable instructions and/or example operations that may be executed, instantiated, and/or performed by example programmable circuitry to implement the example client circuitry of FIG. 1 to adjust a user interface based on user authentical status and specific role-based permissions.

Flowcharts representative of example machine readable instructions, which may be executed by programmable circuitry to implement and/or instantiate the client circuitry 125 of FIG. 3 and/or representative of example operations which may be performed by programmable circuitry to implement and/or instantiate the client circuitry 125 of FIG. 3, are shown in FIGS. 7, 8, 9, and/or 11. The machine readable instructions may be one or more executable programs or portion(s) of one or more executable programs for execution by programmable circuitry, such as the programmable circuitry 22112 shown in the example processor platform 22100 discussed below in connection with FIG. 221 and/or may be one or more function(s) or portion(s) of functions to be performed by the example programmable circuitry (e.g., an FPGA) discussed below in connection with FIGS. 223 and/or 224. In some examples, the machine readable instructions cause an operation, a task, etc., to be carried out and/or performed in an automated manner in the real world. As used herein, "automated" means without human involvement.

While an example manner of implementing the server circuitry 145 is illustrated in FIG. 4, one or more of the elements, processes and/or devices illustrated in FIG. 4 may be combined, divided, re-arranged, omitted, eliminated and/or implemented in any other way. Further, the example input identifier circuitry 402, the example state identifier circuitry 404, the example progress identifier circuitry 406, the example outcome identifier circuitry 408, the example synchronizer circuitry 410, and/or, more generally, the example server circuitry 145 of FIG. 4 may be implemented by hardware, software, firmware and/or any combination of hardware, software and/or firmware. Thus, for example, any of the example input identifier circuitry 402, the example state identifier circuitry 404, the example progress identifier circuitry 406, the example outcome identifier circuitry 408, the example synchronizer circuitry 410, and/or, more generally, the example server circuitry 145 of FIG. 4 could be implemented by programmable circuitry in combination with machine readable instructions (e.g., firmware or software), processor circuitry, analog circuit(s), digital circuit(s), logic circuit(s), programmable processor(s), programmable microcontroller(s), graphics processing unit(s) (GPU(s)), digital signal processor(s) (DSP(s), ASIC(s)), programmable logic device(s) (PLD(s)), and/or field programmable logic device(s) (FPLD(s)) such as FPGAs. Further still, the server circuitry 145 of FIG. 4 may include one or more elements, processes, and/or devices in addition to, or instead of, those illustrated in FIG. 4, and/or may include more than one of any or all of the illustrated elements, processes and devices.

Figure 5:
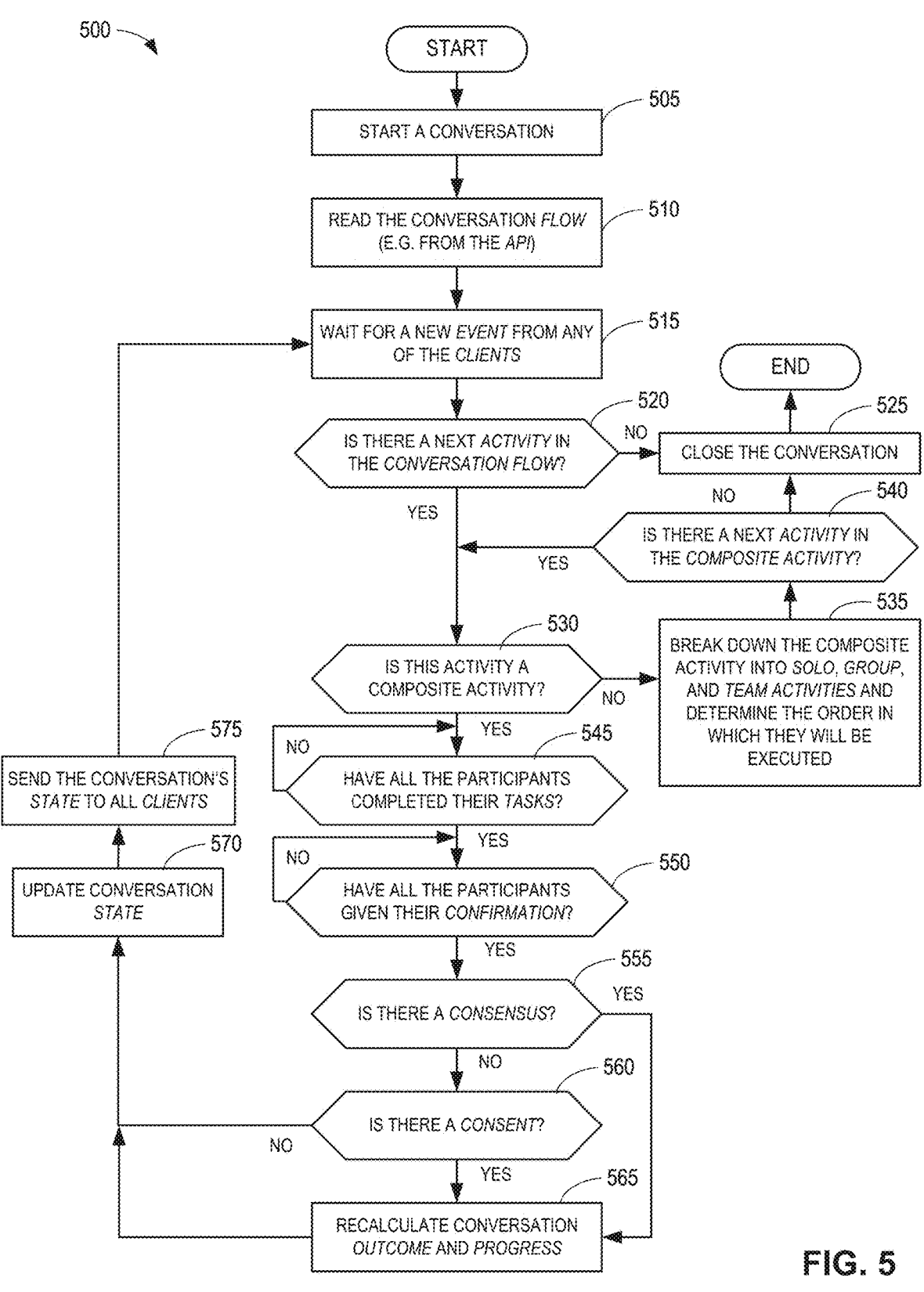
FIG. 5 is a flowchart representative of example machine-readable instructions and/or example operations that may be executed, instantiated, and/or performed by example programmable circuitry to implement the example server circuitry of FIG. 1 to recalculate a state of the conversational workshop.

Flowcharts representative of example machine readable instructions, which may be executed by programmable circuitry to implement and/or instantiate the server circuitry 145 of FIG. 4 and/or representative of example operations which may be performed by programmable circuitry to implement and/or instantiate the server circuitry 145 of FIG. 4, are shown in FIGS. 5 and/or 8. The machine readable instructions may be one or more executable programs or portion(s) of one or more executable programs for execution by programmable circuitry, such as the programmable circuitry 22212 shown in the example processor platform 22200 discussed below in connection with FIG. 222 and/or may be one or more function(s) or portion(s) of functions to be performed by the example programmable circuitry (e.g., an FPGA) discussed below in connection with FIGS. 223 and/or 224. In some examples, the machine readable instructions cause an operation, a task, etc., to be carried out and/or performed in an automated manner in the real world. As used herein, "automated" means without human involvement.

The program may be embodied in instructions (e.g., software and/or firmware) stored on one or more non-transitory computer readable and/or machine readable storage medium such as cache memory, a magnetic-storage device or disk (e.g., a floppy disk, a Hard Disk Drive (HDD), etc.), an optical-storage device or disk (e.g., a Blu-ray disk, a Compact Disk (CD), a Digital Versatile Disk (DVD), etc.), a Redundant Array of Independent Disks (RAID), a register, ROM, a solid-state drive (SSD), SSD memory, non-volatile memory (e.g., electrically erasable programmable read-only memory (EEPROM), flash memory, etc.), volatile memory (e.g., Random Access Memory (RAM) of any type, etc.), and/or any other storage device or storage disk. The instructions of the non-transitory computer readable and/or machine readable medium may program and/or be executed by programmable circuitry located in one or more hardware devices, but the entire program and/or parts thereof could alternatively be executed and/or instantiated by one or more hardware devices other than the programmable circuitry and/or embodied in dedicated hardware. The machine readable instructions may be distributed across multiple hardware devices and/or executed by two or more hardware devices (e.g., a server and a client hardware device). For example, the client hardware device may be implemented by an endpoint client hardware device (e.g., a hardware device associated with a human and/or machine user) or an intermediate client hardware device gateway (e.g., a radio access network (RAN)) that may facilitate communication between a server and an endpoint client hardware device. Similarly, the non-transitory computer readable storage medium may include one or more mediums. Further, although the example program is described with reference to the flowcharts illustrated in FIGS. 5, 7-9, and 11, many other methods of implementing the example client circuitry 125 of FIG. 3 and/or the example server circuitry 145 of FIG. 4 may alternatively be used. For example, the order of execution of the blocks of the flowchart(s) may be changed, and/or some of the blocks described may be changed, eliminated, or combined. Additionally or alternatively, any or all of the blocks of the flow chart may be implemented by one or more hardware circuits (e.g., processor circuitry, discrete and/or integrated analog and/or digital circuitry, an FPGA, an ASIC, a comparator, an operational-amplifier (op-amp), a logic circuit, etc.) structured to perform the corresponding operation without executing software or firmware. The programmable circuitry may be distributed in different network locations and/or local to one or more hardware devices (e.g., a single-core processor (e.g., a single core CPU), a multi-core processor (e.g., a multi-core CPU, an XPU, etc.)). For example, the programmable circuitry may be a CPU and/or an FPGA located in the same package (e.g., the same integrated circuit (IC) package or in two or more separate housings), one or more processors in a single machine, multiple processors distributed across multiple servers of a server rack, multiple processors distributed across one or more server racks, etc., and/or any combination(s) thereof.

The machine readable instructions described herein may be stored in one or more of a compressed format, an encrypted format, a fragmented format, a compiled format, an executable format, a packaged format, etc. Machine readable instructions as described herein may be stored as data (e.g., computer-readable data, machine-readable data, one or more bits (e.g., one or more computer-readable bits, one or more machine-readable bits, etc.), a bitstream (e.g., a computer-readable bitstream, a machine-readable bitstream, etc.), etc.) or a data structure (e.g., as portion(s) of instructions, code, representations of code, etc.) that may be utilized to create, manufacture, and/or produce machine executable instructions. For example, the machine readable instructions may be fragmented and stored on one or more storage devices, disks and/or computing devices (e.g., servers) located at the same or different locations of a network or collection of networks (e.g., in the cloud, in edge devices, etc.). The machine readable instructions may require one or more of installation, modification, adaptation, updating, combining, supplementing, configuring, decryption, decompression, unpacking, distribution, reassignment, compilation, etc., in order to make them directly readable, interpretable, and/or executable by a computing device and/or other machine. For example, the machine readable instructions may be stored in multiple parts, which are individually compressed, encrypted, and/or stored on separate computing devices, wherein the parts when decrypted, decompressed, and/or combined form a set of computer-executable and/or machine executable instructions that implement one or more functions and/or operations that may together form a program such as that described herein.

In another example, the machine readable instructions may be stored in a state in which they may be read by programmable circuitry, but require addition of a library (e.g., a dynamic link library (DLL)), a software development kit (SDK), an application programming interface (API), etc., in order to execute the machine-readable instructions on a particular computing device or other device. In another example, the machine readable instructions may need to be configured (e.g., settings stored, data input, network addresses recorded, etc.) before the machine readable instructions and/or the corresponding program(s) can be executed in whole or in part. Thus, machine readable, computer readable and/or machine readable media, as used herein, may include instructions and/or program(s) regardless of the particular format or state of the machine readable instructions and/or program(s).

The machine readable instructions described herein can be represented by any past, present, or future instruction language, scripting language, programming language, etc. For example, the machine readable instructions may be represented using any of the following languages: C, C++, Java, C#, Perl, Python, JavaScript, HyperText Markup Language (HTML), Structured Query Language (SQL), Swift, etc.

As mentioned above, the example operations of FIGS. 5, 7-9, and 11 may be implemented using executable instructions (e.g., computer readable and/or machine readable instructions) stored on one or more non-transitory computer readable and/or machine readable media. As used herein, the terms non-transitory computer readable medium, non-transitory computer readable storage medium, non-transitory machine readable medium, and/or non-transitory machine readable storage medium are expressly defined to include any type of computer readable storage device and/or storage disk and to exclude propagating signals and to exclude transmission media. Examples of such non-transitory computer readable medium, non-transitory computer readable storage medium, non-transitory machine readable medium, and/or non-transitory machine readable storage medium include optical storage devices, magnetic storage devices, an HDD, a flash memory, a read-only memory (ROM), a CD, a DVD, a cache, a RAM of any type, a register, and/or any other storage device or storage disk in which information is stored for any duration (e.g., for extended time periods, permanently, for brief instances, for temporarily buffering, and/or for caching of the information). As used herein, the terms "non-transitory computer readable storage device" and "non-transitory machine readable storage device" are defined to include any physical (mechanical, magnetic and/ or electrical) hardware to retain information for a time period, but to exclude propagating signals and to exclude transmission media. Examples of non-transitory computer readable storage devices and/or non-transitory machine readable storage devices include random access memory of any type, read only memory of any type, solid state memory, flash memory, optical discs, magnetic disks, disk drives, and/or redundant array of independent disks (RAID) systems. As used herein, the term "device" refers to physical structure such as mechanical and/or electrical equipment, hardware, and/or circuitry that may or may not be configured by computer readable instructions, machine readable instructions, etc., and/or manufactured to execute computer-readable instructions, machine-readable instructions, etc.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/or" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities and/or steps, the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities and/or steps, the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

FIG. 5 is a flowchart representative of example machine-readable instructions and/or example operations 500 that may be executed, instantiated, and/or performed by example programmable circuitry to implement the example client circuitry 125 and/or the example server circuitry 145 of FIG. 4 to recalculate a state of the conversational workshop. As previously described, the server circuitry 145 performs conversation state management. In the example of FIG. 5, the server circuitry 145 recalculates the conversation state while executing the logic behind the consent-cased, consensus-based and consent-consensus-based conversations. For example, while the server circuitry 145 performs computations, the client circuitry 125 uses the clients to present the conversation state to the participants through a user interface. In some examples, the server associated with the server circuitry 145 can be either in an idle mode, waiting for an event (e.g., such as a request from any of the clients or an event triggered by foreground or background processes which manage timeouts and/or transitions) or in a processing state (e.g., where decisions are made based on various conditions).

For example, if a new activity is started, the server circuitry 145 checks the type of activity. If the activity is a solo activity, the server circuitry 145 waits for a set of events that indicate that all participants have completed their tasks. The server circuitry 145 then proceeds to wait for another set of events (e.g., events indicating that all participants have given their confirmations). Subsequently, the server circuitry 145 recalculates the conversation outcome and progress if consensus is reached (e.g., comparing task outcomes to verify an alignment) and sent to the clients (e.g., allowing the client circuitry 125 to update the user interface). As shown in connection with FIG. 5, the conversation identifier circuitry 304 determines that a conversation has started and/or initiates a conversation, at block 505. In some examples, the progress identifier circuitry 406 reads the conversation flow (e.g., from the API 150 of FIG. 1), at block 510. Once the conversation flow is identified, the progress identifier circuitry 406 waits for a new event from any of the clients, at block 515. If the progress identifier circuitry 406 determines that there is a lack of a subsequent activity in the conversation flow, at block 520, the progress identifier circuitry 406 proceeds to close the conversation, at block 525. If the progress identifier circuitry 406 determines that there is a subsequent activity in the conversation flow, the progress identifier circuitry 406 determines whether the subsequent activity is a composite activity, at block 530. In some examples, the progress identifier circuitry 406 breaks down the composite activity into solo, group, and/or team activities and determines the order in which these activities are to be executed, at block 535, if the activity is not a composite activity. The progress identifier circuitry 406 continues to determine whether the next activity is a composite activity, at block 540. Once the progress identifier circuitry 406 determines that there are no more activities in the composite activity, the progress identifier circuitry 406 closes the conversation, at block 525. However, if the progress identifier circuitry 406 determines that the activity is a composite activity, at block 530, the progress identifier circuitry 406 determines whether all the participants have completed their tasks, at block 545. Once all of the participants have completed their given tasks, the progress identifier circuitry 406 determines whether the participants have given their confirmation(s), at block 550. For example, the progress identifier circuitry 406 and/or the conversation identifier circuitry 304 determines whether there is a consensus, at block 555, or a consent, at block 560. Subsequently, the progress identifier circuitry 406 recalculates the conversation progress and the outcome identifier circuitry 408 recalculates the conversation outcome, at block 565. The state identifier circuitry 404 proceeds to update the conversation state, at block 570. Once the conversation state is updated, the state identifier circuitry 404 sends the conversation state to all clients (e.g., associated with the client circuitry 125 of FIG. 1). The progress identifier circuitry 406 continues to monitor for new events from any of the client(s)

(e.g., clients 130, 135, 140 of FIG. 1), at block 515, until there are no more activities and the conversation is closed, at block 525.

Any type of approach can be used to implement the logic behind consent-based, consensus-based, and consent-consensus-based conversations as depicted in the flowchart of FIG. 5. One common approach is using a finite state machine (FSM), where each state represents a specific point in the conversation flow, and transitions between states are triggered by events from clients or background processes. Another approach is employing a rule-based system, where a set of predefined rules determines the flow based on current conditions and events. Alternatively, an event-driven architecture can be used, where events from clients or background processes directly trigger the necessary actions and state transitions. Additionally, a workflow management system can also be implemented to model the conversation as a series of tasks and activities, allowing for more flexibility and scalability. Lastly, a microservices architecture can be used to distribute different components of the conversation flow across separate services, each handling specific tasks or activities, and communicating via messaging systems to maintain the overall conversation state.

Figure 6:
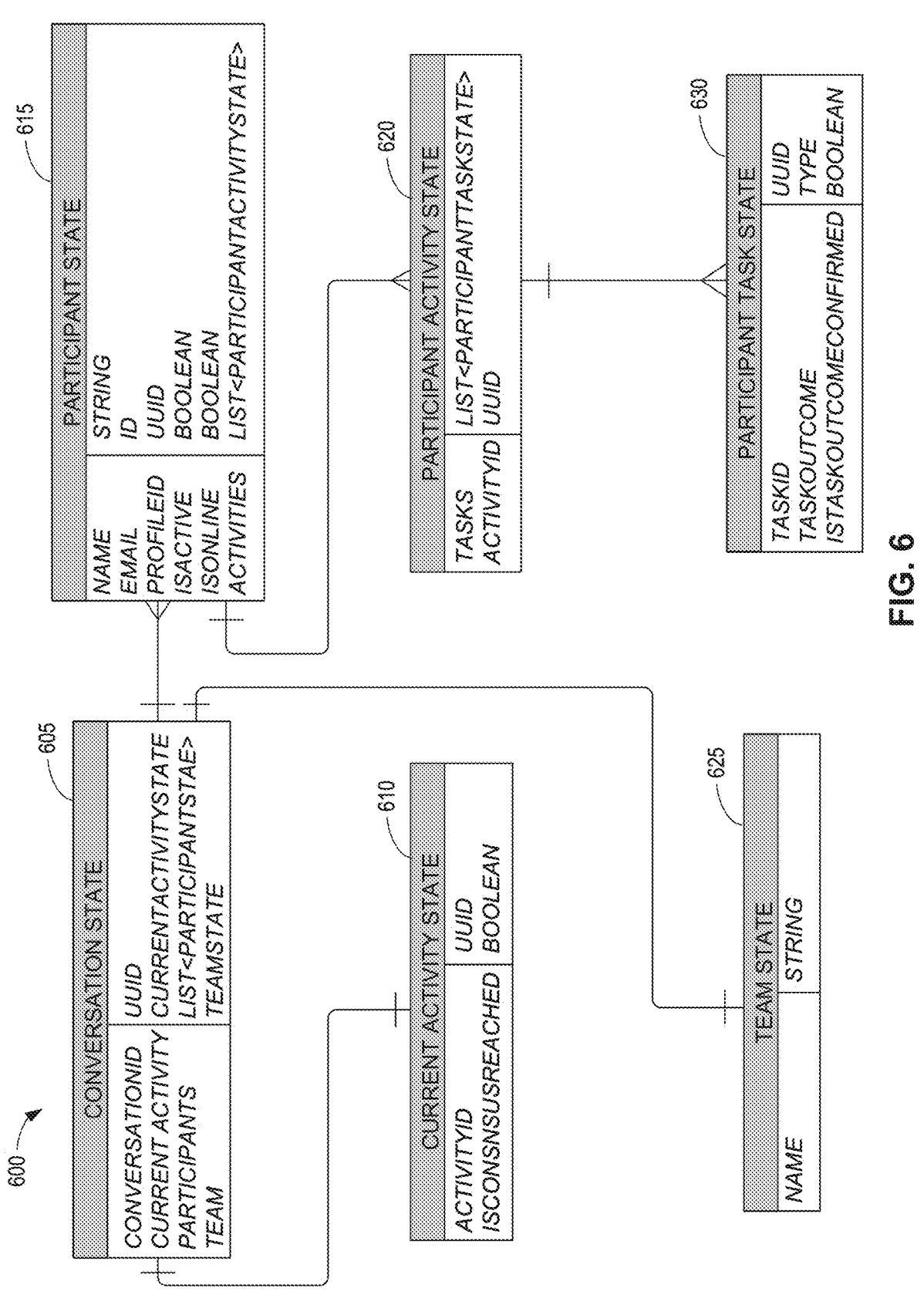
FIG. 6 illustrates an example data structure implemented by server circuitry of FIG. 1 to manage execution of an example workshop, including verifying confirmations and consensuses.

FIG. 6 illustrates an example data structure 600 implemented by server circuitry 145 of FIG. 1 to manage execution of an example workshop, including verifying confirmations and consensuses. In the example of FIG. 6, the server circuitry 145 uses the data structure 600 to manage the execution of the conversation flow (e.g., verify confirmations, consents and consensuses). For example, to verify that there is a consensus among the participants in the current activity of the conversation flow, the server circuitry 145 determines whether all participants have given their confirmation by checking the status of an IsTaskOutcomeConfirmed identifier in their participant's state (e.g., the state identifier circuitry 404 determining the task outcome based on the conversation state 605, participant state 615, participant activity state 620, and participant task state 630, where IsTaskOutcomeConfirmed is set to true using a Boolean identifier). For example, if a given condition is valid, then the server circuitry 145 further checks whether participants' task outcomes are the same and/or equal for their corresponding tasks to mark the presence of a consensus within a given activity. In other examples, if a given condition is not valid, the server circuitry 145 marks that consent is reached. The conversation progresses further based on the activity and a determination of whether the activity requires a consent or a consensus to progress. In the example of FIG. 6, the conversation state 605 can be further used by the state identifier circuitry 404 to identify a current activity state 610 and/or a team state 625.

In some examples, the progress identifier circuitry 406 of the server circuitry 145, and/or conversation identifier circuitry 304 of the client circuitry 125, identifies the presence of a consent or consensus among participants as shown in an example pseudocode below. For example, the progress identifier circuitry 406 of the server circuitry 145 checks whether there is a consensus or consent by determining whether all participants have confirmed their task outcomes in a current activity of the conversation flow (at Lines 1-24), checking if a current activity requires a consensus or consent (at Lines 25-29), checking if all participants' task outcomes for a current activity are equal (e.g., for consensus) (at Lines 30-52), marking the presence of a consensus or consent based on the requirements of the activity (at Lines 53-62), and progressing the conversation based on the activity's requirements (at Lines 63-71). The following is example pseudocode:

```
// Check if there's a Consensus or Consent                              (1)
{                                                                       
// Step 1: Check if all participants have confirmed their Tasks'        (2)
    Outcomes in the current Activity of the Conversation Flow           (3)
    flag allParticipantsHaveGivenConfirmation = true;                   (4)
    for ALL conversationState.getParticipants( ) {                      (5)
        is this Participant considerable for calculating Consensus/Consent   (6)
    (e.g., IsActive and IsOnline flags are on)?                         (7)
        if (not) {                                                      (8)
        // Skip this participant (e.g., being Observer)                 (9)
        continue;                                                       (10)
        }                                                               (11)
        for ALL participant.getActivities( ).getCurrentActivity( ).getTasks( ) {   (12)
        is this Participant done with this Task (e.g., TaskOutcome is not null) and   (13)
        is this Participant given confirmation about this task outcome   (14)
    (the IsTaskOutcomeConfirmed flag is on)                             (15)
        if (not) {                                                      (16)
        allParticipantsHaveGivenConfirmation = false;                   (17)
        break;                                                          (18)
        }                                                               (19)
        }                                                               (20)
    }                                                                   (21)
    if (not allParticipantsHaveGivenConfirmation) {                     (22)
        return that no Consensus/Consent is reached;                    (23)
    }                                                                   (24)
    // Step 2: Check if the current Activity requires Consensus or Consent   (25)
    flag activityRequiresConsensus =                                    (26)
    conversationState.getCurrentActivity( ).requiresConsensus( );       (27)
    flag activityRequiresConsent =                                      (28)
    conversationState.getCurrentActivity( ).requiresConsent( );         (29)
// Step 3: Check if all participants' Task Outcomes for the current     (30)
Activity are equal (for Consensus)                                      (31)
    flag isConsensusReached = true;                                     (32)
    if (activityRequiresConsensus) {                                    (33)
        ActivityData activityData getConversationActivityDataById       (34)
    (conversationState.getCurrentActivity( ).activityId);               (35)
        for ALL activity.getTasks( ) {                                  (36)
        for ALL conversationState.getParticipants( ) {                  (37)
        is this participant considerable for calculating Consensus       (38)
    (e.g., IsActive and IsOnline flags are on)                          (39)
        if (not) {                                                      (40)
        continue;                                                       (41)
        }                                                               (42)
        ParticipantTaskState taskState =                                (43)
    activityState.getTasks( ).getById(this task id)                     (44)
        if (taskState.getTaskOutcome is different from any of the       (45)
    outcomes of the same task but from different participants) {        (46)
        isConsensusReached = false;                                     (47)
        break;                                                          (48)
        }                                                               (49)
        }                                                               (50)
        }                                                               (51)
    }                                                                   (52)
// Step 4: Mark the presence of Consensus or Consent                    (53)
    based on the requirements of the Activity                           (54)
    if (activityRequiresConsensus && isConsensusReached) {              (55)
        return isConsensusReached;                                      (56)
    } else if (activityRequiresConsent) {                               (57)
        return allParticipantsHaveGivenConfirmation; // Consent is reached if   (58)
    all confirmations are given                                         (59)
} else {                                                                (60)
        return that no Consensus/Consent is reached;                    (61)
    }                                                                   (62)
// Step 5: Progress the Conversation based on the Activity's requirements   (63)
    if (activityRequiresConsensus && isConsensusReached) {              (64)
        progressConversation( );                                        (65)
    } else if (activityRequiresConsent && allParticipantsHaveGivenConfirmation) {   (66)
    progressConversation( );                                            (67)
    } else {                                                            (68)
        waitForMoreEvents( );                                           (69)
    }                                                                   (70)
}                                                                       (71)
```

FIG. 7 is a flowchart representative of example machine-readable instructions and/or example operations 700 that may be executed, instantiated, and/or performed by example programmable circuitry to implement the example client circuitry 125 of FIG. 1 to present a state of a workshop to a participant. In the example of FIG. 7, a virtual room can be any type of interface where participants are engaged with an activity. Depending on whether participants can simultaneously interact with one another or not, there can be a distinction between an interaction room (e.g., where group and team activities happen) and a personal room (e.g., where solo activities happen). For example, the client circuitry 125 presents the conversation state to a participant using a user interface. In some examples, the client circuitry 125 selects a virtual room for the participant based on the conversation state identified using the state identifier circuitry 404. In some examples, the virtual room selection depends on the type of current activity from the conversation flow, the particular tasks of the current activity, or anything else which determines what actions are required from the participant. In some examples, the user interface can be different for each participant depending on their role.

In the example of FIG. 7, the virtual room selector circuitry 306 shows a technical setup room to a participant, at block 705. The user interface manager circuitry 308 requests the conversation state from the server circuitry 145, at block 710, and receives the conversation state from the server circuitry 145, at block 715. In some examples, the conversation identifier circuitry 304 obtains the current activity of the conversation from the conversation state, at block 720, and the task manager circuitry 310 determines the task(s) of the current activity, at block 725. For example, if the task manager circuitry 310 determines that the task for the participant is "Are you ready to start?", at block 730, the virtual room selector circuitry 306 selects and shows the waiting room as part of the user interface, at block 735. If the task manager circuitry 310 determines that the task for the participant is "What is your emotion?", at block 740, the virtual room selector circuitry 306 selects and shows the emotion room, at block 745. If the task manager circuitry 310 determines that the task for the participant is "What team name would you use?", at block 750, the virtual room selector circuitry 306 selects and shows the team name room, at block 755. If the task manager circuitry 310 determines that the task for the participant is "Are you ready with the following information?", at block 760, the user interface manager circuitry 308 determines whether the activity is a type of solo activity, at block 765. If the user interface manager circuitry 308 determines that the activity is a solo activity, the virtual room selector circuitry 306 selects and shows a personal information room, at block 770. However, if the user interface manager circuitry 308 determines that the activity is not a solo-based activity, the virtual room selector circuitry 306 shows a group information room, at block 775. Likewise, if the task manager circuitry 310 determines instead that the task for the participant is "Do the following exercise", the user interface manager circuitry 308 determines whether the activity is a type of solo activity, at block 785. The virtual room selector circuitry 306 displays to the user either a personal exercise room, at block 790, or a group exercise room, at block 795, depending on whether the activity is a solo activity or a group-based activity, respectively.

FIG. 8 is a flowchart representative of example machine-readable instructions and/or example operations 800 that may be executed, instantiated, and/or performed by example programmable circuitry to implement the example client circuitry 125 of FIG. 1 to manage a user interface depending on whether participants are actors or observers. In some examples, the client circuitry 125 manages the user interface depending on whether the participants are actors (e.g., their confirmation is required and they are actively engaged in the consent/consensus), observers (e.g., their confirmation is not required and are they not actively engaged in the consent/consensus), facilitators (e.g., similar to observers but have additional information not available to actors and observers), as well as other potential roles. In the example of FIG. 8, the description is limited to the team name room and the roles of the actors and observers. However, this process can apply to any type of activity, task or role, as well as the corresponding virtual room. As such, while FIG. 8 describes only one variant of the user interface management, any other type of user interface management can be used by the client circuitry 125.

In the example of FIG. 8, the virtual room selector circuitry 306 displays the team name room to the participant, at block 805. The participant identifier circuitry 302 determines whether the participant is an actor, at block 810. For example, if the participant is determined not to be an actor, the user interface manager circuitry 308 disables all synchronized inputs (e.g., such as entering a team name or providing confirmation), at block 815. However, if the participant is determined to be an actor, the user interface manager circuitry 308 enables synchronized input to allow the participant to provide a confirmation (e.g., by selecting "Continue"), at block 820. Similarly, the user interface manager circuitry 308 enables synchronized input to allow the participant to enter the team name (e.g., using a text field or a text area). Once the participant provides user input, the user interface manager circuitry 308 determines whether the user input is in the synchronized input field of the user interface, at block 830. Once the user has provided their input using the synchronized input field, the user interface manager circuitry 308 sends the value of the synchronized input to the server circuitry 145, at block 835. In some examples, the server circuitry 145 identifies the synchronized input using the synchronizer circuitry 410. Once the server circuitry 145 (e.g., server) receives the synchronized input via the synchronizer circuitry 410, at block 840, the state identifier circuitry 404 determines whether a new conversation state has been received by the server, at block 845. Once the state identifier circuitry 404 identifies the new conversation state, the user interface manager circuitry 308 updates the user interface (e.g., including all synchronized inputs) to reflect the data in the conversation state, at block 850. Once the progress identifier circuitry 406 that the current activity is completed (e.g., a flag is marked in the conversation state), at block 855, the user interface manager circuitry 308 initiates a transition, at block 860. The state identifier circuitry 404 generates a new state and sends the new state to the client circuitry 125, including the updated conversation outcome and progress (e.g., as determined using the progress identifier circuitry 406 and the outcome identifier circuitry 408), at block 865. The user interface manager circuitry 308 then proceeds to update the user interface to proceed with the next activity.

FIG. 9 is a flowchart representative of example machine-readable instructions and/or example operations 900 that may be executed, instantiated, and/or performed by example programmable circuitry to implement the example client circuitry 125 of FIG. 1 to adjust a user interface based on user authentical status and specific role-based permissions. Considering account management, while much of the platform's features are publicly accessible, some functionalities are exclusive to registered users. For example, a participant can join a conversation if invited by another (e.g., through an email invitation) even without an account. However, for a participant to initiate their own conversation and invite others, registration can be mandatory. Registration can also be necessary for users to track progress, achieve milestones, access certifications, review analytics, create conversation, and utilize other advanced features. For example, user accounts are organized within workspaces, which can represent organizations, departments, and/or teams. In some examples, user accounts can have different roles (e.g., an owner of the workspace, an administrator, a team member, etc.). In some examples, workspaces, users, and/or user roles are saved in a database (e.g., database 155 of FIG. 1). For example, a client (e.g., via client circuitry 125) retrieves this information by sending requests to the server (e.g., via server circuitry 145). FIG. 9 is an example of the client circuitry 125 adjusting a given user interface based on user authentication status and/or specific role-based permissions. In some examples, users can be created by being added during a workspace setup by platform administrators as part of the contract process, or later, on-demand, by the work-space owner or administrator. For example, the workspace owner or administrator can update user information, modify permissions, and/or change statuses. Such adjustments can affect a user's platform capabilities, such as initiating a conversation or joining specific conversations. In the example of FIG. 9, the client's user interface can be adjusted based on a given account management process.

In the example of FIG. 9, a user 905 can access the client circuitry 125 to initiate a request via the API 150 of FIG. 1, allowing the client circuitry 125 to receive user account details associated with the user 905. For example, the API 150 of FIG. 1 queries the database 155 of FIG. 1, providing user data to the API 150. The participant identifier circuitry 302 determines whether there is a user account, at block 910. If a user account does not exist, the user interface manager circuitry 308 displays a "no user account" interface to the user, at block 915. However, if the participant identifier circuitry 302 determines that a user account exists, the participant identifier circuitry 302 also proceeds to determine whether the user account has access to the workspace, at block 920. If the participant identifier circuitry 302 determines that the user account does not have access to the workspace, the user interface manager circuitry 308 displays a "no access" interface, at block 925. However, if the user account does have access to the workspace, the participant identifier circuitry 302 determines whether the user account is an owner of the workspace, at block 930. If the user account is an owner of the workspace, the user interface manager circuitry 308 displays a "workspace owner" inter-face, at block 935. Additionally, if the participant identifier circuitry 302 determines that the user account is an administrator of the workspace, at block 940, the user interface manager circuitry 308 displays a "workspace administrator" interface, at block 945. The process ends at block 950 if none of the interfaces are applicable based on the user account status.

Figure 10:
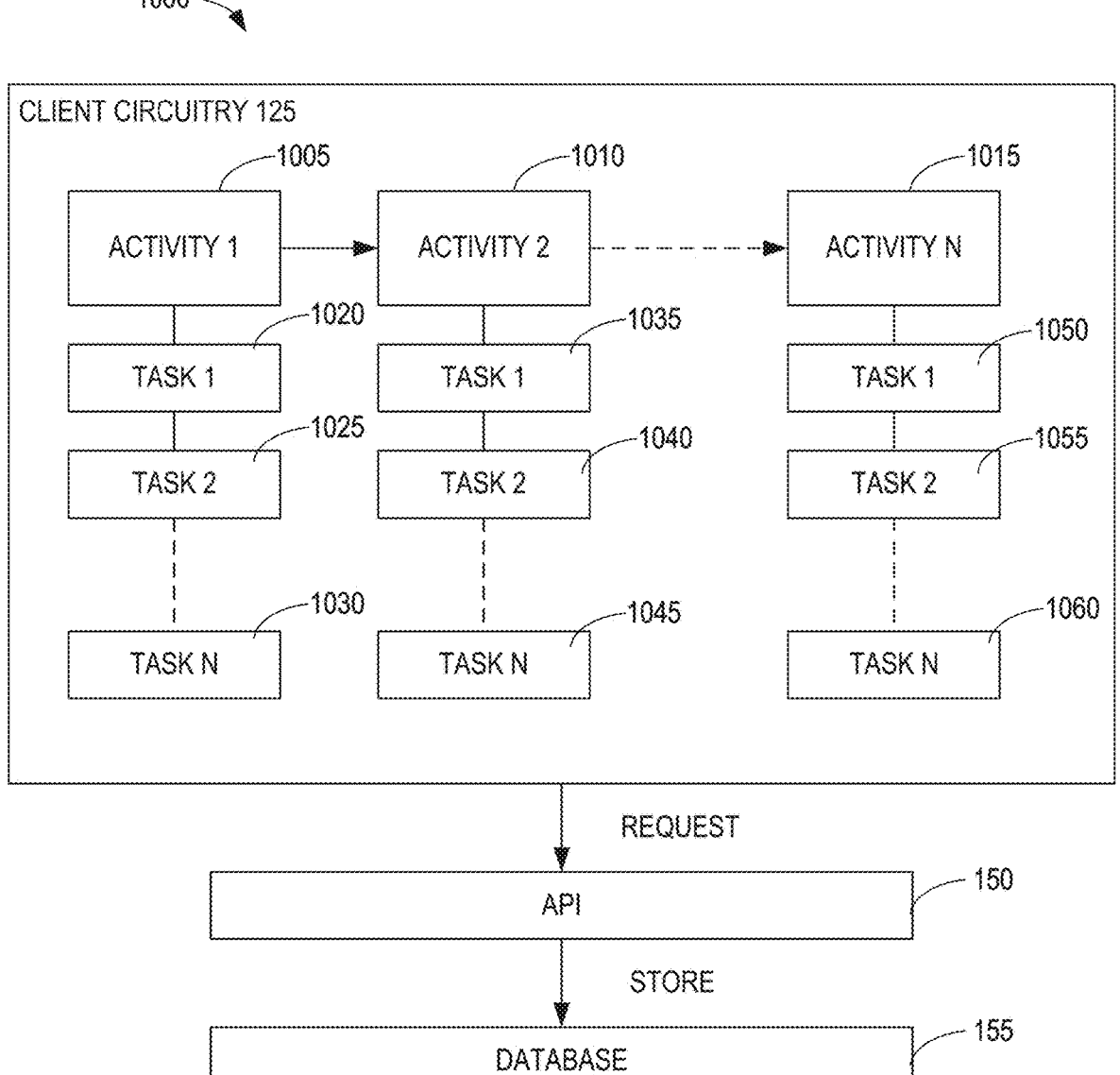
FIG. 10 is a block diagram of an example implementation of client circuitry of FIG. 1 constructed in accordance with teachings of this disclosure to create and/or modify workshops by defining workshop activities and arranging the workshop activities in a specific flow.

FIG. 10 is a block diagram 1000 of an example implementation of client circuitry 125 of FIG. 1 constructed in accordance with teachings of this disclosure to create and/or modify workshops by defining workshop activities and arranging the workshop activities in a specific flow. While FIG. 10 illustrates one example structure that the client circuitry 125 can send to the server circuitry 145 to create a new conversation (e.g., based on a sequence of activities and/or their tasks), any other type of arrangement and/or structure can be used. For example, FIG. 10 includes client circuitry 125 that can monitor and/or adjust activities (e.g., activities 1005, 1010, 1015) and the multiple tasks associated with those activities (e.g., task(s) 1020, 1025, 1030 associated with activity 1005; task(s) 1035, 1040, 1045 associated with activity 1010; task(s) 1050, 1055, 1060 associated with activity 1015, etc.). In the example of FIG. 10, the client circuitry 125 sends a request to the API 150 of FIG. 1, which can store any requests and/or relevant data in the database 155 of FIG. 1. In the example of FIG. 10, a conversation builder is shown where conversations are created and/or tailored by defining their activities and arranging the conversations in a specific flow. In some examples, this process is performed by platform and/or workspace administrators. In examples disclosed herein, a conversation builder corresponds to a space in the conversation platform tailored for conversations inception and adjustments.

Figure 11:
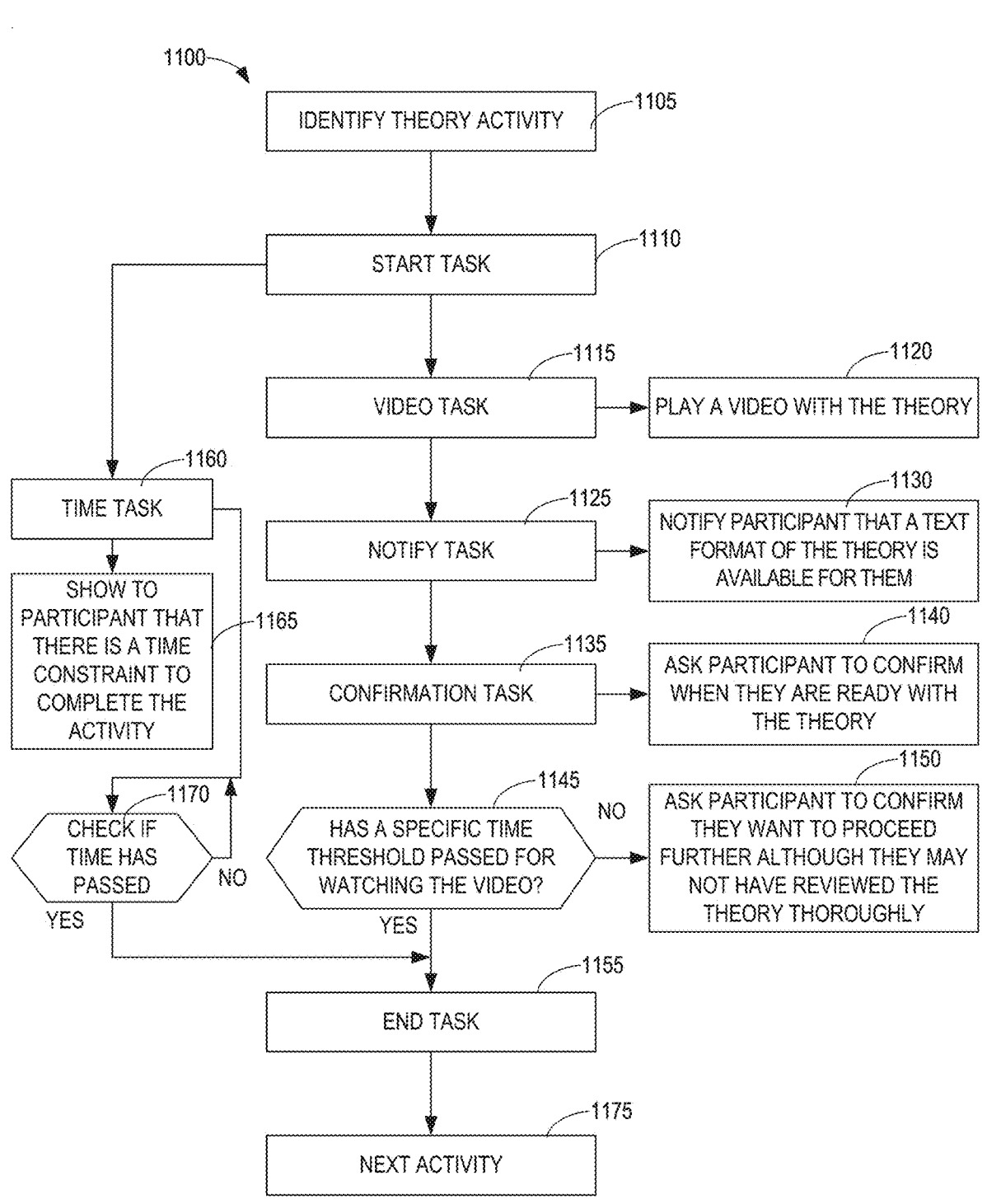
FIG. 11 is a flowchart representative of example machine-readable instructions and/or example operations that may be executed, instantiated, and/or performed by example programmable circuitry to implement the example client circuitry of FIG. 1 to perform an activity during creation and/or modification of a workshop.

FIG. 11 is a flowchart representative of example machine-readable instructions and/or example operations 1100 that may be executed, instantiated, and/or performed by example programmable circuitry to implement the example client circuitry 125 of FIG. 1 to perform an activity during creation and/or modification of a workshop. In some examples, the client circuitry 125 of FIG. 1 can offer multiple methods for users to create and modify conversations. For example, one potential interface can utilize a drag-and-drop functionality, presenting all activities in a panel. Users can then arrange these activities in a workspace to design the final conversation flow. Other user interfaces can involve the use of Wizards or single-page forms. In the example of FIG. 11, a structure of an example theory activity is described. For example, the task manager circuitry 310 identifies a theory activity, at block 1105 and initiates a task, at block 1110. In some examples, the task manager circuitry 310 proceeds to initiate a video task, at block 1115, such that the user interface manager circuitry 308 proceeds to play a video with the theory, at block 1120. In some examples, the task manager circuitry 310 proceeds to initiate a notify task, at block 1125, such that the user interface manager circuitry 308 proceeds to notify participant(s) that a text format of the theory is available, at block 1130. In some examples, the task manager circuitry 310 proceeds to initiate a confirmation task, at block 1135, such that the user interface manager circuitry 308 proceeds to ask participant(s) to confirm when they are ready with the theory, at block 1140. In some examples, the task manager circuitry 310 initiates a time task, at block 1160, such that the user interface manager circuitry 308 proceeds to show to the participant(s) that there is a time constraint to complete a given activity, at block 1165. The task manager circuitry 310 continues to check the time until it has passed, at block 1170. Separately, there may be a different timer associated with tracking whether a specific time threshold has passed for watching the video associated with a video task, at block 1145. If the specific time threshold has not passed for watching the video, the user interface manager circuitry 308 proceeds to ask participant(s) to confirm that they want to proceed further, even when the participant(s) have not reviewed the entire video, at block 1150. The task manager circuitry 310 separately determines whether to end a task, at block 1155, when the specific time threshold has passed. In some examples, the task manager circuitry 310 proceeds to a subsequent activity after the theory activity is completed, at block 1175.

Figure 12:
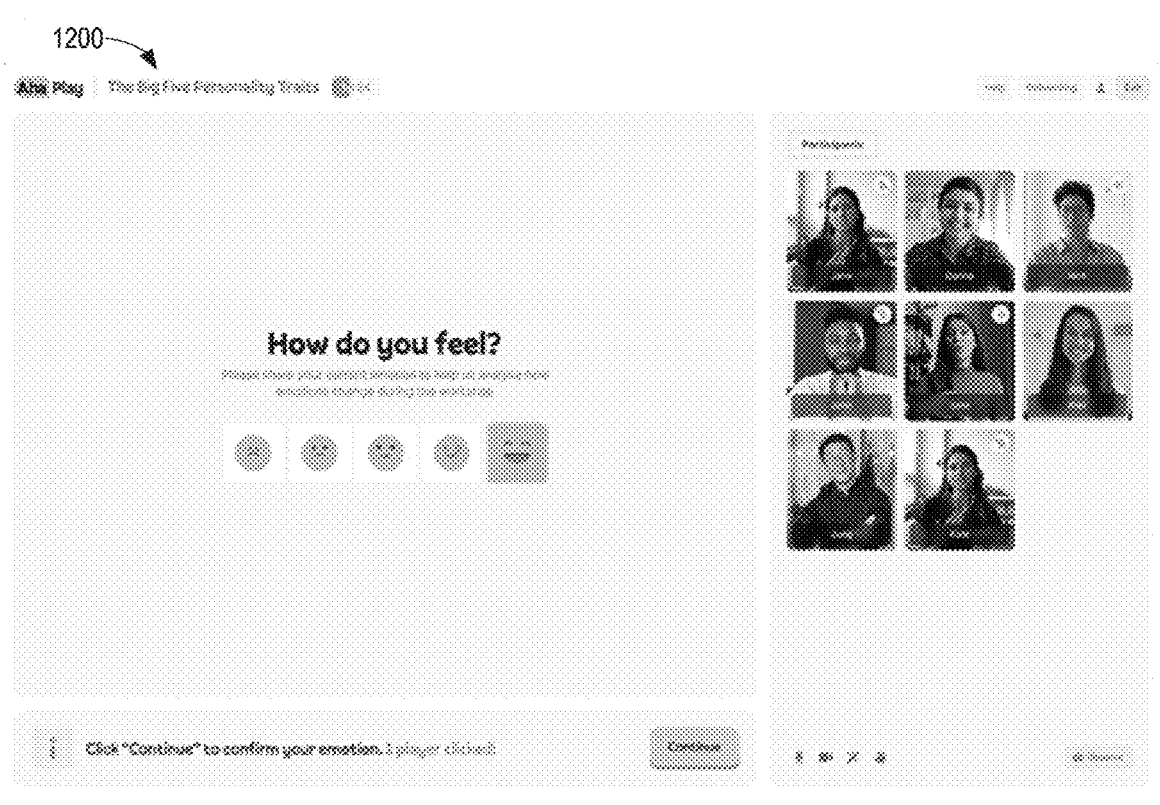
FIG. 12 illustrates an example first group activity (e.g., activity A) completed when all participants perform the same user interaction.

FIG. 12 illustrates an example first group activity 1200 (e.g., activity A) completed when all participants perform the same user interaction. In the example of FIG. 12, the group activity is completed when all participants perform the same user interaction. For example, the participants consent (e.g., by selecting a "Continue" button) without needing consensus on the performed exercise as part of the activity (e.g., each participant selects their own emotion, but still all participants need to select the "Continue" button to complete the activity). In the example of FIG. 12, a consent-based conversation is illustrated such that a group session (e.g., workshop and/or conversation) progresses resulting from the same user interaction (e.g., consent) by all participants.

Figure 13:
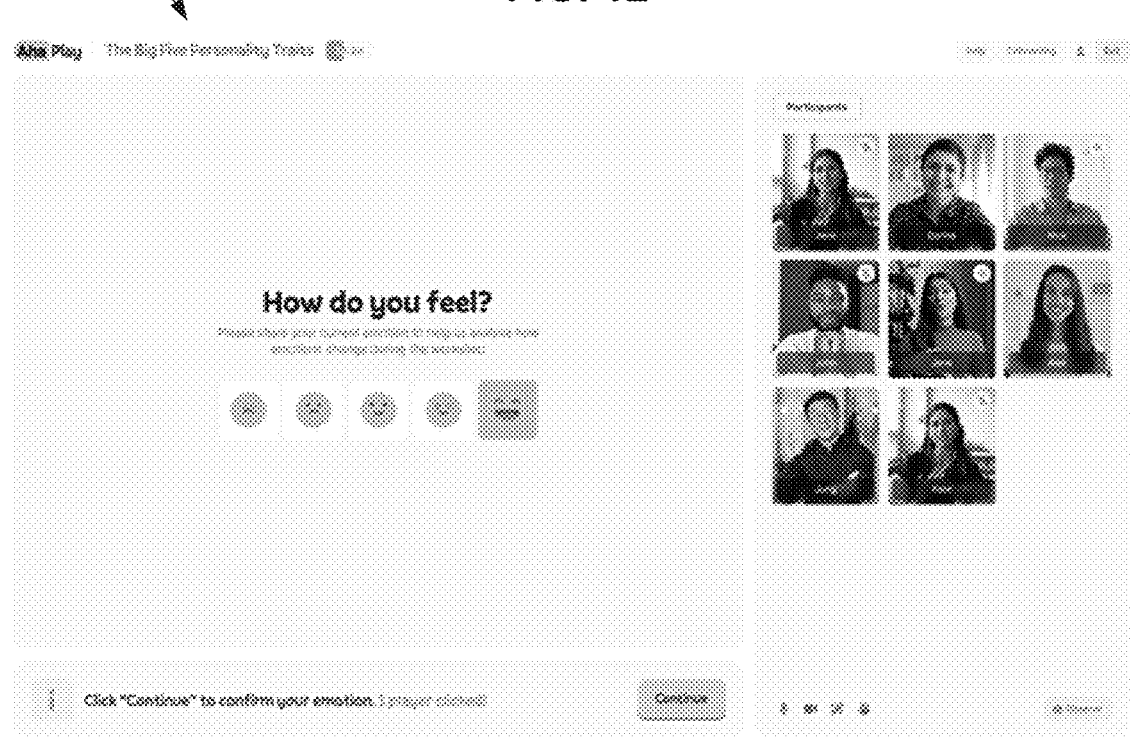
FIG. 13 illustrates an example second group activity (e.g., activity B) completed when all participants perform the same user interaction.

FIG. 13 illustrates an example second group activity 1300 (e.g., activity B) completed when all participants perform the same user interaction. In the example of FIG. 13, the group activity is completed when all participants perform the same user interaction. For example, the participants consent (e.g., by selecting the "Continue" button) and have consensus on the performed exercise as part of the activity. In the example of FIG. 13, the participants create and agree on a common team name, using a synchronized input field, and then all participants select the "Continue" button. In the example of FIG. 13, a consensus-based conversation is illustrated such that a group session always progresses through consensus. In some examples, activities can be either consensus-based or consent-based (e.g., consent-consensus-based conversations), representing a combined activity flow (e.g., activity A/B flow), such that activities can be either activity A or activity B, progressing through user interaction by all participants with consent and/or consensus.

Figures 14, 15:
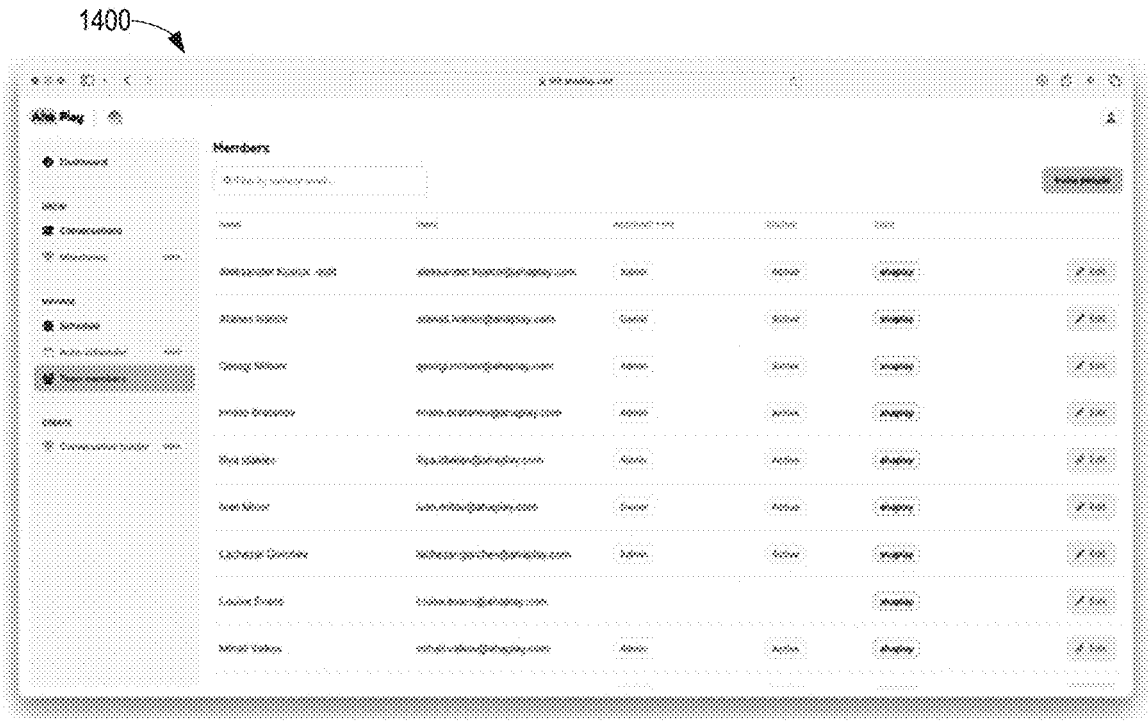
FIG. 14 illustrates an example first design for a client user interface related to account management.
FIG. 15 illustrates an example second design for a client user interface related to account management.

FIG. 14 illustrates an example first design 1400 for a client user interface related to account management.

FIG. 15 illustrates an example second design 1500 for a client user interface related to account management.

Figures 16, 17:
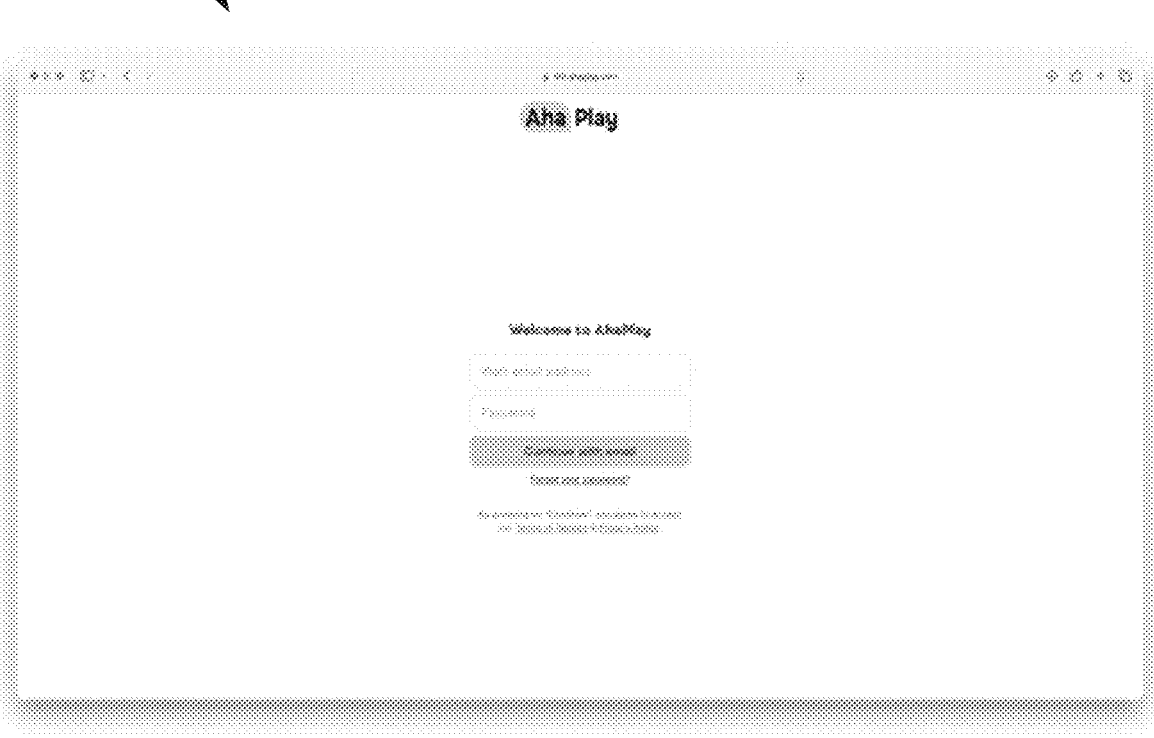
FIG. 16 illustrates an example screen showing a user authentication process for accessing a workspace and associated platform features.
FIG. 17 illustrates an example first user interface associated with scheduling a conversation.

FIG. 16 illustrates an example screen 1600 showing a user authentication process for accessing a workspace and associated platform features.

FIG. 17 illustrates an example first user interface 1700 associated with scheduling a conversation. For example, users can either initiate a conversation immediately (e.g., such that user(s) are auto-joined and provided a link to invite others) or opt to schedule the conversation for a later date. In the example of FIG. 17, a conversation list is displayed, allowing the user to make a selection.

Figure 18:
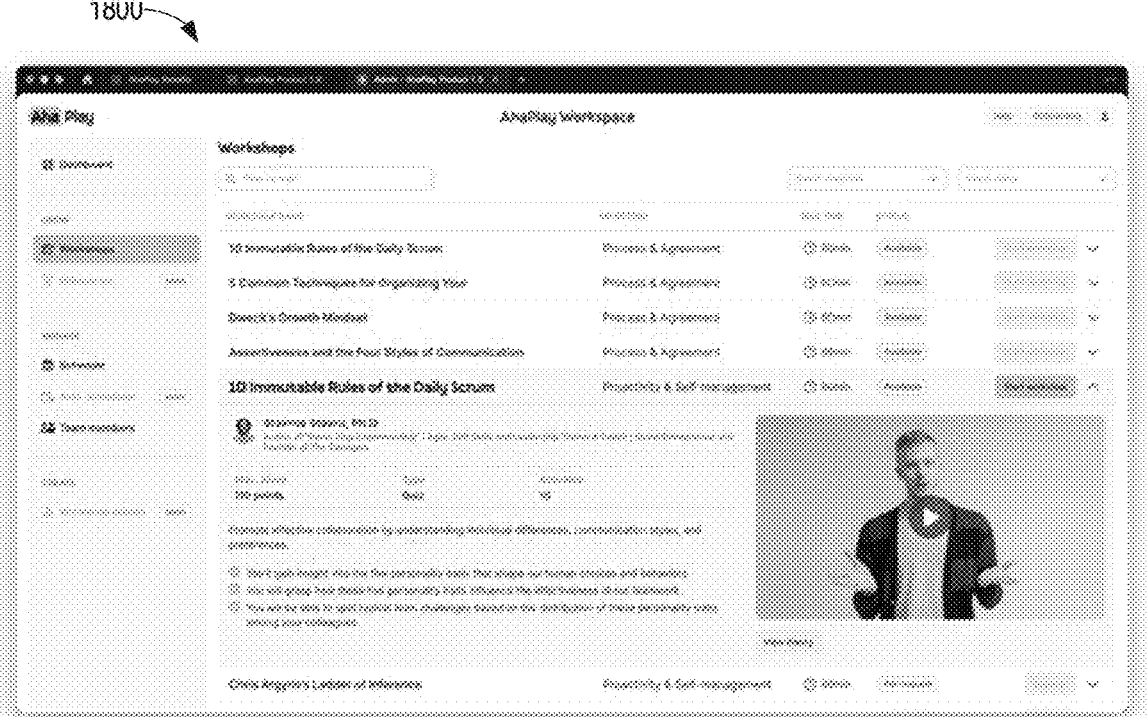
FIG. 18 illustrates an example second user interface associated with scheduling a conversation.

FIG. 18 illustrates an example second user interface 1800 associated with scheduling a conversation. In the example of FIG. 18, a detailed view of a workshop listed in the example first user interface of FIG. 17 is shown, providing additional information for the user.

Figure 19:
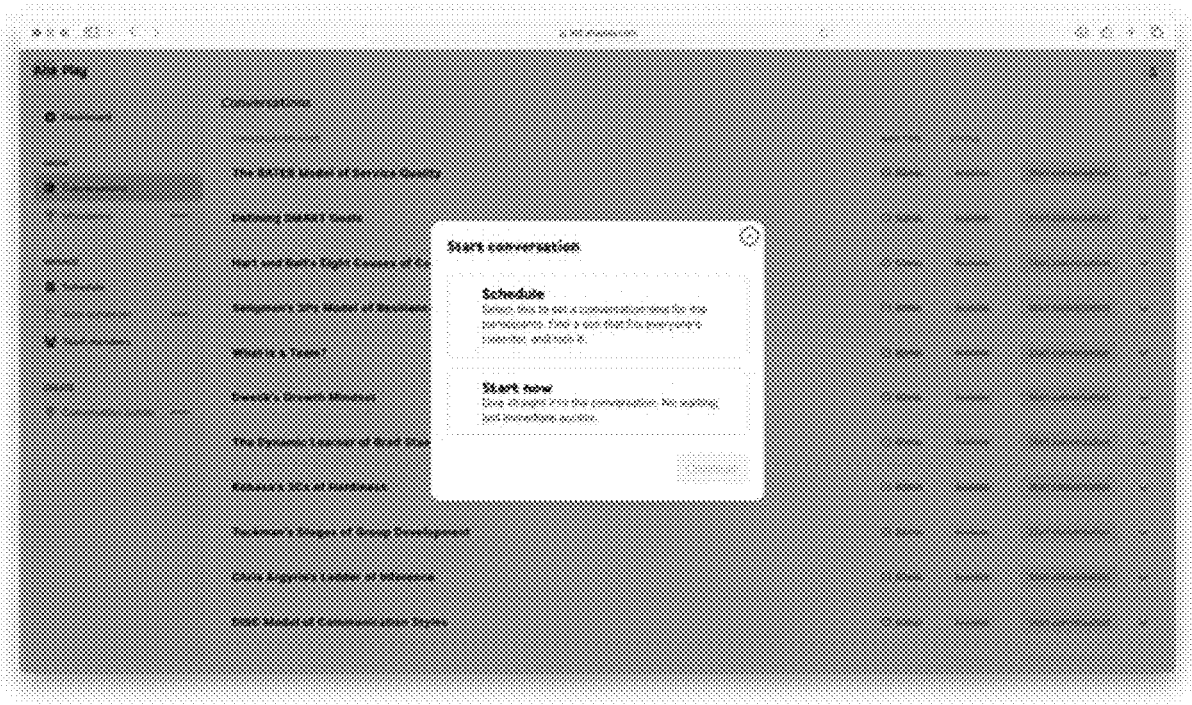
FIG. 19 illustrates an example third user interface associated with scheduling a conversation.

FIG. 19 illustrates an example third user interface 1900 associated with scheduling a conversation. In the example of FIG. 19, the conversation selection includes scheduling the conversation (e.g., to set a conversation time for the participants and/or find a slot that fits user calendars) or starting the conversation (e.g., immediately accessing the conversation without scheduling).

Figure 20:
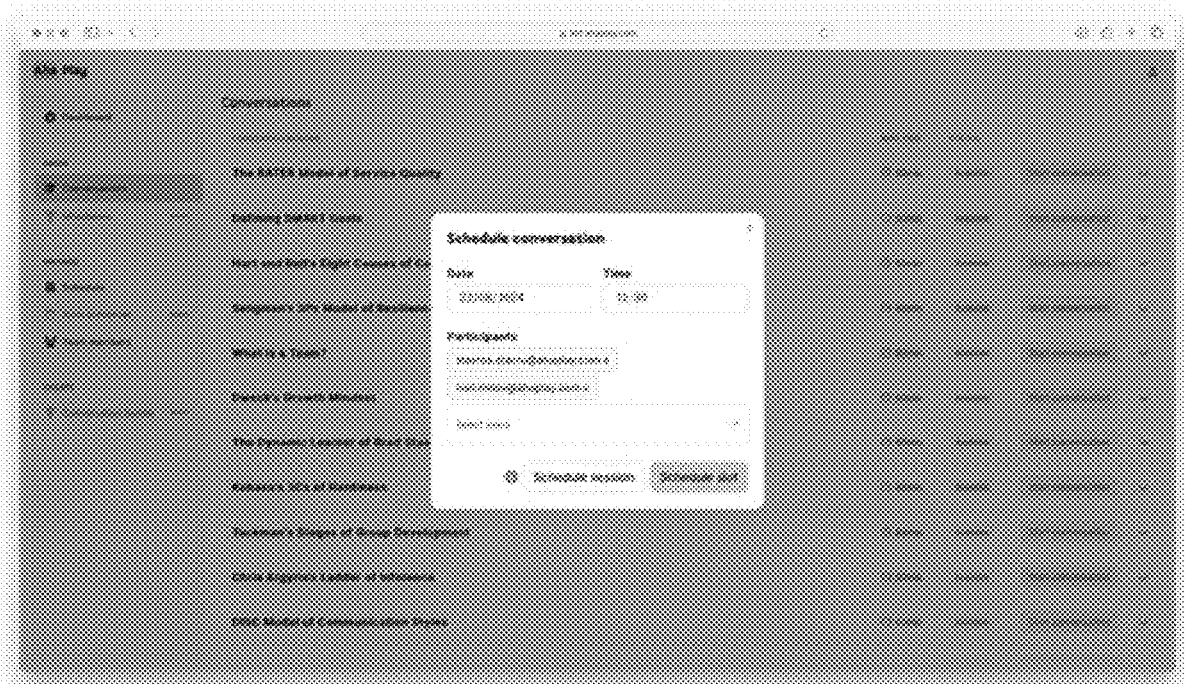
FIG. 20 illustrates an example fourth user interface for scheduling a conversation.

FIG. 20 illustrates an example fourth user interface 2000 for scheduling a conversation. In the example of FIG. 20, when a user opts to schedule a conversation for later, the user might be presented with two additional choices. The first is to initiate a session, corresponding to a fixed group workshop where participants are predetermined. The second is a slot, corresponding to a flexible group workshop wherein participants might be dynamically, perhaps even randomly, assigned to parallel workshops at the scheduled time. As such, FIG. 20 includes potential configurations a user can set while scheduling from the client side.

Figure 21:
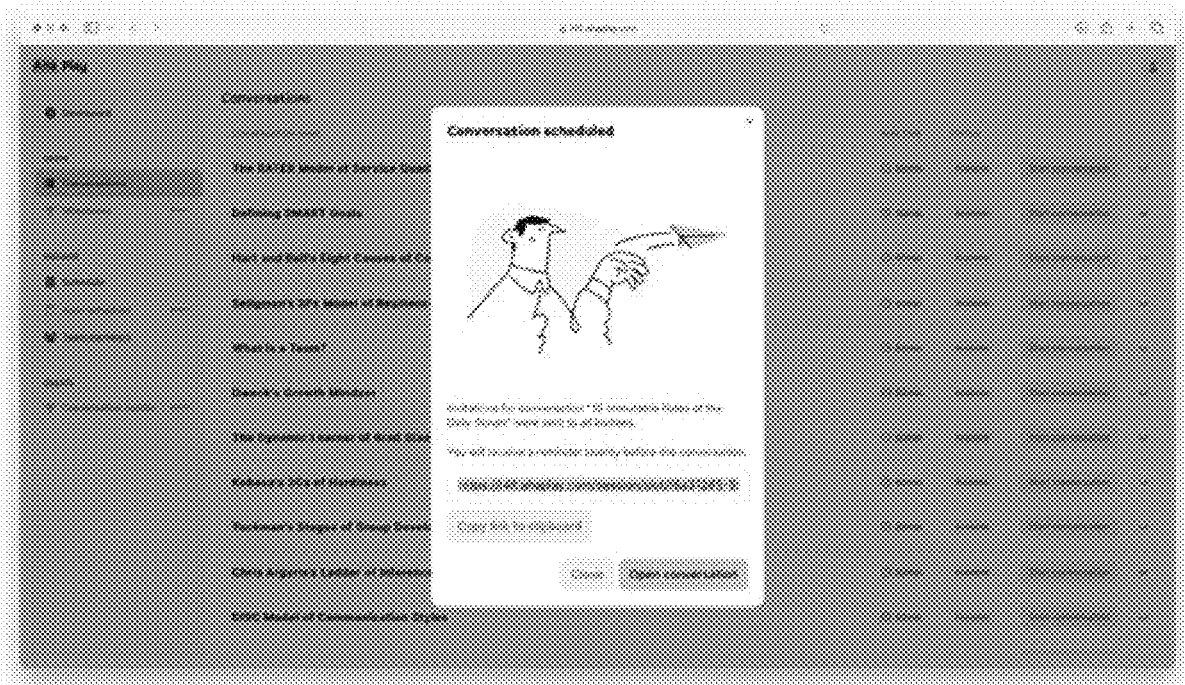
FIG. 21 illustrates an example fifth user interface for scheduling a conversation.

FIG. 21 illustrates an example fifth user interface 2100 for scheduling a conversation. In the example of FIG. 21, an invitation is sent to all invitees once the conversation has been scheduled.

Figure 22:
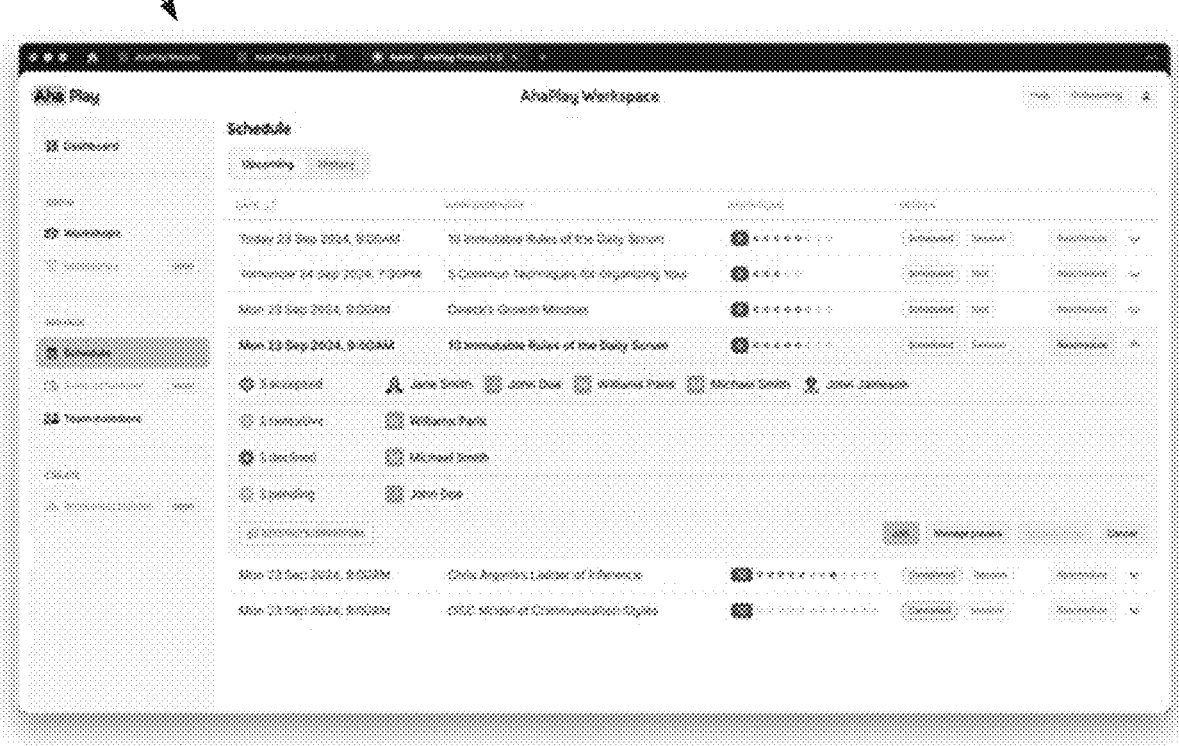
FIG. 22 illustrates an example sixth user interface for scheduling a conversation, showing a schedule associated with the scheduled conversations.

FIG. 22 illustrates an example sixth user interface 2200 for scheduling a conversation, showing a schedule associated with the scheduled conversations. For example, within the platform disclosed herein, all scheduled conversations could be found in a dedicated section (e.g., in a schedule section). Likewise, completed conversations can be accessed in a separate section (e.g., in a history section).

Figure 23:
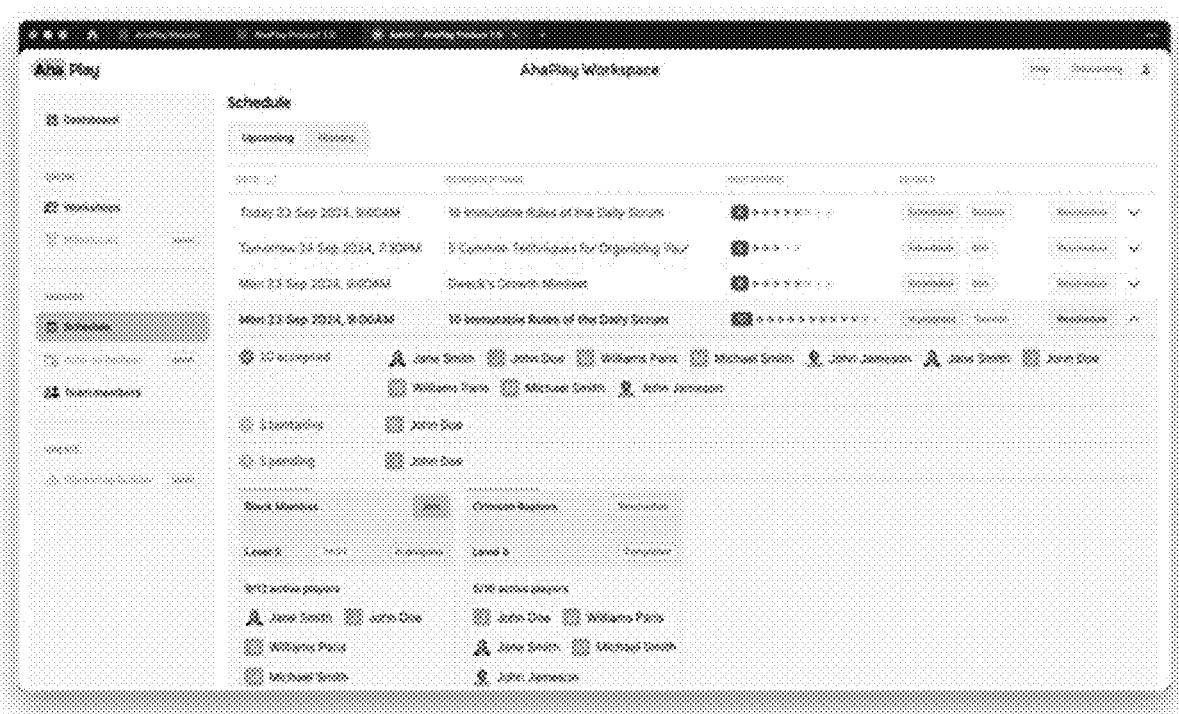
FIG. 23 illustrates an example seventh user interface for scheduling a conversation, showing an upcoming schedule associated with the scheduled conversations.

FIG. 23 illustrates an example seventh user interface 2300 for scheduling a conversation, showing an upcoming schedule associated with the scheduled conversations.

Figure 24:
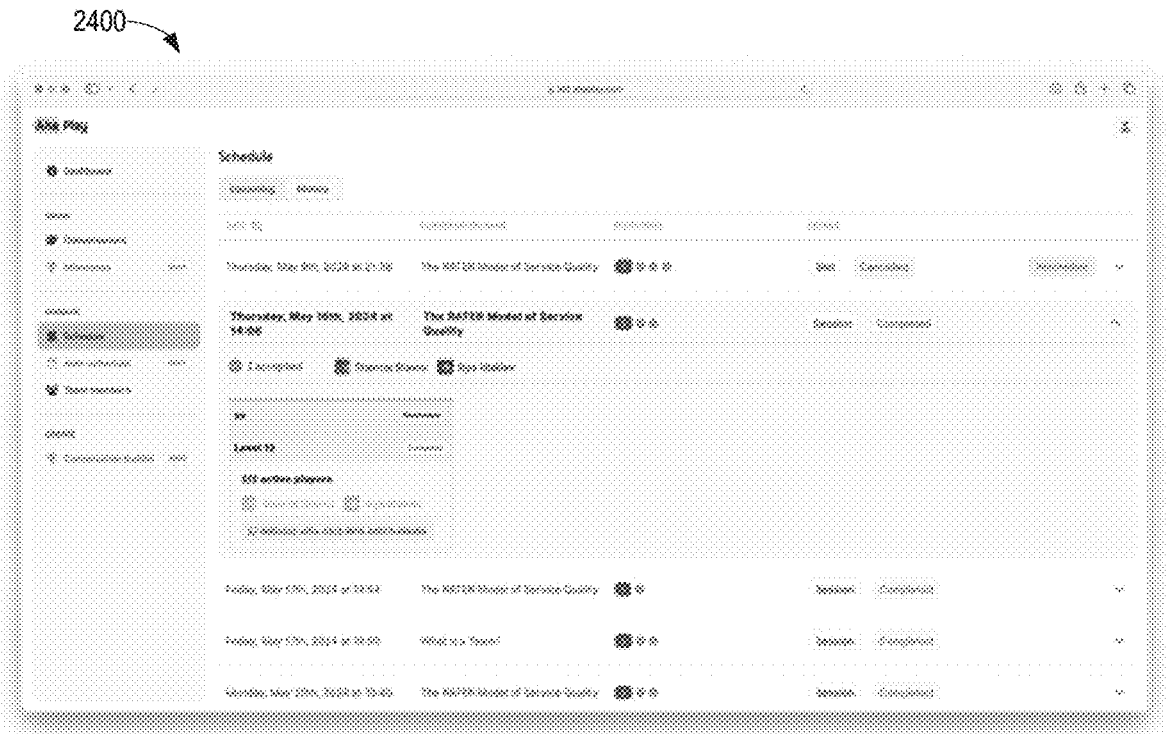
FIG. 24 illustrates an example eight user interface for scheduling a conversation, showing a history associated with the scheduled conversations.

FIG. 24 illustrates an example eight user interface 2400 for scheduling a conversation, showing a history associated with the scheduled conversations.

Figure 25:
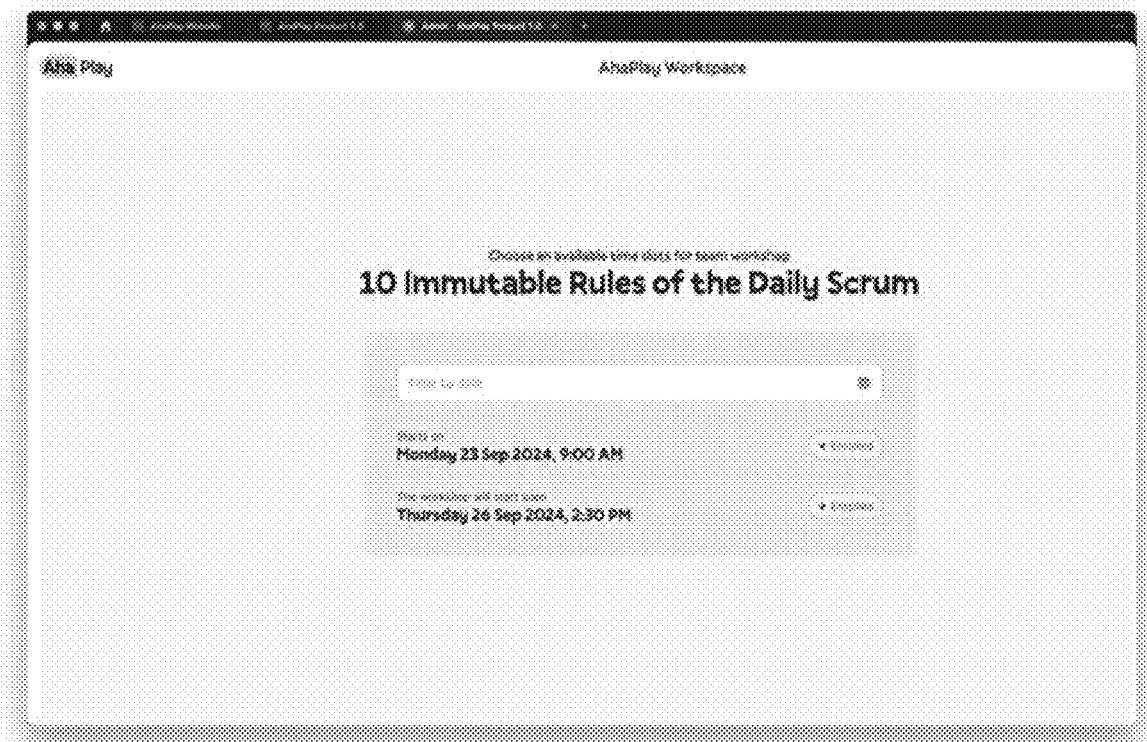
FIG. 25 illustrates an example ninth user interface for scheduling a conversation, including an example schedule crafted by the scheduler disclosed herein.

FIG. 25 illustrates an example ninth user interface 2500 for scheduling a conversation, including an example schedule crafted by the scheduler disclosed herein. For example, for scheduling large numbers of conversations, the platform disclosed herein offers a scheduler. This feature allows users to provide various parameters (e.g., such as the conversation's name, preferred days of the week, working hours, number of invitees, etc.). The scheduler automates the process by crafting a schedule, dispatching invitations, monitoring RSVPs, sending notifications, and/or generating reports.

Figures 26, 27:
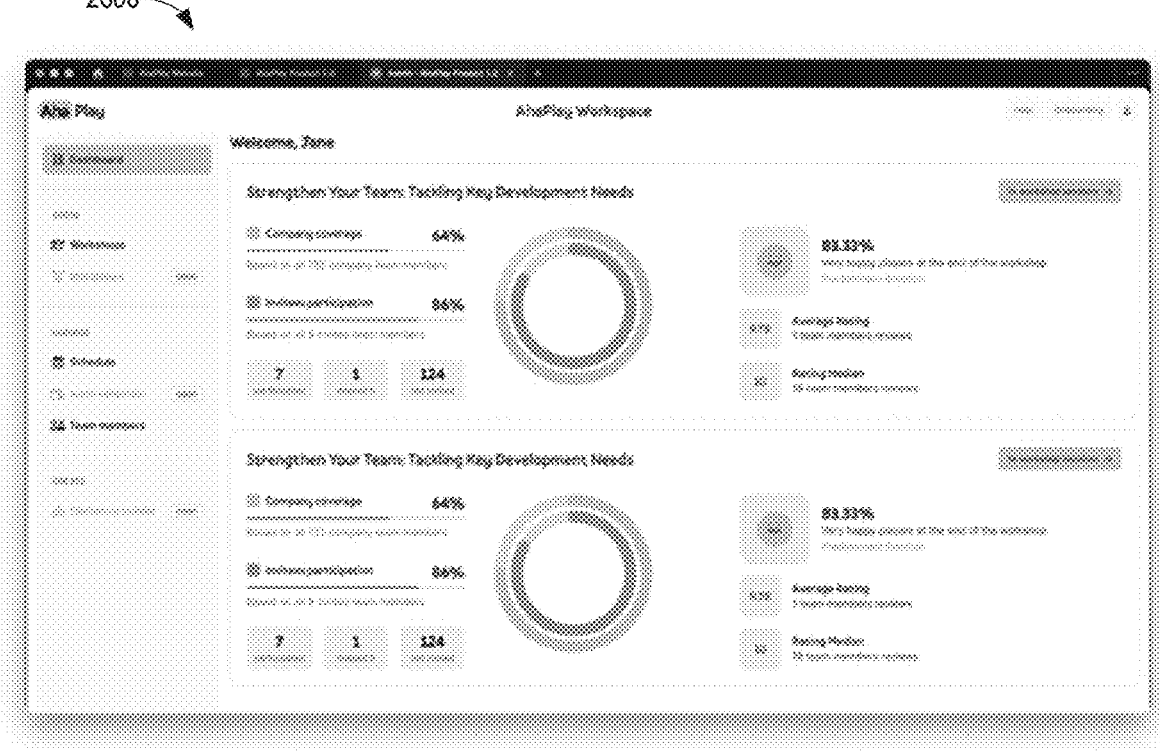
FIG. 26 illustrates an example first user interface associated with an administrator's dashboard.
FIG. 27 illustrates an example second user interface associated with an administrator's dashboard shown in FIG. 26, further illustrating the tracking of key developmental needs for each team member.

FIG. 26 illustrates an example first user interface 2600 associated with an administrator's dashboard. For example, the administrator's dashboard disclosed herein provides administrators with a comprehensive overview of key performance indicators related to their workspace. The dashboard can include metrics such as company coverage, showing the percentage of total team members involved, and/or invitee participation rates. In examples disclosed herein, a team member space provides tools for sending announcements, managing user roles, and/or accessing support resources. In some examples, detailed statistics display the number of participants, those who missed the conversation, and/or those not invited. In some examples, emotional feedback is also captured, indicating the predominant emotion of the team members at the end of the conversation, with associated ratings and median scores for further insight. In examples disclosed herein, this dashboard is configurable, allowing each administrator to customize their view to include relevant information about the workspace, journeys, analytics, and/or other data deemed necessary to effectively manage their team members' progress, as well as advanced features such as search and filtering. In examples disclosed herein, the administrator's dashboard represents an administrator space within the conversations platform where workspace administrators can access detailed analytics, statistics, and reports. For example, administrators can manage upcoming and past conversations, monitor member engagement, configure settings, and/or oversee the overall health and performance of the workspace.

FIG. 27 illustrates an example second user interface 2700 associated with an administrator's dashboard shown in FIG. 26, further illustrating the tracking of key developmental needs for each team member.

Figure 28:
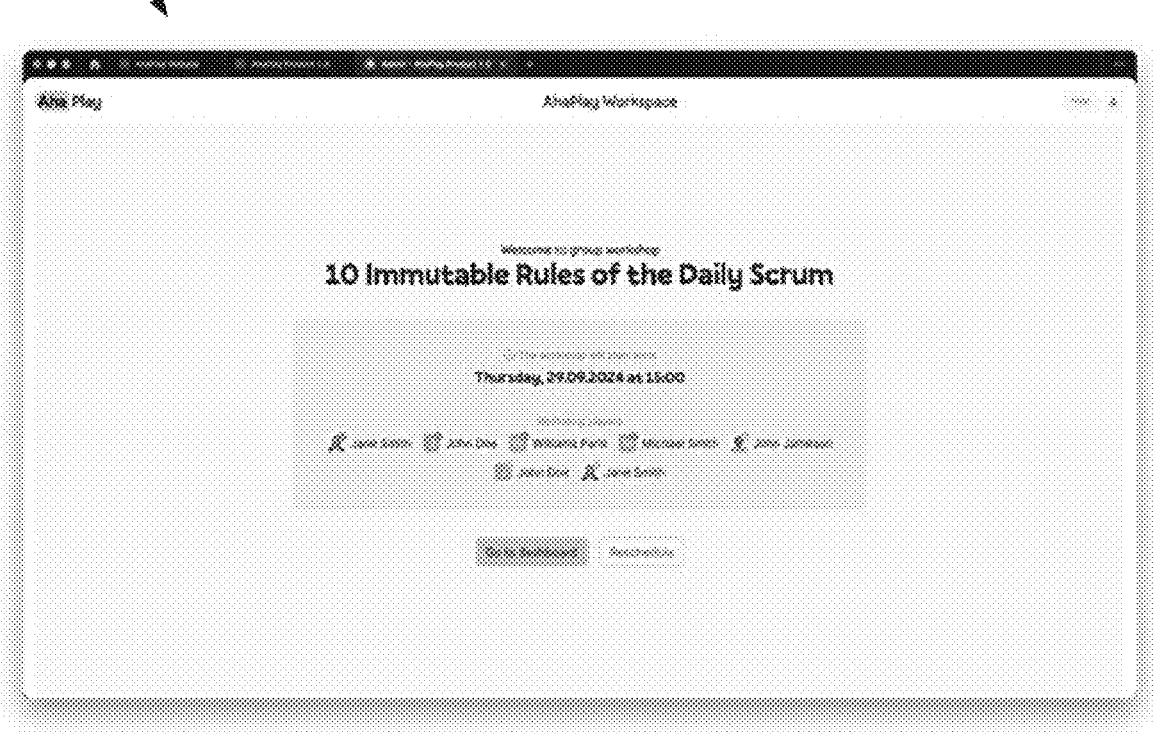
FIG. 28 illustrates an example user interface showing a member's dashboard.

FIG. 28 illustrates an example user interface 2800 showing a member's dashboard. The member's dashboard, in a similar manner to the administrator's dashboard shown in FIGS. 26-27, is fully configurable (e.g., each team member can configure the screen). In the example of FIG. 28, a dashboard presents a team member with their next conversation, including the name of the conversation, conversation participants (e.g., together with their statuses), scheduling time, including an opportunity to reschedule the conversation for another, more convenient time slot. In examples disclosed herein, the member's dashboard is a personalized space within the conversations platform where members can view invitations, upcoming conversations, and/or other relevant information. Members can also track their progress, manage their schedule, access resources, and receive notifications about updates and achievements. In examples disclosed herein, a space corresponds to a virtual area where members and administrators can see the badges and certificates they personally or as a team have earned participating in different conversations and/or conversational journeys. In examples disclosed herein, a member's resources space corresponds to a personalized space within the conversations platform where members can access different artifacts unlocked by completing certain conversations or conversational journeys (e.g., digital books, videos, handouts, cheatsheets, recommendations, reading lists, etc.).

Figure 29:
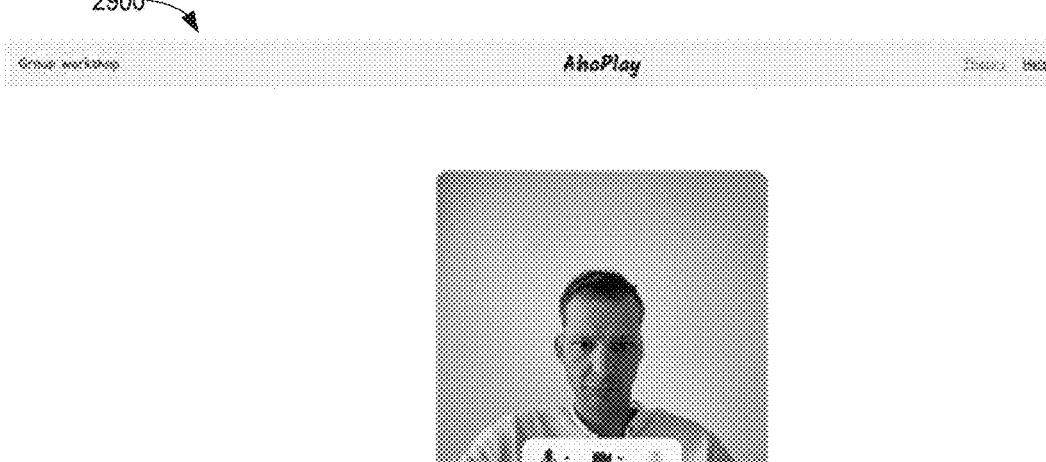
FIG. 29 illustrates a first example user interface for initiating a conversation flow according to the methods and apparatus disclosed herein.

FIG. 29 illustrates a first example user interface 2900 for initiating a conversation flow according to the methods and apparatus disclosed herein.

Figure 30:
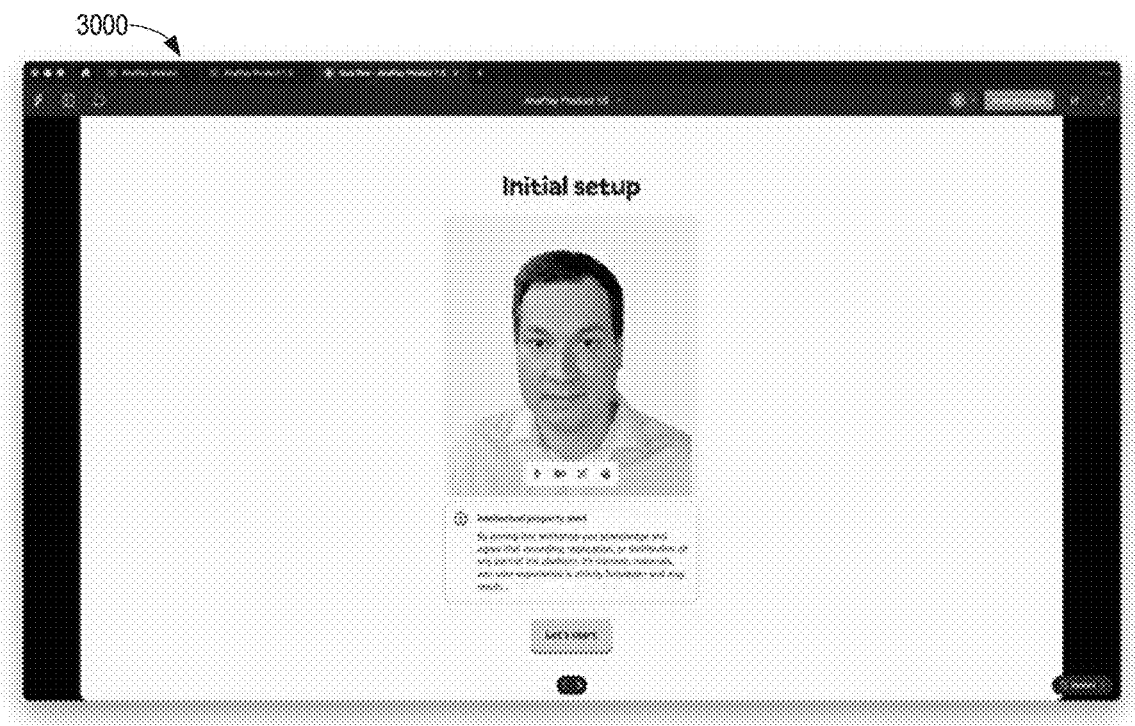
FIG. 30 illustrates a second example user interface for initiating a conversation flow according to the methods and apparatus disclosed herein.

FIG. 30 illustrates a second example user interface 3000 for initiating a conversation flow according to the methods and apparatus disclosed herein. For example, FIGS. 29-30 include a technical setup (solo activity) user interface. For example, the participant is in a technical setup room, where they can configure their camera, microphone and/or any other connection-related settings. Once ready, the participant can select a "Join Workshop" button, resulting in the client circuitry 125 of FIGS. 1-2 sending a request to the server circuitry 145 of FIGS. 1-2. For example, the server circuitry 145 of FIGS. 1-2 updates the conversation state and sends this new state to all the clients, indicating that there is a new participant in the conversation.

Figure 31:
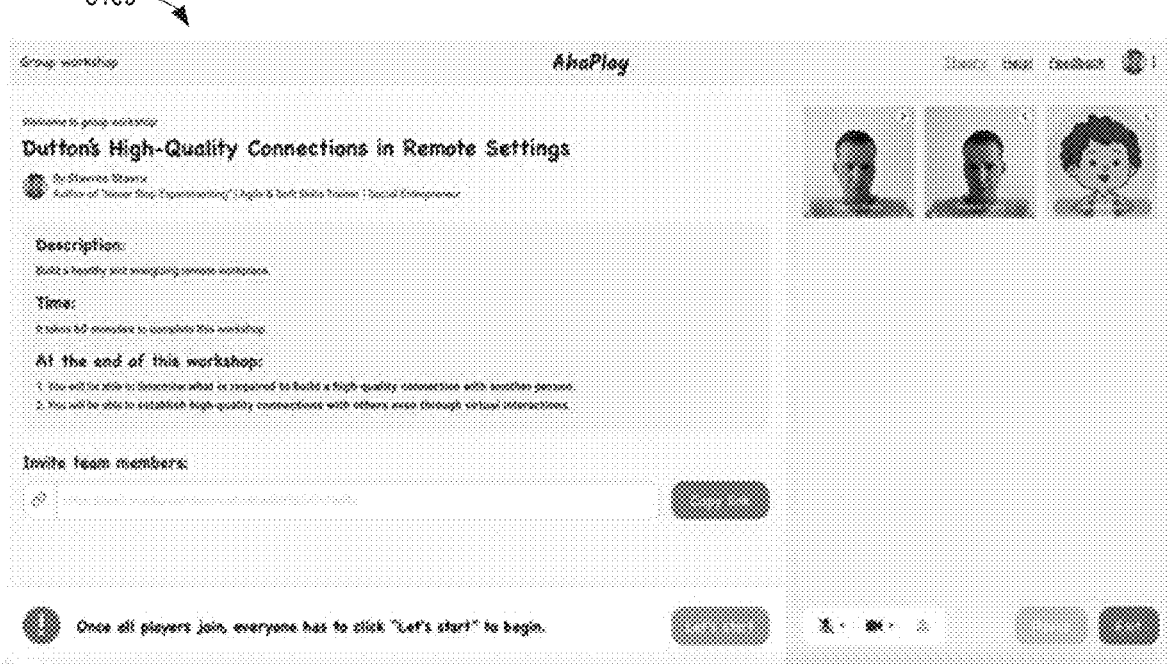
FIG. 31 illustrates an example first user interface showing a waiting room used when starting a conversation (e.g., as part of a group activity).

FIG. 31 illustrates an example first user interface 3100 showing a waiting room used when starting a conversation (e.g., as part of a group activity). In the example of FIG. 31, the participant sees the title of the conversation, conversation author(s), description, timebox, goals, and/or invitation link. In some examples, a right side of the user interface includes a client's integration with a virtual conferencing system, allowing the participants to communicate in real time with each other (e.g., while still having the possibility of switching off the camera, muting the microphone, blurring the background, and/or on any other functionality needed for a positive video conferencing experience). In the example of FIG. 31, a platform facilitator informs the participants that once all players join, participants are to select a "Let's start" icon to begin.

Figure 32:
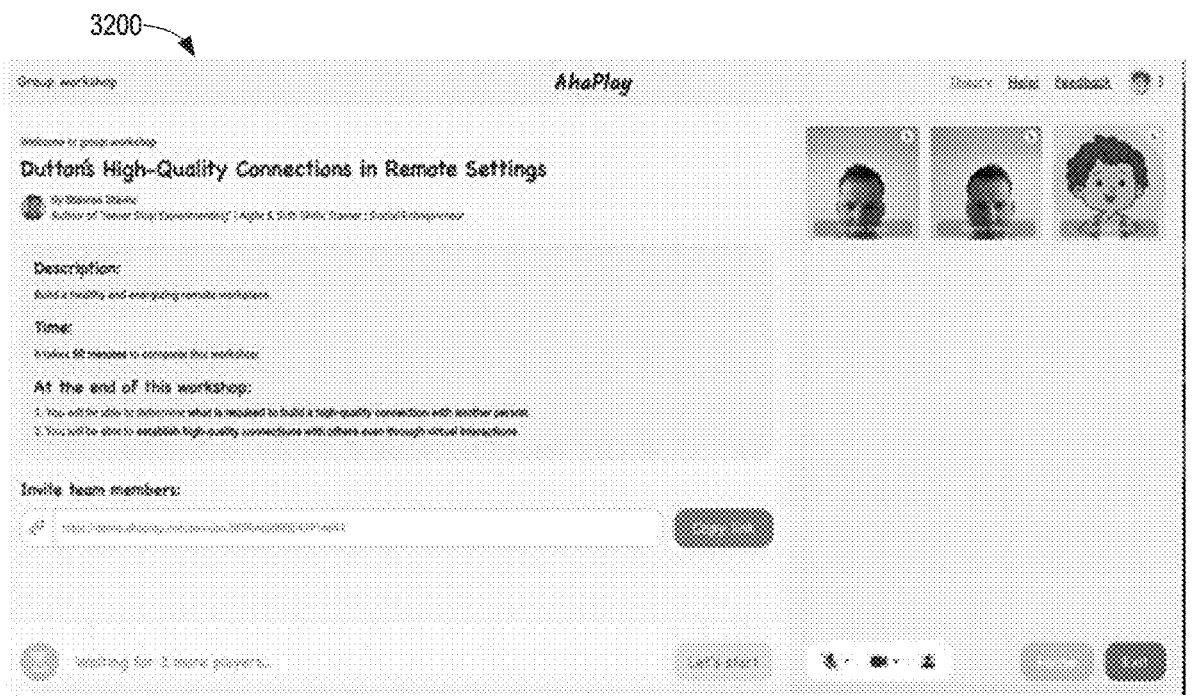
FIG. 32 illustrates an example second user interface showing the waiting room used by participants for starting a conversation.

FIG. 32 illustrates an example second user interface 3200 showing the waiting room used by participants for starting a conversation. In the example of FIG. 32, there are three participants. For example, the activity finishes when all three of the participants give their confirmation by clicking on the "Let's start" icon (e.g., which is an example of a consensus input, triggered when all "Let's start" icons are marked as pressed). For example, once the first participant selects the "Let's start" button, the client circuitry 125 of FIGS. 1-2 sends an event to the server circuitry 145 of FIGS. 1-2 indicating a new user input. The server circuitry 145 of FIGS. 1-2 updates the conversation state and sends the conversation state back to all the clients to update their user interface. FIGS. 32-35 illustrate how the user interface appears from the perspective of the three participants.

Figure 33:
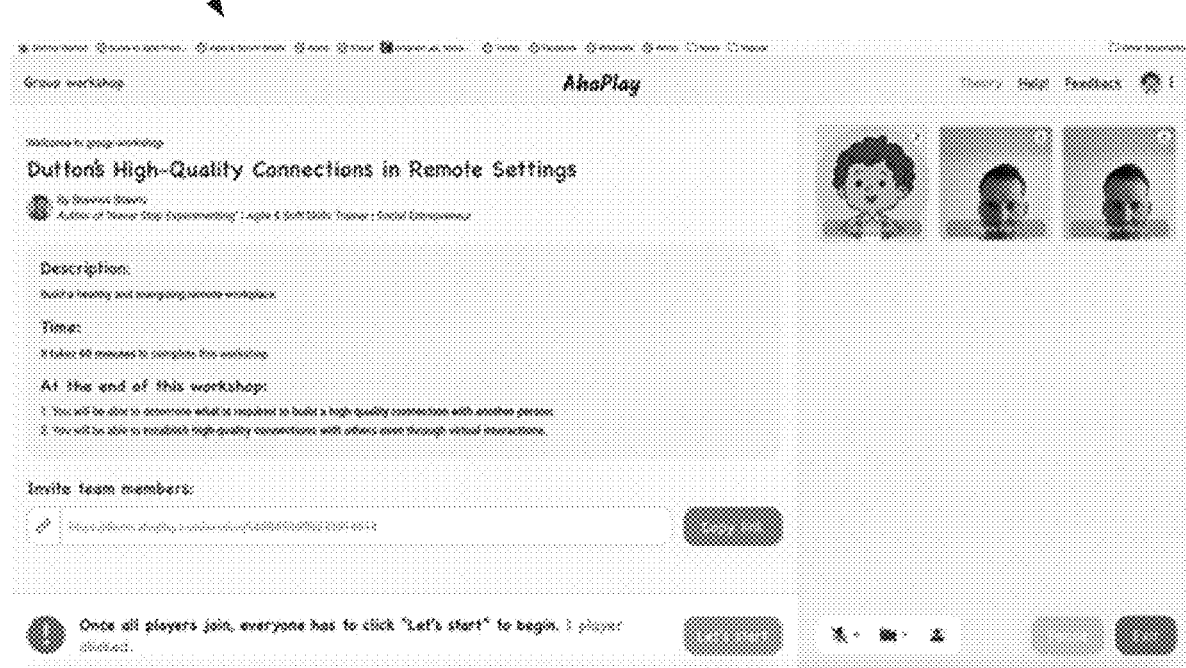
FIG. 33 illustrates an example third user interface showing the waiting room used by participants for starting a conversation.

FIG. 33 illustrates an example third user interface 3300 showing the waiting room used by participants for starting a conversation.

Figure 34:
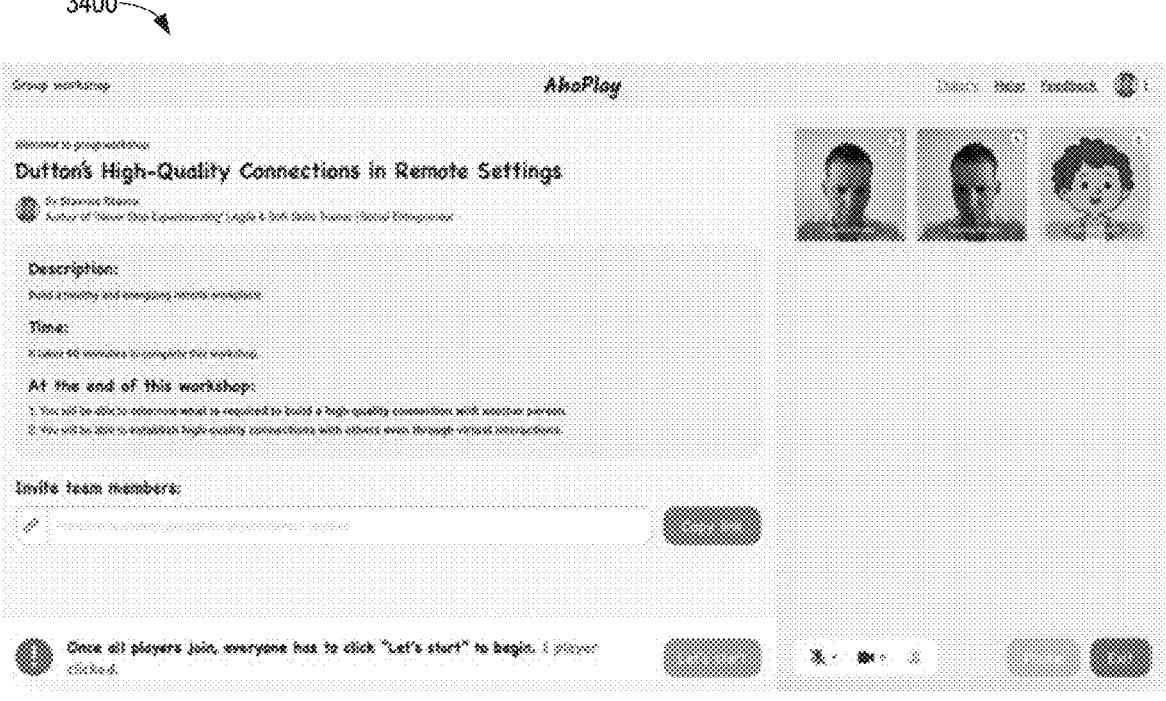
FIG. 34 illustrates an example fourth user interface showing the waiting room used by participants for starting a conversation.

FIG. 34 illustrates an example fourth user interface 3400 showing the waiting room used by participants for starting a conversation.

Figure 35:
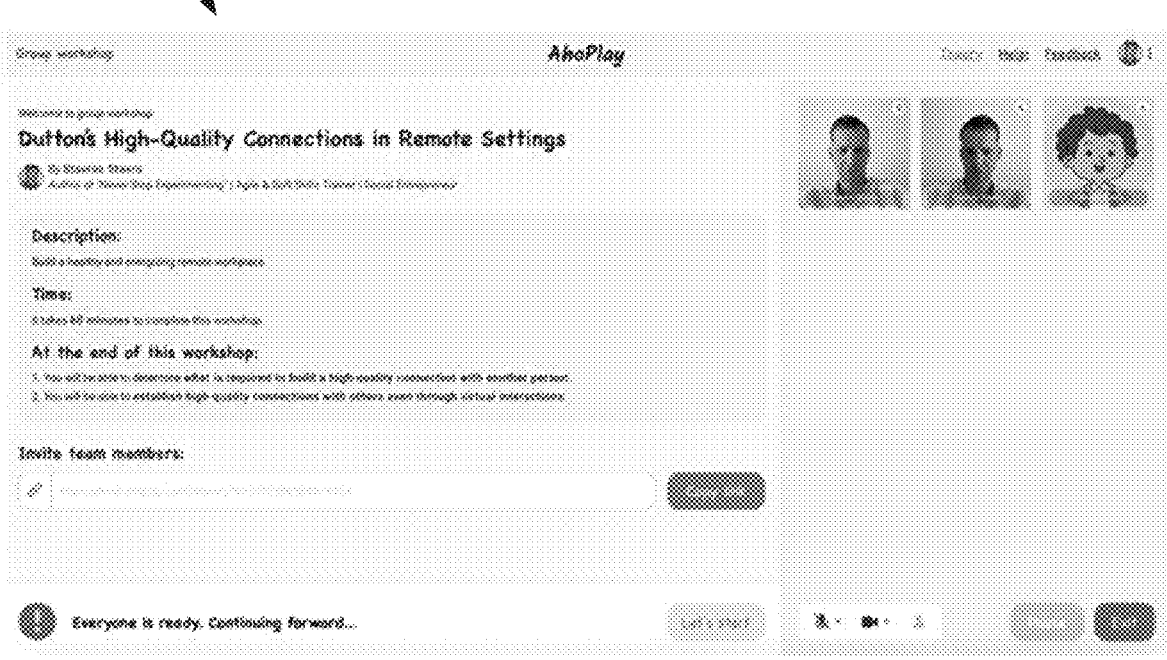
FIG. 35 illustrates an example fifth user interface showing the waiting room used by participants for starting a conversation.

FIG. 35 illustrates an example fifth user interface 3500 showing the waiting room used by participants for starting a conversation. For example, one participant's user interface may be different from the user interface of other participants, as a particular participant has given their confirmation at a time when other participant(s) may not yet have given their confirmation(s). In the example of FIG. 32, participant Gabriela is given the message "Waiting for 2 players", while the remaining participants Stavros and Teodor are given the message "Once all players join, everyone has to click 'Let's start' to begin. 1 player clicked.", as shown in FIGS. 33-34. For example, the server circuitry 145 of FIGS. 1-2 identifies that the conversation is not progressing and is waiting for all confirmations to be given and/or for all participants to reach a consensus to continue with initiating the conversation. In the example of FIG. 35, once participants Stavros and Teodor click on the "Let's start" button, the server circuitry 145 of FIGS. 1-2 updates the conversation state to indicate that there is a confirmation from all participants and a consensus has been reached. In some examples, the server circuitry 145 of FIGS. 1-2 updates the conversation progress, indicating the next activity. Once the new conversation state reaches the clients, a transition is initiated, resulting in the message "Everyone is ready. Continuing forward . . . ", as shown in connection with FIG. 35. As such, FIGS. 32-35 illustrate how the client circuitry 125 of FIGS. 1-2 and/or server circuitry 145 of FIGS. 1-2 use confirmation and consensus to implement the conversational workshop disclosed herein.

Figure 36:
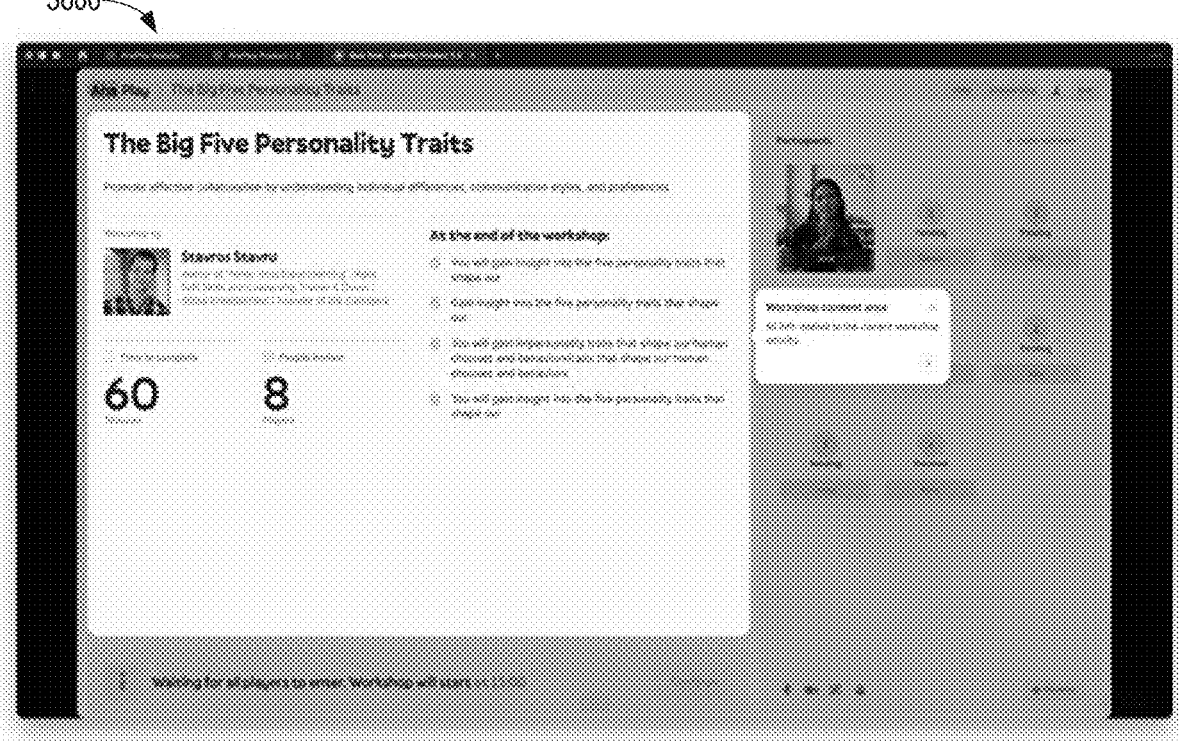
FIG. 36 illustrates a first alternative user interface showing the waiting room used by participants for starting a conversation.

FIG. 36 illustrates a first alternative user interface 3600 showing the waiting room used by participants for starting a conversation. In the example of FIG. 36, the alternative user interface includes a workshop content area describing current workshop activity.

Figure 37:
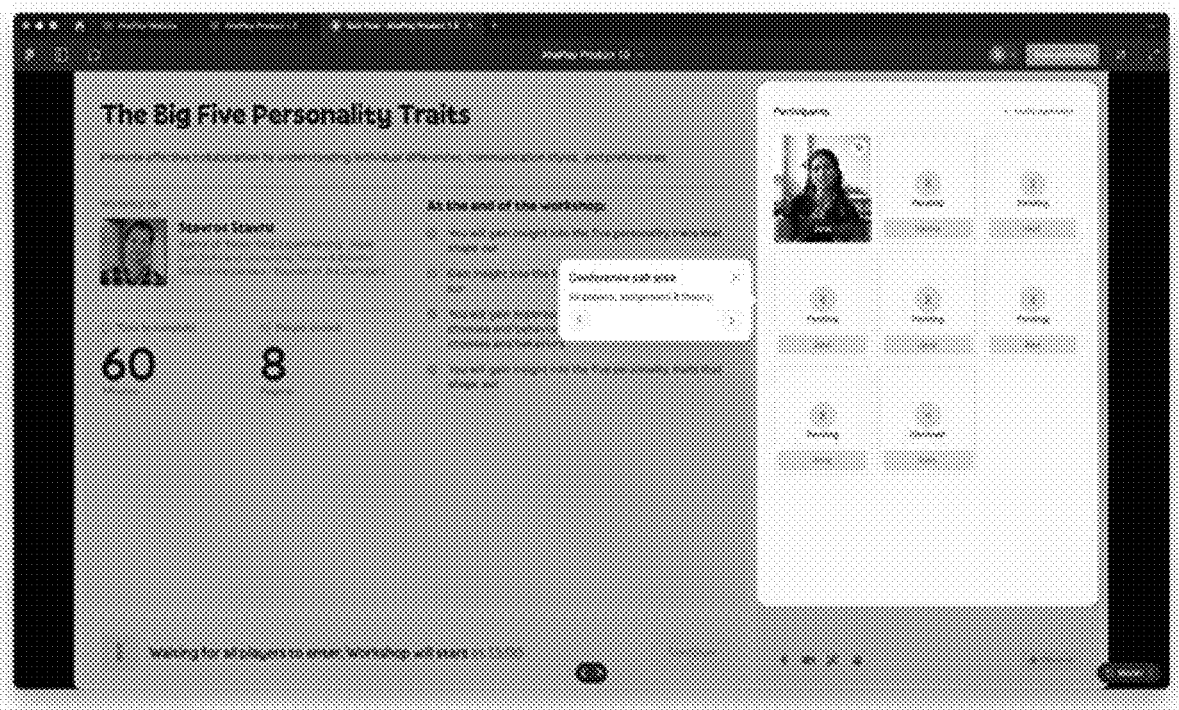
FIG. 37 illustrates a second alternative user interface showing the waiting room used by participants for starting a conversation.

FIG. 37 illustrates a second alternative user interface 3700 showing the waiting room used by participants for starting a conversation. In the example of FIG. 37, the alternative user interface includes a conference call area with all players and/or assignments.

Figure 38:
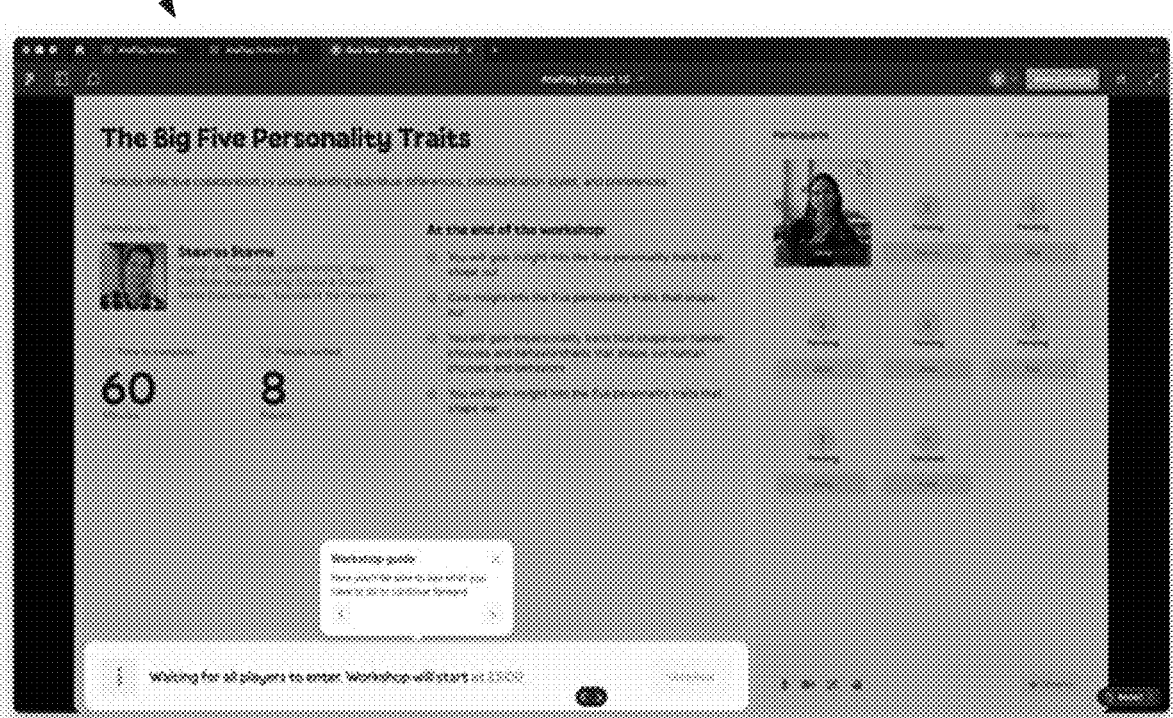
FIG. 38 illustrates a third alternative user interface showing the waiting room used by participants for starting a conversation.

FIG. 38 illustrates a third alternative user interface 3800 showing the waiting room used by participants for starting a conversation. In the example of FIG. 38, the alternative user interface includes a workshop guide showing what the participant needs to do to proceed with the conversation.

Figure 39:
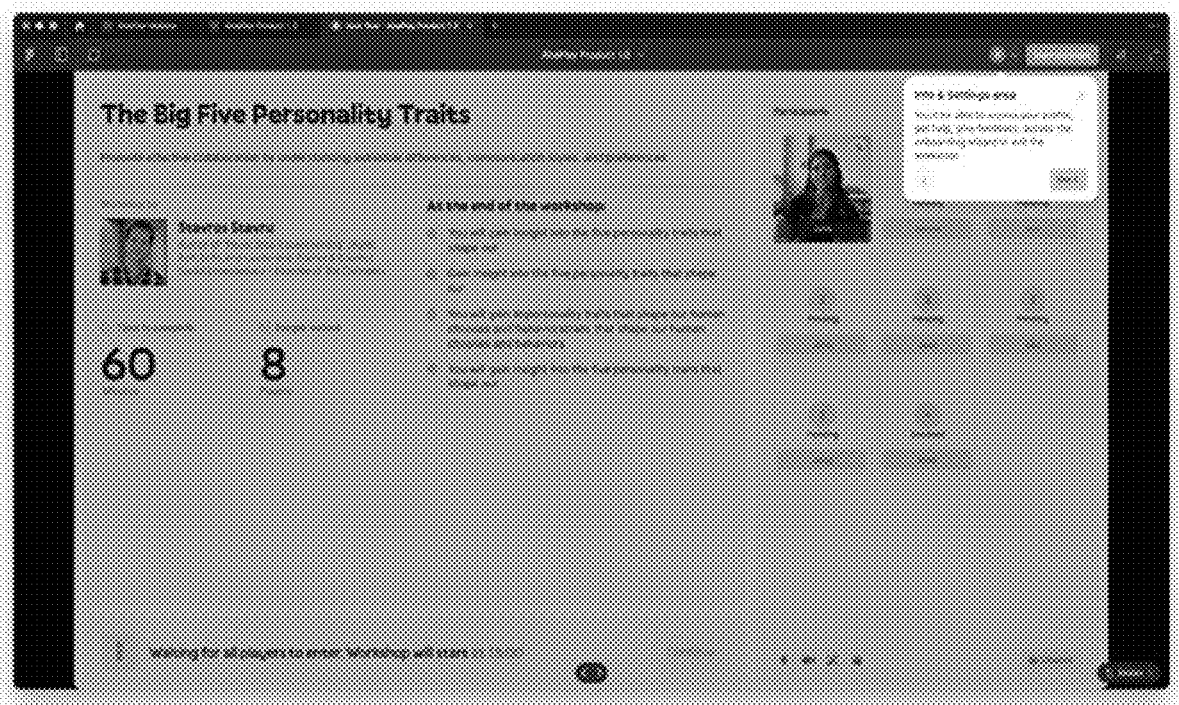
FIG. 39 illustrates a fourth alternative user interface showing the waiting room used by participants for starting a conversation.

FIG. 39 illustrates a fourth alternative user interface 3900 showing the waiting room used by participants for starting a conversation. In the example of FIG. 39, the alternative user interface includes an information and settings area, allowing the participant to access their profile and/or receive feedback.

Figure 40:
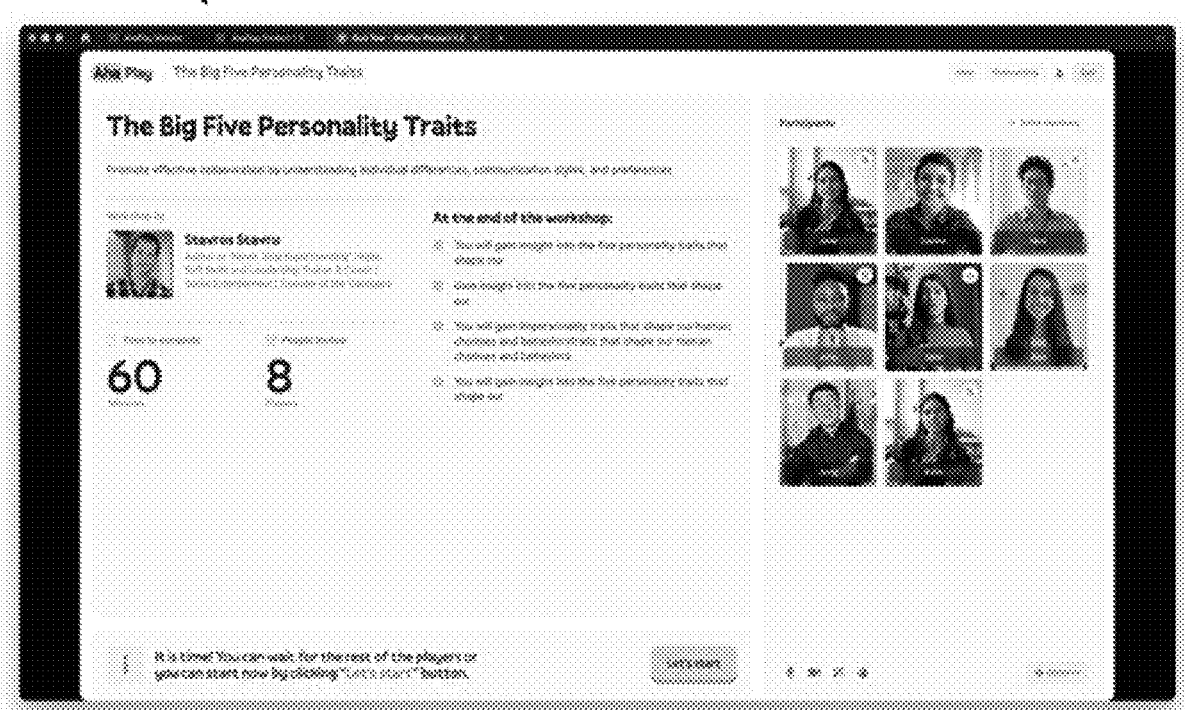
FIG. 40 illustrates a fifth alternative user interface showing the waiting room used by participants for starting a conversation.

FIG. 40 illustrates a fifth alternative user interface 4000 showing the waiting room used by participants for starting a conversation. In the example of FIG. 40, the alternative user interface includes an indication to the participant that the conversation can be started.

Figure 41:
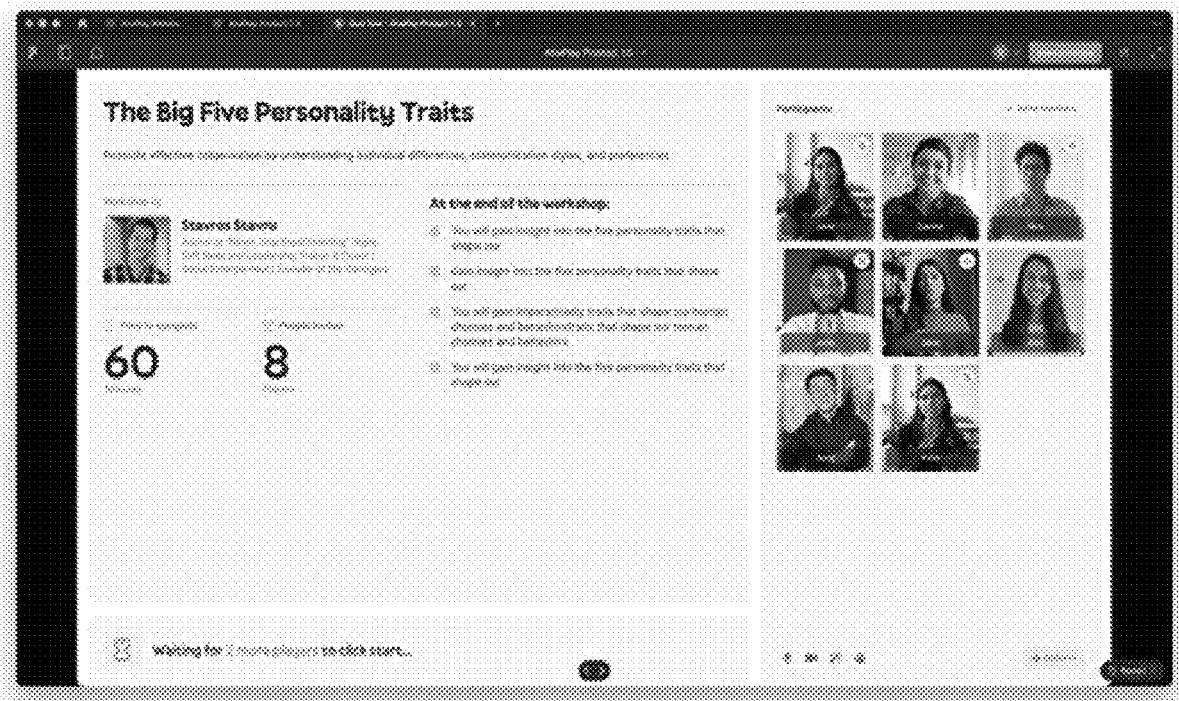
FIG. 41 illustrates a sixth alternative user interface showing the waiting room used by participants for starting a conversation.

FIG. 41 illustrates a sixth alternative user interface 4100 showing the waiting room used by participants for starting a conversation. In the example of FIG. 41, the alternative user interface includes an indication to the participant that there are two additional players that need to start for the conversation to begin.

Figure 42:
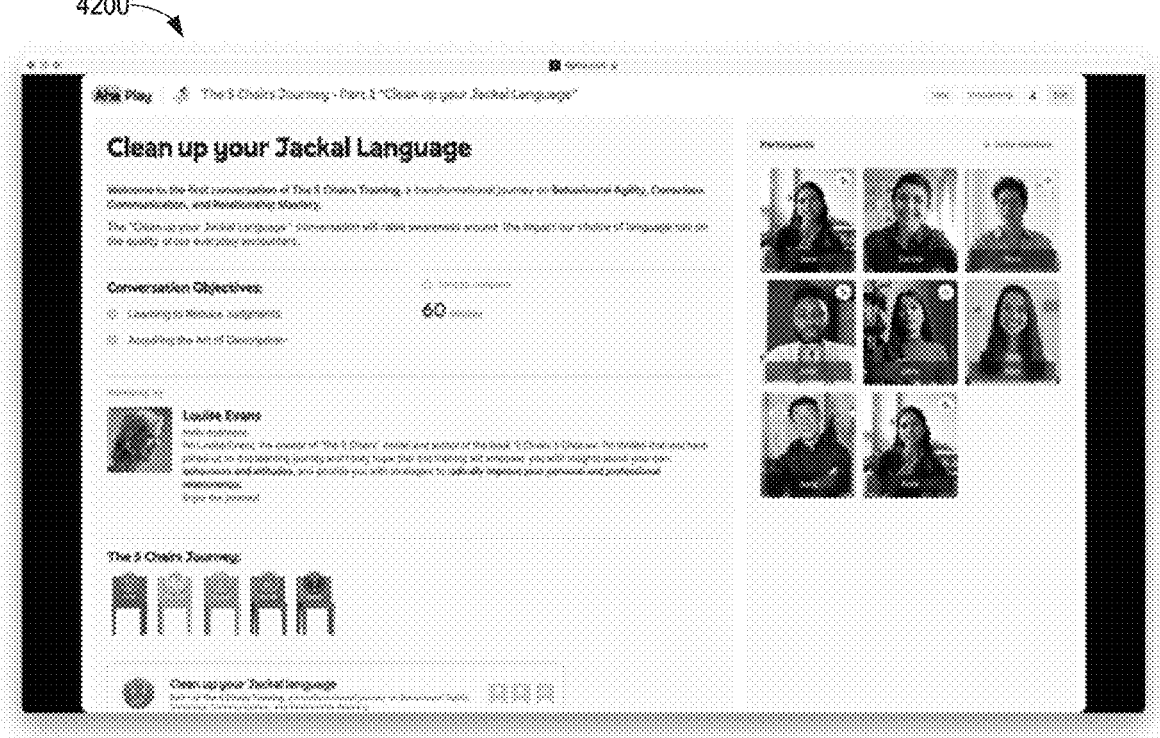
FIG. 42 illustrates an example first user interface of an example conversation, including information about the conversation objectives and presenter.

FIG. 42 illustrates an example first user interface 4200 of an example conversation, including information about the conversation objectives and presenter.

Figure 43:
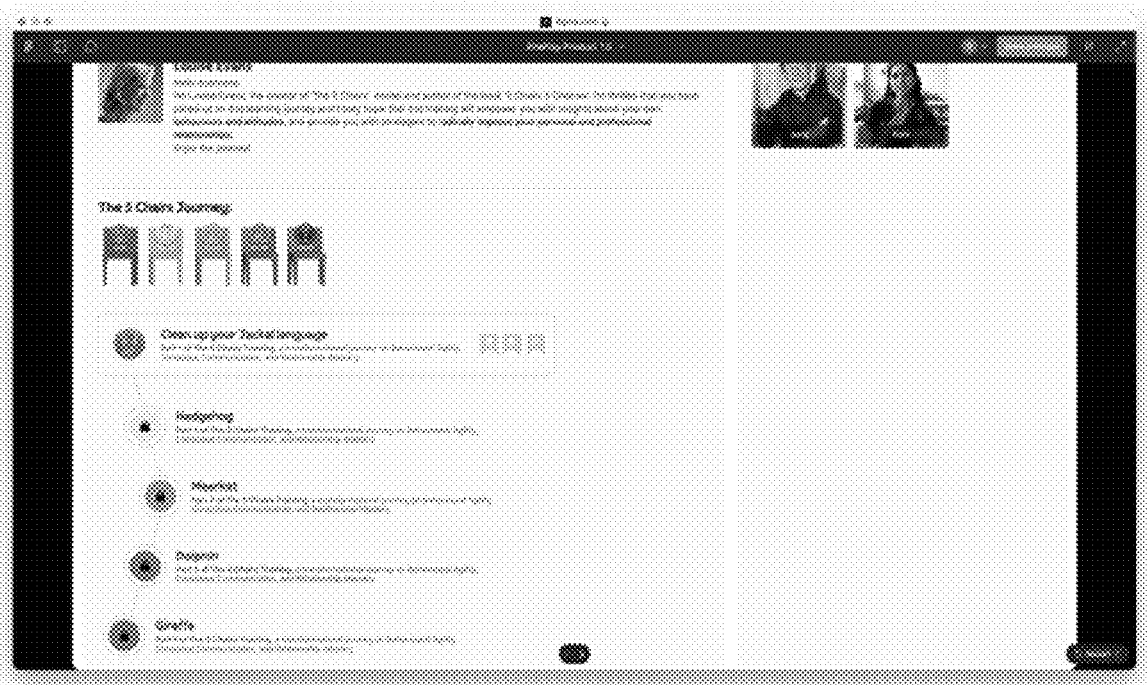
FIG. 43 illustrates an example second user interface of an example conversation, including information about the content of the conversation.

FIG. 43 illustrates an example second user interface 4300 of an example conversation, including information about the content of the conversation.

Figure 44:
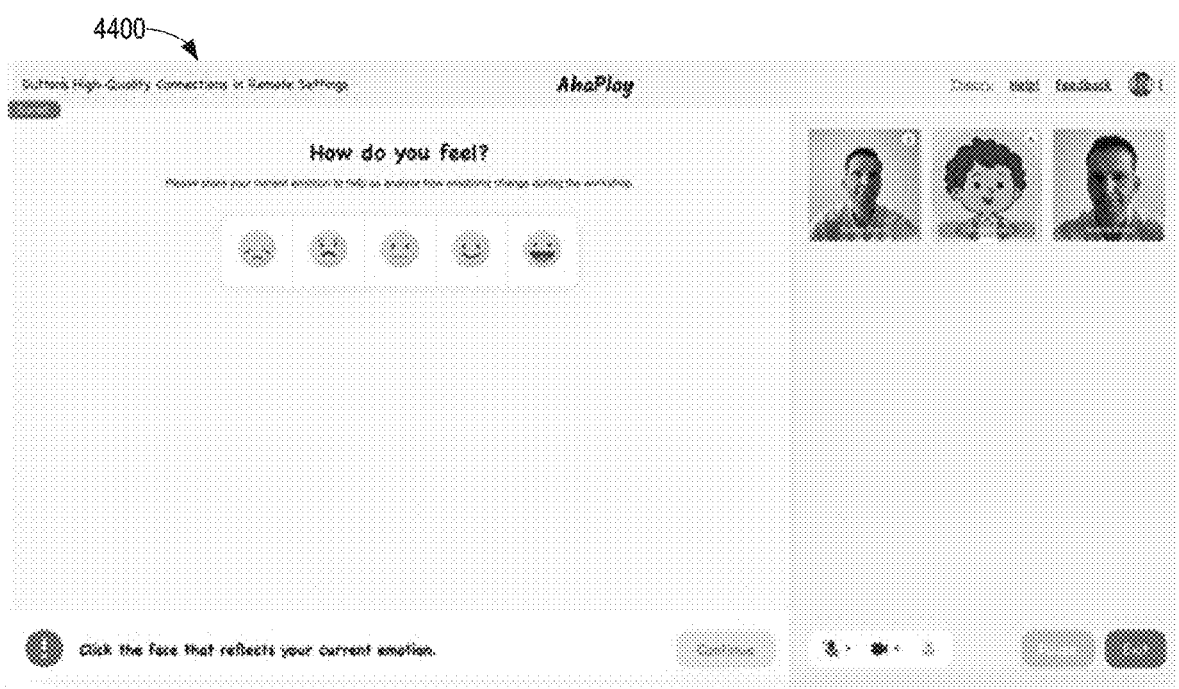
FIG. 44 illustrates an example first user interface associated with a selection of an emotion by the participant(s).

FIG. 44 illustrates an example first user interface 4400 associated with a selection of an emotion by the participant(s). In the example of FIG. 44, the participant is in an emotion room, where they choose how they feel at the beginning of the conversation (e.g., at the beginning of the activity) by selecting the emoticon which represents their emotional state and clicking on the "Continue" icon (e.g., performing a task).

Figure 45:
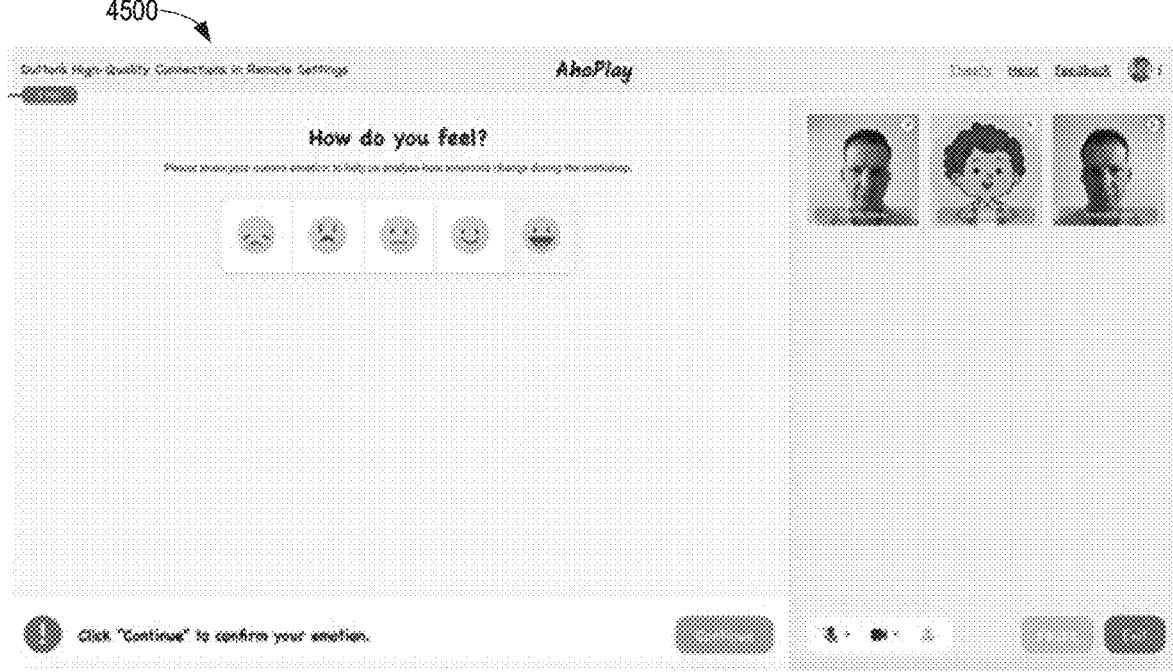
FIG. 45 illustrates an example second user interface associated with a selection of an emotion by the participant(s).

FIG. 45 illustrates an example second user interface 4500 associated with a selection of an emotion by the participant(s). In the example of FIG. 45, a participant has selected an emotion and the "Continue" icon is now active, requiring the participant to give their confirmation.

Figure 46:
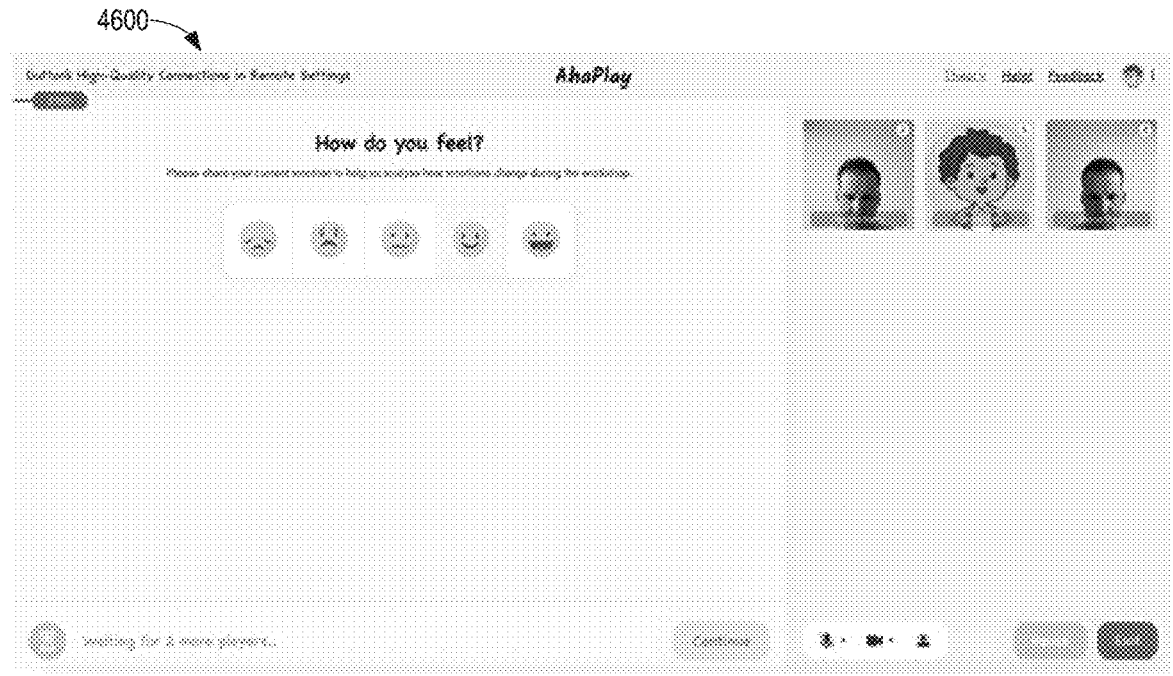
FIG. 46 illustrates an example third user interface associated with a selection of an emotion by the participant(s).

FIG. 46 illustrates an example third user interface 4600 associated with a selection of an emotion by the participant(s). In the example of FIG. 46, when a participant gives his confirmation, the client circuitry 125 of FIGS. 1-2 sends the new user input to the server circuitry 145 of FIGS. 1-2, resulting in an update to the conversation state that is then deployed to all the clients. As a result, the participant sees a notification that reads "Waiting for two more players", while other participants (e.g., Gabriela and Teodor) see notifications that read "Click the face that reflects your current emotion. 1 player clicked.", as shown in connection with FIG. 47 or "Click continue to confirm your emotion. 1 player clicked.", as shown in connection with FIG. 48, depending on whether the participant(s) have selected an emoticon or not.

Figure 47:
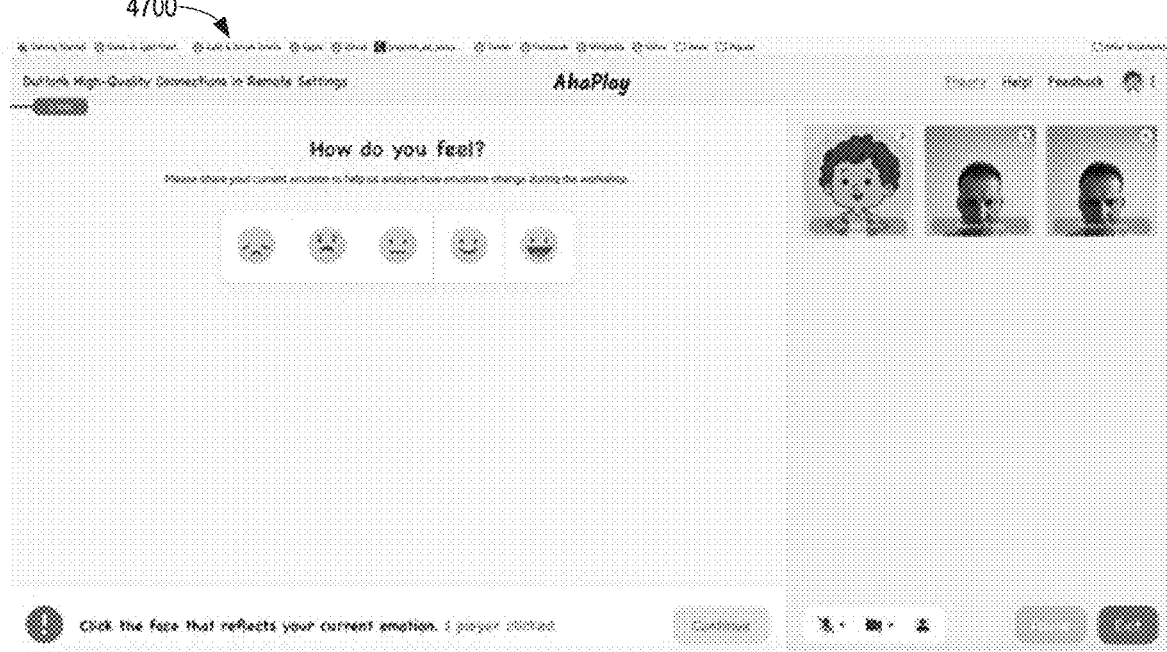
FIG. 47 illustrates an example fourth user interface associated with a selection of an emotion by the participant(s).

FIG. 47 illustrates an example fourth user interface 4700 associated with a selection of an emotion by the participant(s). In the example of FIG. 47, the participant is asked to select an emotion and is informed of the number of selections already made.

Figure 48:
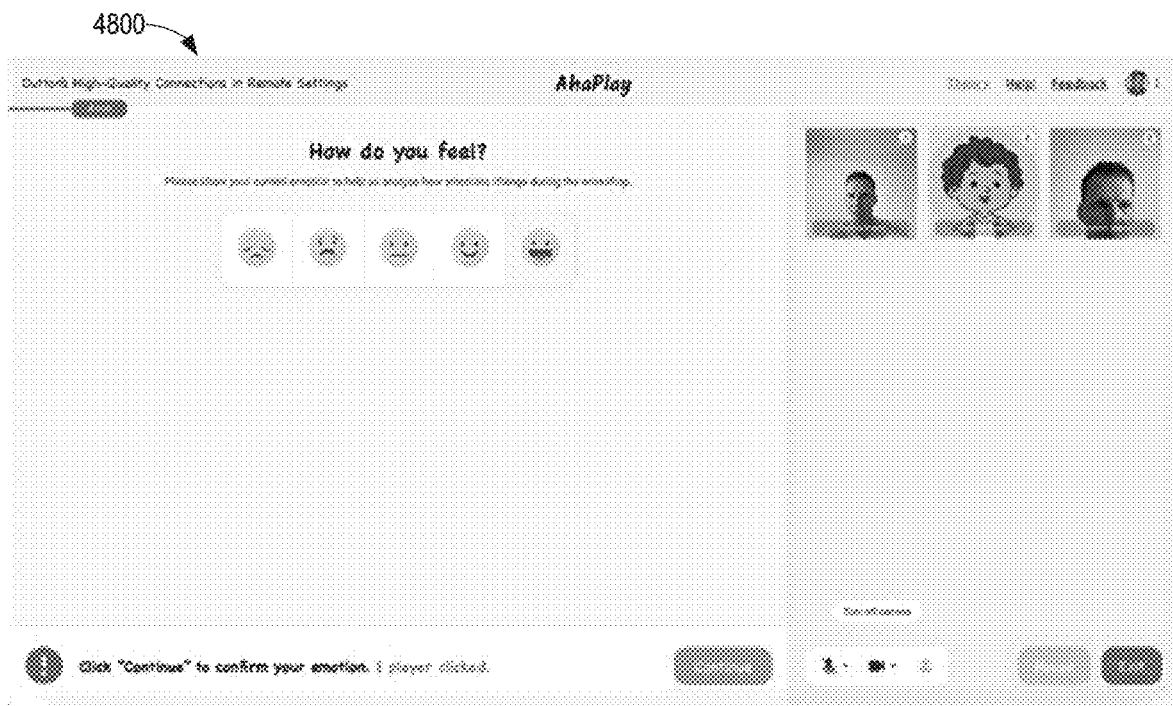
FIG. 48 illustrates an example fifth user interface associated with a selection of an emotion by the participant(s).

FIG. 48 illustrates an example fifth user interface 4800 associated with a selection of an emotion by the participant(s). In the example of FIG. 48, the participant is asked to confirm the selected emotion and indicates the number of selections already made.

Figure 49:
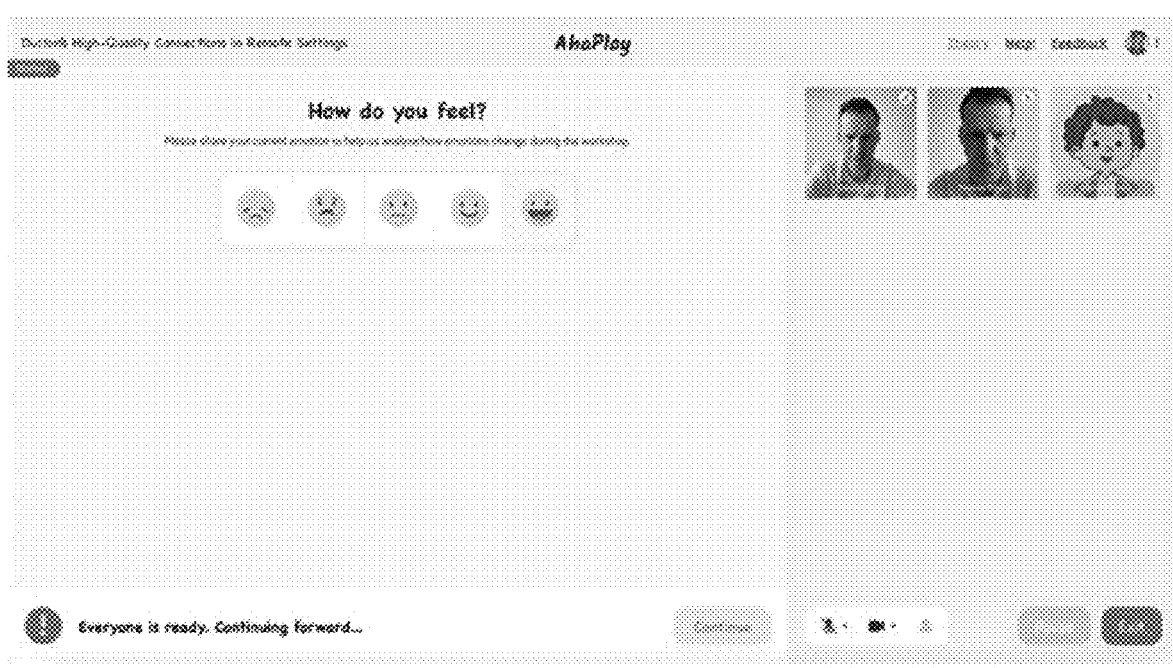
FIG. 49 illustrates an example sixth user interface associated with a selection of an emotion by the participant(s).

FIG. 49 illustrates an example sixth user interface 4900 associated with a selection of an emotion by the participant(s). In the example of FIG. 49, once two partici-pants (e.g., Gabriela and Teodor) select and confirm their current emotion by clicking on the "Continue" icon (e.g., representing the consensus input), the server circuitry 145 of FIGS. 1-2 updates the conversation state to indicate that there is a confirmation received from all participants and consent is reached. This occurs even if each participant might have chosen a different emotion, meaning their choices are not identical (e.g., the task's outcomes are not identical) and there is no consensus. In some examples, the server circuitry 145 of FIGS. 1-2 also updates the conver-sation progress, indicating the next activity. Once the new conversation state reaches the clients, the clients will show a transition (e.g., a message that reads "Everyone is ready. Continuing forward . . . ".).

Figure 50:
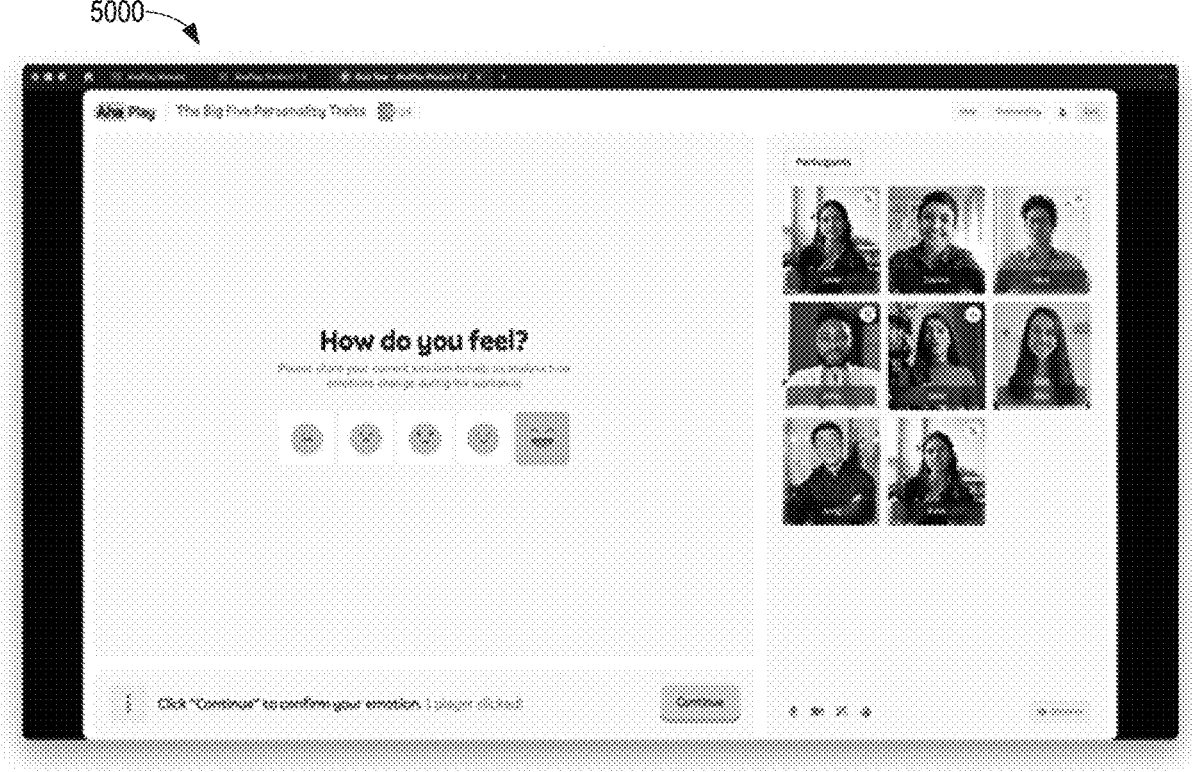
FIG. 50 illustrates a first alternative user interface associated with a selection of an emotion by the participant(s), as shown in connection with FIGS. 44-49.

FIG. 50 illustrates a first alternative user interface 5000 associated with a selection of an emotion by the participant(s), as shown in connection with FIGS. 44-49.

Figure 51:
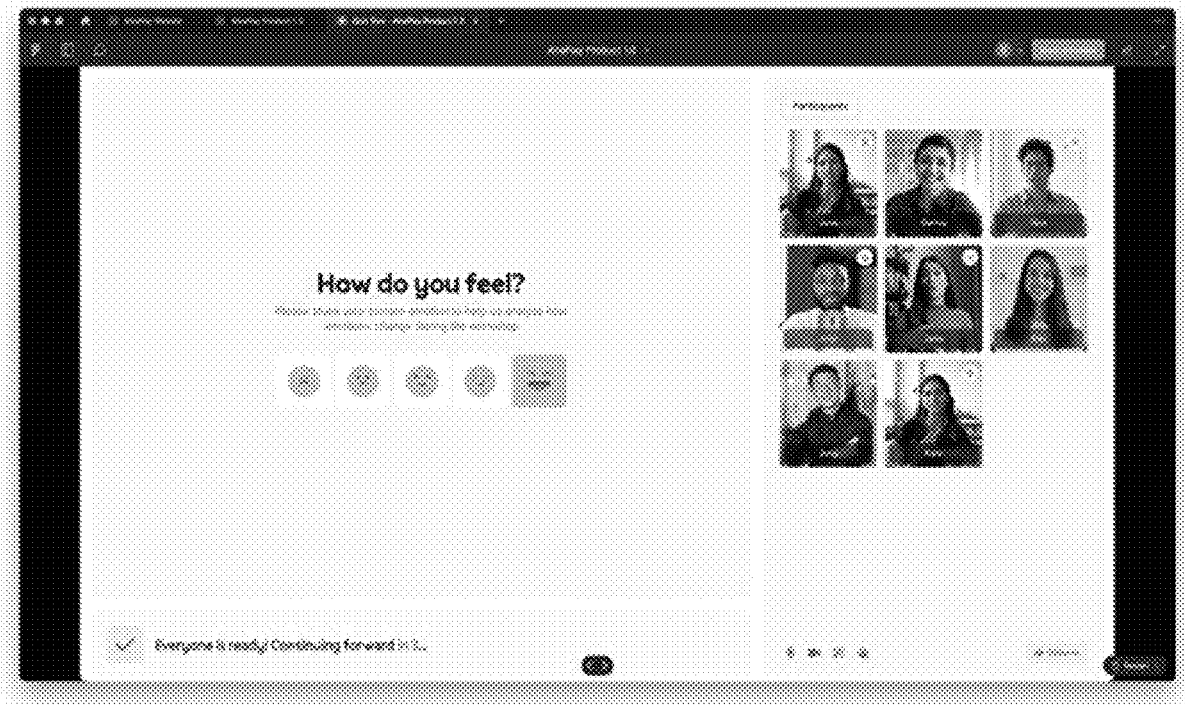
FIG. 51 illustrates a second alternative user interface associated with a selection of an emotion by the participant(s), as shown in connection with FIGS. 44-49.

FIG. 51 illustrates a second alternative user interface 5100 associated with a selection of an emotion by the participant(s), as shown in connection with FIGS. 44-49.

Figure 52:
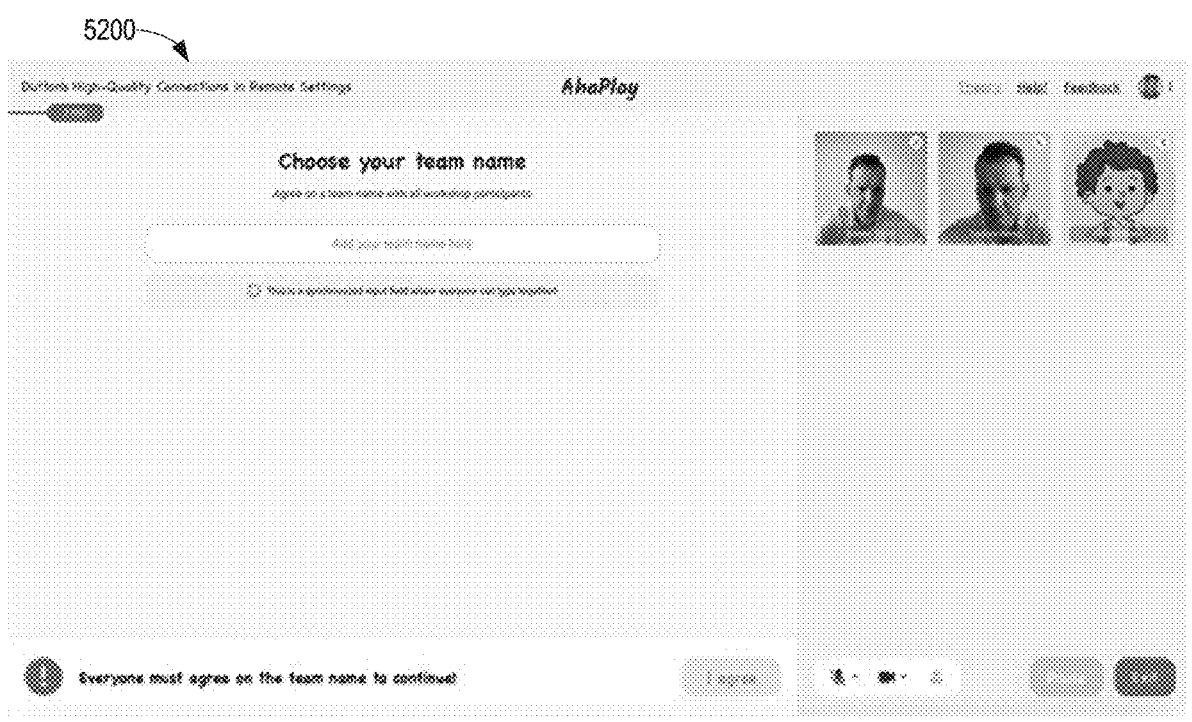
FIG. 52 illustrates an example first user interface associated with defining a team name as part of a team activity.

FIG. 52 illustrates an example first user interface 5200 associated with defining a team name as part of a team activity. In the example of FIG. 52, the participant(s) are in a team name room where they define a team name (e.g., as part of a team activity) by entering a suggestion in a synchronization input and clicking on a consensus input (e.g., an "I agree" icon).

Figure 53:
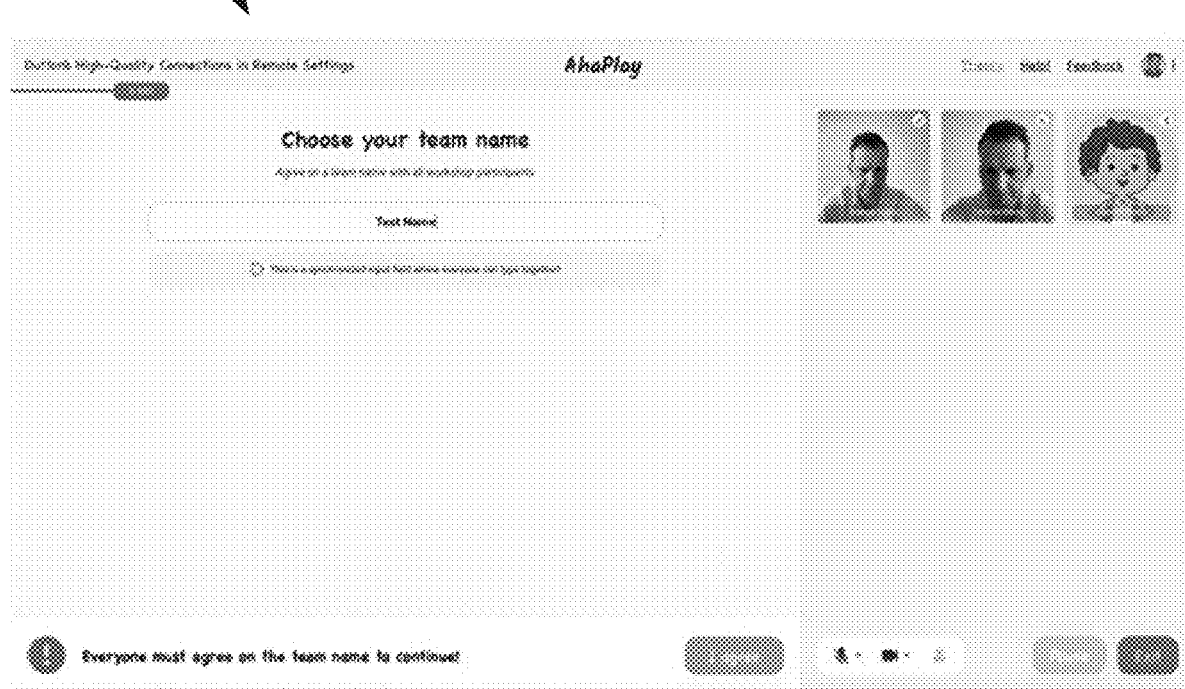
FIG. 53 illustrates an example second user interface associated with defining a team name as part of a team activity.

FIG. 53 illustrates an example second user interface 5300 associated with defining a team name as part of a team activity. In the example of FIG. 53, the user interface is updated when a participant has entered a suggestion into the synchronization input. For example, the participant's input for the team name is simultaneously presented to all clients and all participants are invited to click the "I agree" button if they agree with the suggested team name.

Figure 54:
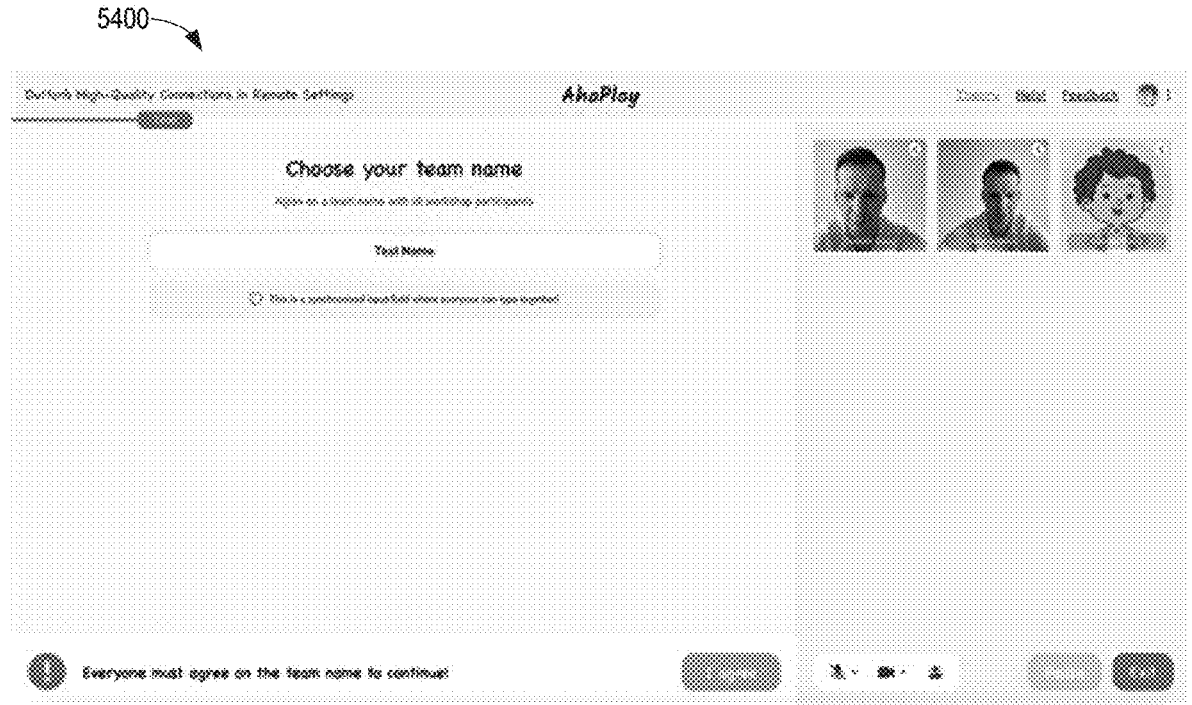
FIG. 54 illustrates an example third user interface associated with defining a team name as part of a team activity, including a prompt to participants that everyone agree on the team name to continue.

FIG. 54 illustrates an example third user interface 5400 associated with defining a team name as part of a team activity, including a prompt to participants that everyone is to agree on the team name to continue.

Figure 55:
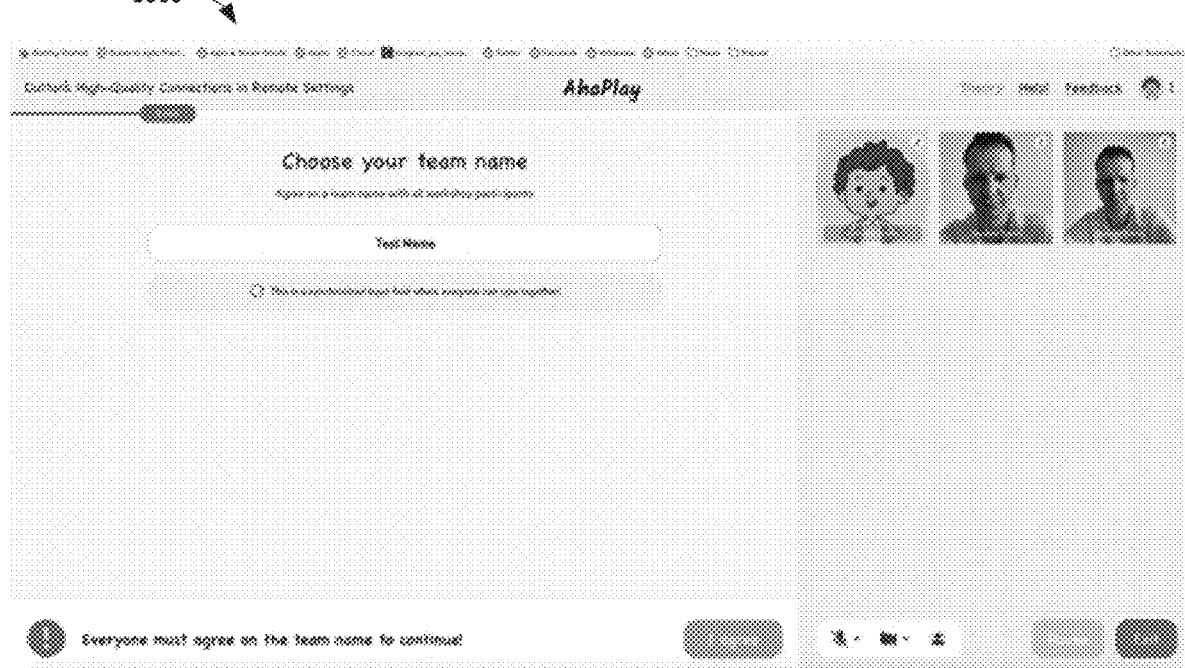
FIG. 55 illustrates an example fourth user interface associated with defining a team name as part of a team activity.

FIG. 55 illustrates an example fourth user interface 5500 associated with defining a team name as part of a team activity.

Figure 56:
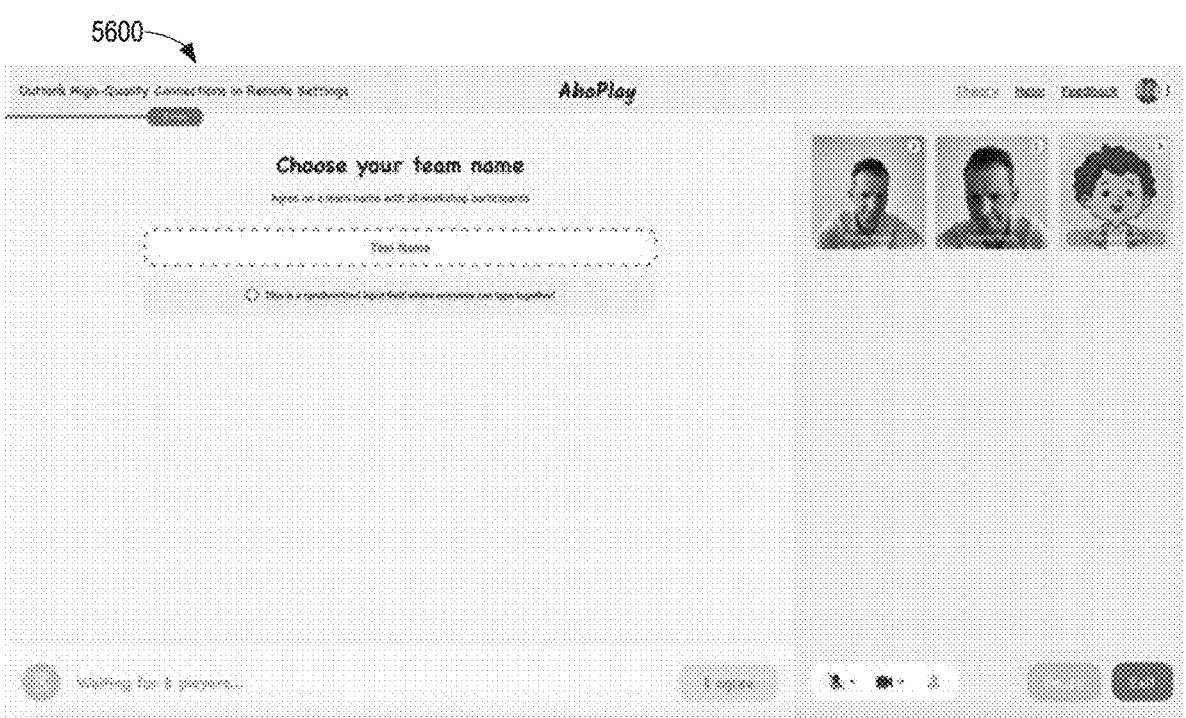
FIG. 56 illustrates an example fifth user interface associated with defining a team name as part of a team activity.

FIG. 56 illustrates an example fifth user interface 5600 associated with defining a team name as part of a team activity. In the example of FIG. 56, the client circuitry 125 of FIGS. 1-2 associated with the client of one participant (e.g., Stavros) sends to the server circuitry 145 of FIGS. 1-2 a new value in the synchronization input (e.g., a text field). In some examples, the server circuitry 145 of FIGS. 1-2 updates the conversation state to reflect the newly suggested team name. In some examples, the server circuitry 145 of FIGS. 1-2 sends the state associated with the conversation to all clients (e.g., thus also updating the user interfaces of participants Gabriela and Teodor). In case more participants simultaneously change the value of the synchronization input, the server circuitry 145 of FIGS. 1-2 determines how to handle these conditions (e.g., using a fire-in, first-out (FIFO) strategy, etc.). For example, if a participant clicks on the consensus input (e.g., the "I agree" icon), the client circuitry 125 of FIGS. 1-2 sends his confirmation to the server circuitry 145 of FIGS. 1-2, such that the server circuitry 145 of FIGS. 1-2 again updates the conversation state and sends the state back to the clients (e.g., using the client circuitry 125 of FIGS. 1-2).

Figure 57:
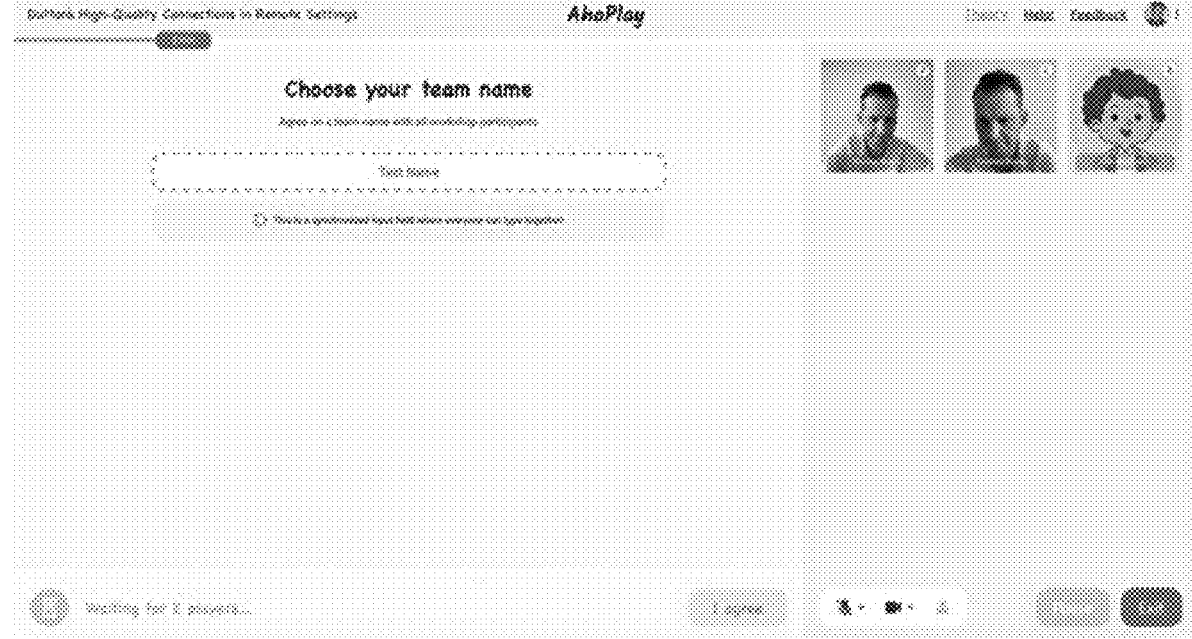
FIG. 57 illustrates an example sixth user interface associated with defining a team name as part of a team activity.

FIG. 57 illustrates an example sixth user interface 5700 associated with defining a team name as part of a team activity.

Figure 58:
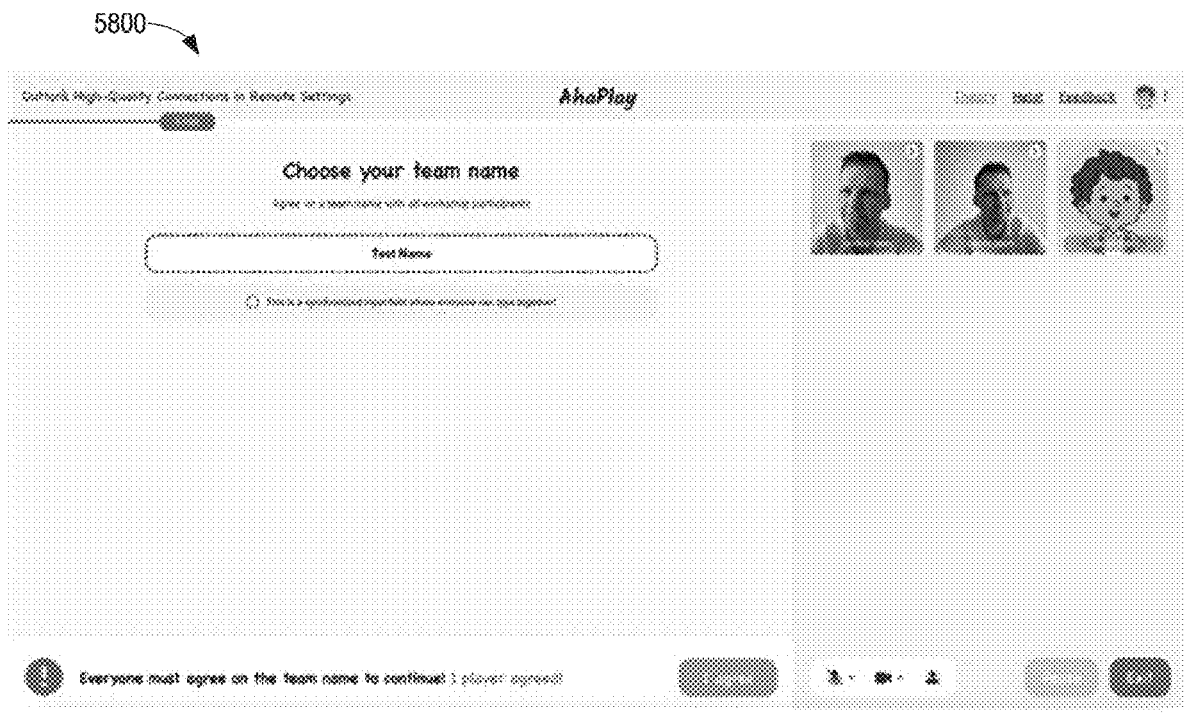
FIG. 58 illustrates an example seventh user interface associated with defining a team name as part of a team activity.

FIG. 58 illustrates an example seventh user interface 5800 associated with defining a team name as part of a team activity.

Figure 59:
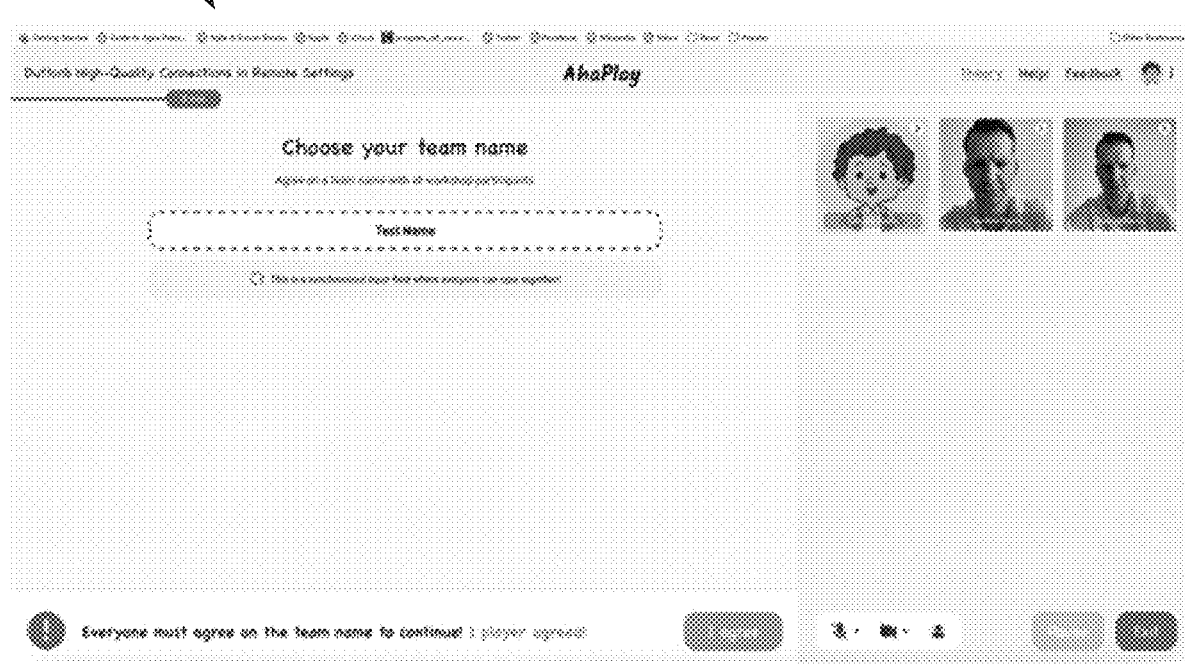
FIG. 59 illustrates an example eighth user interface associated with defining a team name as part of a team activity.

FIG. 59 illustrates an example eight user interface 5900 associated with defining a team name as part of a team activity.

Figure 60:
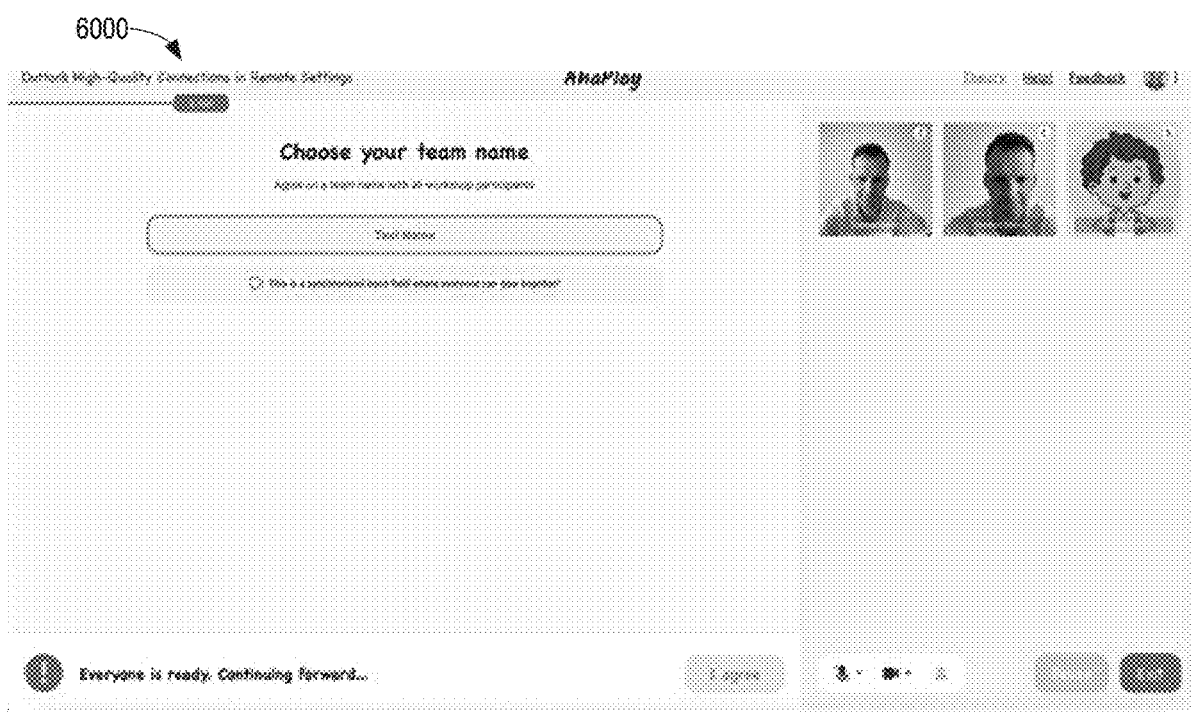
FIG. 60 illustrates an example ninth user interface associated with defining a team name as part of a team activity.

FIG. 60 illustrates an example ninth user interface 6000 associated with defining a team name as part of a team activity. For example, one of the participants (e.g., Stavros) can see a notification such as "Waiting for two players.", while the remaining participants (e.g., Gabriela and Teodor) see a notification such as "Everyone must agree on the team name to continue. 1 player clicked.", thus requesting par-ticipants to reach consensus. For example, when all partici-pants select the "I agree" button, the server circuitry 145 of FIGS. 1-2 updates the conversation state to indicate that there is a confirmation from all participants and consensus is reached. In some examples, the server circuitry 145 of FIGS. 1-2 updates the conversation progress, indicating the next activity. Once the new conversation state reaches the clients, the clients display a transition (e.g., "Everyone is ready. Continuing forward . . . ").

Figure 61:
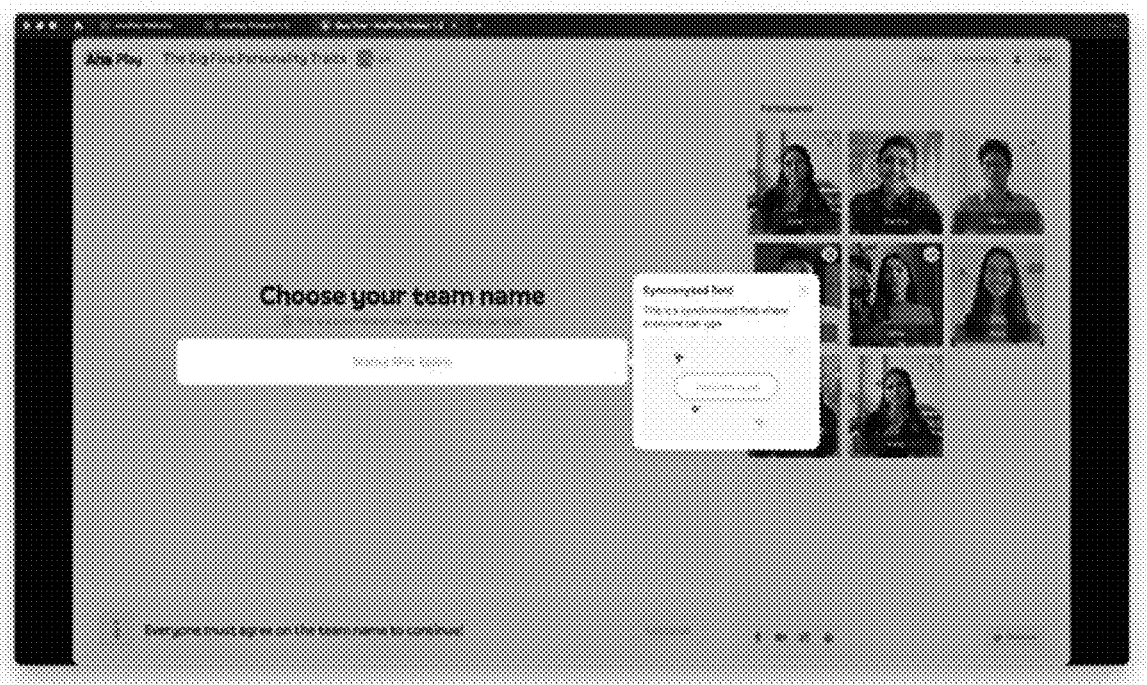
FIG. 61 illustrates an alternative first user interface associated with defining a team name as part of a team activity.

FIG. 61 illustrates an alternative first user interface 6100 associated with defining a team name as part of a team activity. In the example of FIG. 61, a synchronized field is shown where participants can enter text (e.g., a team name).

Figure 62:
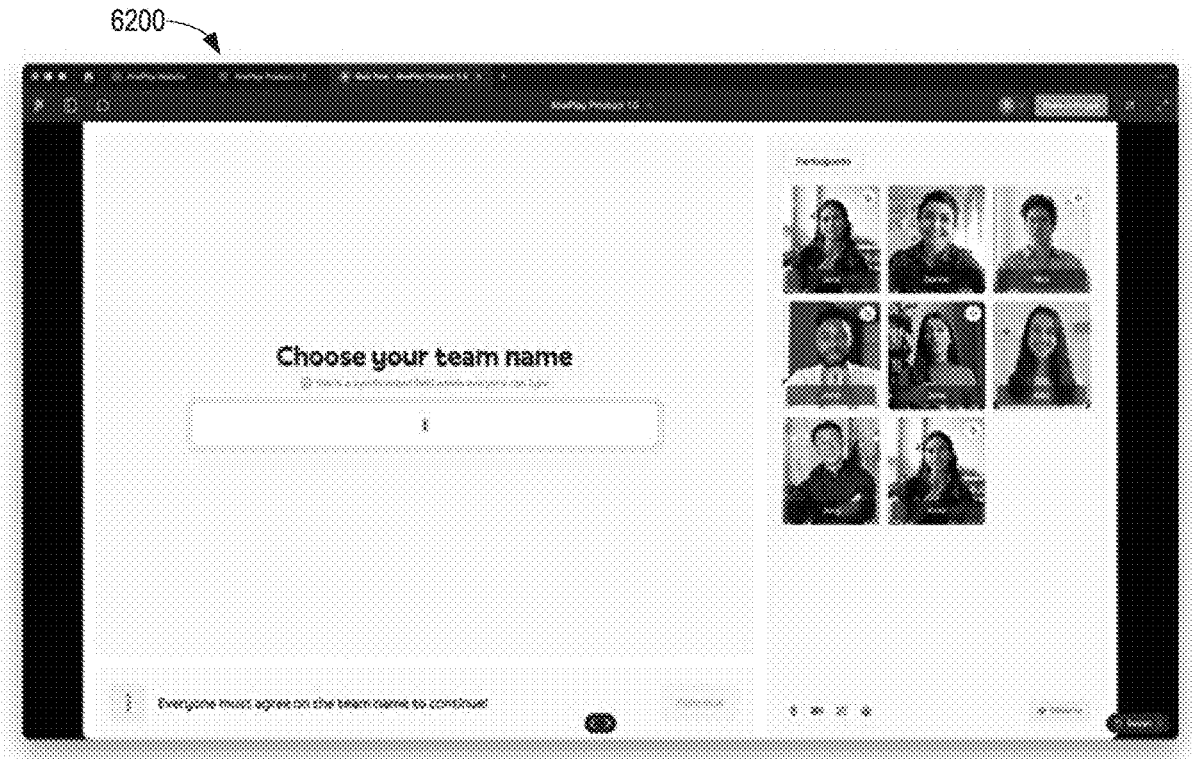
FIG. 62 illustrates an alternative second user interface associated with defining a team name as part of a team activity.

FIG. 62 illustrates an alternative second user interface 6200 associated with defining a team name as part of a team activity. In the example of FIG. 62, a prompt is given to the participant indicating that everyone is to agree on the team name to continue.

Figure 63:
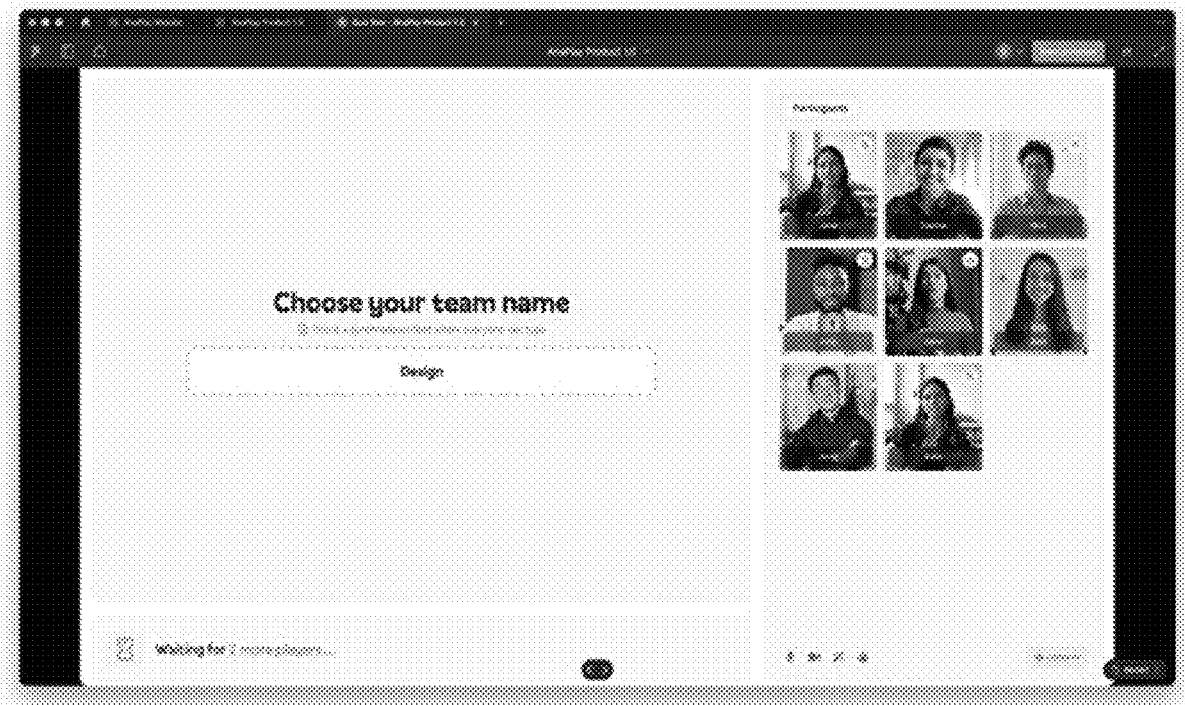
FIG. 63 illustrates an alternative third user interface associated with defining a team name as part of a team activity.

FIG. 63 illustrates an alternative third user interface 6300 associated with defining a team name as part of a team activity. In the example of FIG. 63, a prompt is given to the participant indicating that two more players need to agree on the team name to continue.

Figure 64:
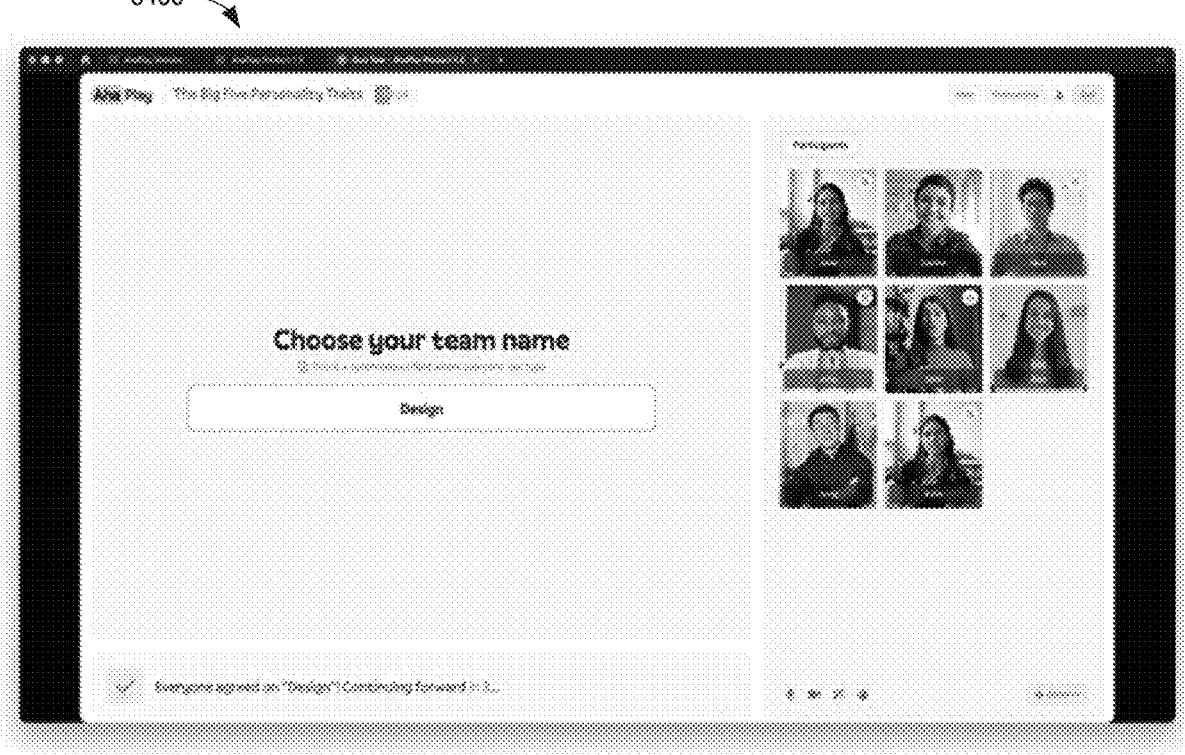
FIG. 64 illustrates an alternative fourth user interface associated with defining a team name as part of a team activity.

FIG. 64 illustrates an alternative fourth user interface 6400 associated with defining a team name as part of a team activity. In the example of FIG. 64, a prompt is given to the participant indicating that all participants have agreed on the team name.

Figure 65:
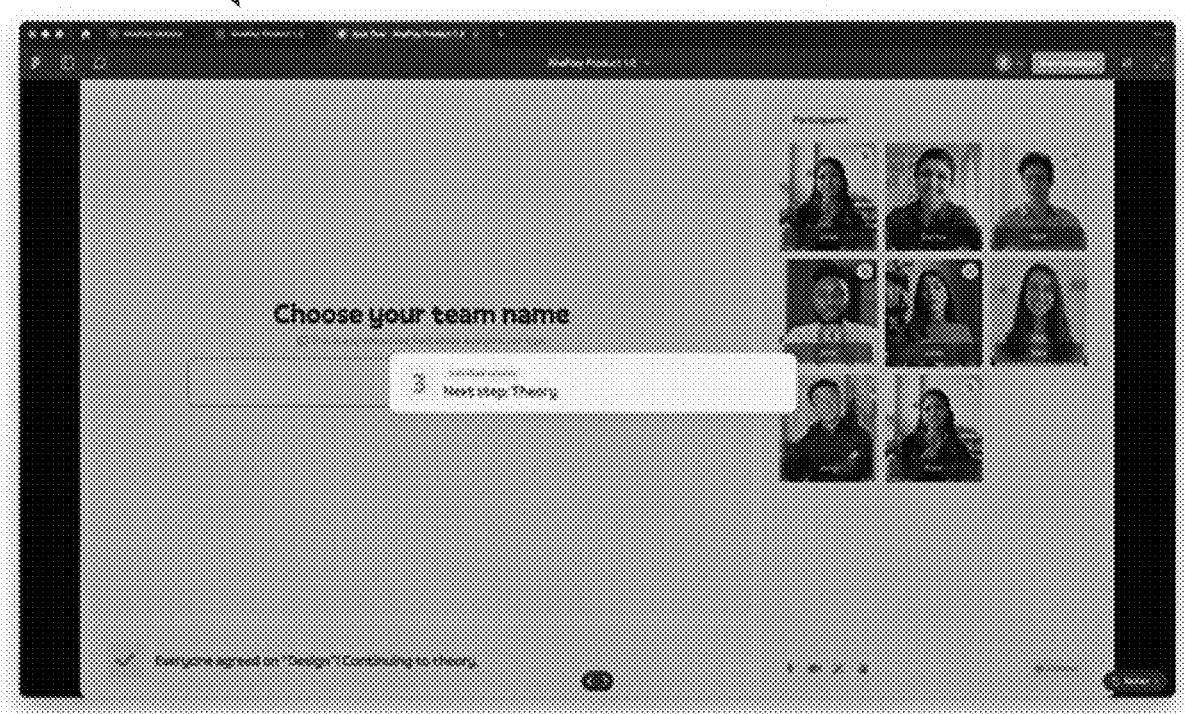
FIG. 65 illustrates a first user interface associated with transitioning into a team activity.

FIG. 65 illustrates a first user interface 6500 associated with transitioning into a team activity. In the example of FIG. 65, a modal dialog at the center of the screen indicates the transition and provides information on the next activity, including the activity type (e.g., solo, group, or team).

Figures 66, 67:
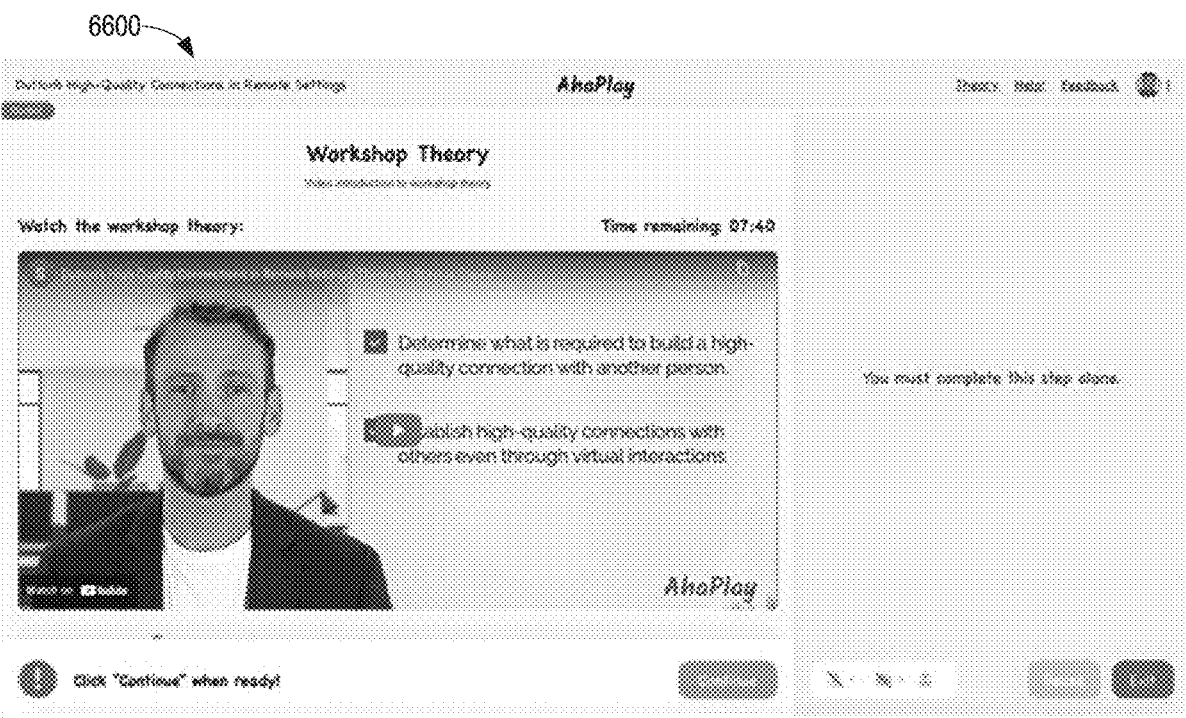
FIG. 66 illustrates a second user interface associated with transitioning into a team activity.
FIG. 67 illustrates a third user interface associated with transitioning into a team activity.

FIG. 66 illustrates a second user interface 6600 associated with transitioning into a team activity. In the example of FIG. 66, the participant is alone in a personal information room. For example, the activity is for the participant to familiarize themselves with the theory of the conversation, while the tasks might be associated with watching a video or reviewing a text.

FIG. 67 illustrates a third user interface 6700 associated with transitioning into a team activity. In the example of FIG. 67, the participant is in an individual room where he has no access to the rest of the participants. For example, on the right side of the user interface there is a message for the participant (e.g., "You must complete this step alone."). For example, when the participant is ready to proceed with the activity, the participant selects the "Continue" icon (e.g., provide a consensus input) to confirm the action.

Figure 68:
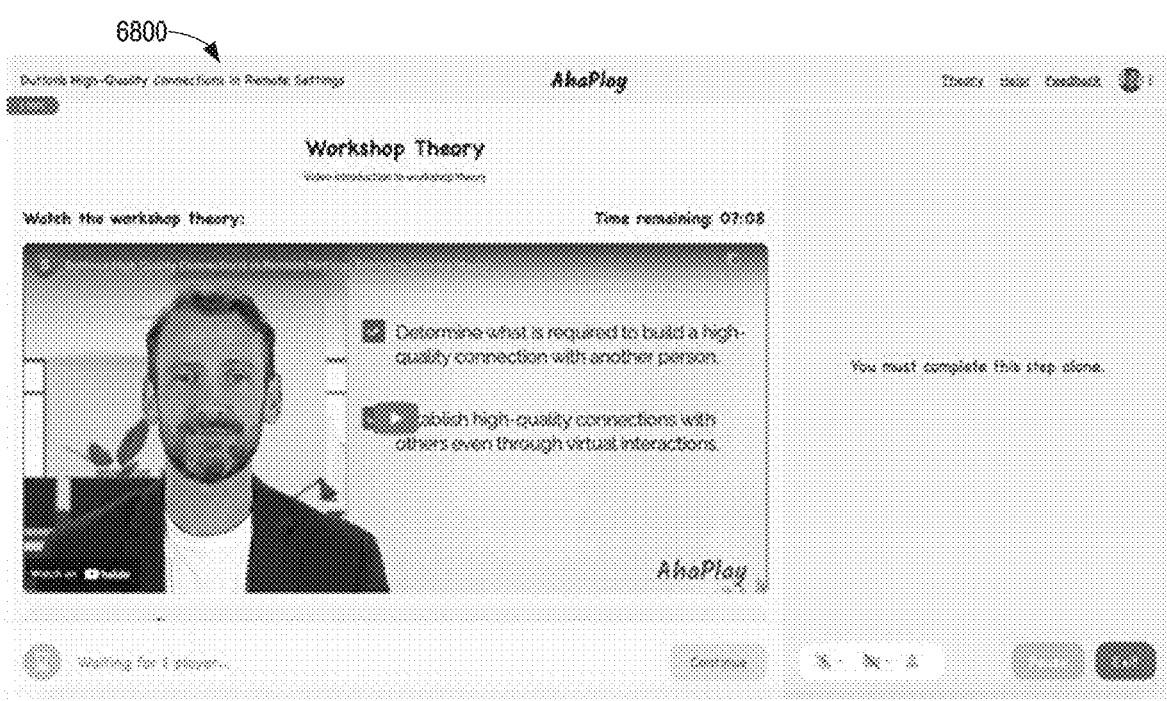
FIG. 68 illustrates a fourth user interface associated with transitioning into a team activity.
Figure 69:
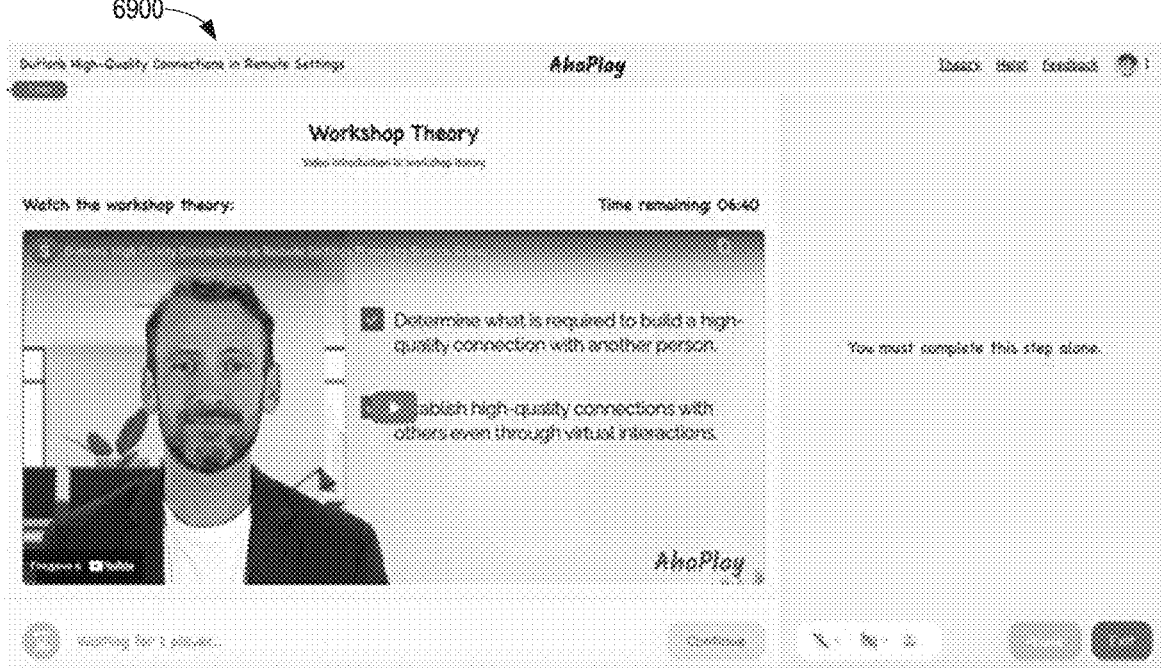
FIG. 69 illustrates a fifth user interface associated with transitioning into a team activity.

FIG. 68 illustrates a fourth user interface 6800 associated with transitioning into a team activity. In the example of FIG. 68, the client circuitry 125 of FIGS. 1-2 sends user input to the server circuitry 145 of FIGS. 1-2, and the server circuitry 145 sends back a new, updated conversation state, indicating how many confirmations have been received. In the example of FIGS. 68-69, the user interface includes a message stating "Waiting for N players . . . " that is shown if the participant has already selected "Continue". In some examples, a message displays "Click 'Continue' when ready. 2 players clicked." if the participant has not yet selected "Continue", as shown in connection with FIG. 70.

FIG. 69 illustrates a fifth user interface 6900 associated with transitioning into a team activity.

Figure 70:
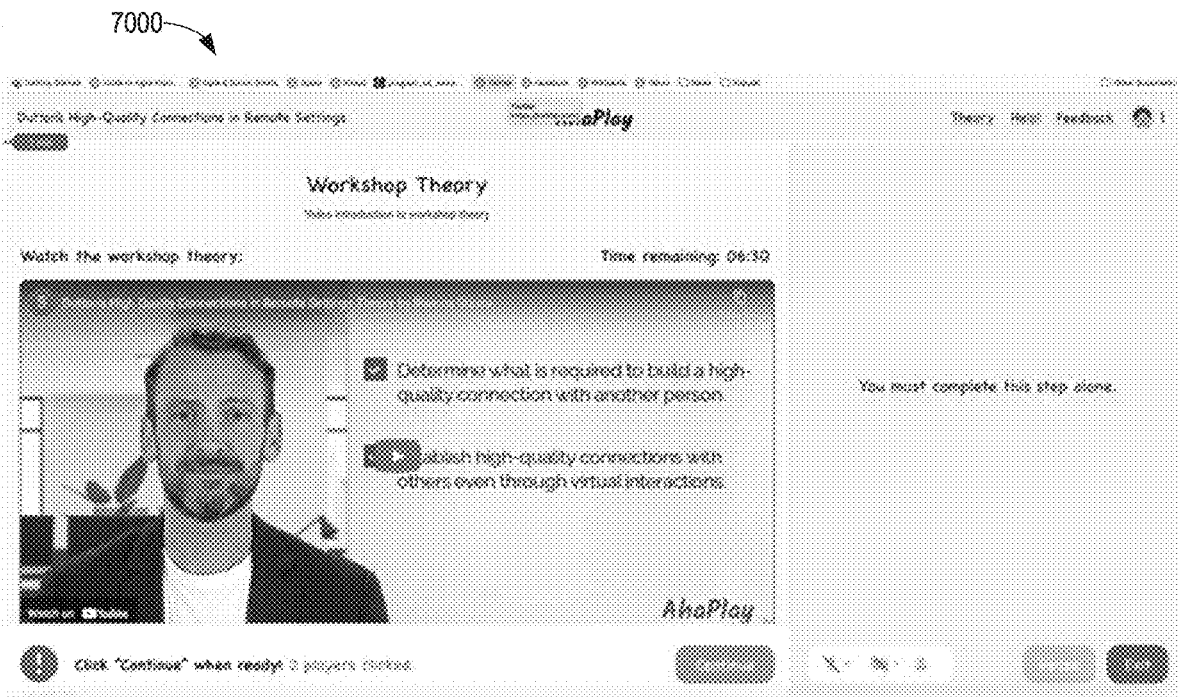
FIG. 70 illustrates a sixth user interface associated with transitioning into a team activity.

FIG. 70 illustrates a sixth user interface 7000 associated with transitioning into a team activity.

Figure 71:
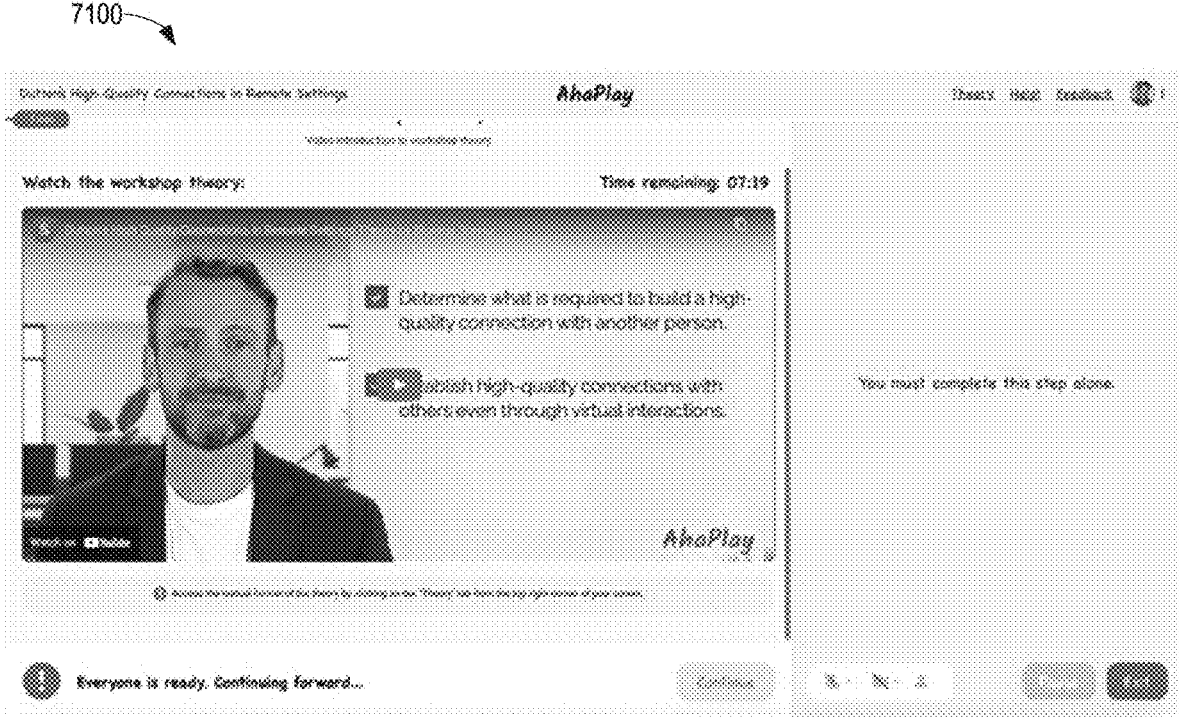
FIG. 71 illustrates a seventh user interface associated with transitioning into a team activity.

FIG. 71 illustrates a seventh user interface 7100 associated with transitioning into a team activity. In the example of FIG. 71, the user is informed that all other participants are ready to continue.

Figure 72:
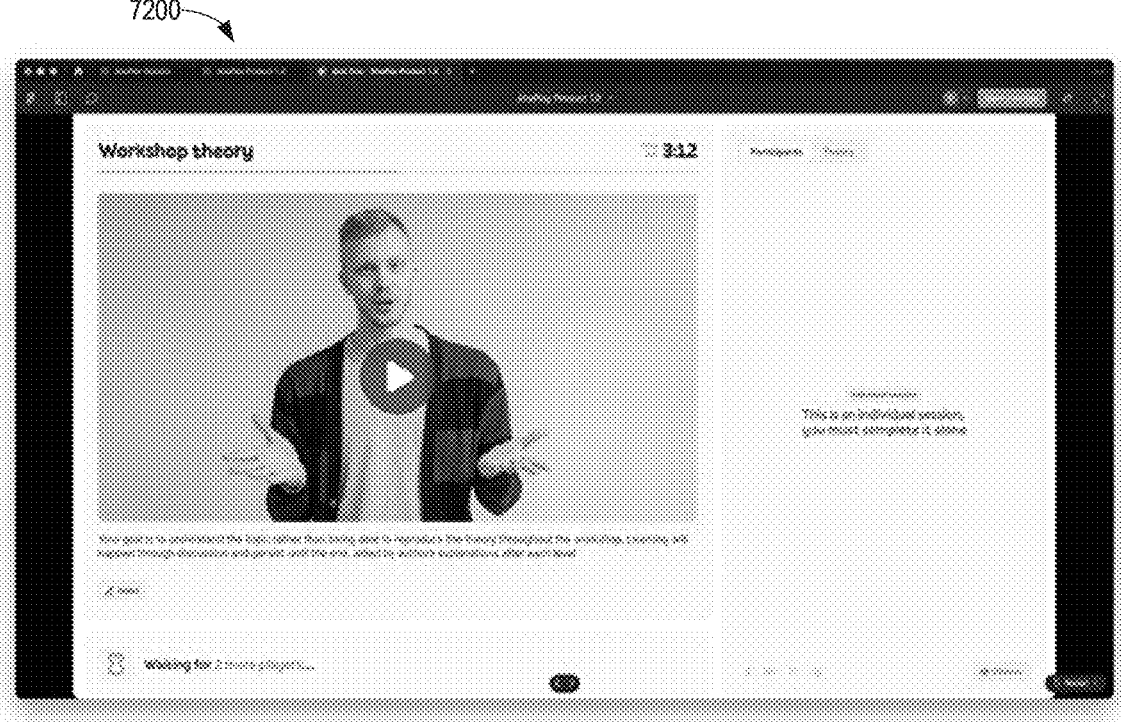
FIG. 72 illustrates a first alternative user interface associated with transitioning into a team activity.

FIG. 72 illustrates a first alternative user interface 7200 associated with transitioning into a team activity. In the example of FIG. 72, the user interface includes information about the workshop and a region for entering personal notes.

Figure 73:
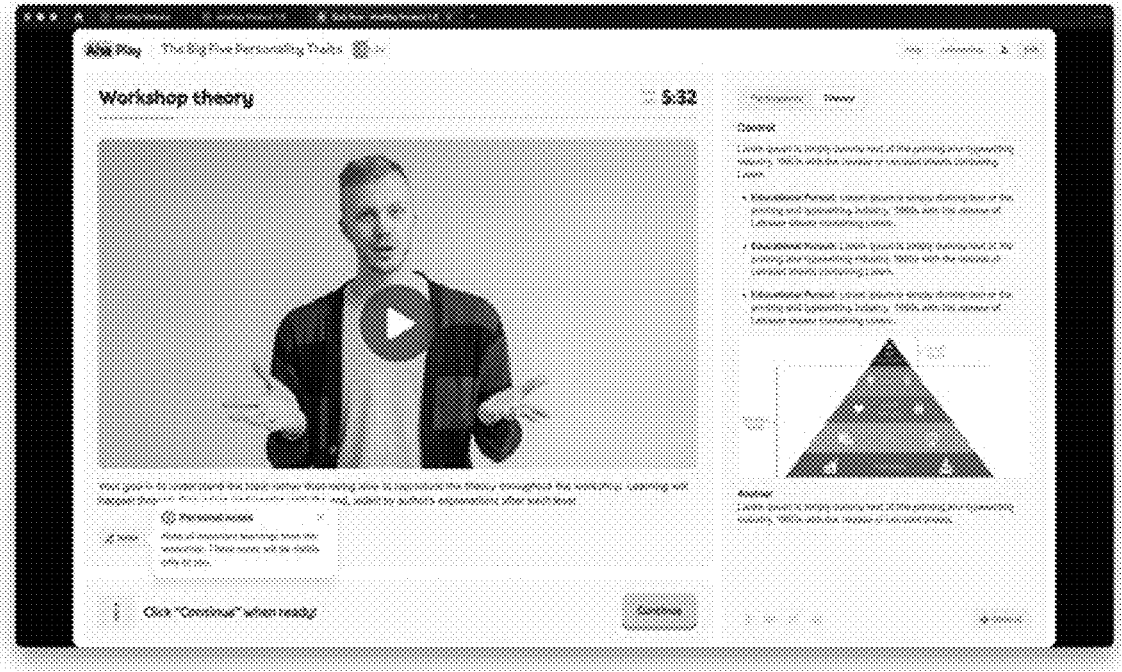
FIG. 73 illustrates a second alternative user interface associated with transitioning into a team activity.

FIG. 73 illustrates a second alternative user interface 7300 associated with transitioning into a team activity. In the example of FIG. 73, the user interface includes an example of a personal notes area that allows the user to make private notes associated with the workshop.

Figure 74:
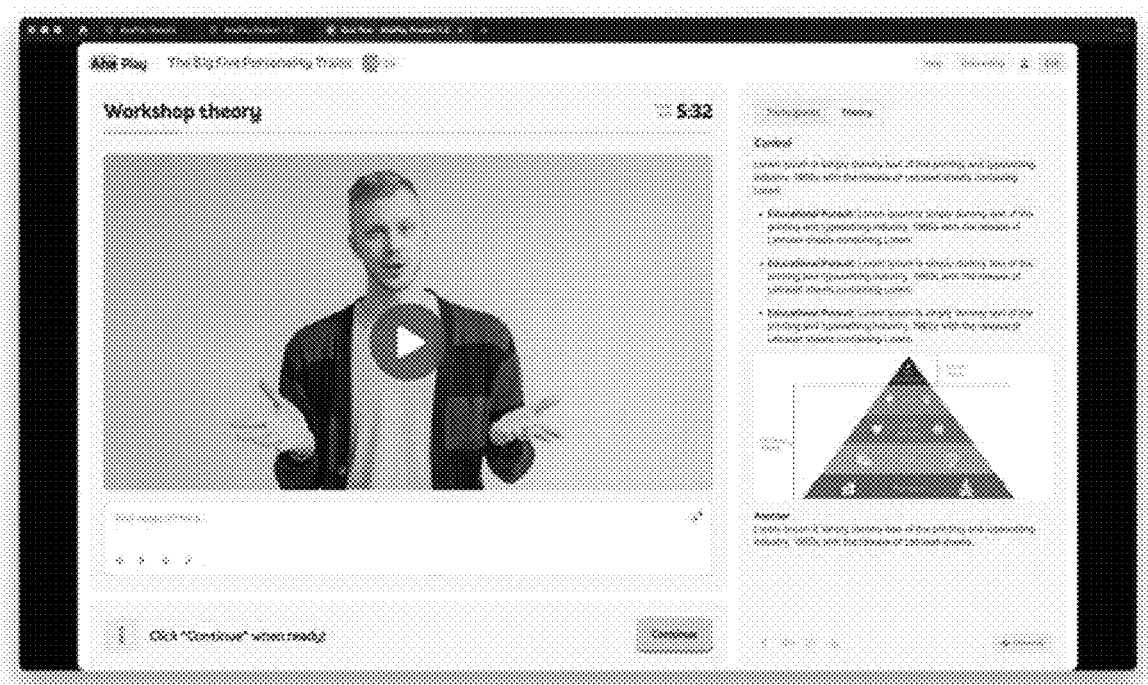
FIG. 74 illustrates a third alternative user interface associated with transitioning into a team activity.

FIG. 74 illustrates a third alternative user interface 7400 associated with transitioning into a team activity. In the example of FIG. 74, the user interface includes the private notes area where the user can enter text.

Figure 75:
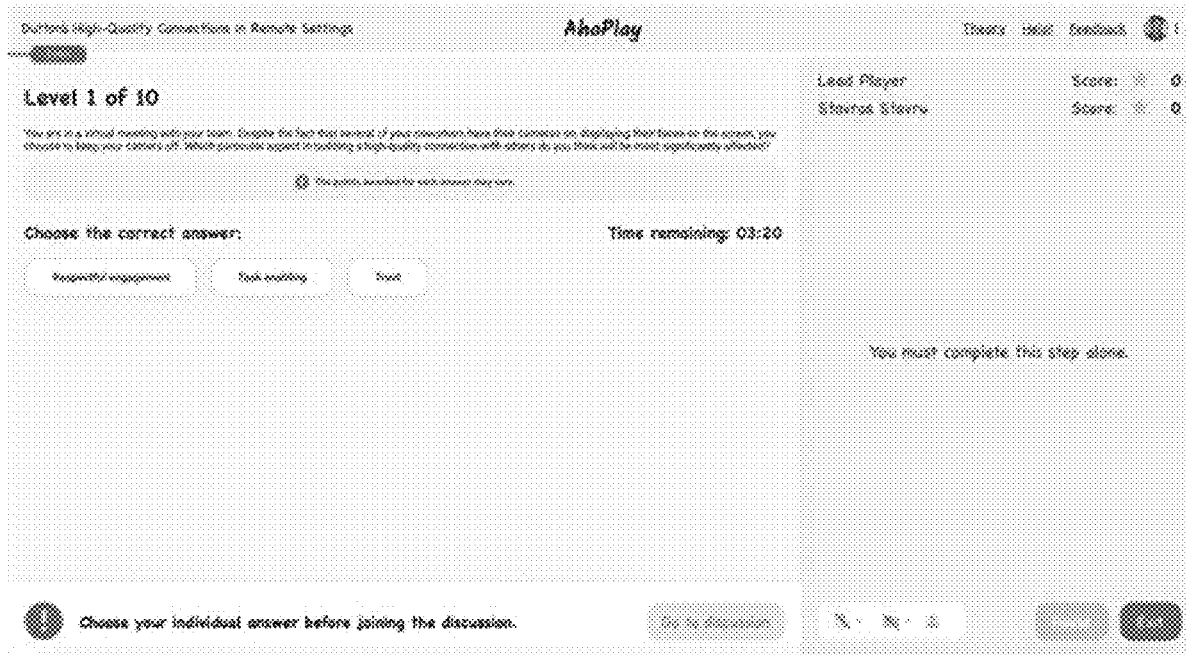
FIG. 75 illustrates an example first user interface associated with solving a case study that involves a right/wrong answer.

FIG. 75 illustrates an example first user interface 7500 associated with solving a case study that involves a right/ wrong answer. In the example of FIG. 75, the user is alone in a personal exercise room. For example, the user is involved in an activity for solving a case study, presented in the example of FIG. 75 as a question with possible answers, while the tasks for the user can include selecting the correct answer and clicking on "Go to discussion" (e.g., providing a consensus input) to initiate confirmation.

Figures 76, 77:
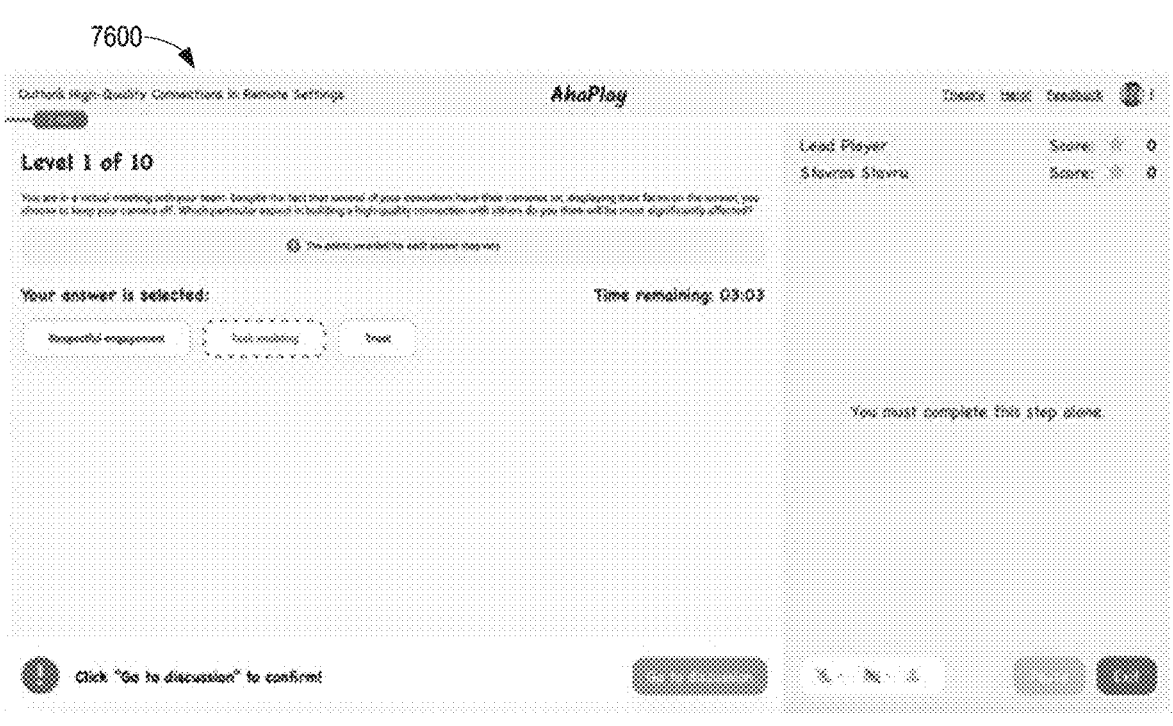
FIG. 76 illustrates an example second user interface associated with solving a case study that involves a right/wrong answer.
FIG. 77 illustrates an example third user interface associated with solving a case study that involves a right/wrong answer.

FIG. 76 illustrates an example second user interface 7600 associated with solving a case study that involves a right/ wrong answer. In the example of FIG. 76, a user interface is shown that a participant views when they select a particular answer. Once the participant selects "Go to discussion", the client circuitry 125 of FIGS. 1-2 sends a request to the server circuitry 145 of FIGS. 1-2 for updating the conversation state. The server circuitry 145 of FIGS. 1-2 renews the state and sends the state back to the clients to update their user interface.

FIG. 77 illustrates an example third user interface 7700 associated with solving a case study that involves a right/ wrong answer. In the example of FIG. 77, a user interface is updated such that for a participant who has clicked on "Go to discussion", the icon becomes inactive, and the notification is updated to "Waiting for 2 more players". For those participants who have not given their confirmation, the "Go to discussion" icon becomes active and the notification updates to "Choose your individual answer before joining the discussion. N players did it", as shown in connection with FIGS. 78-79.

Figure 78:
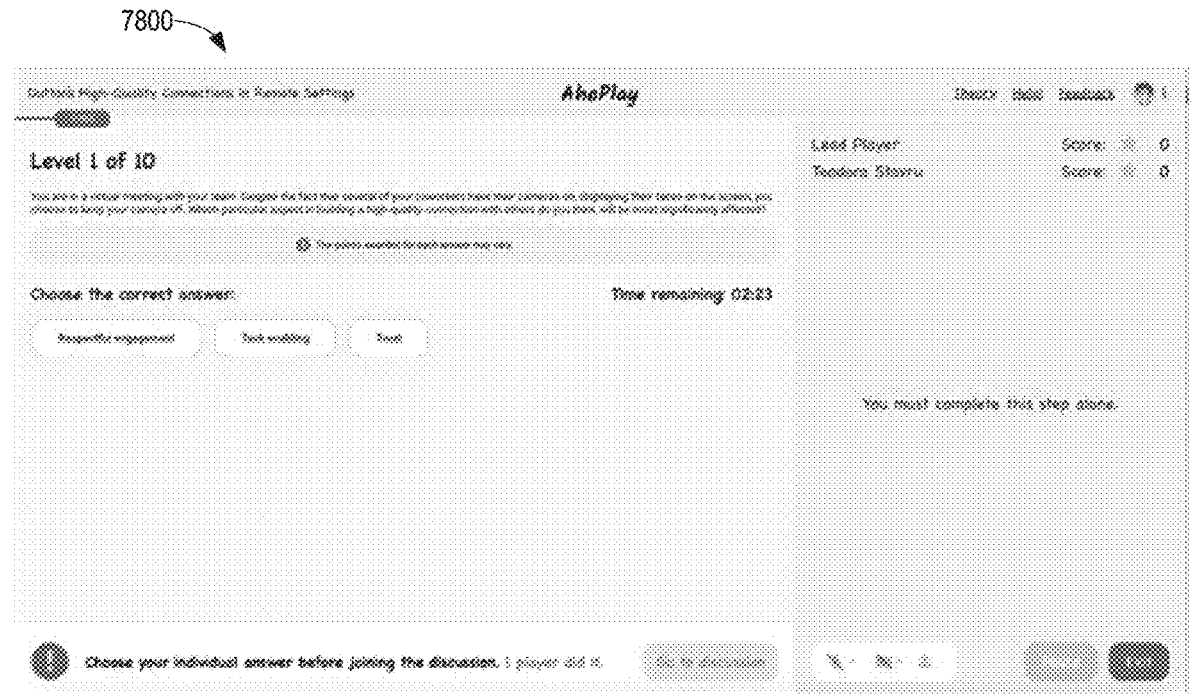
FIG. 78 illustrates an example fourth user interface associated with solving a case study that involves a right/wrong answer to be entered by a first participant.

FIG. 78 illustrates an example fourth user interface 7800 associated with solving a case study that involves a right/ wrong answer to be entered by a first participant.

Figure 79:
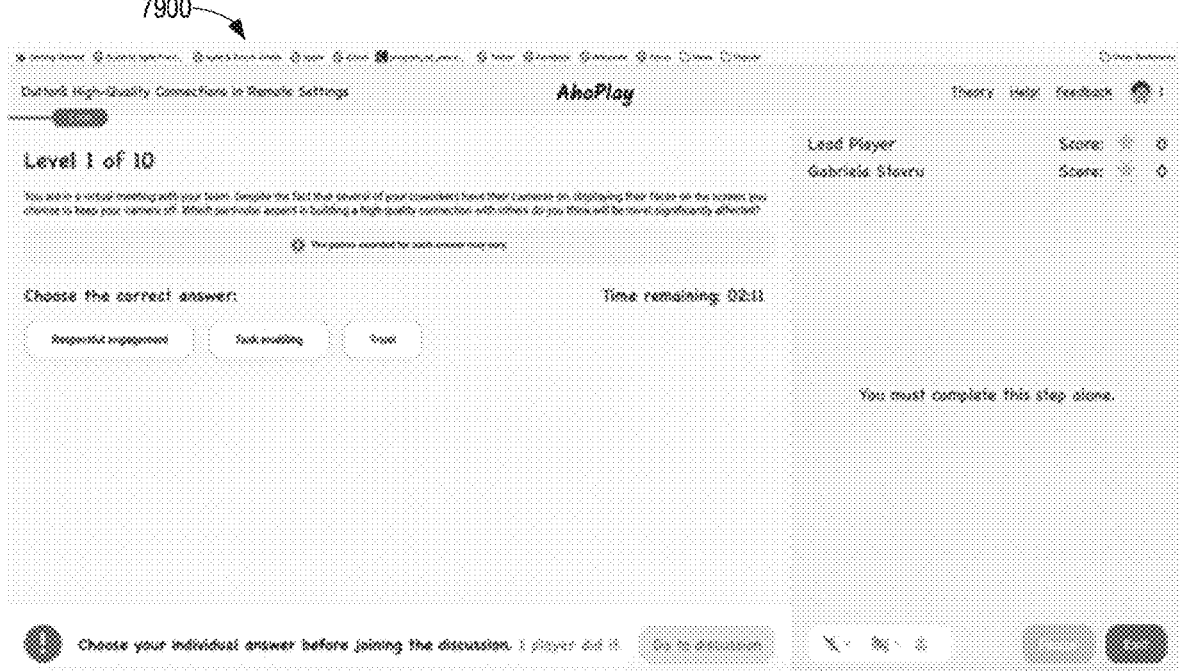
FIG. 79 illustrates an example fifth user interface associated with solving a case study that involves a right/wrong answer to be entered by a second participant.

FIG. 79 illustrates an example fifth user interface 7900 associated with solving a case study that involves a right/ wrong answer to be entered by a second participant.

Figures 80, 81:
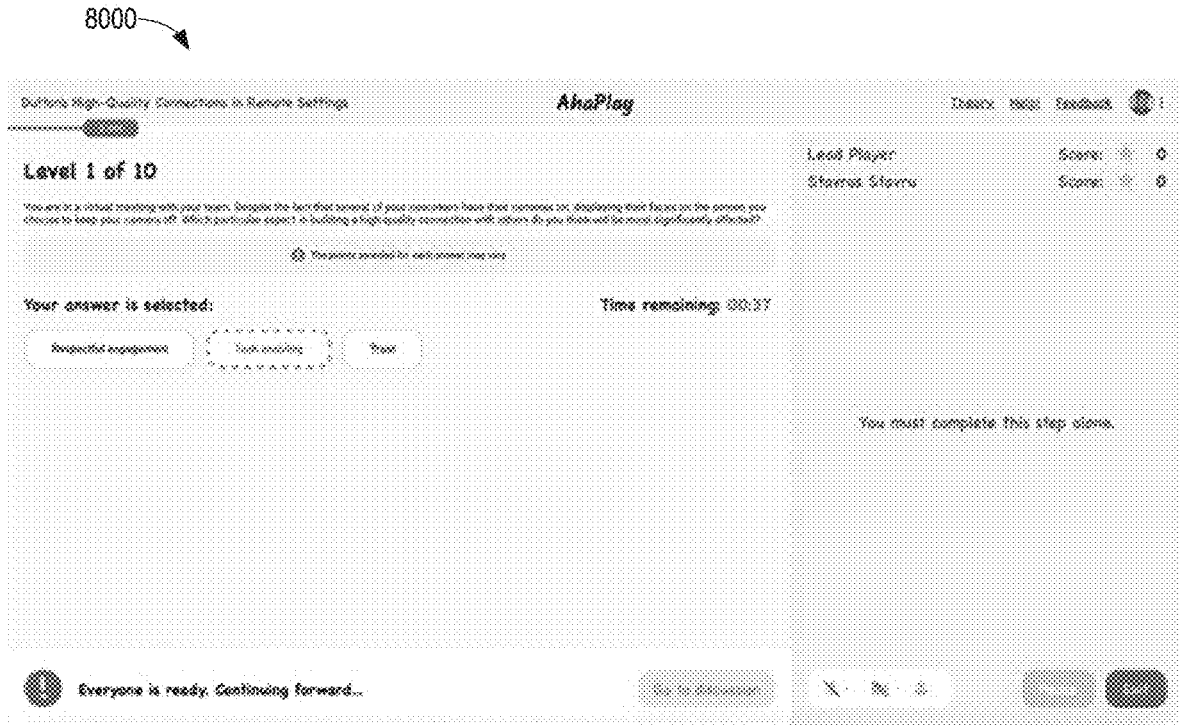
FIG. 80 illustrates an example sixth user interface associated with solving a case study that involves a right/wrong answer to be entered by a third (final) participant.
FIG. 81 illustrates an alternative first user interface associated with solving a case study that involves a right/wrong answer to be entered by a participant.

FIG. 80 illustrates an example sixth user interface 8000 associated with solving a case study that involves a right/ wrong answer to be entered by a third (final) participant. In the example of FIG. 80, once the last participant gives their confirmation by selecting the "Go to discussion" and the client circuitry 125 of FIGS. 1-2 sends this user input to the server circuitry 145 of FIGS. 1-2, the server circuitry 145 of FIGS. 1-2 verifies the presence of a consensus and updates the conversation progress and outcome, and then sends the new conversation state to all the clients, triggering a transition.

FIG. 81 illustrates an alternative first user interface 8100 associated with solving a case study that involves a right/ wrong answer to be entered by a participant.

Figures 82, 83:
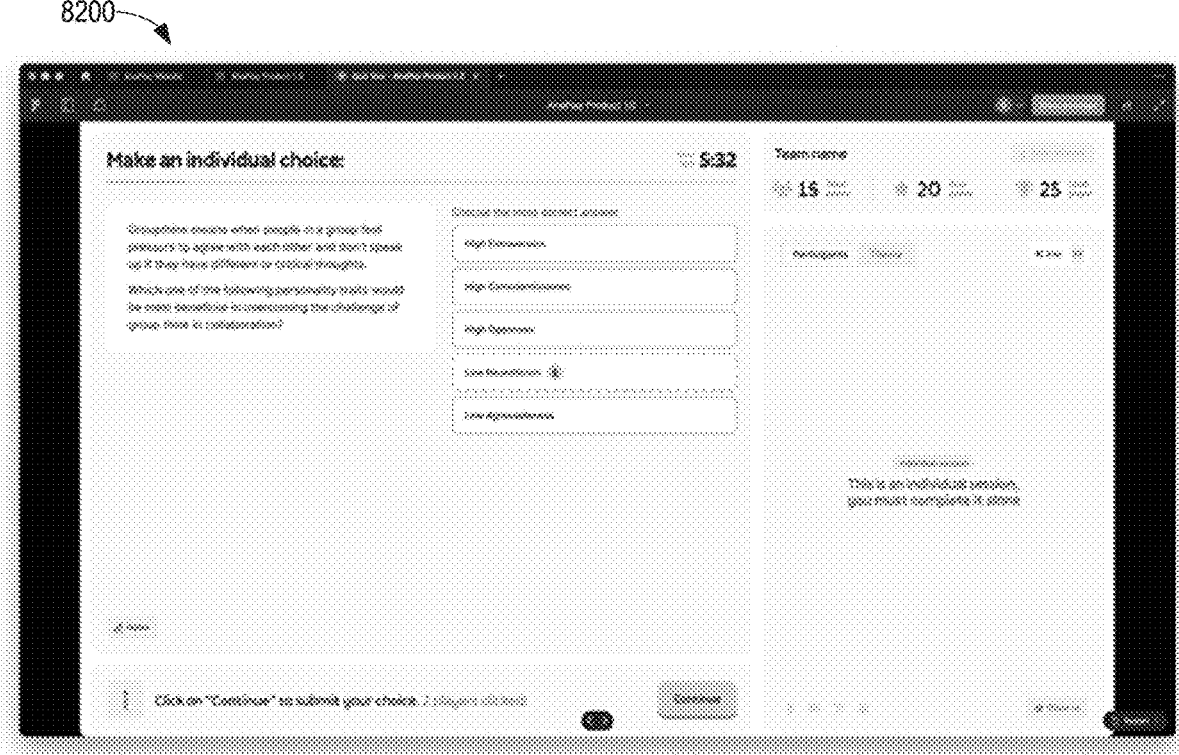
FIG. 82 illustrates an alternative second user interface associated with solving a case study that involves a right/wrong answer to be entered by a participant.
FIG. 83 illustrates an alternative third user interface associated with solving a case study that involves a right/wrong answer to be entered by a participant, in which all participants have entered a response.

FIG. 82 illustrates an alternative second user interface 8200 associated with solving a case study that involves a right/wrong answer to be entered by a participant.

FIG. 83 illustrates an alternative third user interface 8300 associated with solving a case study that involves a right/ wrong answer to be entered by a participant, in which all participants have entered a response.

Figure 84:
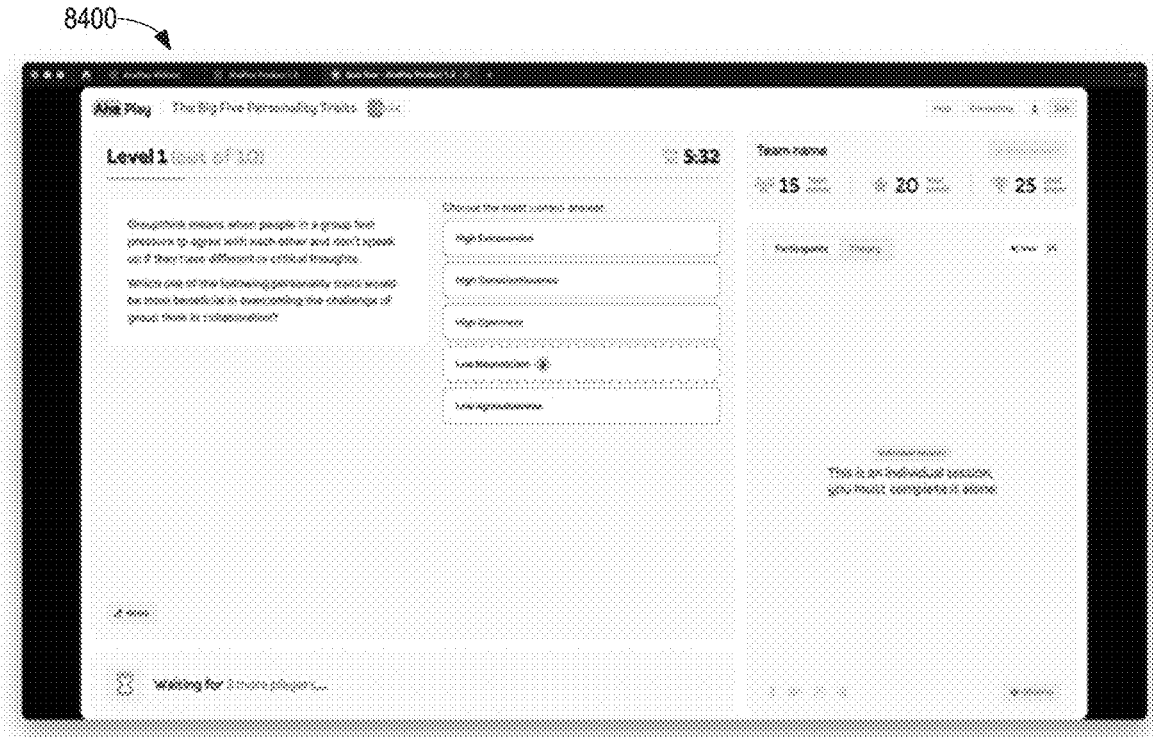
FIG. 84 illustrates an alternative fourth user interface associated with solving a case study that involves a right/wrong answer to be entered by a participant, including notification of how many participants still need to respond.

FIG. 84 illustrates an alternative fourth user interface 8400 associated with solving a case study that involves a right/wrong answer to be entered by a participant, including notification of how many participants still need to respond.

Figure 85:
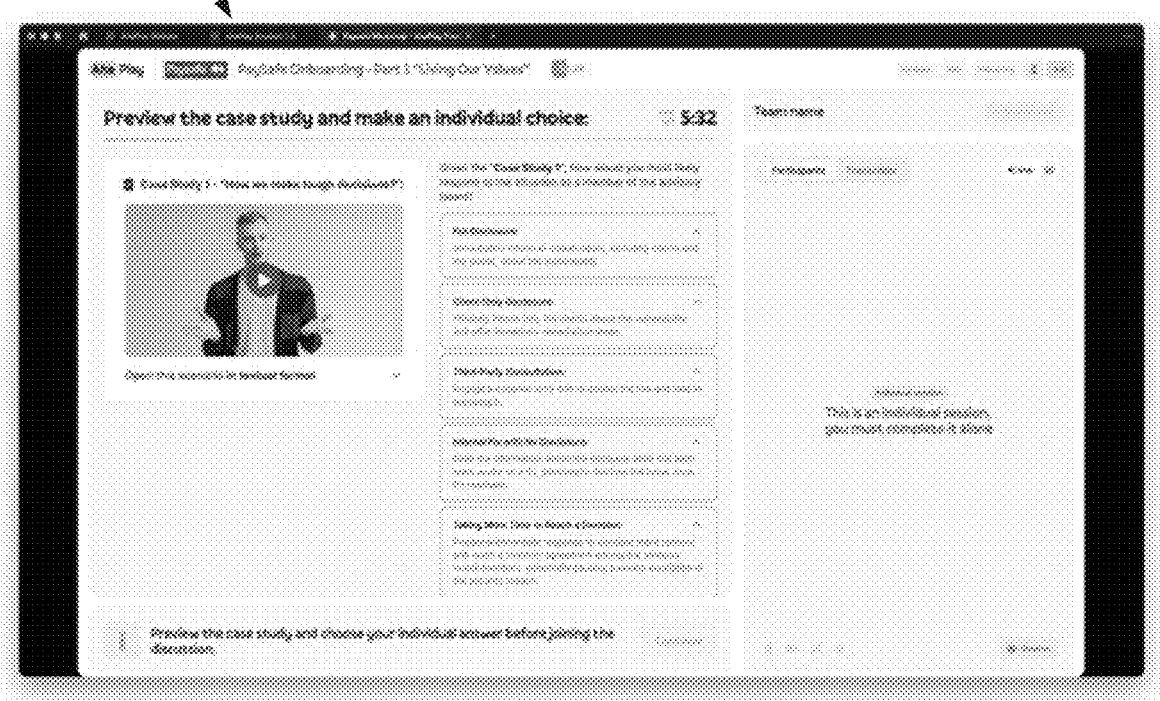
FIG. 85 illustrates an alternative fifth user interface associated with solving a case study that involves a right/wrong answer to be entered by a participant, including the presence of a video associated with the case study.

FIG. 85 illustrates an alternative fifth user interface 8500 associated with solving a case study that involves a right/ wrong answer to be entered by a participant, including the presence of a video associated with the case study.

Figure 86:
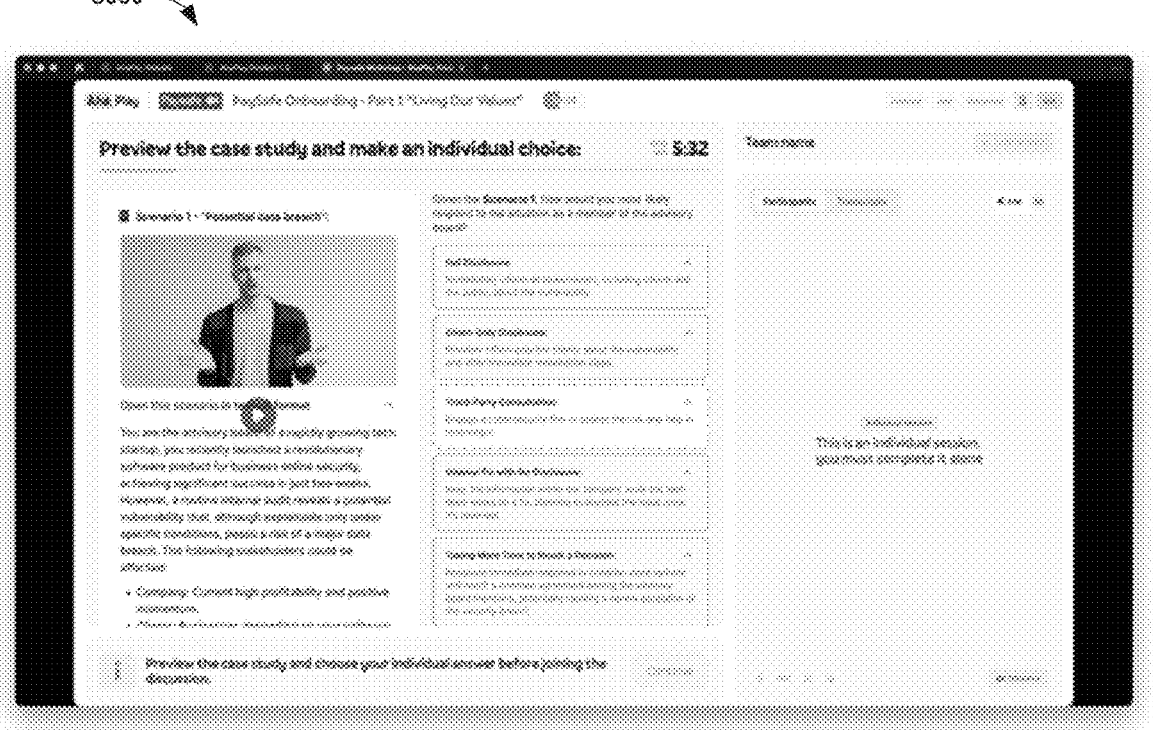
FIG. 86 illustrates an alternative sixth user interface associated with solving a case study that involves a right/wrong answer to be entered by a participant, including the selection of an answer by the participant.

FIG. 86 illustrates an alternative sixth user interface 8600 associated with solving a case study that involves a right/ wrong answer to be entered by a participant, including the selection of an answer by the participant.

Figure 87:
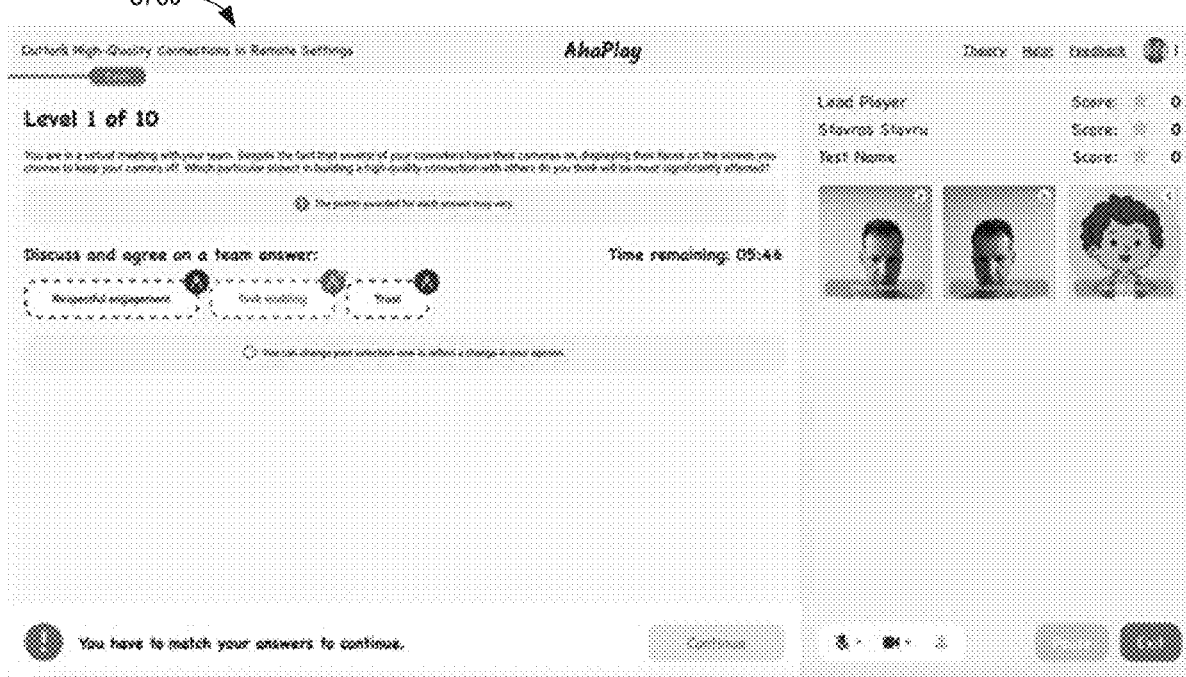
FIG. 87 illustrates an example first user interface associated with collective solving of the case study.

FIG. 87 illustrates an example first user interface 8700 associated with collective solving of the case study. In the example of FIG. 87, participants are gathered in a virtual group exercise room. For example, all participants are to agree on one answer for a case study from a previous activity, including selecting the correct answer (e.g., providing a synchronization input) and selecting "Continue" (e.g., providing a consensus input) to give confirmation (e.g., all different unique individual answers that have been given during a previous activity can be outlined without disclosing who and/or how many participants have contributed to selecting the answers).

Figures 88, 89:
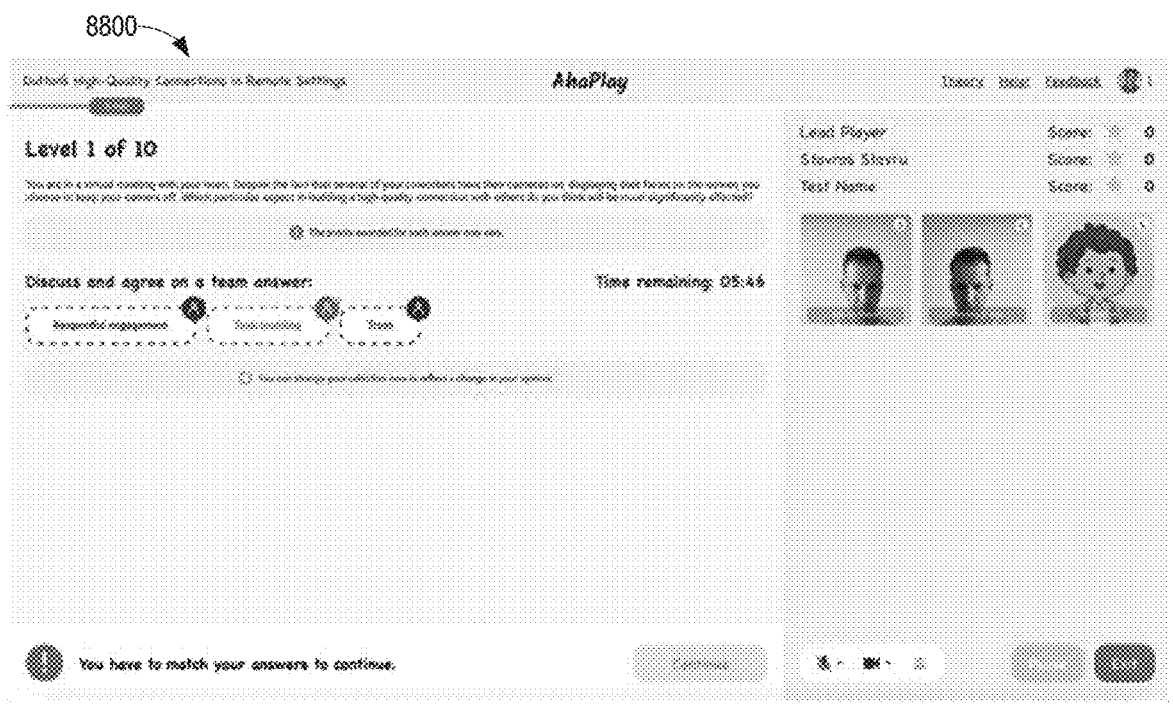
FIG. 88 illustrates an example second user interface associated with collective solving of the case study.
FIG. 89 illustrates an example third user interface associated with collective solving of the case study.

FIG. 88 illustrates an example second user interface 8800 associated with collective solving of the case study. In the example of FIG. 88, the current participant has individually selected "Task enabling" (e.g., from a previous activity), which is marked blue and has an icon "Me", while the other two participants have selected "Respectful engagement" and "Trust" (e.g., shown in black with a different icon). For example, the "Continue" icon is inactive, as there is no consensus (e.g., among all participants selecting the same answer).

FIG. 89 illustrates an example third user interface 8900 associated with collective solving of the case study. In the example of FIG. 89, the user interface is shown for another participant, different from the participant seeing the user interface of FIG. 88.

Figure 90:
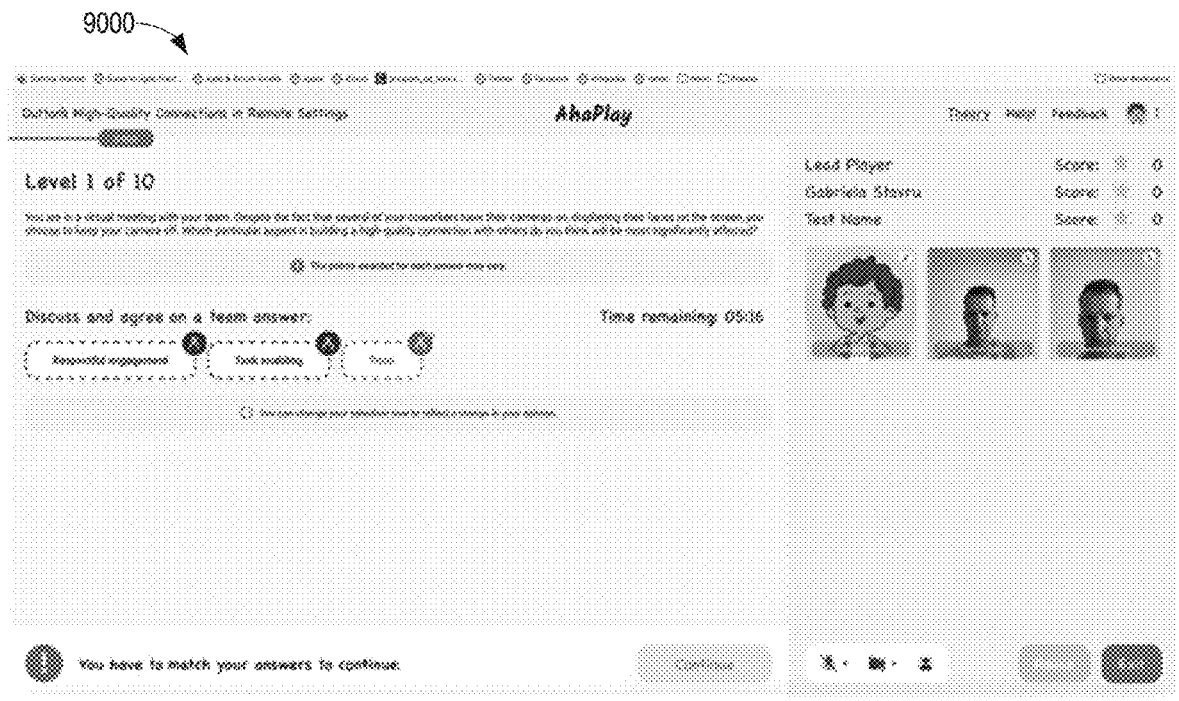
FIG. 90 illustrates an example fourth user interface associated with collective solving of the case study.

FIG. 90 illustrates an example fourth user interface 9000 associated with collective solving of the case study. In the example of FIG. 90, the user interface is shown for another participant, different from the participant(s) seeing the user interface(s) of FIGS. 88-89.

Figure 91:
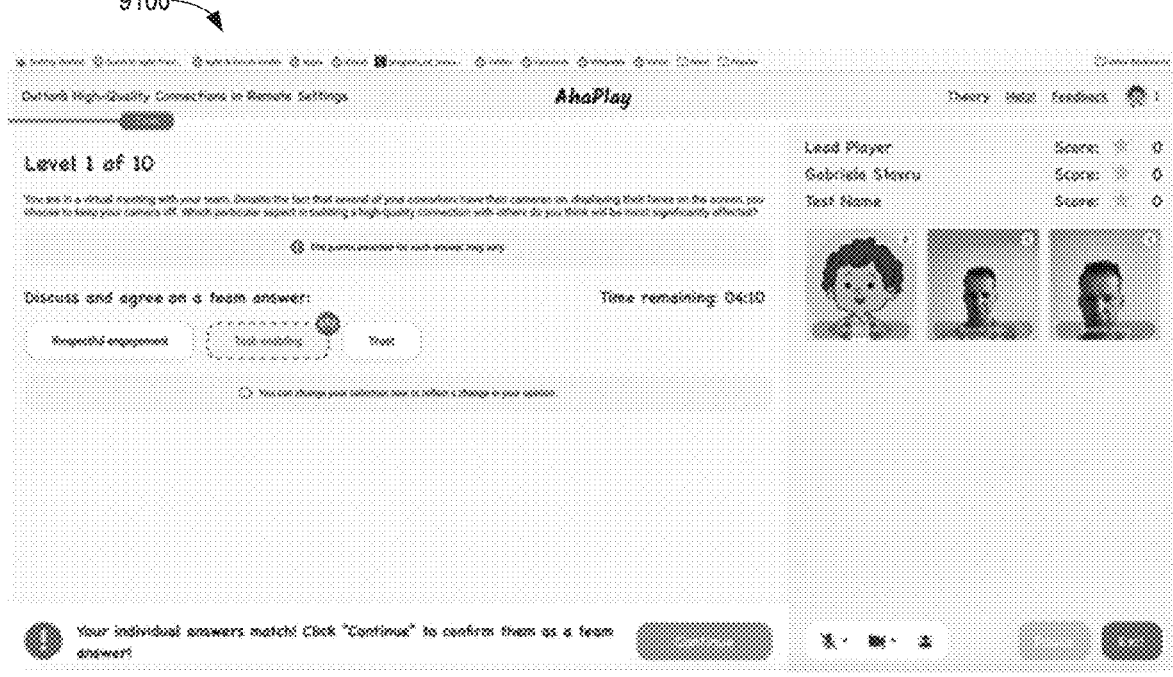
FIG. 91 illustrates an example fifth user interface associated with collective solving of the case study.

FIG. 91 illustrates an example fifth user interface 9100 associated with collective solving of the case study. In the example of FIG. 91, once all participants select the same answer (e.g., which triggers a client-server communication resulting in an update to the conversation state), there is a consensus (e.g., the "Continue" icon becomes active to allow for confirmation).

Figures 92, 93:
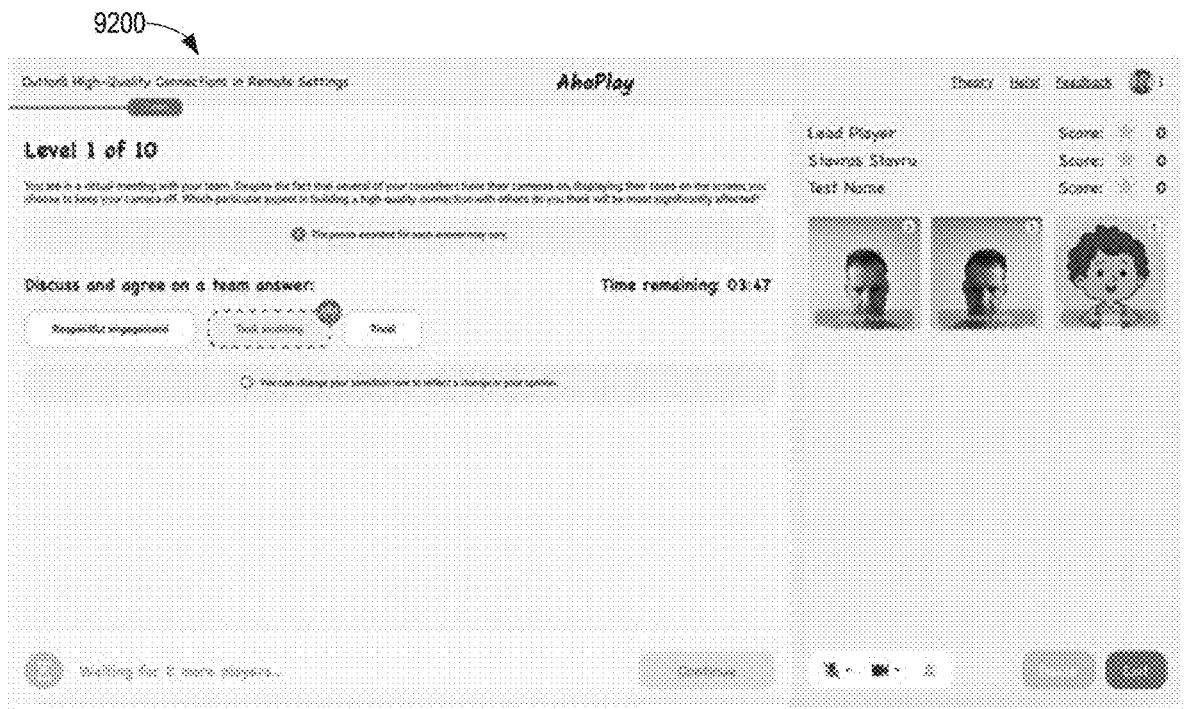
FIG. 92 illustrates an example fifth user interface associated with collective solving of the case study.
FIG. 93 illustrates an example sixth user interface associated with collective solving of the case study.

FIG. 92 illustrates an example fifth user interface 9200 associated with collective solving of the case study. In the example of FIG. 92, one of the participants selects "Continue," allowing a new confirmation to be identified by the server circuitry 145 of FIGS. 1-2 within the conversation state (e.g., which is then sent back to the clients).

FIG. 93 illustrates an example sixth user interface 9300 associated with collective solving of the case study. In the example of FIG. 93, a notification is shown to a first participant indicating that individual answers match.

Figure 94:
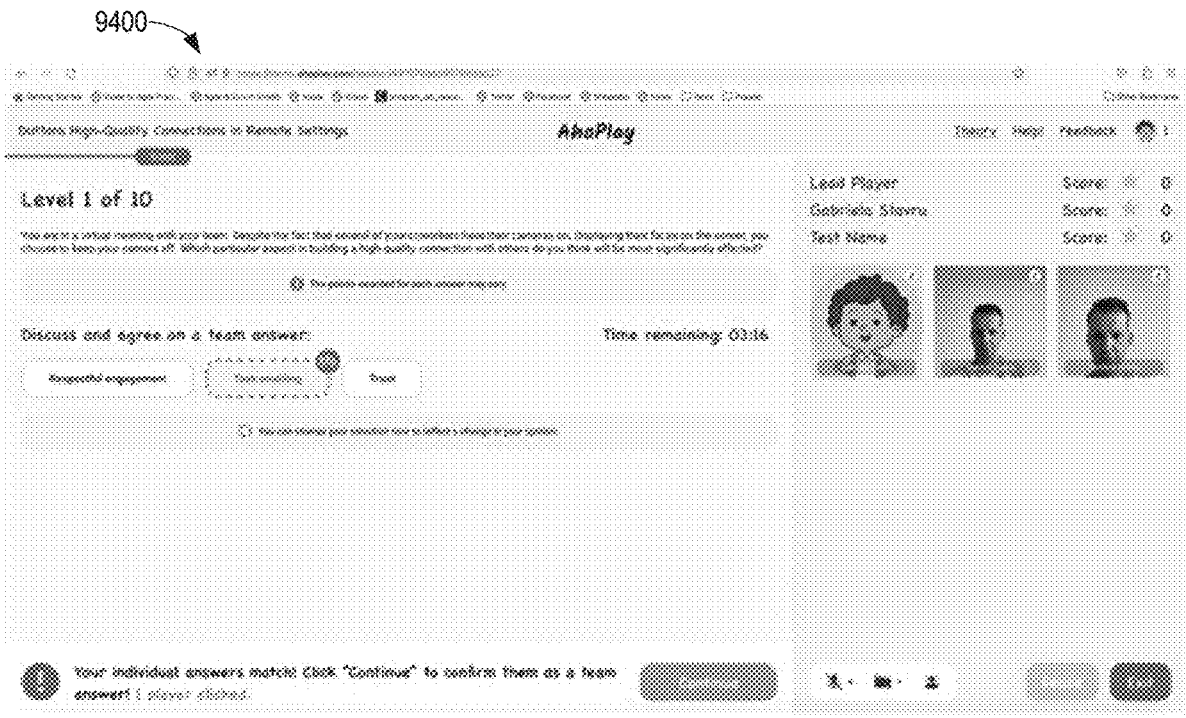
FIG. 94 illustrates an example seventh user interface associated with collective solving of the case study.

FIG. 94 illustrates an example seventh user interface 9400 associated with collective solving of the case study. In the example of FIG. 94, a notification is shown to a second participant indicating that individual answers match.

Figure 95:
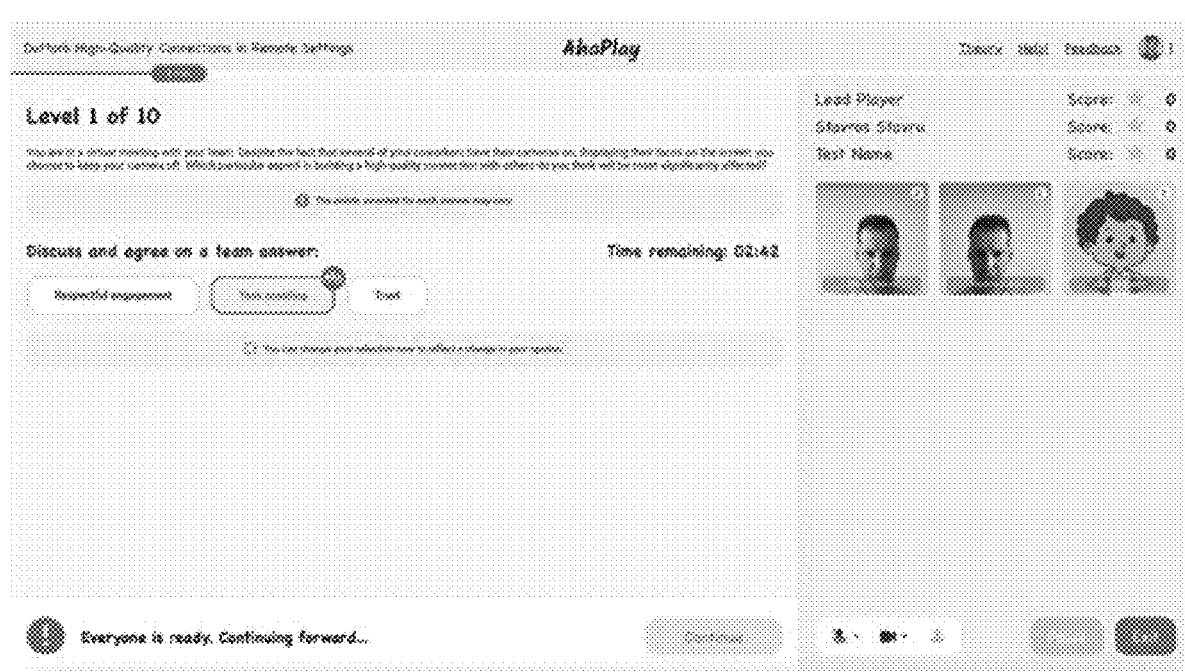
FIG. 95 illustrates an example eight user interface associated with collective solving of the case study.

FIG. 95 illustrates an example eight user interface 9500 associated with collective solving of the case study. In the example of FIG. 95, once the last participant gives confirmation by clicking on the "Continue" icon and the client circuitry 125 of FIGS. 1-2 sends this user input to the server circuitry 145 of FIGS. 1-2, the server circuitry 145 of FIGS. 1-2 verifies the presence of a consensus and updates the conversation progress and outcome, and then sends the new conversation state to all the clients, triggering a transition.

Figure 96:
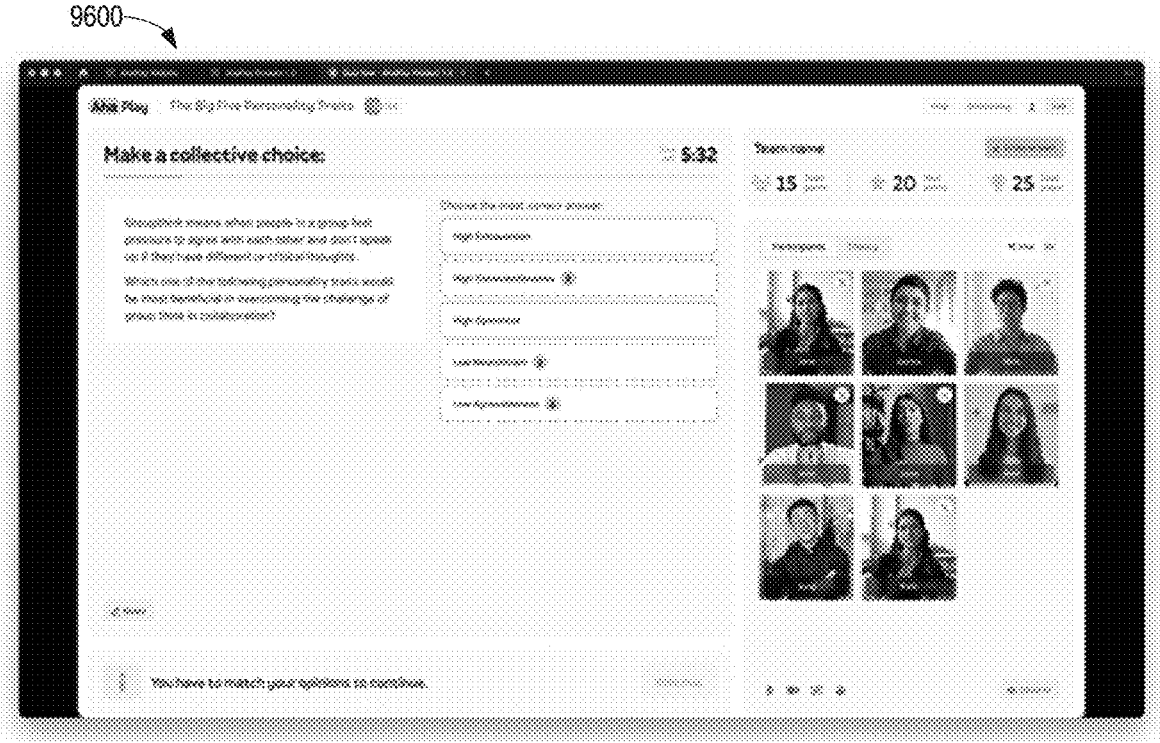
FIG. 96 illustrates an example ninth user interface associated with collective solving of the case study.

FIG. 96 illustrates an example ninth user interface 9600 associated with collective solving of the case study. In the example of FIG. 96, the users are alerted to match their selections to continue with the case study.

Figure 97:
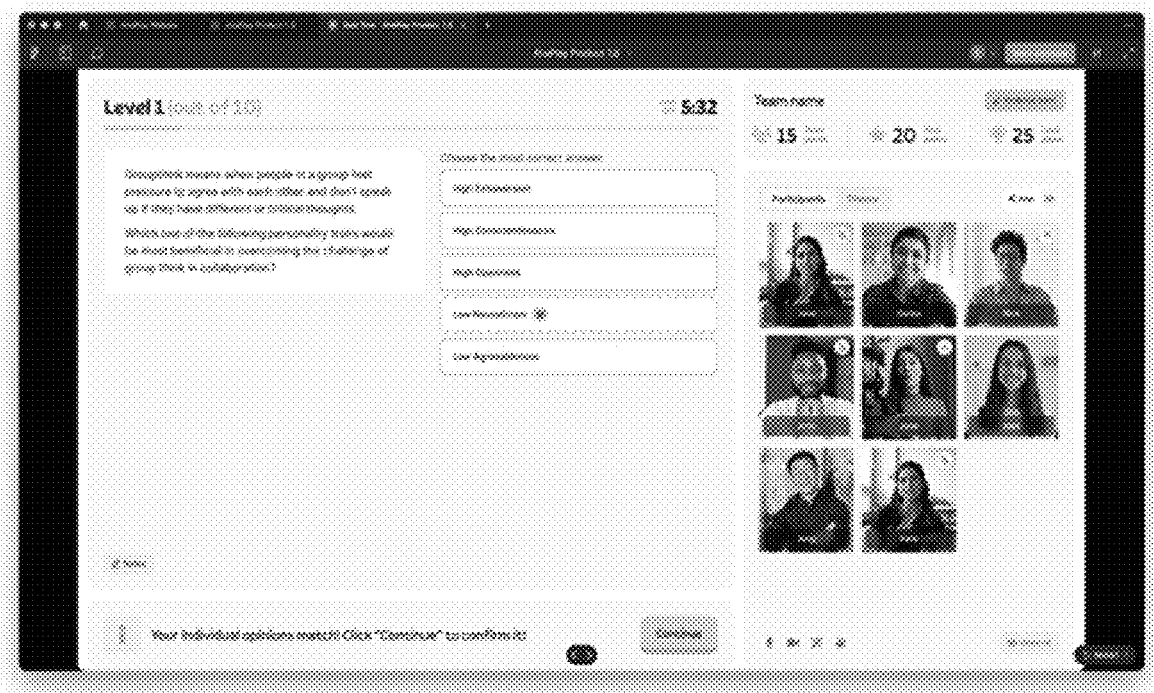
FIG. 97 illustrates an example tenth user interface associated with collective solving of the case study.

FIG. 97 illustrates an example tenth user interface 9700 associated with collective solving of the case study. In the example of FIG. 97, the users are notified that their individual selections match.

Figure 98:
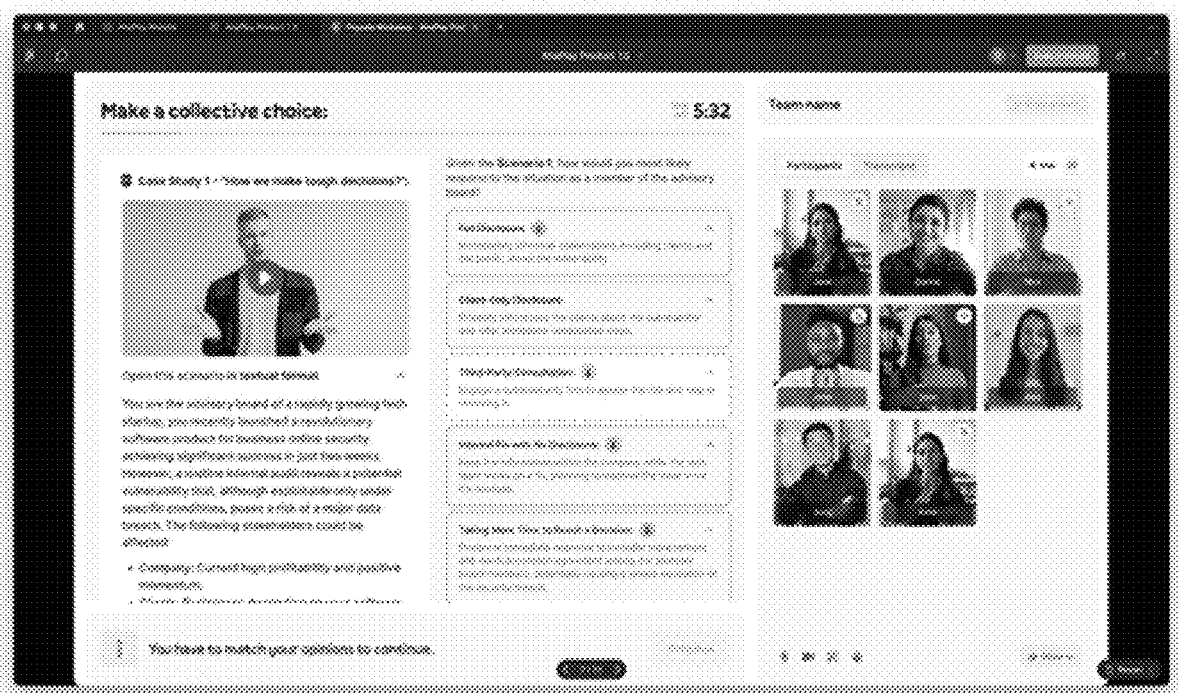
FIG. 98 illustrates alternative first user interface associated with collective solving of the case study.

FIG. 98 illustrates alternative first user interface 9800 associated with collective solving of the case study. In the example of FIG. 98, the users are alerted to match their selections to continue with the case study.

Figure 99:
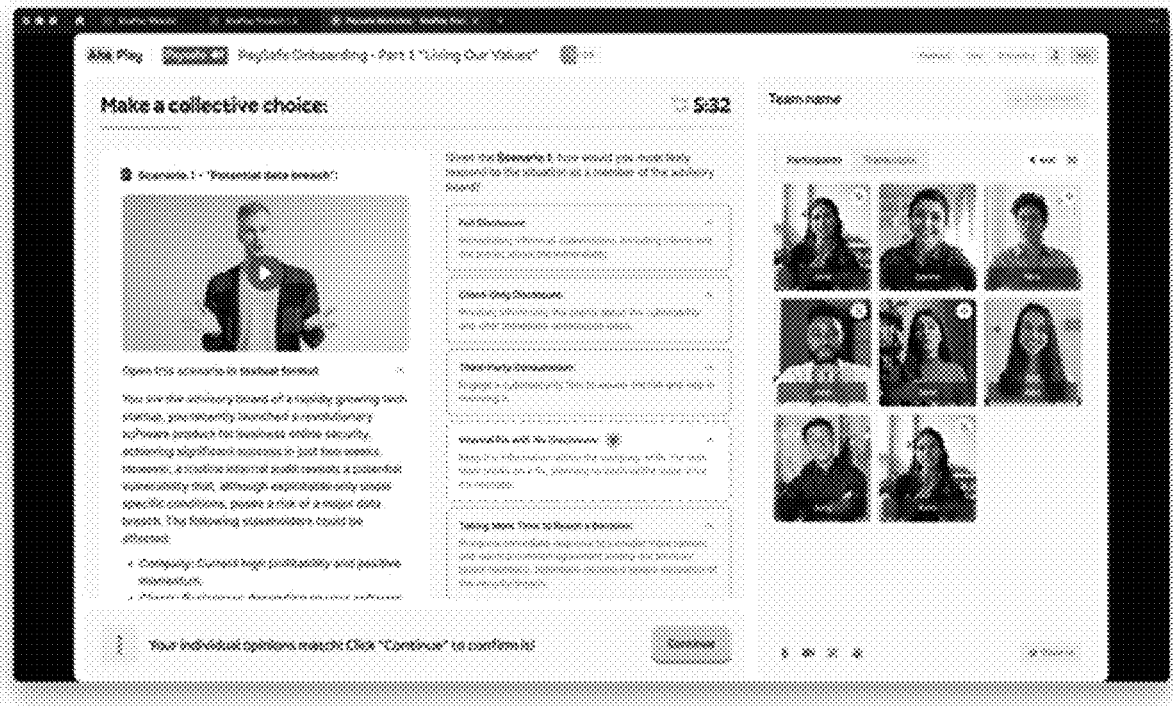
FIG. 99 illustrates an alternative second user interface associated with collective solving of the case study.

FIG. 99 illustrates an alternative second user interface 9900 associated with collective solving of the case study. In the example of FIG. 99, the users are notified that their individual selections match.

Figure 100:
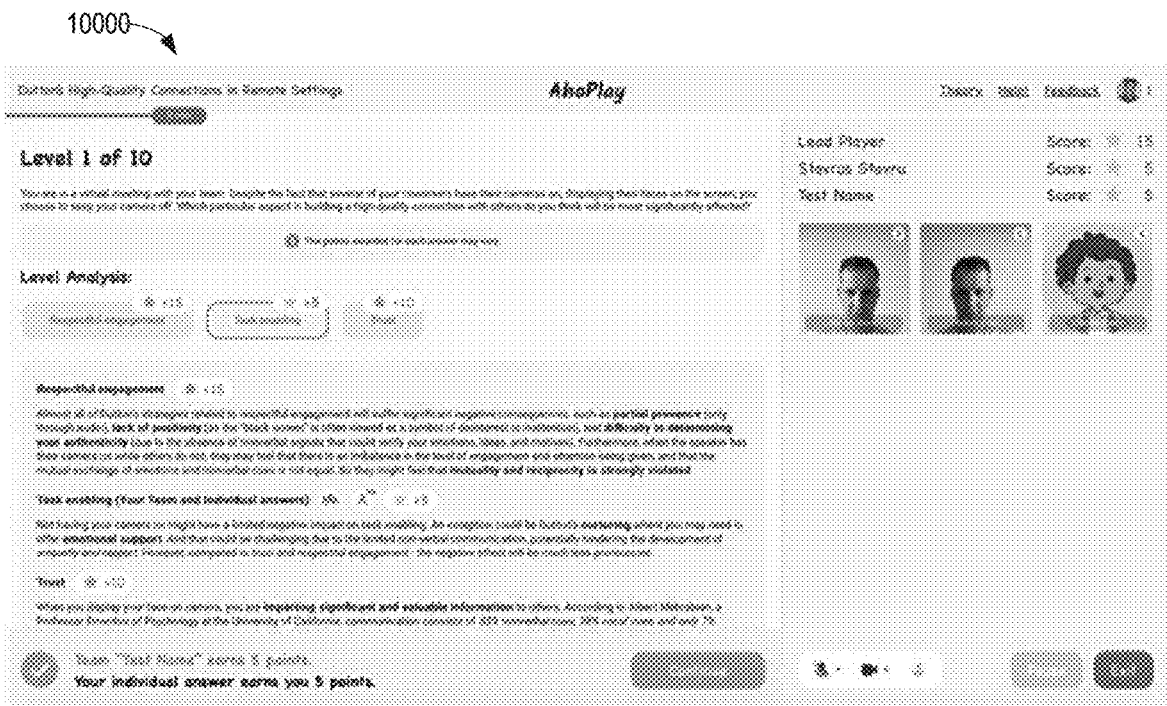
FIG. 100 illustrates an example first user interface associated with reviewing an explanation of the completed case study.

FIG. 100 illustrates an example first user interface 10000 associated with reviewing an explanation of the completed case study. In the example of FIG. 100, the participant is in a group exercise room. The activity in the example of FIG. 100 is for all participants to review the answers and their explanations in this exercise, while the tasks to complete include aligning on a topic by selecting "Continue" (e.g., providing consensus input).

Figure 101:
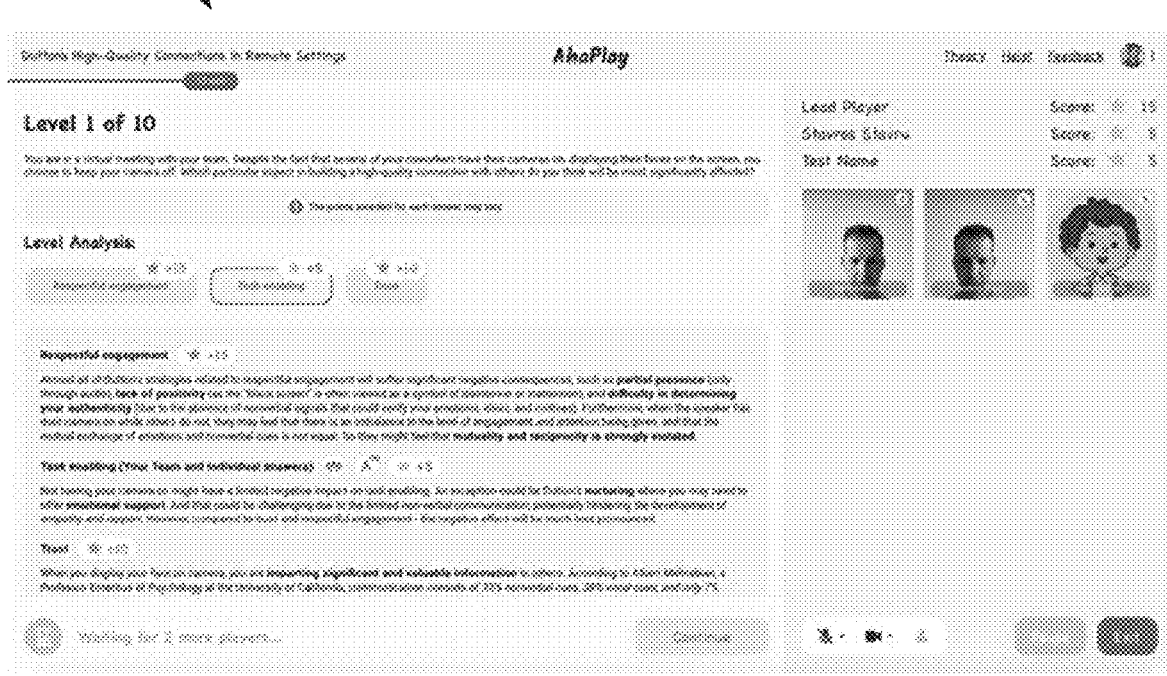
FIG. 101 illustrates an example second user interface associated with reviewing an explanation of the completed case study.

FIG. 101 illustrates an example second user interface 10100 associated with reviewing an explanation of the completed case study. In the example of FIG. 101, when a participant selects "Continue", a new conversation state is triggered, and the client circuitry 125 of FIGS. 1-2 updates the user interface accordingly. In the example of FIG. 101, the user interface is shown for a first participant (e.g., Stavros).

Figure 102:
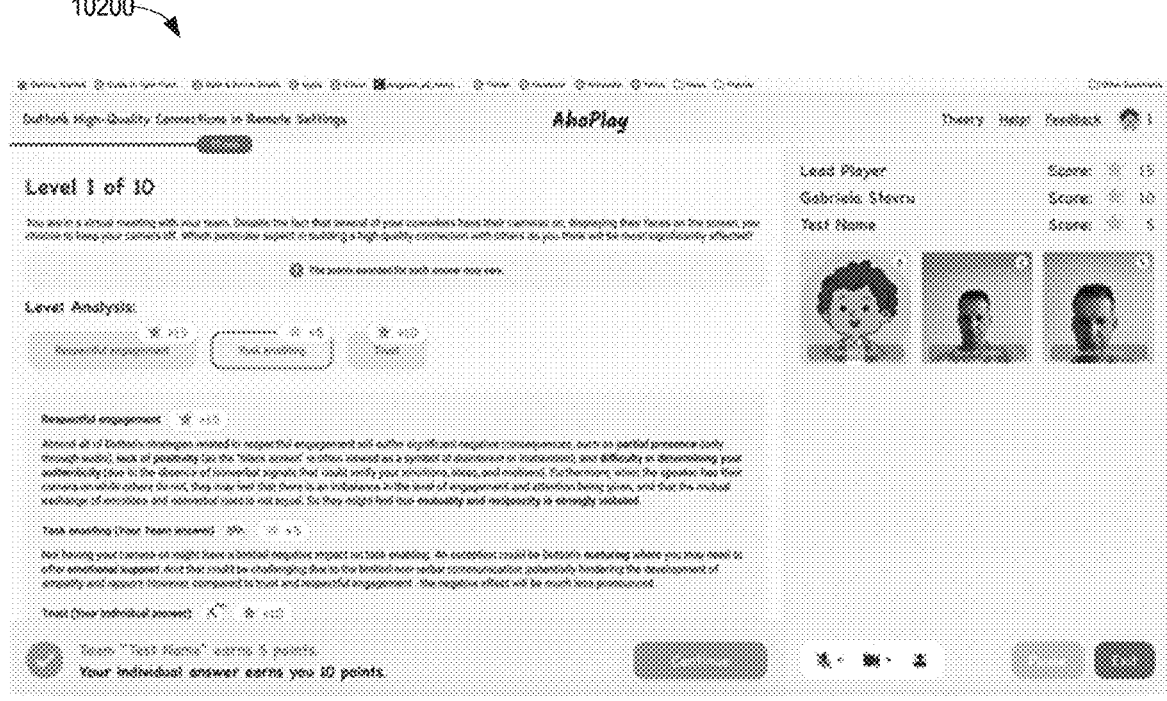
FIG. 102 illustrates an example third user interface associated with reviewing an explanation of the completed case study.

FIG. 102 illustrates an example third user interface 10200 associated with reviewing an explanation of the completed case study. In the example of FIG. 102, the user interface is shown for a second participant (e.g., Gabriela).

Figure 103:
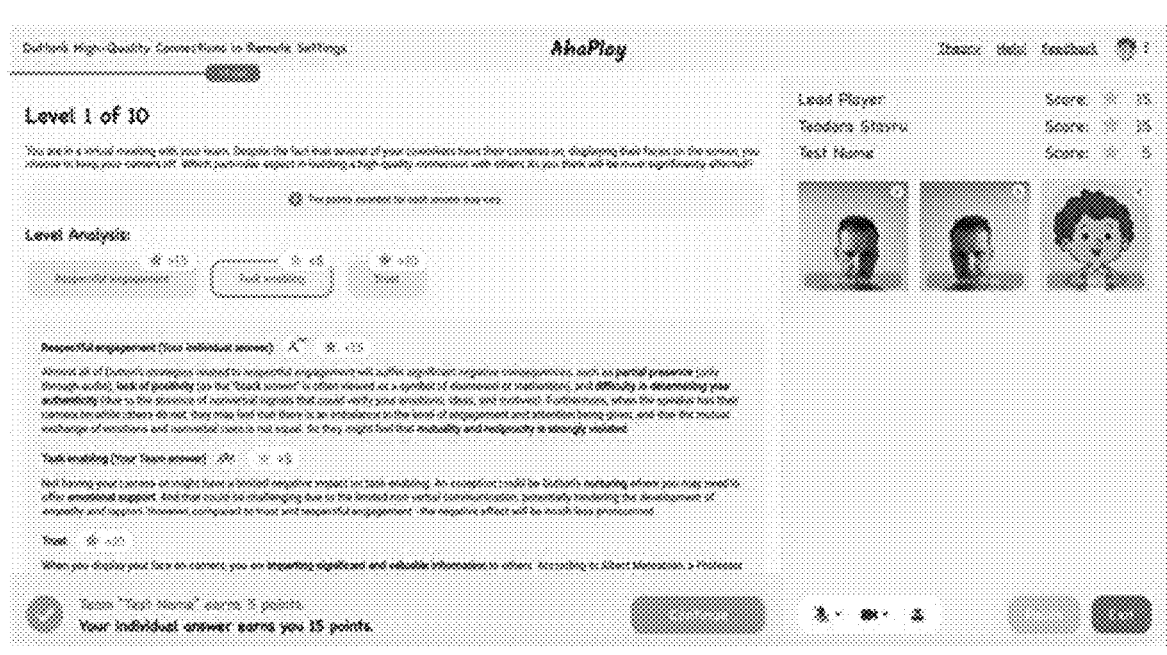
FIG. 103 illustrates an example fourth user interface associated with reviewing an explanation of the completed case study.

FIG. 103 illustrates an example fourth user interface 10300 associated with reviewing an explanation of the completed case study. In the example of FIG. 103, the user interface is shown for a third participant (e.g., Teodora).

Figure 104:
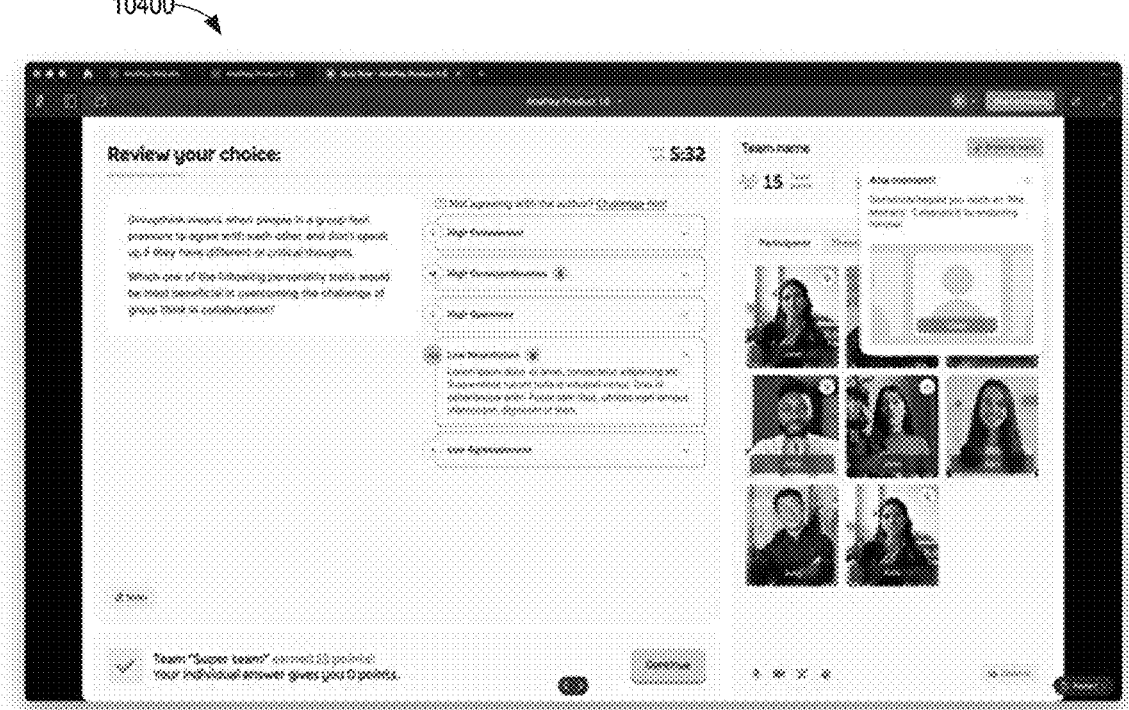
FIG. 104 illustrates an example fifth user interface associated with reviewing an explanation of the completed case study.

FIG. 104 illustrates an example fifth user interface 10400 associated with reviewing an explanation of the completed case study. In the example of FIG. 104, when the last participant gives their confirmation by clicking on "Continue", the client circuitry 125 of FIGS. 1-2 sends user input to the server circuitry 145 of FIGS. 1-2. For example, the server circuitry 125 of FIGS. 1-2 verifies the presence of a consensus and updates the conversation progress and outcome, sending the new conversation state to all the clients, which triggers a transition.

Figure 105:
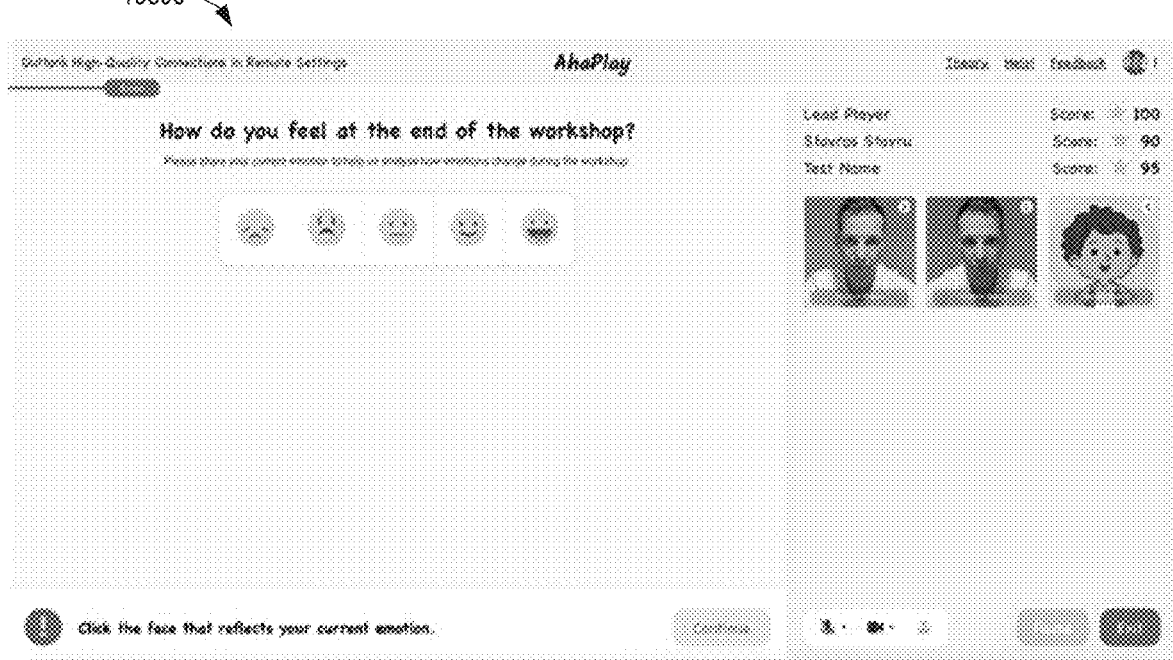
FIG. 105 illustrates an example first user interface associated with selecting a final emotion as part of a group activity.

FIG. 105 illustrates an example first user interface 10500 associated with selecting a final emotion as part of a group activity. In the example of FIG. 105, the activity may be the same as previous activities described herein associated with emotion input(s) in terms of mechanics, business logic and/or technical details. However, there may be some differences in the user interface (e.g., in the message "How do you feel at the end of the workshop?" or "Please share your current emotion to help us analyze how emotions change during the workshop"), as shown in comparison to the user interface of FIG. 106.

Figure 106:
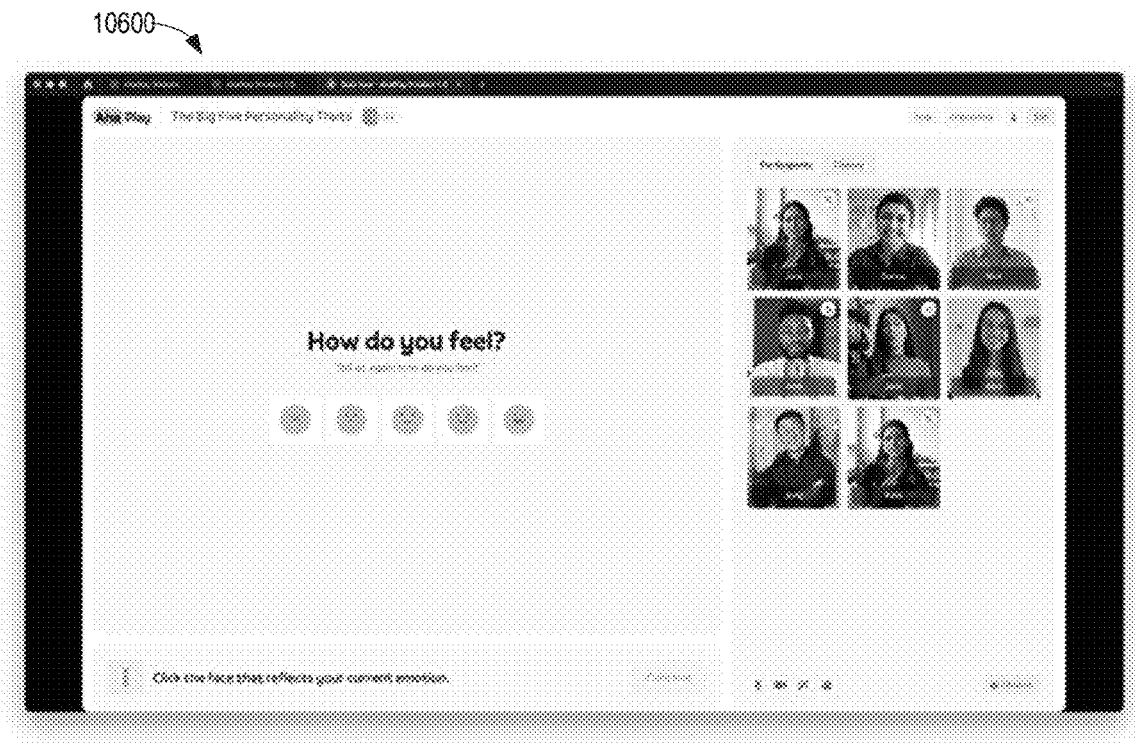
FIG. 106 illustrates an example second user interface associated with selecting an emotion as part of a group activity.

FIG. 106 illustrates an example second user interface 10600 associated with selecting an emotion as part of a group activity.

Figure 107:
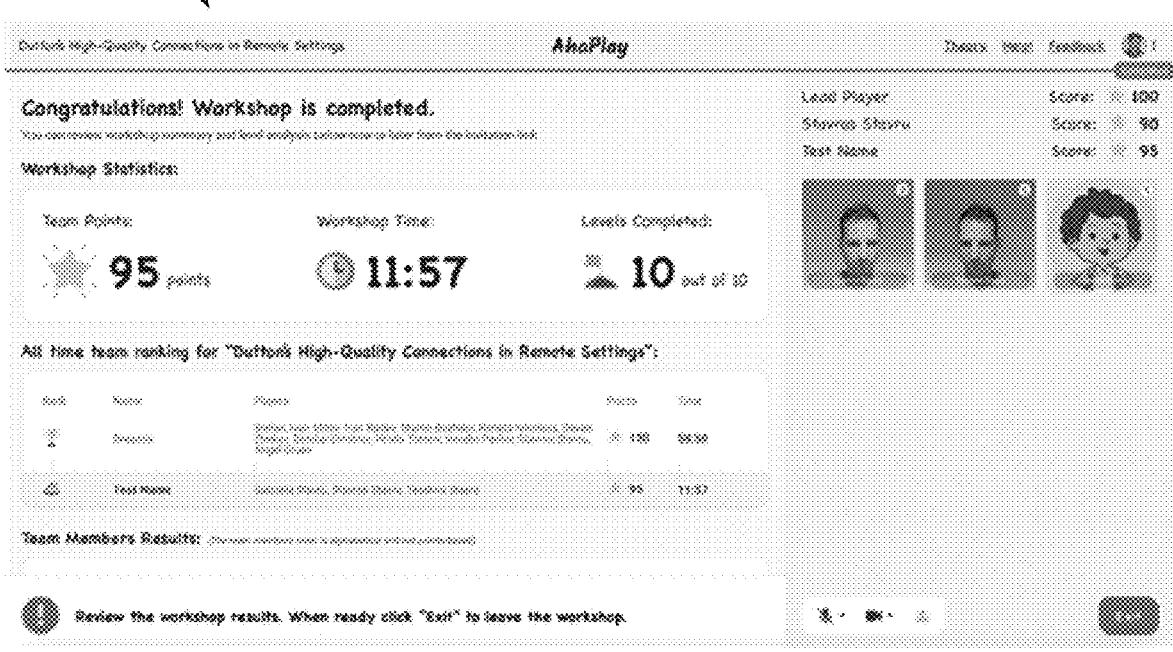
FIG. 107 illustrates an example first user interface associated with reviewing the results of a group activity.

FIG. 107 illustrates an example first user interface 10700 associated with reviewing the results of a group activity. In the example of FIG. 107, the participant is in a group information room where they can see the outcome of the conversation which could be related to how well the participant(s) solved the case studies using the theory that was initially provided.

Figure 108:
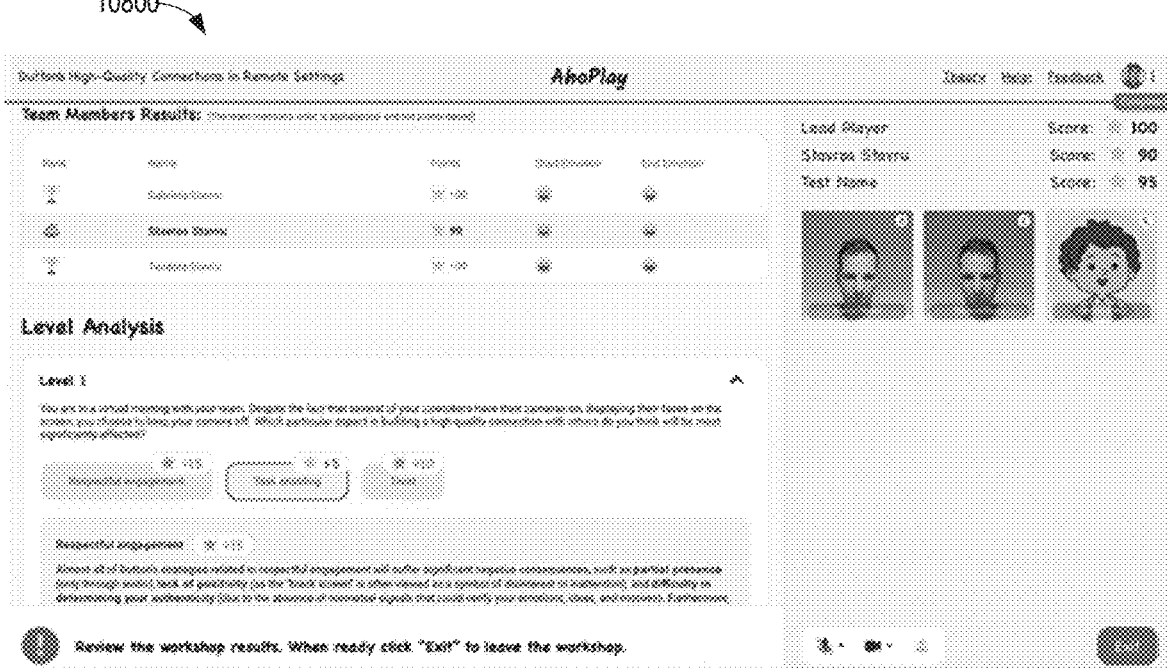
FIG. 108 illustrates an example second user interface associated with reviewing the results of a group activity.

FIG. 108 illustrates an example second user interface 10800 associated with reviewing the results of a group activity. In the example of FIG. 108, the participant can view the results for each individual user, including selected emotions before and after the workshop.

Figure 109:
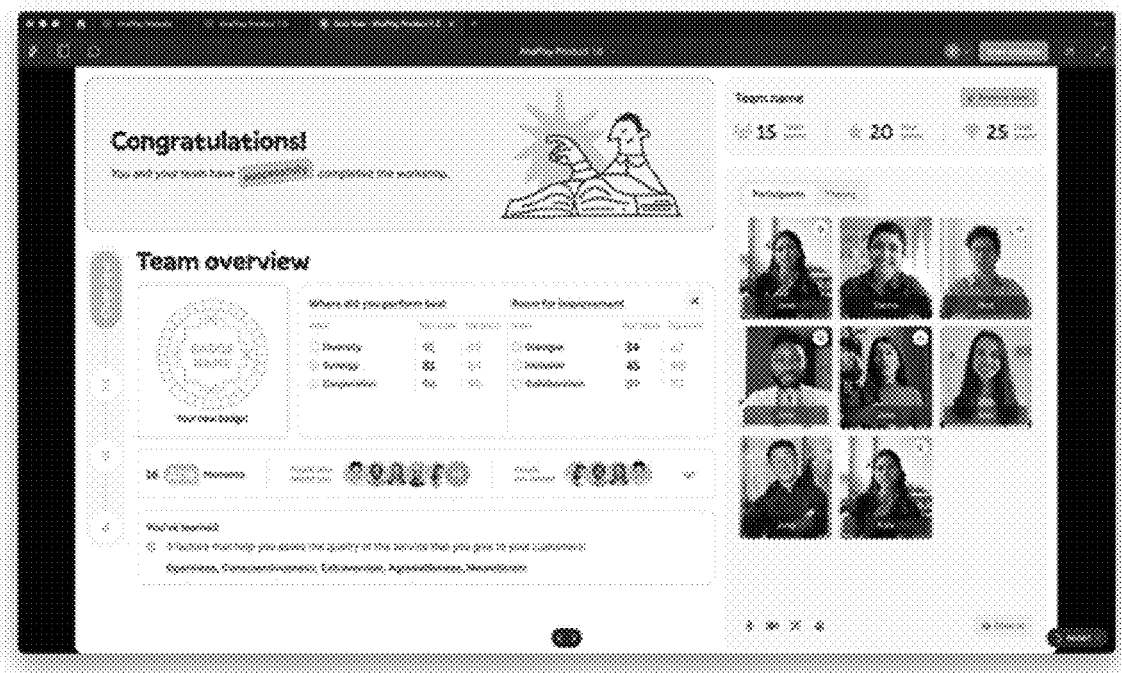
FIG. 109 illustrates an example third user interface associated with reviewing the results of a group activity.

FIG. 109 illustrates an example third user interface 10900 associated with reviewing the results of a group activity. In the example of FIG. 109, different components are displayed including team and personal statistics, areas for improvement, endorsements, experienced aha moments, unlocked badges and certificates, the journey this conversation is part of, details regarding the exercises, and/or assignments, among others.

Figures 110, 111:
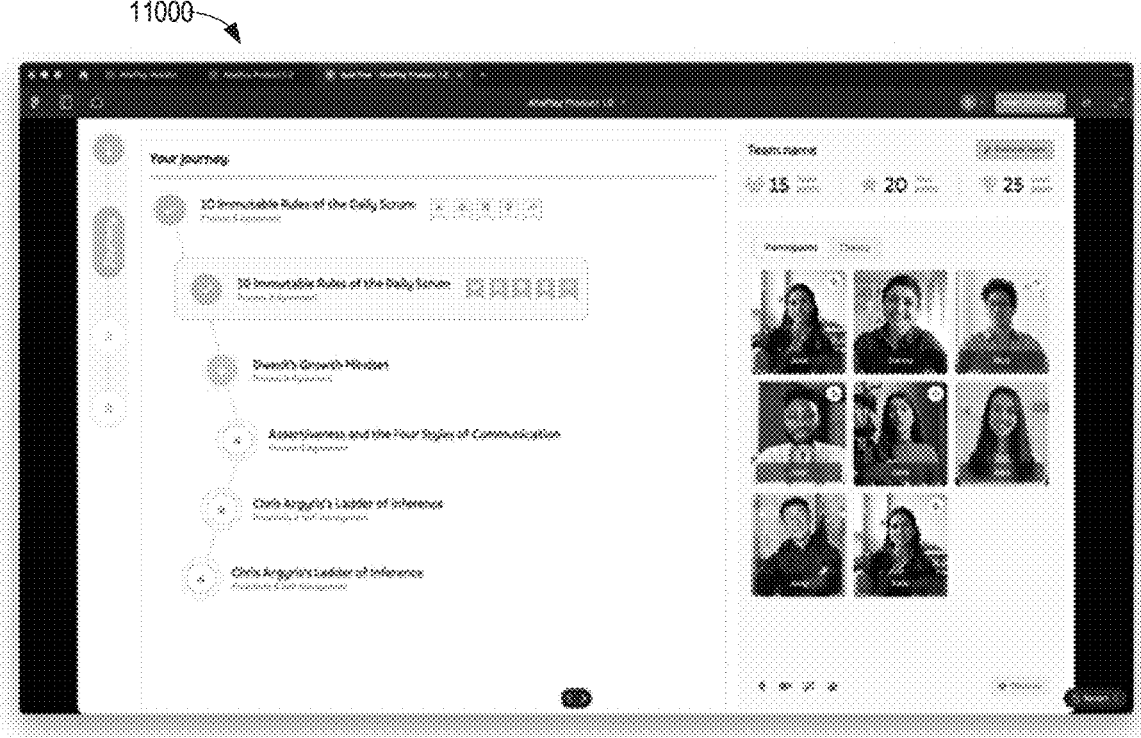
FIG. 110 illustrates an example fourth user interface associated with reviewing the results of a group activity.
FIG. 111 illustrates an example fifth user interface associated with reviewing the results of a group activity.

FIG. 110 illustrates an example fourth user interface 11000 associated with reviewing the results of a group activity. In the example of FIG. 110, the user interface includes the journey taken by the participant (e.g., workshops completed, etc.).

FIG. 111 illustrates an example fifth user interface 11100 associated with reviewing the results of a group activity. In the example of FIG. 111, the user interface includes workshop assignments.

Figure 112:
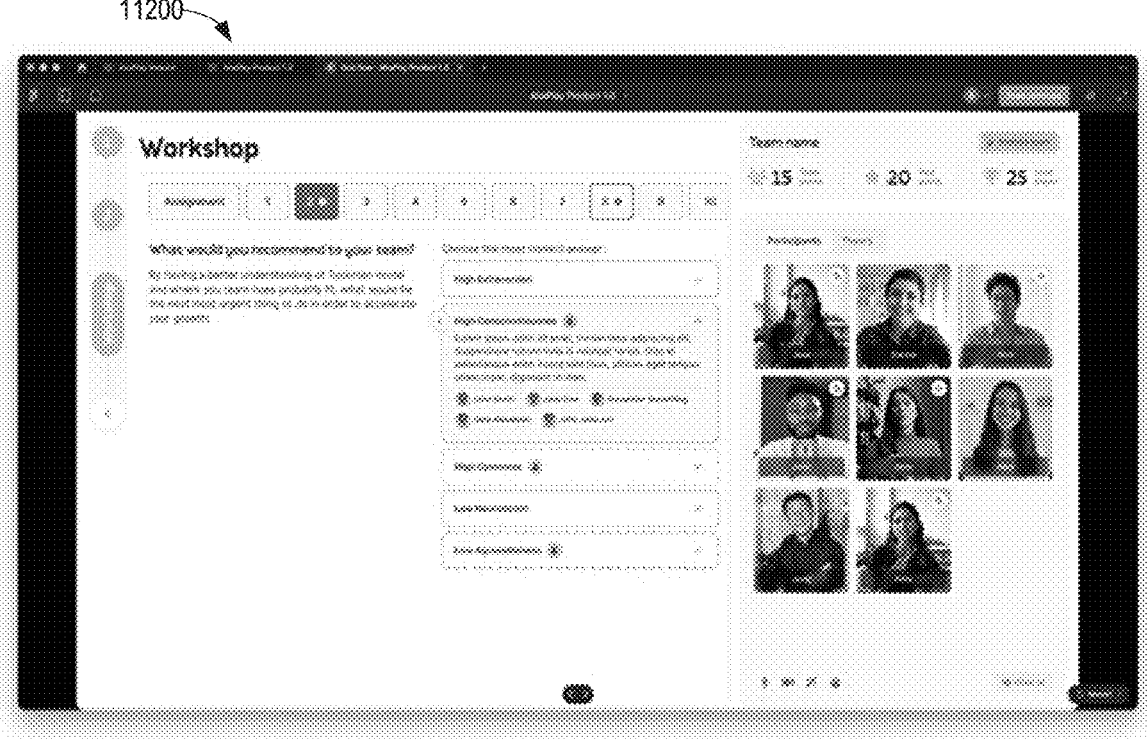
FIG. 112 illustrates an example sixth user interface associated with reviewing the results of a group activity.

FIG. 112 illustrates an example sixth user interface 11200 associated with reviewing the results of a group activity. In the example of FIG. 112, the user interface includes an area allowing the participant to provide a recommendation to the rest of the team.

Figure 113:
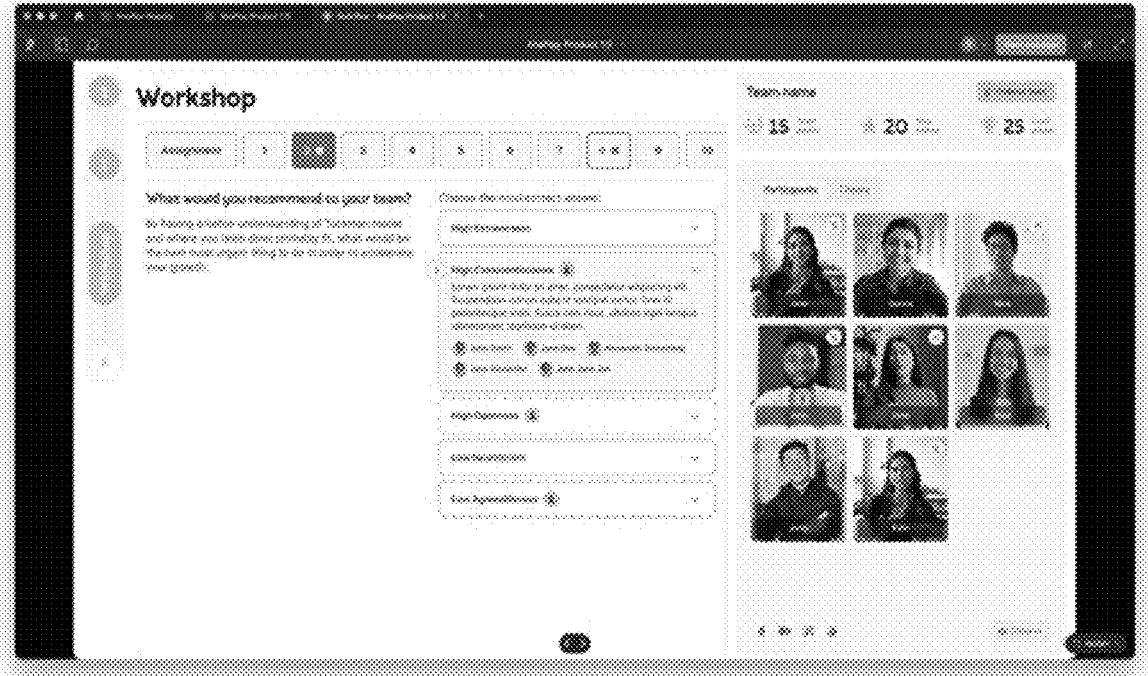
FIG. 113 illustrates an example seventh user interface associated with reviewing the results of a group activity.

FIG. 113 illustrates an example seventh user interface 11300 associated with reviewing the results of a group activity. In the example of FIG. 113, the user interface includes unlocked books and/or links.

Figure 114:
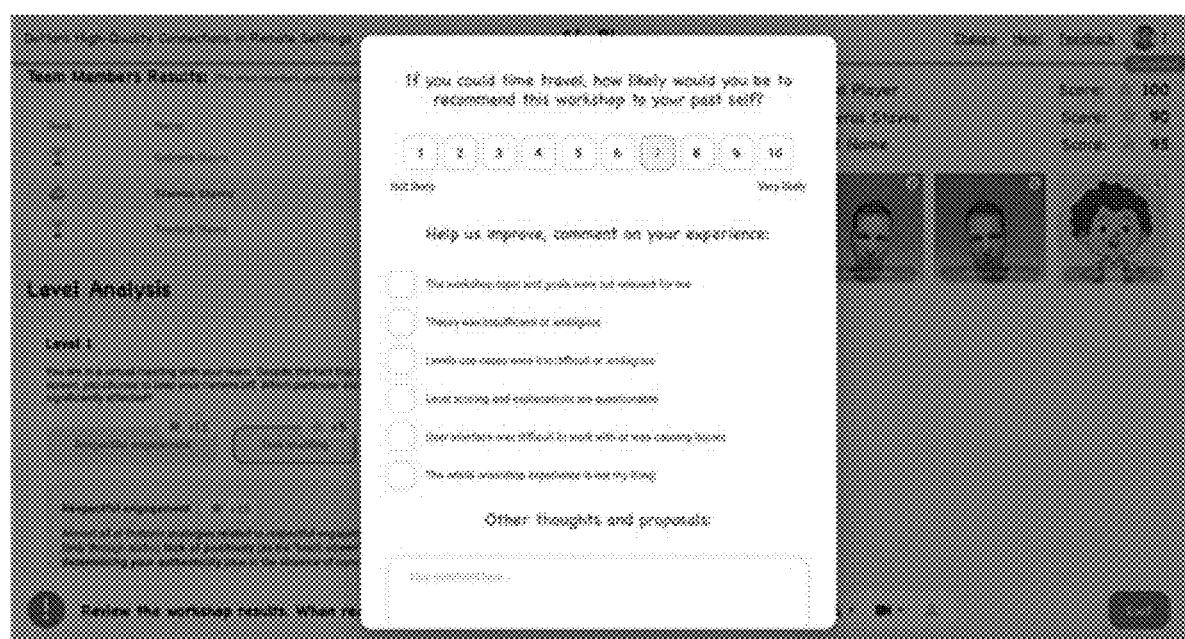
FIG. 114 illustrates an example eight user interface associated with reviewing the results of a group activity.

FIG. 114 illustrates an example eight user interface 11400 associated with reviewing the results of a group activity. In the example of FIG. 114, the user interface includes an option for the user to provide feedback on the workshop.

Figure 115:
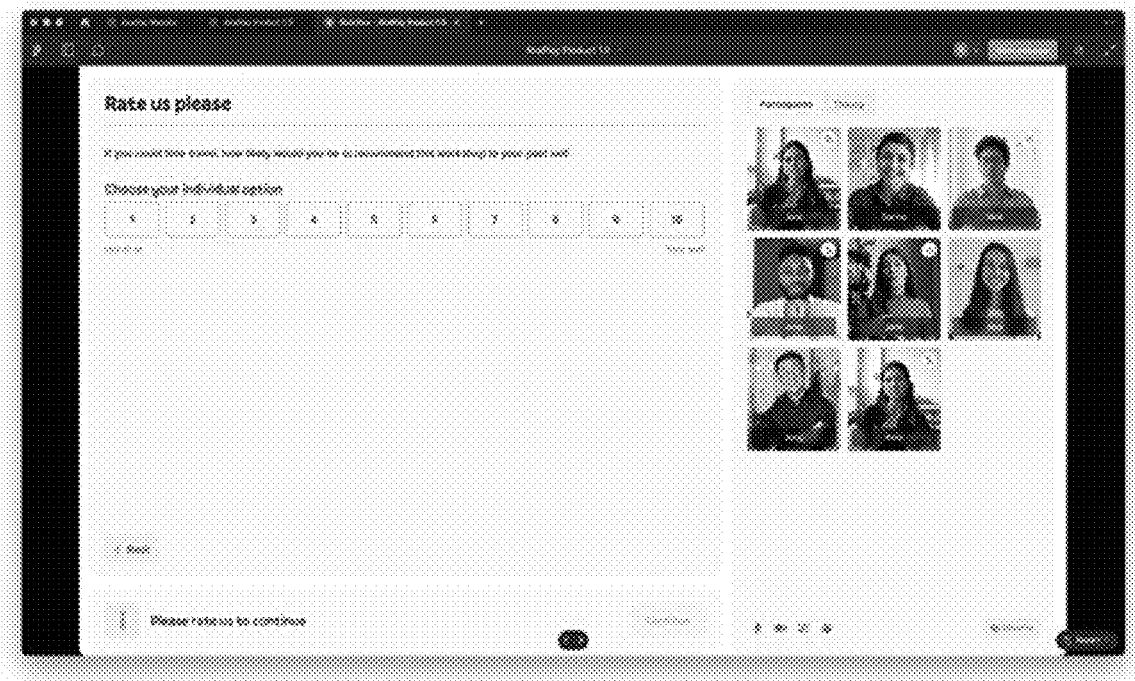
FIG. 115 illustrates an example ninth user interface associated with reviewing the results of a group activity.

FIG. 115 illustrates an example ninth user interface 11500 associated with reviewing the results of a group activity. In the example of FIG. 115, an alterative user interface is presented for recommending the workshop.

Figures 116, 117:
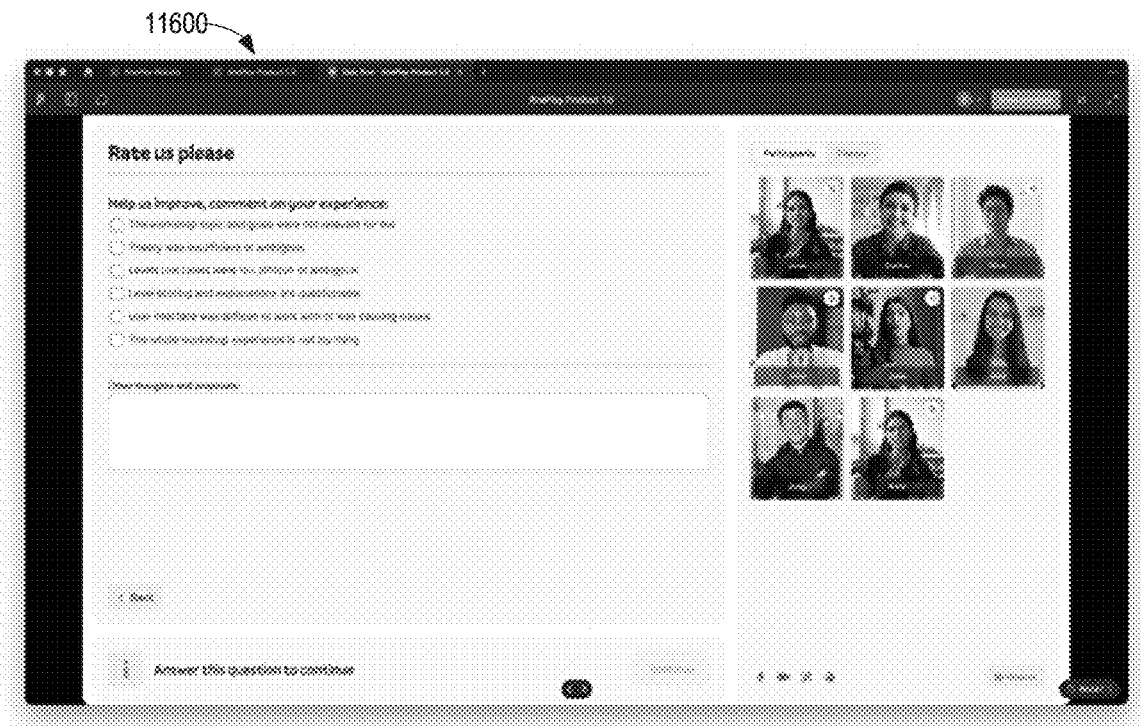
FIG. 116 illustrates an example ninth user interface associated with reviewing the results of a group activity.
FIG. 117 illustrates an example first user interface associated with exiting a conversation.

FIG. 116 illustrates an example ninth user interface 11600 associated with reviewing the results of a group activity. In the example of FIG. 116, an alterative user interface is presented for improving the workshop and/or providing feedback.

FIG. 117 illustrates an example first user interface 11700 associated with exiting a conversation. In the example of FIG. 117, with the completion of the conversation, each participant is provided with an option to exit the client (e.g., using a red "Exit" icon in the lower right-hand corner of the user interface). In some examples, by exiting the session, the participant may be asked to provide a summary of their experience with the conversation platform. In some examples, by confirming their exit, the client circuitry 125 of FIGS. 1-2 closes the connection with the server circuitry 145 of FIGS. 1-2 and the virtual conferencing system. The server circuitry 145 of FIGS. 1-2 then updates the conversation state and sends the state back to all the clients, indicating to the rest of the participants that another participant has left.

Figures 118, 119:
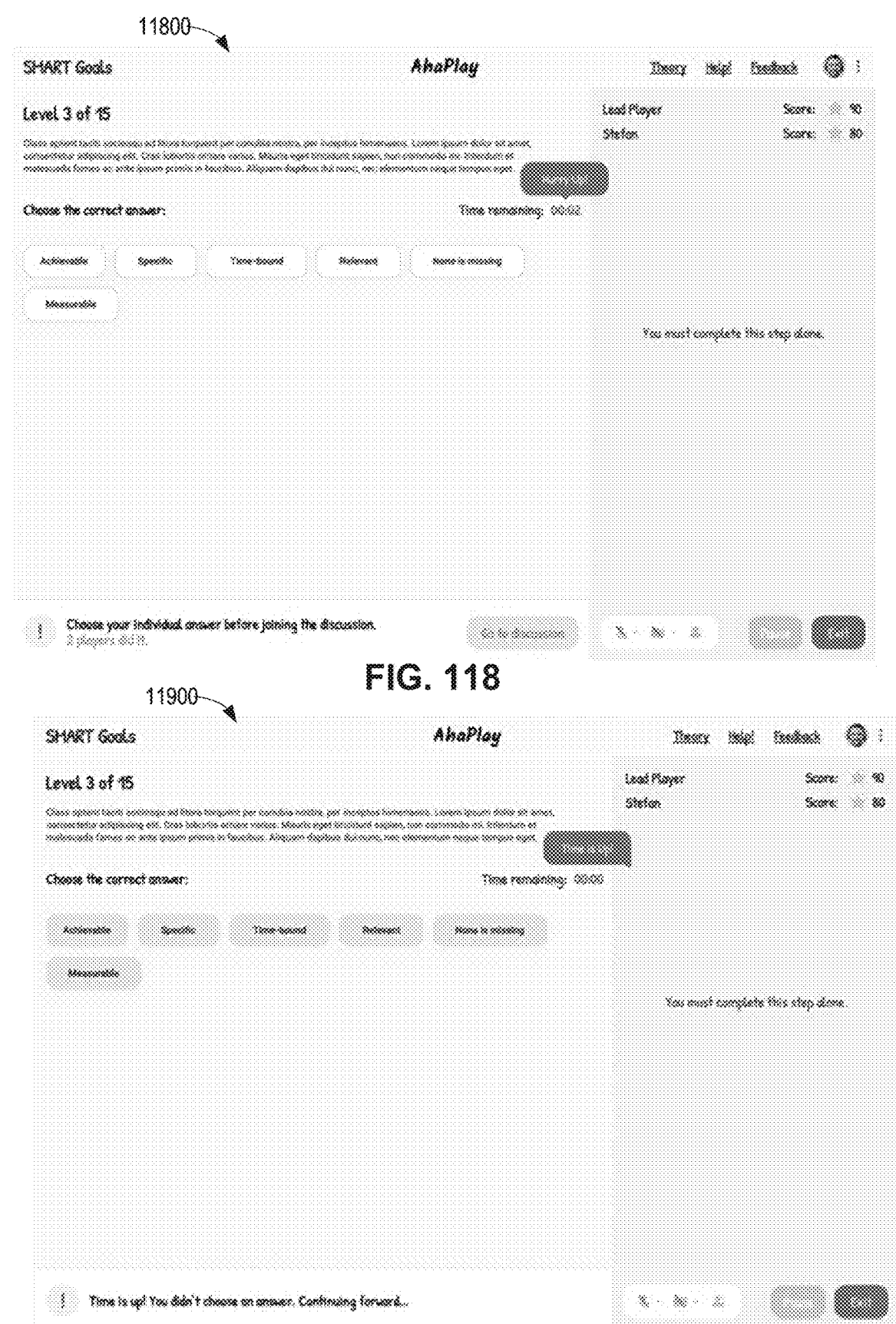
FIG. 118 illustrates an example second user interface associated with exiting a conversation.
FIG. 119 illustrates an example third user interface associated with exiting a conversation.
Figures 120, 121:
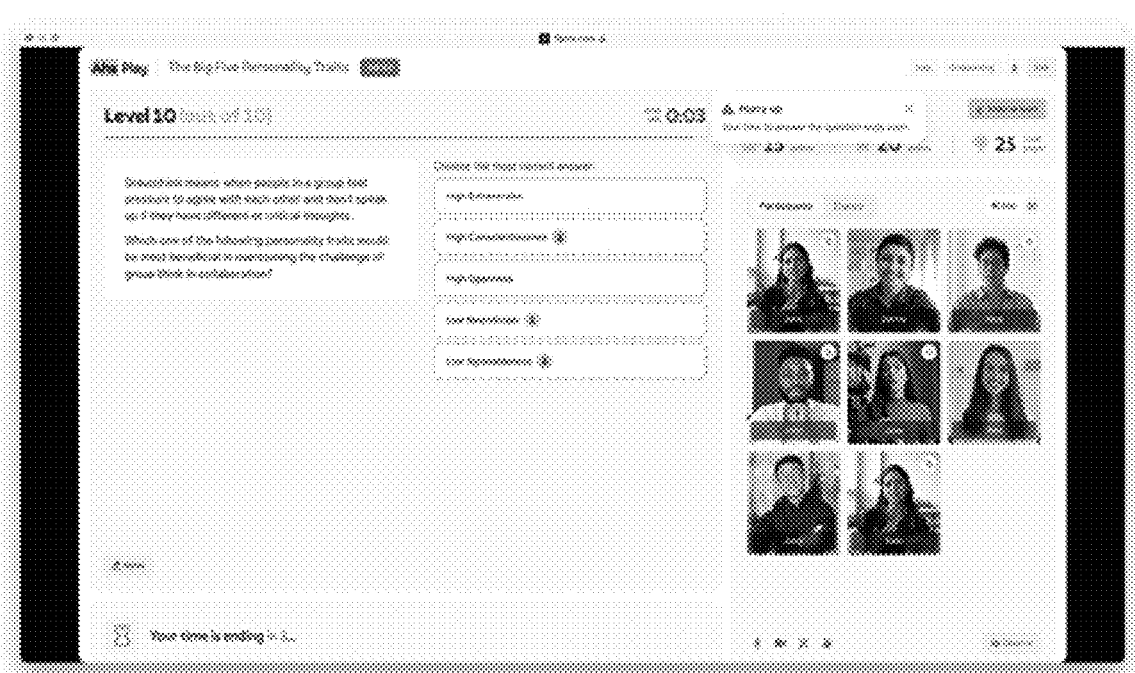

FIG. 118 illustrates an example second user interface 11800 associated with exiting a conversation. In the example of FIG. 118, the user is prompted to choose an answer before exiting the conversation. In some examples, activities are timeboxed and might trigger a timeout. In some examples, the client circuitry 125 of FIGS. 1-2 or the server circuitry 145 of FIGS. 1-2 manages the timeboxes. In some examples, the server circuitry 145 of FIGS. 1-2 can update the conversation state to indicate to all clients that a timeout has occurred. Depending on the activity, the timeout may trigger updating the conversation progress and outcome, resulting in a transition on the client side. In some examples, the timeout is for the entire conversation flow (e.g., represented as a red progress bar), as shown in FIGS. 120-121. In some examples, there is a timeout for a given activity (e.g., represented as a countdown timer), as shown in FIGS. 118-119.

FIG. 119 illustrates an example third user interface 11900 associated with exiting a conversation. In the example of FIG. 119, the user is alerted that the time to complete the activity is up using a timeout for a given activity (e.g., represented as a countdown timer).

FIG. 120 illustrates an example fourth user interface 12000 associated with exiting a conversation. In the example of FIG. 120, the user is alerted that the time to complete the activity is up using a timeout for a given activity (e.g., represented as a red progress bar).

FIG. 121 illustrates an example fifth user interface 12100 associated with exiting a conversation. In the example of FIG. 121, the user is notified that the time is completed and provides a total number of points earned for the answer.

Figures 122, 123:
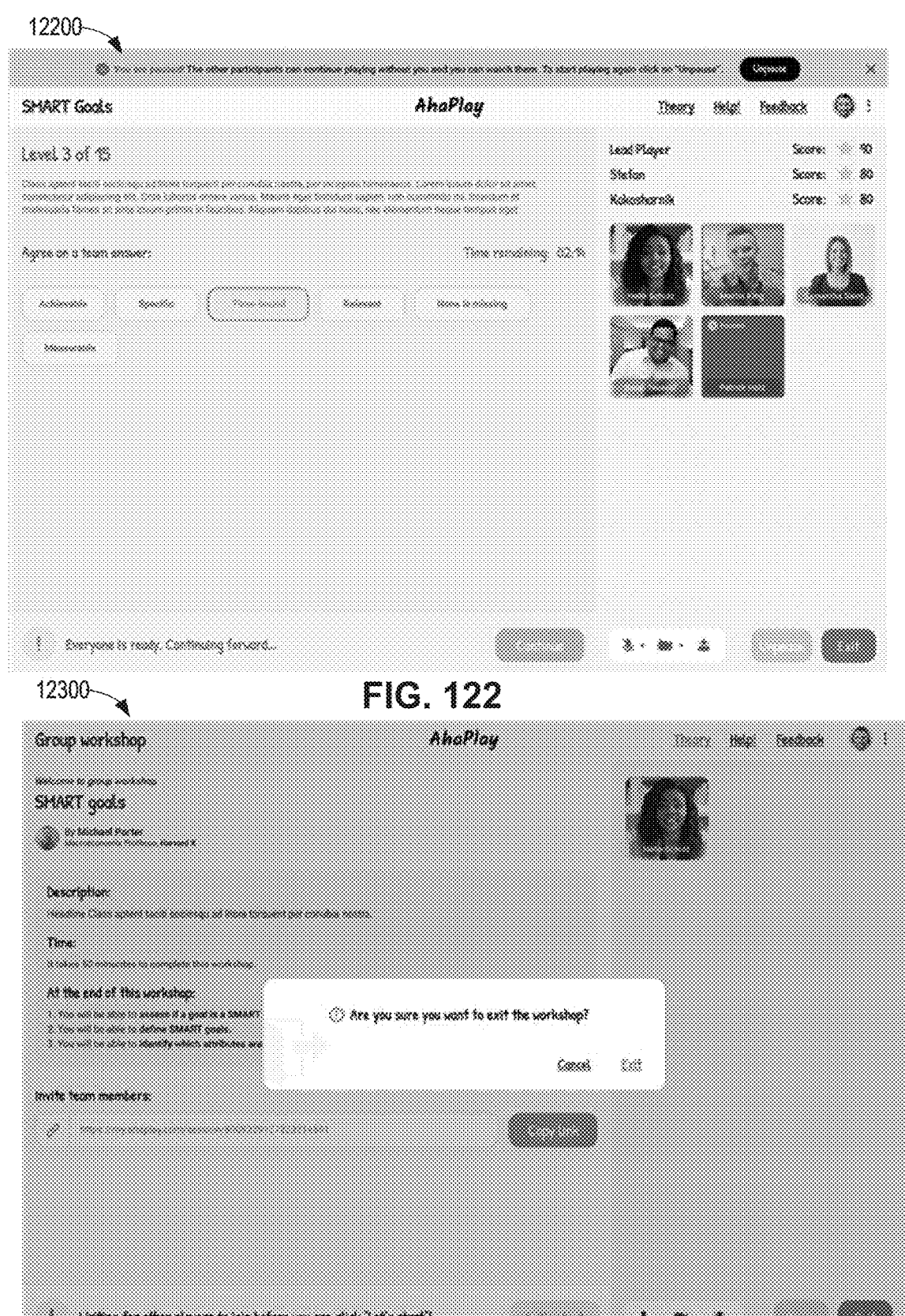

FIG. 122 illustrates an example first user interface 12200 associated with changing roles during the execution of the conversation flow. For example, participants can change roles during the execution of the conversation flow. Given an observer and an actor, if the actor changes their role into an observer (e.g., by selecting "Pause"), the client circuitry 125 of FIGS. 1-2 sends the user input to the server circuitry 145 of FIGS. 1-2 and the server circuitry 125 of FIGS. 1-2 updates the conversation state (e.g., marks the state as "paused"). Subsequently, when the new conversation state is received by the clients, they will indicate to the rest of the participants that one of the participants has paused. Except for participants manually changing their roles, the activities and tasks within the conversation flow can also perform this function automatically.

FIG. 123 illustrates an example second user interface 12300 associated with changing roles during the execution of the conversation flow. In some examples, a participant might leave, rejoin or join at any time during the conversation. As with the changing roles described in connection with FIG. 122, the client circuitry 125 of FIGS. 1-2 notifies the server circuitry 145 of FIGS. 1-2 about these events, which updates the conversation state accordingly (e.g., flagging within the participant's state that the user is offline, online, etc.).

Figures 124, 125:
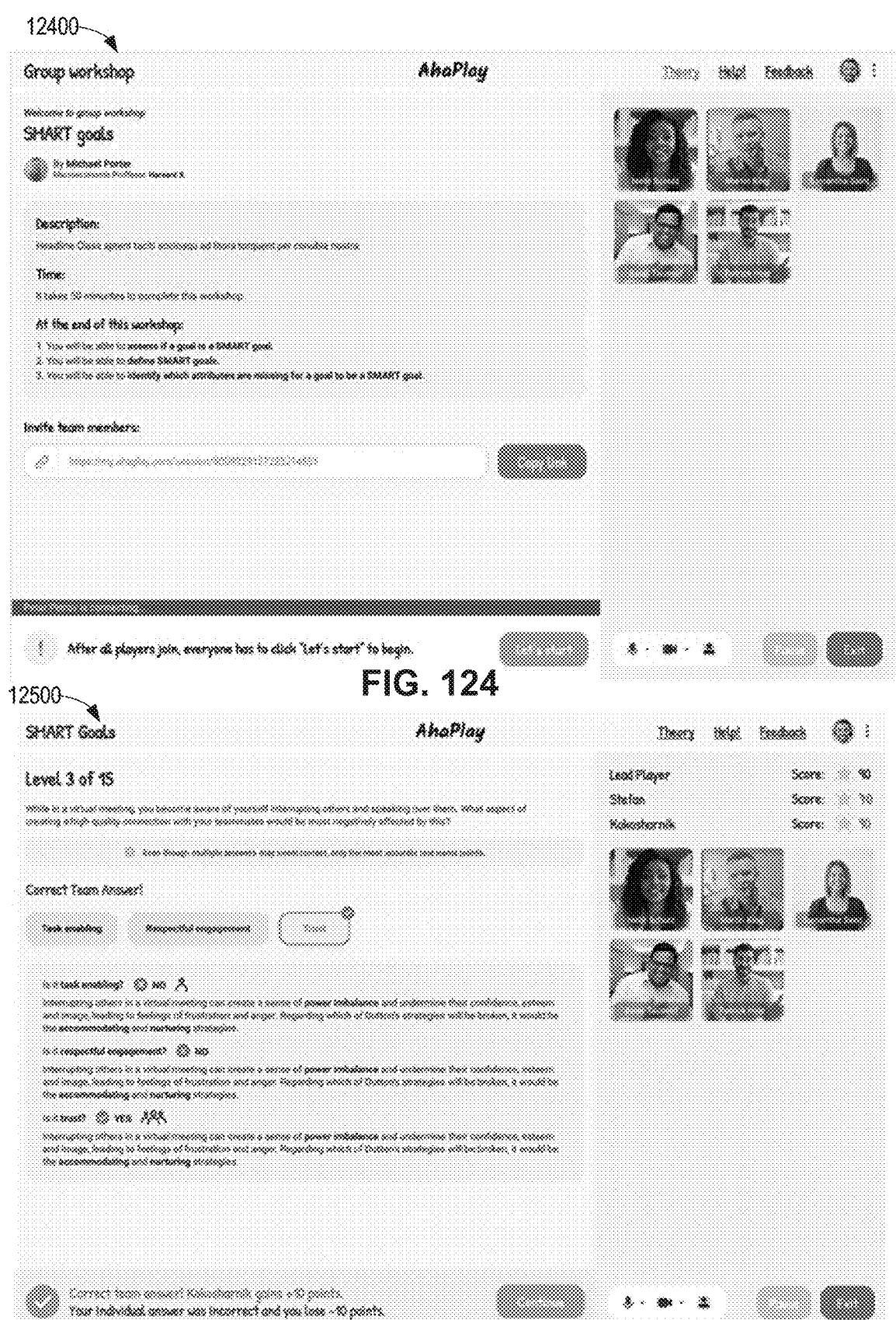

FIG. 124 illustrates an example first user interface 12400 associated with identifying an outcome of the conversation. In the example of FIG. 124, the user is shown the description of a group workshop.

FIG. 125 illustrates an example second user interface 12500 associated with identifying an outcome of the conversation. In the example of FIG. 125, although there are no limitations on how the conversation outcome might be calculated, in this conversation flow (e.g., associated with the workshop of FIG. 124), there are points which are calculated based on the degree of correctness of the individual answers given by the participants. In some examples, these calculations can be performed using the client circuitry 125 of FIGS. 1-2 and/or the server circuitry 145 of FIGS. 1-2 based on the specific conversation flow and/or specific activities and tasks.

Figures 126, 127:
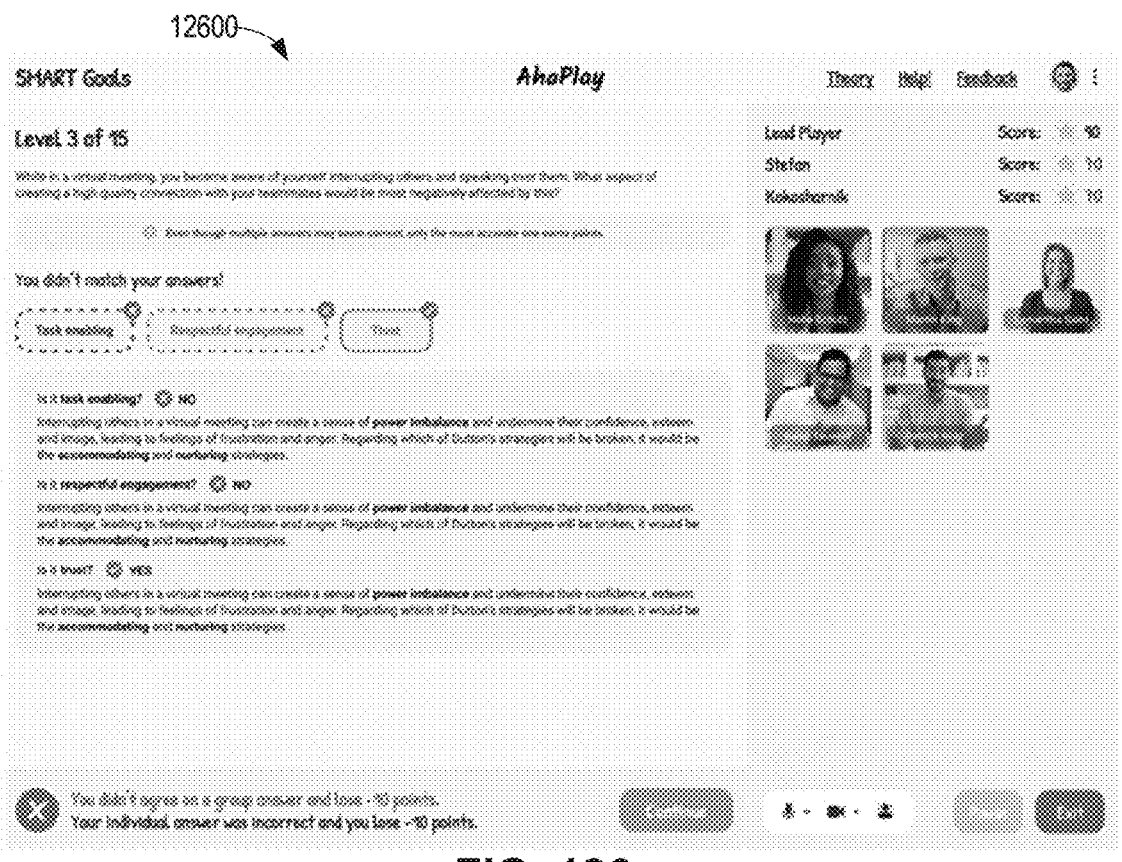

FIG. 126 illustrates an example third user interface 12600 associated with identifying an outcome of the conversation.

In the example of FIG. 126, the conversation outcome is shown to be negatively impacted if the participants do not reach consensus.

FIG. 127 illustrates an example first user interface 12700 associated with a conversation flow. In some examples, how the conversation flow is defined can depend on author-based specific goals, audiences, time limitations, etc. In some examples, the authors might find it useful for learning and building a shared understanding on a given topic based on activities that first provide a theory, followed by a series of case studies to practice this theory (e.g., developing a conversational workshop for learning). In some examples, the activities might be completely reorganized, new activities added, and/or some activities replaced, creating a completely new conversation flow. In some examples, confirmations, consents and/or consensuses should be clear for each activity in the flow to allow the client circuitry 125 of FIGS. 1-2 and/or the server circuitry 145 of FIGS. 1-2 to execute the given conversation flow. In some examples, this knowledge is embedded in the server circuitry 145 of FIGS. 1-2 as business logic (e.g., indicated using an identifier or the type of the activity), or can be part of the data structure within the activity itself.

In some examples, an example conversational workshop for alignment can include a technical setup (e.g., solo activity), starting the conversation (e.g., group activity), selecting an initial emotion (e.g., group activity), defining a team name (e.g., team activity), reviewing the assignment (e.g., solo activity), discussing a statement (e.g., composite activity), stating an individual position (e.g., solo activity), stating a collective position (e.g., team activity), conceptualizing (e.g., composite activity), and conceptualizing individually (e.g., solo activity). For example, reviewing the assignment is similar to reviewing the theory (e.g., where the participant is alone in a personal information room). The difference is that the activity is for the participant to familiarize themselves with what is expected from them as part of the conversation (e.g., "Write your own definition of leadership" as shown in connection with FIGS. 127-130), while the tasks might be to watch a video or review a text.

In some examples, discussing a statement can be very similar to solving a case study with a right/wrong answer. In some examples, discussing a statement can include stating an individual position and stating a collective position. For example, stating the individual position can be identical to the previously described individual solving of the case study activity (e.g., in terms of the user interface). In examples disclosed herein, the participant can take a position on a given statement, give an opinion on a given topic, and/or solve a particular problem. In some examples, once the last participant gives their confirmation by selecting "Go to discussion", the client circuitry 125 of FIGS. 1-2 sends the user input to the server circuitry 145 of FIGS. 1-2, and the server circuitry 145 of FIGS. 1-2 verifies the presence of a consensus, updating the conversation progress and outcome, and sending the new conversation state to all the clients, triggering a transition.

In some examples, stating a collective position activity can be identical to the collective solving of the case study activity previously described. The difference between these activities lies in their specific tasks (e.g., building a collective opinion as opposed to choosing the correct answer). In some examples, conceptualizing individually can include having each participant in a personal exercise room and performing an exercise (e.g., depending on what has been assigned to the participant in the "Reviewing the Assignment" activity). In the example where the question is "To define what leadership is", the activity can require from the participant to compose their own definition of leadership in an input field or complete a form with ten inputs, each corresponding to one of the top ten essential traits required to become a successful leader. Once ready, the user should provide confirmation (e.g. by selecting "Continue"). The server circuitry 145 of FIGS. 1-2 then checks for a consensus (e.g., all participants are ready to "Continue") and updates the clients (e.g., via the client circuitry 125 of FIGS. 1-2) to continue forward to the next activity, as shown in connection with FIGS. 128-130.

Figures 128, 129:
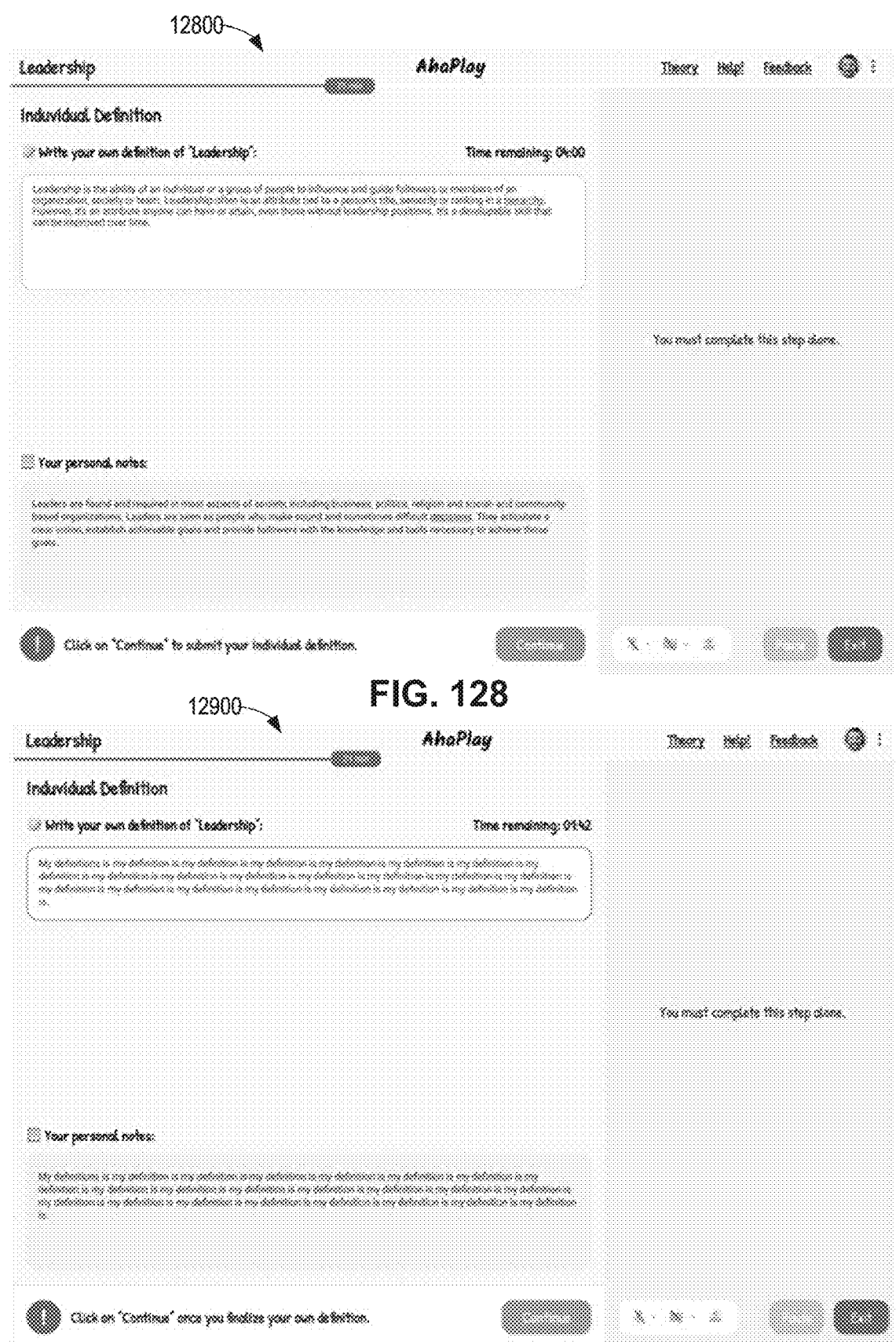

FIG. 128 illustrates an example second user interface 12800 associated with a conversation flow, where the user is notified to select "Continue" to submit their response.

FIG. 129 illustrates an example third user interface 12900 associated with a conversation flow, where the user is notified to select "Continue" after finalizing their definition.

Figure 130:
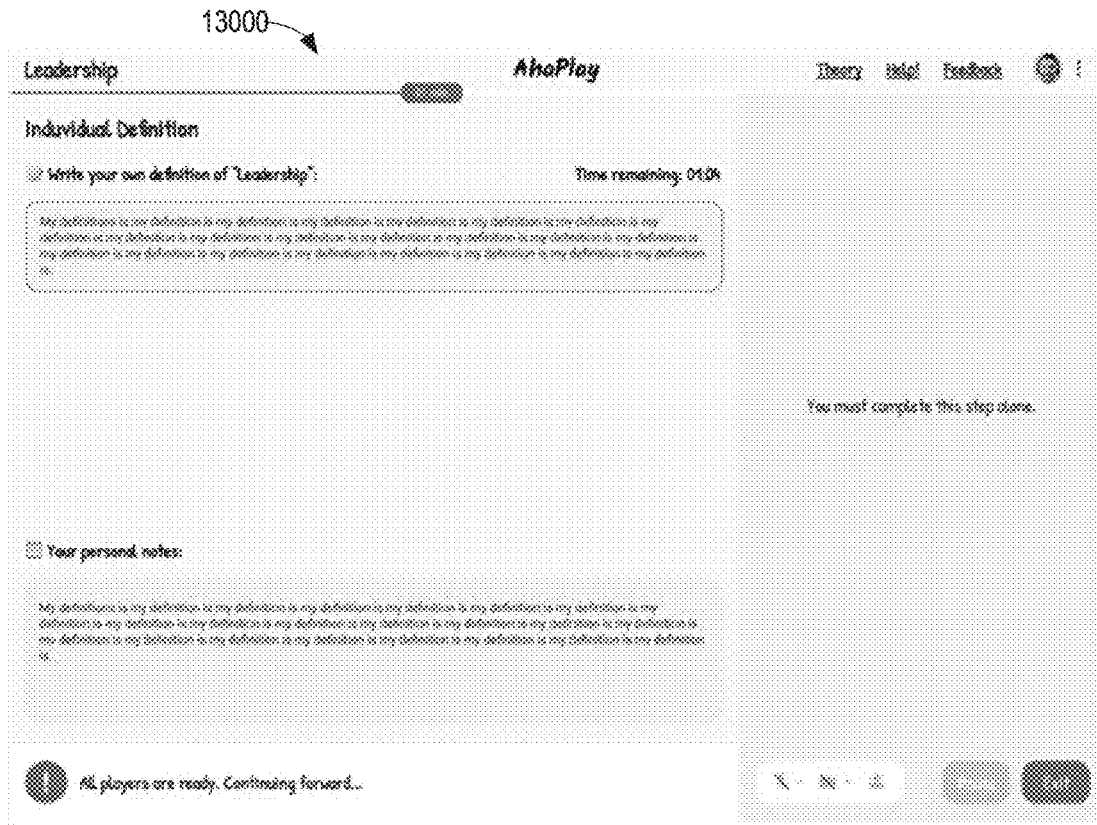

FIG. 130 illustrates an example fourth user interface 13000 associated with a conversation flow, where the user is notified that all players are ready. For example, the server circuitry 145 of FIGS. 1-2 updates the conversation state to indicate that there is a consensus to continue.

Figure 131:
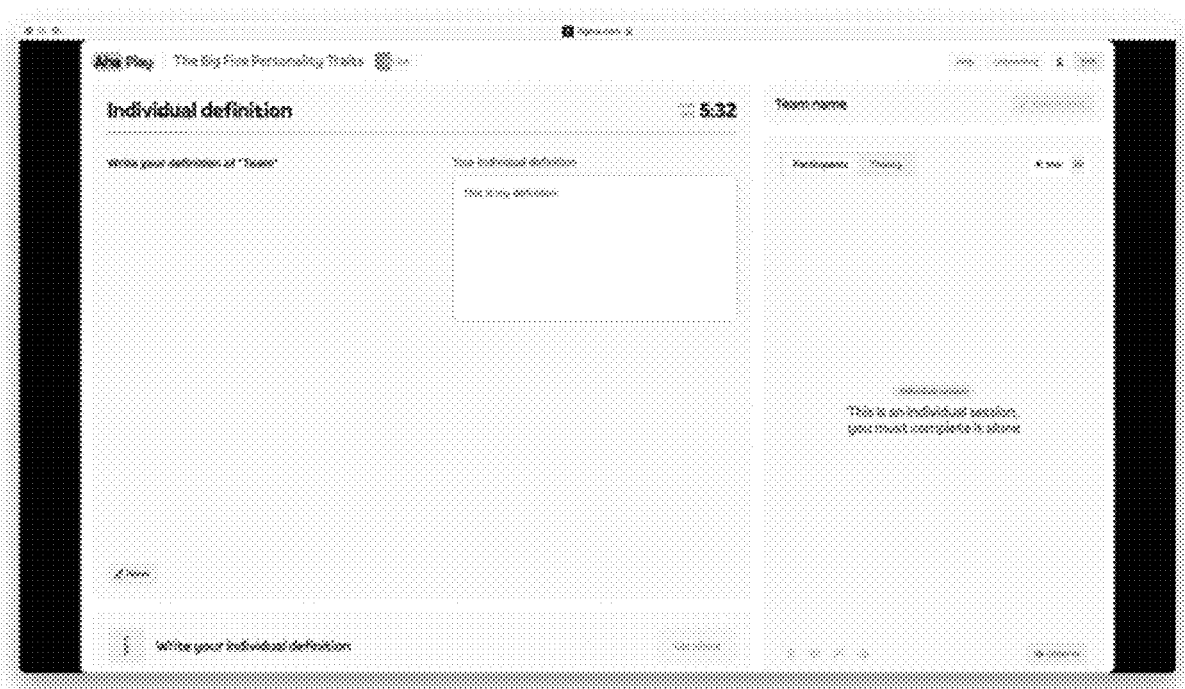

FIG. 131 illustrates an alternative first user interface 13100 associated with a conversation flow, where the user can provide their individual definition.

FIG. 132 illustrates an alternative second user interface 13200 associated with a conversation flow, where the user is notified to submit their individual definition.

FIG. 133 illustrates an alternative third user interface 13300 associated with a conversation flow, where the user is notified that everyone is to agree on a team definition to continue.

FIG. 134 illustrates an example first user interface 13400 associated with a definition entry, where the user's definition entry is displayed, and the user is prompted to enter a team definition. In some examples, the participants are engaged in conceptualizing as a group, as shown in connection with FIGS. 134-140. For example, the participants are in a group exercise room. In some examples, the participants might be provided with individual answers from the previous step and invited to create a common definition of leadership in a synchronized input field. Such an activity can be likened to defining a team name activity, as previously described, where the text field might be replaced with a larger text area input for convenience.

FIG. 135 illustrates an example second user interface 13500 associated with a definition entry, where the team definition is displayed separately from the user's own definition.

FIG. 136 illustrates example third user interface 13600 associated with a definition entry, where the team definition is displayed separately from the user's own definition and the user is notified that two players have agreed to the team definition.

FIG. 137 illustrates an example fourth user interface 13700 associated with a definition entry, where the team definition is displayed separately from the user's own definition and the user is notified that three more players need to approve the team definition.

FIG. 138 illustrates an example fifth user interface 13800 associated with a definition entry, where the team definition is displayed separately from the user's own definition and the user is notified that all team players are ready to continue forward.

FIG. 139 illustrates an alternative first user interface 13900 associated with a definition entry, where the team definition is displayed separately from the user's own definition and the user is notified that all players are to agree on a team definition to continue.

FIG. 140 illustrates an alternative second user interface 14000 associated with a definition entry, where the team definition is displayed separately from the user's own definition and the user is notified that two players have agreed on the team definition.

FIG. 141 illustrates an example first user interface 14100 associated with benchmarking individually, where the user selects an individual definition. For example, benchmarking can include benchmarking individually such that each participant is in a personal exercise room. In some examples, the participant may need to choose the closest of all individual definitions in terms of the baseline definition, as part of reviewing the theory. The tasks for the user to complete can include selecting one of the listed individual definitions (e.g., using a set of radio buttons) and/or giving confirmation by selecting "Continue", so that the server circuitry 145 of FIGS. 1-2 can update the conversation state accordingly.

FIG. 142 illustrates an example second user interface 14200 associated with benchmarking individually, where the user selects an answer and proceeds to submit their choice.

FIG. 143 illustrates an alternative first user interface 14300 associated with benchmarking individually, where the user votes for the most accurate individual definition.

FIG. 144 illustrates an alternative second user interface 14400 associated with benchmarking individually, where the user is notified that two more players need to provide their input.

FIG. 145 illustrates an alternative third user interface 14500 associated with benchmarking individually, where the user is notified to proceed with the submission of their choice.

FIG. 146 illustrates an alternative fourth user interface 14600 associated with benchmarking individually, where the user is notified that all players are ready to proceed.

FIG. 147 illustrates an example first user interface 14700 associated with benchmarking as a group. For example, the participants, being in a group exercise room, are tasked with repeating the same process as in the previous step, but to proceed further, the participants collectively reach a consensus by all selecting and confirming the same item from a list of definitions.

FIG. 148 illustrates an example second user interface 14800 associated with benchmarking as a group where the user is notified that all votes match.

FIG. 149 illustrates an example third user interface 14900 associated with benchmarking as a group, where the user is notified that all participants are ready to continue.

FIG. 150 illustrates an alternative first user interface 15000 associated with benchmarking as a group, where the user is notified that answers are to be matched to continue.

FIG. 151 illustrates an alternative second user interface 15100 associated with benchmarking as a group, where the user is provided with an area to create a new definition.

FIG. 152 illustrates an alternative third user interface 15200 associated with benchmarking as a group, where the user is notified to confirm their team answer.

FIG. 153 illustrates an alternative fourth user interface 15300 associated with benchmarking as a group, where the user is notified that all players have agreed on the definition.

FIG. 154 illustrates an alternative fifth user interface 15400 associated with benchmarking as a group, where the user is provided with voting results.

FIG. 155 illustrates an example first user interface 15500 associated with a survey prior to existing the conversation. For example, the participant is in an individual exercise room, where all participants are to complete a survey and/or answer each one of the questions in the survey and then select "Continue" (e.g., provide a consensus input).

FIG. 156 illustrates an example second user interface 15600 associated with a survey prior to existing the conversation, where the user is asked to confirm whether a given description matches their opinion.

FIG. 157 illustrates an example third user interface 15700 associated with a survey prior to existing the conversation, where the user is notified that they have answered all questions successfully.

FIG. 158 illustrates an example fourth user interface 15800 associated with a survey prior to existing the conversation, where the user is notified that three more players need to provide their input.

FIG. 159 illustrates an example first user interface 15900 associated with team alignment. In some examples, the team alignment is linked to a survey activity and shows information based on how participants have completed their tasks in the survey activity.

FIG. 160 illustrates an example second user interface 16000 associated with team alignment, where the user is notified that two players have already made a selection.

FIG. 161 illustrates an example third user interface 16100 associated with team alignment, where the user is notified that the player opinions need to be matched to continue.

FIG. 162 illustrates an example fourth user interface 16200 associated with team alignment, where the user is notified that individual opinions match.

FIG. 163 illustrates an example fifth user interface 16300 associated with team alignment, where the user is reminded to continue when ready with the analysis.

FIG. 164 illustrates an example first user interface 16400 associated with a team recommendation, where the user is reminded to select an individual answer before joining the discussion, with a separate area of the interface showing results associated with a developmental stage (e.g., as part of the analysis results). In some examples, this activity can be similar to the benchmarking activity and/or the case study activity performed with the goal of giving a recommendation to the group. The major difference in terms of the user interface (UI) and user experience (UX) associated with the conversation-based platform disclosed herein is that dynamically, additional options are generated to select from based on proprietary recommendation algorithms.

Other activities also involve providing individual answers. In some examples, the user can enter a suggestion for solving a challenge using a text field, selecting from a predefined list of suggestions, and selecting "Go to Discussion" to provide their confirmation. When collectively reviewing a sharing, all participants are shown an individual sharing and need to choose a group answer. When performing contracting, the participants define and agree on follow-up actions and/or new ways of working. For example, the users can enter their collective decisions and agreements in a synchronized input field and proceed to have other participants confirm the collective decisions by selecting "Continue" button.

FIG. 165 illustrates an example second user interface 16500 associated with a team recommendation, where the user is reminded to select an individual answer before joining the discussion, with a separate area showing all the participants in place of the analysis results.

FIG. 166 illustrates an example third user interface 16600 associated with a team recommendation, where the user is notified that two players have made their selections.

FIG. 167 illustrates an example fourth user interface 16700 associated with a team recommendation, where the user is notified that two players have made their selections and illustrates an example third user interface associated with a team recommendation, where the user is notified that two players have made their selections.

FIG. 168 illustrates an example user interface 16800 associated with making an individual choice. While in the example of FIG. 168, the participant makes an individual choice, in some examples, the participant just shares an opinion rather than stating which answer is right and/or wrong. In some cases, these activities can be encountered in the individual solving of the case study, in the collective solving of the case study, and/or in reaching a consensus.

FIG. 169 illustrates an example user interface 16900 associated with making a collective choice.

FIG. 170 illustrates an example first user interface 17000 associated with making a final individual choice.

FIG. 171 illustrates an example second user interface 17100 associated with making a final individual choice.

FIG. 172 illustrates an example user interface 17200 associated with performing a case study review.

FIG. 173 illustrates an example first user interface 17300 associated with a brainstorming session. In a collective brainstorming session, the participants can generate and submit an idea without the other participants needing to accept the idea (e.g., such an activity requires a consent but not a consensus).

FIG. 174 illustrates an example second user interface 17400 associated with a brainstorming session.

FIG. 175 illustrates an example first user interface 17500 associated with comparing collective definitions. In some examples, an activity may be a solo activity or a composite activity (e.g., where participants first brainstorm on their own, then together as a group, and then review the ideas generated). A comparison activity as shown herein includes participants comparing different items (e.g., for example texts, images, videos, etc.), including content that they have generated in previous activities.

FIG. 176 illustrates an example second user interface 17600 associated with comparing collective definitions.

FIG. 177 illustrates an example third user interface 17700 associated with comparing collective definitions. In the example of FIG. 177, the participant can engage in filtering. For example, filtering can include individual filtering (e.g., the participant, located in an individual exercise room, is asked to filter items from a set of items based on specific criteria), group filtering (e.g., all participants, located in a group exercise room, have to reach consensus on what should be the selected items from the entire list), and a reviewing of the filtering (e.g., the participant, in a group exercise room, reviews the correct filtering of items and their explanation, in the context of a theory which was presented to the participant in a reviewing the theory activity).

FIG. 178 illustrates an example fourth user interface 17800 associated with comparing collective definitions.

FIG. 179 illustrates an example fifth user interface 17900 associated with comparing collective definitions.

FIG. 180 illustrates an example user interface 18000 associated with information provided to the user (e.g., video and transcript) to assist with completing an assignment.

FIG. 181 illustrates an example user interface 18100 associated with making a collective choice.

FIG. 182 illustrates an example first user interface 18200 associated with performing a collective translation. For example, the translation activity can include all participants assembled (e.g., in a virtual group exercise room) to rewrite/ rephrase/translate certain texts and/or a type of media (e.g., including content generated in previous activities). This activity might have different variants, including only being a solo activity or a composite activity (e.g., where participants first make the translations of items on an individual basis, then continue the translation as a group, and then perform a final review).

FIG. 183 illustrates an example second user interface 18300 associated with performing a collective translation.

FIG. 184 illustrates an example third user interface 18400 associated with performing a collective translation.

FIG. 185 illustrates an example fourth user interface 18500 associated with performing a collective translation.

FIG. 186 illustrates an example fifth user interface 18600 associated with performing a collective translation.

FIG. 187 illustrates an example sixth user interface 18700 associated with performing a collective translation.

FIG. 188 illustrates an example seventh user interface 18800 associated with performing a collective translation.

FIG. 189 illustrates an example eight user interface 18900 associated with performing a collective translation.

FIG. 190 illustrates an example ninth user interface 19000 associated with performing a collective translation.

FIG. 191 illustrates an example tenth user interface 19100 associated with performing a collective translation.

FIG. 192 illustrates an example eleventh user interface 19200 associated with performing a collective translation.

FIG. 193 illustrates an example first user interface 19300 associated with sharing of an aha moment. For example, participants (e.g., located in a virtual group exercise room) share the personal or collective insights they obtain from participating in certain activities and/or the entire conversation.

FIG. 194 illustrates an example second user interface 19400 associated with sharing of an aha moment.

FIG. 195 illustrates an example third user interface 19500 associated with sharing of an aha moment.

FIG. 196 illustrates an example fourth user interface 19600 associated with sharing of an aha moment.

FIG. 197 illustrates an example fifth user interface 19700 associated with sharing of an aha moment.

FIG. 198 illustrates an example user interface 19800 associated with a group brainstorming activity. For example, all participants are together (e.g., in a group exercise room) and they generate and submit each idea with full consensus. This activity might have different variants, including only being a solo activity or being a composite activity (e.g., where participants first brainstorm on their own, then together as a group through consensus, and lastly review the ideas generated).

FIG. 199 illustrates an example first user interface 19900 associated with performing a categorization. For example, categorizing a list of items can include performing an individual categorization (e.g., the participant, located in an individual exercise room, is asked to distribute items in predefined categories), a group categorization (e.g., all participants in a group exercise room reach consensus on what should be the final categorization of these items), and reviewing of the categorization (e.g., the participant is in a group exercise room). For example, all participants can be asked to review the correct categorization of items and item explanation (e.g. in the context of a theory which was presented to them in a "Reviewing the Theory" activity), while the tasks can involve understanding and aligning on the topic by selecting "Continue".

FIG. 200 illustrates an example second user interface 20000 associated with performing a categorization.

FIG. 201 illustrates an example third user interface 20100 associated with performing a categorization.

FIG. 202 illustrates an example fourth user interface 20200 associated with performing a categorization.

In some examples, activities of the conversation workshop can include ordering/ranking of a list of items (e.g., composite activity), which can include individual ordering of a list of items (e.g., an individual activity), where the participant is asked to arrange a set of items in an ordered list. The confirmation might be the participant selecting "Continue" button, while the consensus can include all participants selecting "Continue" (e.g., all participants agreeing to continue forward). In some examples, ordering/ranking can include group ordering of a list of items (e.g., a group activity). In some examples, all participants (e.g., in a group exercise room) agree with a particular ordering of a list which is represented by a synchronization input. Once there is an agreement among the participants, the participants confirm agreement (e.g., by selecting "Continue") and if the server circuitry 145 of FIGS. 1-2 determines the presence of consensus, the workshop starts to progress.

In some examples, activities of the conversation workshop can also include reviewing the explanation of the ordering (e.g., in a semigroup activity). For example, all participants review the correct ordering of items and corresponding explanation (e.g., in the context of a theory which was presented to the participants in a Reviewing the Theory activity), while the tasks for the participants can include improving their understanding and aligning on the topic by selecting "Continue" (e.g., providing consensus input).

In some examples, activities of the conversation workshop can also include solving a puzzle (e.g., as a group activity), where all participants synchronize their efforts to solve a common puzzle. For example, this could be constructing a common textual or logical riddle through assembling participants' individual texts and then solving the riddle through consensus. In some examples, each participant shares information which is only available to them and tries to answer a question which requires the entire group to have all the pieces of information.

In some examples, activities of the conversation workshop can also include role playing (e.g., as a group activity), where in a group exercise room some of the participants assume specific roles (e.g., a manager), while some other participants assume another role (e.g., a subordinate). In some examples, there might also be inactive roles such as observers or analyzers, who might give feedback later in the activity. The tasks associated with this activity can include assessing how well the participants have performed their roles and reaching a consensus on a final score.

In some examples, activities of the conversation workshop can also include the participants simulating or presenting something, which the other participants guess through a consensus. All the given example activities described herein are a limited subset of all possible activities that could be created using confirmations, constants, consensuses and their corresponding UI/UX components (e.g., such as synchronization and consensus inputs). The possibility to distribute roles to participants and to allow the dynamic change of the conversation flow during the workshop execution in the client circuitry 125 of FIGS. 1-2 and the server circuitry 145 of FIGS. 1-2 gives the conversation-based platform the opportunity to transform almost any real-life situation into a conversational workshop.

FIG. 203 illustrates an example first user interface 20300 associated with an end-to-end representation of the conversational workshop on a screen-by-screen basis, including an introduction to the conversation workshop.

FIG. 204 illustrates an example second user interface 20400 associated with an end-to-end representation of the conversational workshop on a screen-by-screen basis, including a selection of an emotion by the participant.

FIG. 205 illustrates an example third user interface 20500 associated with an end-to-end representation of the conversational workshop on a screen-by-screen basis, including a workshop introduction and first exercise.

FIG. 206 illustrates an example fourth user interface 20600 associated with an end-to-end representation of the conversational workshop on a screen-by-screen basis, including a brainstorming activity.

FIG. 207 illustrates an example fifth user interface 20700 associated with an end-to-end representation of the conversational workshop on a screen-by-screen basis, including the brainstorming activity.

FIG. 208 illustrates an example sixth user interface 20800 associated with an end-to-end representation of the conversational workshop on a screen-by-screen basis, including an area for inputting a team definition.

FIG. 209 illustrates an example seventh user interface 20900 associated with an end-to-end representation of the conversational workshop on a screen-by-screen basis, including a comparison of the team definitions.

FIG. 210 illustrates an example eight user interface 21000 associated with an end-to-end representation of the conversational workshop on a screen-by-screen basis, including a continuation of the workshop presentation using a video and/or transcript.

FIG. 211 illustrates an example ninth user interface 21100 associated with an end-to-end representation of the conversational workshop on a screen-by-screen basis, including an exercise associated with the conversation workshop.

FIG. 212 illustrates an example tenth user interface 21200 associated with an end-to-end representation of the conversational workshop on a screen-by-screen basis, including the entry of collective translations.

FIG. 213 illustrates an example eleventh user interface 21300 associated with an end-to-end representation of the conversational workshop on a screen-by-screen basis, including the entry of collective translations.

FIG. 214 illustrates an example twelfth user interface 21400 associated with an end-to-end representation of the conversational workshop on a screen-by-screen basis, including a comparison of translations.

FIG. 215 illustrates an example thirteenth user interface 21500 associated with an end-to-end representation of the conversational workshop on a screen-by-screen basis, including an area for entering aha moments associated with the conversation workshop.

FIG. 216 illustrates an example fourteenth user interface 21600 associated with an end-to-end representation of the conversational workshop on a screen-by-screen basis, including entry of an emotion associated with the completion of the workshop.

FIG. 217 illustrates an example fifteenth user interface 21700 associated with an end-to-end representation of the conversational workshop on a screen-by-screen basis, including the sharing of collective aha moments.

FIG. 218 illustrates an example first user interface 21800 associated with additional key features of the conversation platform, such as endorsements. For example, during the conversational workshop, participants can endorse another participant or the entire team for helping them reach an "Aha Moment".

FIG. 219 illustrates an example second user interface 21900 associated with additional key features of the conversation platform, such as endorsements.

FIG. 220 illustrates an example user interface 22000 associated with additional key features of the conversation platform, such as personal achievements. In the example of FIG. 220, specific badges and certifications (e.g., on a personal level or on an organizational level) can be issued based on participant achievements. For example, general nudges and personalized nudges, as well as badges and certifications, can be provided. For example, the conversation's author may want participants to be aware of certain points or events during the conversation, such that some or all the participants receive the same nudge through a notification or other kind of notice (e.g., a pop-up). These nudges could include text, images, or other type(s) of media. For example, some text nudges could be: "Remember to listen to each other" or "Share your opinion", which represent general nudges.

In some examples, different analytics can be generated (e.g., using artificial intelligence) such that each participant or the entire team can receive personalized nudges with recommendations on how to participate during the conversation. Examples of such nudges can include "You have been quiet for a while. Join the conversation or the team might think you're not contributing enough" or "In the last few conversations your speaking time was 85% more than the rest of the participants".

FIG. 221 is a block diagram of an example programmable circuitry platform 22100 structured to execute and/or instantiate the example machine-readable instructions and/or the example operations of FIGS. 3, 5, 7, 8, 9, and/or 11 to implement the example client circuitry 125. The programmable circuitry platform 22100 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 22100 of the illustrated example includes programmable circuitry 22112. The programmable circuitry 22112 of the illustrated example is hardware. For example, the programmable circuitry 22112 can be implemented by one or more integrated circuits, logic circuits, FPGAs microprocessors, CPUs, GPUs, DSPs, and/or microcontrollers from any desired family or manufacturer. The programmable circuitry 22112 may be implemented by one or more semiconductor based (e.g., silicon based) devices. In this example, the processor circuitry 22112 implements the participant identifier circuitry 302, the conversation identifier circuitry 304, the virtual room selector circuitry 306, the user interface manager circuitry 308, and the task manager circuitry 310.

The programmable circuitry 22112 of the illustrated example includes a local memory 22113 (e.g., a cache, registers, etc.). The programmable circuitry 22112 of the illustrated example is in communication with a main memory including a volatile memory 22114 and a non-volatile memory 22116 by a bus 22118. The volatile memory 22114 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 22116 may be implemented by flash memory and/or any other desired type of memory device. Access to the main memory 22114, 22116 of the illustrated example is controlled by a memory controller 22117. In some examples, the memory controller 22117 may be implemented by one or more integrated circuits, logic circuits, microcontrollers from any desired family or manufacturer, or any other type of circuitry to manage the flow of data going to and from the main memory 22114, 22116.

The programmable circuitry platform 22100 of the illustrated example also includes interface circuitry 22120. The interface circuitry 22120 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 22122 are connected to the interface circuitry 22120. The input device(s) 22122 permit(s) a user (e.g., a human user, a machine user, etc.) to enter data and/or commands into the programmable circuitry 22112. The input device(s) 22122 can be implemented by, for example, an audio sensor, a microphone, a camera (still or video), a keyboard, a button, a mouse, a touchscreen, a track-pad, a trackball, an isopoint device, and/or a voice recognition system.

One or more output devices 22124 are also connected to the interface circuitry 22120 of the illustrated example. The output devices 22124 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 22120 of the illustrated example, thus, typically includes a graphics driver card, a graphics driver chip, and/or graphics processor circuitry such as a GPU.

The interface circuitry 22120 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 22126. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The programmable circuitry platform 22100 of the illustrated example also includes one or more mass storage devices 22128 to store software and/or data. Examples of such mass storage devices 22128 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine executable instructions 22132, which may be implemented by the machine readable instructions of FIGS. 3, 5, 7, 8, 9, and/or 11, may be stored in the mass storage device 22128, in the volatile memory 22114, in the non-volatile memory 22116, and/or on at least one non-transitory computer readable storage medium such as a CD or DVD which may be removable.

FIG. 222 is a block diagram of an example programmable circuitry platform 22200 structured to execute and/or instantiate the example machine-readable instructions and/or the example operations of FIGS. 5 and 8 to implement the example server circuitry 145. The programmable circuitry platform 22200 can be, for example, a server, a personal computer, a workstation, a self-learning machine (e.g., a neural network), a mobile device (e.g., a cell phone, a smart phone, a tablet such as an iPad™), a personal digital assistant (PDA), an Internet appliance, a DVD player, a CD player, a digital video recorder, a Blu-ray player, a gaming console, a personal video recorder, a set top box, a headset (e.g., an augmented reality (AR) headset, a virtual reality (VR) headset, etc.) or other wearable device, or any other type of computing and/or electronic device.

The programmable circuitry platform 22200 of the illustrated example includes programmable circuitry 22212. The programmable circuitry 22212 of the illustrated example is hardware. For example, the programmable circuitry 22212 can be implemented by one or more integrated circuits, logic circuits, FPGAs microprocessors, CPUs, GPUs, DSPs, and/or microcontrollers from any desired family or manufacturer. The programmable circuitry 22212 may be implemented by one or more semiconductor based (e.g., silicon based) devices. In this example, the processor circuitry 22212 implements the input identifier circuitry 402, the state identifier circuitry 404, the progress identifier circuitry 406, the outcome identifier circuitry 408, and the synchronizer circuitry 410.

The programmable circuitry 22212 of the illustrated example includes a local memory 22213 (e.g., a cache, registers, etc.). The programmable circuitry 22212 of the illustrated example is in communication with a main memory including a volatile memory 22214 and a non-volatile memory 22216 by a bus 22218. The volatile memory 22214 may be implemented by Synchronous Dynamic Random Access Memory (SDRAM), Dynamic Random Access Memory (DRAM), RAMBUS® Dynamic Random Access Memory (RDRAM®), and/or any other type of RAM device. The non-volatile memory 22216 may be implemented by flash memory and/or any other desired type of memory device. Access to the main memory 22214, 22216 of the illustrated example is controlled by a memory controller 22217. In some examples, the memory controller 22217 may be implemented by one or more integrated circuits, logic circuits, microcontrollers from any desired family or manufacturer, or any other type of circuitry to manage the flow of data going to and from the main memory 22214, 22216.

The programmable circuitry platform 22200 of the illustrated example also includes interface circuitry 22220. The interface circuitry 22220 may be implemented by hardware in accordance with any type of interface standard, such as an Ethernet interface, a universal serial bus (USB) interface, a Bluetooth® interface, a near field communication (NFC) interface, a Peripheral Component Interconnect (PCI) interface, and/or a Peripheral Component Interconnect Express (PCIe) interface.

In the illustrated example, one or more input devices 22222 are connected to the interface circuitry 22220. The input device(s) 22222 permit(s) a user (e.g., a human user, a machine user, etc.) to enter data and/or commands into the programmable circuitry 22212. The input device(s) 22222 can be implemented by, for example, an audio sensor, a microphone, a camera (still or video), a keyboard, a button, a mouse, a touchscreen, a track-pad, a trackball, an isopoint device, and/or a voice recognition system.

One or more output devices 22224 are also connected to the interface circuitry 22220 of the illustrated example. The output devices 22224 can be implemented, for example, by display devices (e.g., a light emitting diode (LED), an organic light emitting diode (OLED), a liquid crystal display (LCD), a cathode ray tube (CRT) display, an in-place switching (IPS) display, a touchscreen, etc.), a tactile output device, a printer, and/or speaker. The interface circuitry 22220 of the illustrated example, thus, typically includes a graphics driver card, a graphics driver chip, and/or graphics processor circuitry such as a GPU.

The interface circuitry 22220 of the illustrated example also includes a communication device such as a transmitter, a receiver, a transceiver, a modem, a residential gateway, a wireless access point, and/or a network interface to facilitate exchange of data with external machines (e.g., computing devices of any kind) by a network 22226. The communication can be by, for example, an Ethernet connection, a digital subscriber line (DSL) connection, a telephone line connection, a coaxial cable system, a satellite system, a line-of-site wireless system, a cellular telephone system, an optical connection, etc.

The programmable circuitry platform 22200 of the illustrated example also includes one or more mass storage devices 22228 to store software and/or data. Examples of such mass storage devices 22228 include magnetic storage devices (e.g., floppy disk, drives, HDDs, etc.), optical storage devices (e.g., Blu-ray disks, CDs, DVDs, etc.), RAID systems, and/or solid-state storage discs or devices such as flash memory devices and/or SSDs.

The machine executable instructions 22232, which may be implemented by the machine readable instructions of FIGS. 5 and/or 8, may be stored in the mass storage device 22228, in the volatile memory 22214, in the non-volatile memory 22216, and/or on at least one non-transitory computer readable storage medium such as a CD or DVD which may be removable.

FIG. 223 is a block diagram of an example implementation of the programmable circuitry 22112, 22212 of FIGS. 221 and 222. In this example, the programmable circuitry 22112, 22212 of FIGS. 221 and 222 is implemented by a microprocessor 22300. For example, the microprocessor 22300 may be a general purpose microprocessor (e.g., general purpose microprocessor circuitry). The microprocessor 22300 executes some or all of the machine readable instructions of the flowchart of FIGS. 5, 7, 8, 9, and/or 11 to effectively instantiate the circuitry of FIGS. 3-4 logic circuits to perform the operations corresponding to those machine readable instructions. In some such examples, the circuitry of FIGS. 3-4 is instantiated by the hardware circuits of the microprocessor 22300 in combination with the instructions. For example, the microprocessor 22300 may implement multi-core hardware circuitry such as a CPU, a DSP, a GPU, an XPU, etc. Although it may include any number of example cores 22302 (e.g., 1 core), the microprocessor 22300 of this example is a multi-core semiconductor device including N cores. The cores 22302 of the microprocessor 22300 may operate independently or may cooperate to execute machine readable instructions. For example, machine code corresponding to a firmware program, an embedded software program, or a software program may be executed by one of the cores 22302 or may be executed by multiple ones of the cores 22302 at the same or different times. In some examples, the machine code corresponding to the firmware program, the embedded software program, or the software program is split into threads and executed in parallel by two or more of the cores 22302. The software program may correspond to a portion or all of the machine readable instructions and/or operations represented by the flowcharts of FIGS. 5, 7, 8, 9, and/or 11.

The cores 22302 may communicate by a first example bus 22304. In some examples, the first bus 22304 may implement a communication bus to effectuate communication associated with one(s) of the cores 22302. For example, the first bus 22304 may implement at least one of an Inter-Integrated Circuit (I2C) bus, a Serial Peripheral Interface (SPI) bus, a PCI bus, or a PCIe bus. Additionally or alternatively, the first bus 22304 may implement any other type of computing or electrical bus. The cores 22302 may obtain data, instructions, and/or signals from one or more external devices by example interface circuitry 22306. The cores 22302 may output data, instructions, and/or signals to the one or more external devices by the interface circuitry 22306. Although the cores 22302 of this example include example local memory 22320 (e.g., Level 1 (L1) cache that may be split into an L1 data cache and an L1 instruction cache), the microprocessor 22300 also includes example shared memory 22310 that may be shared by the cores (e.g., Level 2 (L2_cache)) for high-speed access to data and/or instructions. Data and/or instructions may be transferred (e.g., shared) by writing to and/or reading from the shared memory 22310. The local memory 22320 of each of the cores 22302 and the shared memory 22310 may be part of a hierarchy of storage devices including multiple levels of cache memory and the main memory (e.g., the main memory 22314, 22316 of FIG. 223). Typically, higher levels of memory in the hierarchy exhibit lower access time and have smaller storage capacity than lower levels of memory. Changes in the various levels of the cache hierarchy are managed (e.g., coordinated) by a cache coherency policy.

Each core 22302 may be referred to as a CPU, DSP, GPU, etc., or any other type of hardware circuitry. Each core 222302 includes control unit circuitry 22314, arithmetic and logic (AL) circuitry (sometimes referred to as an ALU) 22316, a plurality of registers 22318, the L1 cache 22320, and a second example bus 22322. Other structures may be present. For example, each core 22302 may include vector unit circuitry, single instruction multiple data (SIMD) unit circuitry, load/store unit (LSU) circuitry, branch/jump unit circuitry, floating-point unit (FPU) circuitry, etc. The control unit circuitry 22314 includes semiconductor-based circuits structured to control (e.g., coordinate) data movement within the corresponding core 22302. The AL circuitry 22316 includes semiconductor-based circuits structured to perform one or more mathematic and/or logic operations on the data within the corresponding core 22302. The AL circuitry 22316 of some examples performs integer-based operations. In other examples, the AL circuitry 22316 also performs floating-point operations. In yet other examples, the AL circuitry 22316 may include first AL circuitry that performs integer-based operations and second AL circuitry that performs floating point operations. In some examples, the AL circuitry 22316 may be referred to as an Arithmetic Logic Unit (ALU).

The registers 22318 are semiconductor-based structures to store data and/or instructions such as results of one or more of the operations performed by the AL circuitry 22316 of the corresponding core 22302. For example, the registers 22318 may include vector register(s), SIMD register(s), general purpose register(s), flag register(s), segment register(s), machine specific register(s), instruction pointer register(s), control register(s), debug register(s), memory management register(s), machine check register(s), etc. The registers 22318 may be arranged in a bank as shown in FIG. 223. Alternatively, the registers 22318 may be organized in any other arrangement, format, or structure including distributed throughout the core 22302 to shorten access time. The second bus 22322 may be implemented by at least one of an I2C bus, a SPI bus, a PCI bus, or a PCIe bus.

Each core 22302 and/or, more generally, the microprocessor 22300 may include additional and/or alternate structures to those shown and described above. For example, one or more clock circuits, one or more power supplies, one or more power gates, one or more cache home agents (CHAs), one or more converged/common mesh stops (CMSs), one or more shifters (e.g., barrel shifter(s)) and/or other circuitry may be present. The microprocessor 22300 is a semiconductor device fabricated to include many transistors interconnected to implement the structures described above in one or more integrated circuits (ICs) contained in one or more packages.

The microprocessor 22300 may include and/or cooperate with one or more accelerators (e.g., acceleration circuitry, hardware accelerators, etc.). In some examples, accelerators are implemented by logic circuitry to perform certain tasks more quickly and/or efficiently than can be done by a general-purpose processor. Examples of accelerators include ASICs and FPGAs such as those discussed herein. A GPU, DSP and/or other programmable device can also be an accelerator. Accelerators may be on-board the microprocessor 22300, in the same chip package as the microprocessor 22300 and/or in one or more separate packages from the microprocessor 22300.

FIG. 224 is a block diagram of another example implementation of the programmable circuitry of FIGS. 221-222. In this example, the programmable circuitry 22112, 22212 is implemented by FPGA circuitry 22400. For example, the FPGA circuitry 22400 may be implemented by an FPGA. The FPGA circuitry 22400 can be used, for example, to perform operations that could otherwise be performed by the example microprocessor 22400 of FIG. 224 executing corresponding machine readable instructions. However, once configured, the FPGA circuitry 22400 instantiates the operations and/or functions corresponding to the machine readable instructions in hardware and, thus, can often execute the operations/functions faster than they could be performed by a general-purpose microprocessor executing the corresponding software.

More specifically, in contrast to the microprocessor 22300 of FIG. 223 described above (which is a general purpose device that may be programmed to execute some or all of the machine readable instructions represented by the flowcharts of FIGS. 5, 7, 8, 9, and/or 11 but whose interconnections and logic circuitry are fixed once fabricated), the FPGA circuitry 22400 of the example of FIG. 224 includes interconnections and logic circuitry that may be configured, structured, programmed, and/or interconnected in different ways after fabrication to instantiate, for example, some or all of the operations/functions corresponding to the machine readable instructions represented by the flowcharts of FIGS. 5, 7, 8, 9, and/or 11. In particular, the FPGA 22400 may be thought of as an array of logic gates, interconnections, and switches. The switches can be programmed to change how the logic gates are interconnected by the interconnections, effectively forming one or more dedicated logic circuits (unless and until the FPGA circuitry 22400 is reprogrammed). The configured logic circuits enable the logic gates to cooperate in different ways to perform different operations on data received by input circuitry. Those operations may correspond to some or all of the instructions (e.g., the software and/or firmware) represented by the flowcharts of FIGS. 5, 7, 8, 9, and/or 11. As such, the FPGA circuitry 22400 may be configured and/or structured to effectively instantiate some or all of the operations/functions corresponding to the machine readable instructions of the flowcharts of FIGS. 5, 7, 8, 9, and/or 11 as dedicated logic circuits to perform the operations/functions corresponding to those software instructions in a dedicated manner analogous to an ASIC. Therefore, the FPGA circuitry 22400 may perform the operations/functions corresponding to the some or all of the machine readable instructions of FIGS. 5, 7, 8, 9, and/or 11 faster than the general-purpose microprocessor can execute the same.

In the example of FIG. 224, the FPGA circuitry 22400 is configured and/or structured in response to being programmed (and/or reprogrammed one or more times) based on a binary file. In some examples, the binary file may be compiled and/or generated based on instructions in a hardware description language (HDL) such as Lucid, Very High Speed Integrated Circuits (VHSIC) Hardware Description Language (VHDL), or Verilog. For example, a user (e.g., a human user, a machine user, etc.) may write code or a program corresponding to one or more operations/functions in an HDL; the code/program may be translated into a low-level language as needed; and the code/program (e.g., the code/program in the low-level language) may be converted (e.g., by a compiler, a software application, etc.) into the binary file. In some examples, the FPGA circuitry 22400 of FIG. 224 may access and/or load the binary file to cause the FPGA circuitry 22400 of FIG. 224 to be configured and/or structured to perform the one or more operations/ functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 22400 of FIG. 224 to cause configuration and/or structuring of the FPGA circuitry 22400 of FIG. 224, or portion(s) thereof.

In some examples, the binary file is compiled, generated, transformed, and/or otherwise output from a uniform software platform utilized to program FPGAs. For example, the uniform software platform may translate first instructions (e.g., code or a program) that correspond to one or more operations/functions in a high-level language (e.g., C, C++, Python, etc.) into second instructions that correspond to the one or more operations/functions in an HDL. In some such examples, the binary file is compiled, generated, and/or otherwise output from the uniform software platform based on the second instructions. In some examples, the FPGA circuitry 22400 of FIG. 224 may access and/or load the binary file to cause the FPGA circuitry 22400 of FIG. 224 to be configured and/or structured to perform the one or more operations/functions. For example, the binary file may be implemented by a bit stream (e.g., one or more computer-readable bits, one or more machine-readable bits, etc.), data (e.g., computer-readable data, machine-readable data, etc.), and/or machine-readable instructions accessible to the FPGA circuitry 22400 of FIG. 224 to cause configuration and/or structuring of the FPGA circuitry 22400 of FIG. 224, or portion(s) thereof.

The FPGA circuitry 22400 of FIG. 224, includes example input/output (I/O) circuitry 22402 to obtain and/or output data to/from example configuration circuitry 22404 and/or external hardware 22406. For example, the configuration circuitry 22404 may be implemented by interface circuitry that may obtain a binary file, which may be implemented by a bit stream, data, and/or machine-readable instructions, to configure the FPGA circuitry 22400, or portion(s) thereof. In some such examples, the configuration circuitry 22404 may obtain the binary file from a user, a machine (e.g., hardware circuitry (e.g., programmable or dedicated circuitry) that may implement an Artificial Intelligence/Machine Learning (AI/ML) model to generate the binary file), etc., and/or any combination(s) thereof). In some examples, the external hardware 22406 may be implemented by external hardware circuitry. For example, the external hardware 22406 may be implemented by the microprocessor 22300 of FIG. 223.

The FPGA circuitry 22300 also includes an array of example logic gate circuitry 22308, a plurality of example configurable interconnections 22310, and example storage circuitry 22312. The logic gate circuitry 22308 and the configurable interconnections 22310 are configurable to instantiate one or more operations/functions that may correspond to at least some of the machine readable instructions of FIGS. 5, 7, 8, 9, 11 and/or other desired operations. The logic gate circuitry 22408 shown in FIG. 224 is fabricated in blocks or groups. Each block includes semiconductor-based electrical structures that may be configured into logic circuits. In some examples, the electrical structures include logic gates (e.g., And gates, Or gates, Nor gates, etc.) that provide basic building blocks for logic circuits. Electrically controllable switches (e.g., transistors) are present within each of the logic gate circuitry 22408 to enable configuration of the electrical structures and/or the logic gates to form circuits to perform desired operations/functions. The logic gate circuitry 22408 may include other electrical structures such as look-up tables (LUTs), registers (e.g., flip-flops or latches), multiplexers, etc.

The configurable interconnections 22410 of the illustrated example are conductive pathways, traces, vias, or the like that may include electrically controllable switches (e.g., transistors) whose state can be changed by programming (e.g., using an HDL instruction language) to activate or deactivate one or more connections between one or more of the logic gate circuitry 22408 to program desired logic circuits.

The storage circuitry 22412 of the illustrated example is structured to store result(s) of the one or more of the operations performed by corresponding logic gates. The storage circuitry 22412 may be implemented by registers or the like. In the illustrated example, the storage circuitry 22412 is distributed amongst the logic gate circuitry 22408 to facilitate access and increase execution speed.

The example FPGA circuitry 22400 of FIG. 224 also includes example dedicated operations circuitry 22414. In this example, the dedicated operations circuitry 22414 includes special purpose circuitry 22416 that may be invoked to implement commonly used functions to avoid the need to program those functions in the field. Examples of such special purpose circuitry 22416 include memory (e.g., DRAM) controller circuitry, PCIe controller circuitry, clock circuitry, transceiver circuitry, memory, and multiplier-accumulator circuitry. Other types of special purpose circuitry may be present. In some examples, the FPGA circuitry 22400 may also include example general purpose programmable circuitry 22418 such as an example CPU 22420 and/or an example DSP 22422. Other general purpose programmable circuitry 22418 may additionally or alternatively be present such as a GPU, an XPU, etc., that can be programmed to perform other operations.

Although FIGS. 223 and 224 illustrate two example implementations of the programmable circuitry 22112, 22212 of FIGS. 221-222, many other approaches are contemplated. For example, FPGA circuitry may include an on-board CPU, such as one or more of the example CPU 22420 of FIG. 224. Therefore, the programmable circuitry 22112, 22212 of FIGS. 221-222 may additionally be implemented by combining at least the example microprocessor 22300 of FIG. 223 and the example FPGA circuitry 22400 of FIG. 224. In some such hybrid examples, one or more cores 22402 of FIG. 224 may execute a first portion of the machine readable instructions represented by the flowchart (s) of FIGS. 5, 7, 8, 9, and/or 11 to perform first operation (s)/function(s), the FPGA circuitry 22400 of FIG. 15 may be configured and/or structured to perform second operation (s)/function(s) corresponding to a second portion of the machine readable instructions represented by the flowcharts of FIGS. 5, 7, 8, 9, and/or 11, and/or an ASIC may be configured and/or structured to perform third operation(s)/ function(s) corresponding to a third portion of the machine readable instructions represented by the flowcharts of FIGS. 5, 7, 8, 9, and/or 11.

It should be understood that some or all of the circuitry of FIGS. 3-4 may, thus, be instantiated at the same or different times. For example, same and/or different portion(s) of the microprocessor 22300 of FIG. 223 may be programmed to execute portion(s) of machine-readable instructions at the same and/or different times. In some examples, same and/or different portion(s) of the FPGA circuitry 22400 of FIG. 224 may be configured and/or structured to perform operations/ functions corresponding to portion(s) of machine-readable instructions at the same and/or different times.

In some examples, some or all of the circuitry of FIGS. 3-4 may be instantiated, for example, in one or more threads executing concurrently and/or in series. For example, the microprocessor 22300 of FIG. 223 may execute machine readable instructions in one or more threads executing concurrently and/or in series. In some examples, the FPGA circuitry 22400 of FIG. 224 may be configured and/or structured to carry out operations/functions concurrently and/or in series. Moreover, in some examples, some or all of the circuitry of FIGS. 3-4 may be implemented within one or more virtual machines and/or containers executing on the microprocessor 22300 of FIG. 223.

In some examples, the programmable circuitry 22112, 22212 of FIGS. 221-222 may be in one or more packages. For example, the microprocessor 22300 of FIG. 223 and/or the FPGA circuitry 22400 of FIG. 224 may be in one or more packages. In some examples, an XPU may be implemented by the programmable circuitry 22112, 22212 of FIGS. 221-222 which may be in one or more packages. For example, the XPU may include a CPU (e.g., the microprocessor 22300 of FIG. 223, the CPU 22420 of FIG. 224, etc.) in one package, a DSP (e.g., the DSP 22422 of FIG. 224) in another package, a GPU in yet another package, and an FPGA (e.g., the FPGA circuitry 22400 of FIG. 224) in still yet another package.

A block diagram illustrating an example software distribution platform 22505 to distribute software such as the example machine readable instructions 22132, 22232 of FIGS. 221-222 to other hardware devices (e.g., hardware devices owned and/or operated by third parties from the owner and/or operator of the software distribution platform) is illustrated in FIG. 225. The example software distribution platform 22505 may be implemented by any computer server, data facility, cloud service, etc., capable of storing and transmitting software to other computing devices. The third parties may be customers of the entity owning and/or operating the software distribution platform 22505. For example, the entity that owns and/or operates the software distribution platform 22505 may be a developer, a seller, and/or a licensor of software such as the example machine readable instructions 22132, 22232 of FIGS. 221-222. The third parties may be consumers, users, retailers, OEMs, etc., who purchase and/or license the software for use and/or re-sale and/or sub-licensing. In the illustrated example, the software distribution platform 22505 includes one or more servers and one or more storage devices. The storage devices store the machine readable instructions 22132, 22232, which may correspond to the example machine readable instructions of FIGS. 5, 7, 8, 9, and/or 11, as described above. The one or more servers of the example software distribution platform 22505 are in communication with an example network 22510, which may correspond to any one or more of the Internet and/or any of the example networks described above. In some examples, the one or more servers are responsive to requests to transmit the software to a requesting party as part of a commercial transaction. Payment for the delivery, sale, and/or license of the software may be handled by the one or more servers of the software distribution platform and/or by a third party payment entity. The servers enable purchasers and/or licensors to download the machine readable instructions 22132, 22232 from the software distribution platform 22505. For example, the software, which may correspond to the example machine readable instructions of FIGS. 5, 7, 8, 9, and/or 11, may be downloaded to the example programmable circuitry platform(s) 22100, 22200, which is to execute the machine readable instructions 22132, 22232 to implement the client circuitry 125 and/or the server circuitry 145. In some examples, one or more servers of the software distribution platform 22505 periodically offer, transmit, and/or force updates to the software (e.g., the example machine readable instructions 22132, 22232 of FIGS. 221, 222) to ensure improvements, patches, updates, etc., are distributed and applied to the software at the end user devices. Although referred to as software above, the distributed "software" could alternatively be firmware.

"Including" and "comprising" (and all forms and tenses thereof) are used herein to be open ended terms. Thus, whenever a claim employs any form of "include" or "comprise" (e.g., comprises, includes, comprising, including, having, etc.) as a preamble or within a claim recitation of any kind, it is to be understood that additional elements, terms, etc., may be present without falling outside the scope of the corresponding claim or recitation. As used herein, when the phrase "at least" is used as the transition term in, for example, a preamble of a claim, it is open-ended in the same manner as the term "comprising" and "including" are open ended. The term "and/of" when used, for example, in a form such as A, B, and/or C refers to any combination or subset of A, B, C such as (1) A alone, (2) B alone, (3) C alone, (4) A with B, (5) A with C, (6) B with C, or (7) A with B and with C. As used herein in the context of describing structures, components, items, objects and/or things, the phrase "at least one of A and B" is intended to refer to implementations including any of (1) at least one A, (2) at least one B, or (3) at least one A and at least one B. Similarly, as used herein in the context of describing structures, components, items, objects and/or things, the phrase "at least one of A or B" is intended to refer to implementations including any of (1) at least one A, (2) at least one B, or (3) at least one A and at least one B. As used herein in the context of describing the performance or execution of processes, instructions, actions, activities, etc., the phrase "at least one of A and B" is intended to refer to implementations including any of (1) at least one A, (2) at least one B, or (3) at least one A and at least one B. Similarly, as used herein in the context of describing the performance or execution of processes, instructions, actions, activities, etc., the phrase "at least one of A or B" is intended to refer to implementations including any of (1) at least one A, (2) at least one B, or (3) at least one A and at least one B.

As used herein, singular references (e.g., "a", "an", "first", "second", etc.) do not exclude a plurality. The term "a" or "an" object, as used herein, refers to one or more of that object. The terms "a" (or "an"), "one or more", and "at least one" are used interchangeably herein. Furthermore, although individually listed, a plurality of means, elements, or actions may be implemented by, e.g., the same entity or object. Additionally, although individual features may be included in different examples or claims, these may possibly be combined, and the inclusion in different examples or claims does not imply that a combination of features is not feasible and/or advantageous.

As used herein, the phrase "in communication," including variations thereof, encompasses direct communication and/or indirect communication through one or more intermediary components, and does not require direct physical (e.g., wired) communication and/or constant communication, but rather additionally includes selective communication at periodic intervals, scheduled intervals, aperiodic intervals, and/or one-time events.

As used herein, "programmable circuitry" is defined to include (i) one or more special purpose electrical circuits (e.g., an application specific circuit (ASIC)) structured to perform specific operation(s) and including one or more semiconductor-based logic devices (e.g., electrical hardware implemented by one or more transistors), and/or (ii) one or more general purpose semiconductor-based electrical circuits programmable with instructions to perform specific functions(s) and/or operation(s) and including one or more semiconductor-based logic devices (e.g., electrical hardware implemented by one or more transistors). Examples of programmable circuitry include programmable microprocessors such as Central Processor Units (CPUs) that may execute first instructions to perform one or more operations and/or functions, Field Programmable Gate Arrays (FPGAs) that may be programmed with second instructions to cause configuration and/or structuring of the FPGAs to instantiate one or more operations and/or functions corresponding to the first instructions, Graphics Processor Units (GPUs) that may execute first instructions to perform one or more operations and/or functions, Digital Signal Processors (DSPs) that may execute first instructions to perform one or more operations and/or functions, XPUs, Network Processing Units (NPUs) one or more microcontrollers that may execute first instructions to perform one or more operations and/or functions and/or integrated circuits such as Application Specific Integrated Circuits (ASICs). For example, an XPU may be implemented by a heterogeneous computing system including multiple types of programmable circuitry (e.g., one or more FPGAs, one or more CPUs, one or more GPUs, one or more NPUs, one or more DSPs, etc., and/or any combination(s) thereof), and orchestration technology (e.g., application programming interface(s) (API(s)) that may assign computing task(s) to whichever one(s) of the multiple types of programmable circuitry is/are suited and available to perform the computing task(s).

As used herein integrated circuit/circuitry is defined as one or more semiconductor packages containing one or more circuit elements such as transistors, capacitors, inductors, resistors, current paths, diodes, etc. For example, an integrated circuit may be implemented as one or more of an ASIC, an FPGA, a chip, a microchip, programmable circuitry, a semiconductor substrate coupling multiple circuit elements, a system on chip (SoC), etc.

From the foregoing, it will be appreciated that example systems, methods, apparatus, and articles of manufacture disclosed herein introduce a conversational workshop as part of a virtual meeting platform, including consent-based, consensus-based, and consent-consensus-based conversational workshops. For example, participants can collaborate through hands-on activities and/or focus on a conversational goal (e.g., sharing knowledge with others and/or communicating important topics, aligning understanding, making a decision or solving a problem, fostering relationships among participants, etc.). In examples disclosed herein, a conversation flow includes a sequence of activities that participants follow to successfully achieve the conversation's intended goal. In some examples, the activities can be arranged in sequence, conditionally, recursively, and/or in any other combination.

The following claims are hereby incorporated into this Detailed Description by this reference. Although certain example systems, methods, apparatus, and articles of manufacture have been disclosed herein, the scope of coverage of this patent is not limited thereto. On the contrary, this patent covers all systems, methods, apparatus, and articles of manufacture fairly falling within the scope of the claims of this patent.

What is claimed is:

1. An apparatus comprising:
interface circuitry;
machine-readable instructions; and
at least one processor circuit to be programmed by the machine-readable instructions to:
present a graphical user interface associated with a conversational workshop in a computing environment, a type of the graphical user interface presented based on a status of a user account;
identify a conversation flow to present on the graphical user interface, the conversation flow based on a type of activity;
initiate a virtual room based on the type of activity, the virtual room selected from a first virtual room type and a second virtual room type, the first virtual room type different from the second virtual room type;
admit a plurality of users to the virtual room, the virtual room to allow the plurality of users to enter a first user input based on the type of activity and a status of the user;
receive second user input associated with the type of activity, the second user input including input from the plurality of users;
identify at least one of a consent or a consensus from the second user input; and
output, based on the at least one of the consent or the consensus, a progress of the conversational workshop, wherein the progress includes a transition from the first virtual room type to the second virtual room type.

2. The apparatus of claim 1, wherein one or more of the at least one processor circuit is to identify the consent based on user confirmation of an outcome of the type of activity, the outcome for a first user different from the outcome for a second user.

3. The apparatus of claim 1, wherein one or more of the at least one processor circuit is to identify the consensus based on user confirmation of an outcome of the type of activity, the outcome for a first user identical to the outcome for a second user.

4. The apparatus of claim 1, wherein one or more of the at least one processor circuit is to identify the graphical user interface for at least one of a user account with access to the conversational workshop, a user account for an owner of the conversational workshop, or a user account for an administrator of the conversational workshop.

5. The apparatus of claim 1, wherein one or more of the at least one processor circuit is to update the graphical user interface based on changes to a conversation state, the type of activity associated with the conversation state.

6. The apparatus of claim 1, wherein, when the type of activity is a composite activity, one or more of the at least one processor circuit is to identify the composite activity as a solo activity, a group activity, or a team activity.

7. The apparatus of claim 1, wherein the first virtual room type or the second virtual room type displays text and video-based information to the plurality of users.

8. The apparatus of claim 1, wherein the consent represents (1) a single user-based input on behalf of the plurality of users or (2) a collective response from the plurality of users based on the type of activity.

9. The apparatus of claim 1, wherein the consensus represents a matching selection made by the plurality of users.

10. The apparatus of claim 1, wherein the graphical user interface includes a display of artifacts accessible by at least one of the plurality of users in connection with a completion of the conversation flow, the artifacts corresponding to at least one of a certificate, a contract, a digital book, a video, a handout, a recommendation, or a reading list.

11. At least one non-transitory machine-readable medium comprising machine-readable instructions to cause at least one processor circuit to at least:

present a graphical user interface associated with a conversational workshop, a type of the graphical user interface presented based on a status of a user account;

identify a conversation flow to present on the graphical user interface, the conversation flow based on a type of activity;

initiate a virtual room based on the type of activity, the virtual room selected from a first virtual room type and a second virtual room type, the first virtual room type different from the second virtual room type;

admit a plurality of users to the virtual room, the virtual room to allow the plurality of users to enter a first user input based on the type of activity and a status of the user;

receive second user input associated with the type of activity, the second user input including input from the plurality of users;

identify at least one of a consent or a consensus from the second user input; and output, based on the at least one of the consent or the consensus, a progress of the conversational workshop, wherein the progress includes a transition from the first virtual room type to the second virtual room type.

12. The at least one non-transitory machine-readable medium of claim 11, wherein the machine-readable instructions are to cause one or more of the at least one processor circuit to identify the consent based on user confirmation of an outcome of the type of activity, the outcome for a first user different from the outcome for a second user.

13. The at least one non-transitory machine-readable medium of claim 11, wherein the machine-readable instructions are to cause one or more of the at least one processor circuit to identify the consensus based on user confirmation of an outcome of the type of activity, the outcome for a first user identical to the outcome for a second user.

14. The at least one non-transitory machine-readable medium of claim 11, wherein the machine-readable instructions are to cause one or more of the at least one processor circuit to identify the graphical user interface for at least one of a user account with access to the conversational workshop, a user account for an owner of the conversational workshop, or a user account for an administrator of the conversational workshop.

15. The at least one non-transitory machine-readable medium of claim 11, wherein the machine-readable instructions are to cause one or more of the at least one processor circuit to update the graphical user interface, based on changes to a conversation state, the type of activity associated with the conversation state.

16. The at least one non-transitory machine-readable medium of claim 11, wherein, when the type of activity is a composite activity, the machine-readable instructions are to cause one or more of the at least one processor circuit to identify the composite activity as a solo activity, a group activity, or a team activity.

17. A method comprising:

presenting a graphical user interface associated with a conversational workshop, a type of the graphical user interface presented based on a status of a user account;

identifying, by at least one processor circuit programmed by at least one instruction, a conversation flow to present on the graphical user interface, the conversation flow based on a type of activity;

initiating, by one or more of the at least one processor circuit, a virtual room based on the type of activity, the virtual room selected from a first virtual room type and a second virtual room type, the first virtual room type different from the second virtual room type;

admitting a plurality of users to the virtual room, the virtual room to allow the plurality of users to enter a first user input based on the type of activity and a status of the user;

receiving second user input associated with the type of activity, the second user input including input from the plurality of users;

identifying a consent from the second user input;

identifying a consensus from the second user input; and outputting, based on the consent and the consensus, a progress of the conversational workshop, wherein the progress includes a transition from the first virtual room type to the second virtual room type.

18. The method of claim 17, including identifying the consent based on user confirmation of an outcome of the type of activity, the outcome for a first user different from the outcome for a second user.

19. The method of claim 17, including identifying the consensus based on user confirmation of an outcome of the type of activity, the outcome for a first user identical to the outcome for a second user.

20. The method of claim 17, including identifying the graphical user interface for at least one of a user account with access to the conversational workshop, a user account for an owner of the conversational workshop, or a user account for an administrator of the conversational workshop.

* * * * *